US011205141B2

(12) United States Patent
De Spong

(10) Patent No.: US 11,205,141 B2
(45) Date of Patent: *Dec. 21, 2021

(54) METHODS AND SYSTEMS FOR RESOURCE AND ORGANIZATION ACHIEVEMENT

(71) Applicant: SHARED PERFORMANCE, LLC, Scottsdale, AZ (US)

(72) Inventor: David T. De Spong, Scottsdale, AZ (US)

(73) Assignee: Shared Performance, LLC, Scottsdale, AZ (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/005,021

(22) Filed: Jun. 11, 2018

(65) Prior Publication Data
US 2019/0258972 A1    Aug. 22, 2019

Related U.S. Application Data

(63) Continuation of application No. 12/785,398, filed on May 21, 2010, now Pat. No. 10,002,332.

(60) Provisional application No. 61/180,360, filed on May 21, 2009, provisional application No. 61/231,123, filed on Aug. 4, 2009.

(51) Int. Cl.
  *G06Q 10/06* (2012.01)
  *G06Q 30/02* (2012.01)
(52) U.S. Cl.
  CPC ......... *G06Q 10/06* (2013.01); *G06Q 30/0202* (2013.01); *G06Q 30/0235* (2013.01)

(58) Field of Classification Search
None
See application file for complete search history.

(56) References Cited

U.S. PATENT DOCUMENTS

| 6,542,933 B1* | 4/2003 | Durst, Jr. | G06F 16/9554 709/229 |
| 2002/0049621 A1* | 4/2002 | Bruce | G06Q 10/06 705/7.26 |
| 2002/0188527 A1 | 12/2002 | Dillard et al. | |
| 2003/0018510 A1* | 1/2003 | Sanches | G06Q 10/10 717/102 |
| 2003/0115209 A1* | 6/2003 | Murray | G06F 16/93 |

(Continued)

OTHER PUBLICATIONS

International Search Report and Written Opinion for PCT/US10/35879 dated Nov. 2, 2010 (19 pages).

(Continued)

*Primary Examiner* — Stephanie Z Delich
(74) *Attorney, Agent, or Firm* — Brooks Kushman P.C.

(57) ABSTRACT

Methods and systems for resource and organization achievement are described. In one embodiment, outcome data associated with a resource may be received. The outcome data may include an outcome time period, an outcome title, an outcome priority, an outcome status, and an outcome access level. The outcome status may identify progress by the resource toward an outcome. The outcome access level may define resource access to an outcome item. The outcome data may be stored in a database. A display of an outcome item associated with the resource may be generated based on at least a portion of the outcome data. The outcome item may represent the outcome for the resource. Additional methods and systems are disclosed.

21 Claims, 96 Drawing Sheets

(56) References Cited

U.S. PATENT DOCUMENTS

| | | | |
|---|---|---|---|
| 2004/0002885 A1* | 1/2004 | Levy | G06Q 10/109 |
| | | | 705/50 |
| 2004/0098366 A1* | 5/2004 | Sinclair | G06F 21/6245 |
| 2005/0114829 A1* | 5/2005 | Robin | G06Q 10/06 |
| | | | 717/101 |
| 2005/0278198 A1* | 12/2005 | Huxol | G06Q 10/0635 |
| | | | 705/4 |
| 2006/0026053 A1* | 2/2006 | Dezonno | G06Q 10/06 |
| | | | 705/7.15 |
| 2006/0190391 A1* | 8/2006 | Cullen, III | G06Q 10/10 |
| | | | 705/37 |
| 2008/0077530 A1* | 3/2008 | Banas | G06Q 10/06313 |
| | | | 705/50 |
| 2008/0086353 A1* | 4/2008 | Motwani | G06Q 10/06313 |
| | | | 705/7.23 |
| 2008/0221961 A1 | 9/2008 | James | |
| 2008/0313004 A1* | 12/2008 | Ryan | G06Q 10/109 |
| | | | 705/7.17 |
| 2009/0319312 A1* | 12/2009 | Moerdler | G06Q 10/06316 |
| | | | 705/7.28 |

OTHER PUBLICATIONS

Karatepe, O. et al., "Relationships of Supervisor Support and Conflicts in the Work-Family Interface with the Selected Job Outcomes of Frontline Employees," Science Direct, Tourism Management 28 (2007), pp. 238-252.

Kearns, et al., Strategic Alignment Between Business and Information Technology: A Knowledge-Based View of Beahviours, Outcomes and Consequences, Journal of Management Information Systems, v. 23, issue 3 (2006), 35 pgs.

Qing L, et al., "Business Processes Oriented Heterogeneous Systems Integration Platform for Networked Enterprises," Computers in Industry, 2009, 18 pgs.

* cited by examiner

| OUTCOME ACCESS LEVELS | | |
|---|---|---|
| Access Level | Icon | Who else can see the Outcome |
| Anyone Above | | Your manager and any manager in direct line to the CEO. |
| Anyone Above & Direct Reports | | Your manager and any manager in direct line to the CEO & Anyone who reports directly to you. |
| Anyone Above & Below | | Your manager and any manager in direct line to the CEO & Anyone in your department/team. |
| Anyone | | Anyone in the organization who can connect to you. |
| Private | | Only you. |
| Private (Custom) | | For each Access Level, you can grant access to specific people in the organization |

FIGURE 13

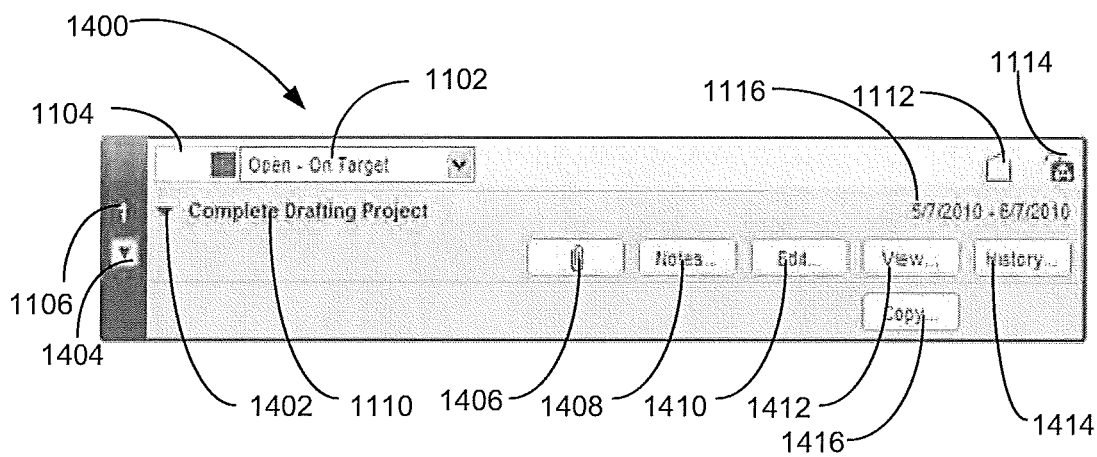

| FIELD | VALUE | USER | DATE |
|---|---|---|---|
| Access Level | Anyone Above & Direct Reports | Dave Chapman | 5/7/2010 10:28:46 AM |
| Customer User | Dave Chapman | Dave Chapman | 5/7/2010 10:28:46 AM |
| Description | | Dave Chapman | 5/7/2010 10:28:46 AM |
| Manager Acceptance | Un-Accept | Dave Chapman | 5/7/2010 10:28:46 AM |
| Measurement | | Dave Chapman | 5/7/2010 10:28:46 AM |
| Period End | Jun 7 2010 12:00AM | Dave Chapman | 5/7/2010 10:28:46 AM |
| Period Start | May 7 2010 12:00AM | Dave Chapman | 5/7/2010 10:28:46 AM |
| Priority | 1 | Dave Chapman | 5/7/2010 10:28:46 AM |
| Status | Open - On Target | Dave Chapman | 5/7/2010 10:28:46 AM |
| Title | Complete Drafting Project | Dave Chapman | 5/7/2010 10:28:46 AM |

| FIELD | VALUE | USER | DATE |
|---|---|---|---|
| Manager Acceptance | Un-Accept | Dave Chapman | 5/7/2010 5:00:09 PM |
| Status | Open – On Hold | Dave Chapman | 5/7/2010 5:00:09 PM |
| Manager Acceptance | Un-Accept | Dave Chapman | 5/7/2010 4:59:47 PM |
| Status | Closed – Achieved | Dave Chapman | 5/7/2010 4:59:47 PM |
| Status | Open – Warning | Dave Chapman | 5/7/2010 4:59:39 PM |
| Contribution | 50 | Dave Chapman | 5/7/2010 4:58:27 PM |
| Display Order | 7 | Dave Chapman | 5/7/2010 4:58:18 PM |
| Display Order | 8 | Dave Chapman | 5/7/2010 4:58:15 PM |
| Display Order | 9 | Dave Chapman | 5/7/2010 4:58:15 PM |
| Display Order | 10 | Dave Chapman | 5/7/2010 4:58:12 PM |

History: Draft plans for book applies to Complete Drafting Project Outcome

FIGURE 30

| FIELD | VALUE | USER | DATE |
|---|---|---|---|
| Manager Acceptance | Un-Accept | Dave Chapman | 5/10/2010 11:07:20 AM |
| Period End | Jun 14 2010 12:00AM | Dave Chapman | 5/10/2010 11:07:20 AM |
| Status | Open - Warning | Dave Chapman | 5/10/2010 11:07:20 AM |
| Manager Acceptance | Accept | George Nagel | 5/10/2010 10:55:24 AM |
| Access Level | Anyone Above & Direct Reports | Dave Chapman | 5/7/2010 10:28:46 AM |
| Customer User | Dave Chapman | Dave Chapman | 5/7/2010 10:28:46 AM |
| Description | | Dave Chapman | 5/7/2010 10:28:46 AM |
| Manager Acceptance | Un-Accept | Dave Chapman | 5/7/2010 10:28:46 AM |
| Measurement | | Dave Chapman | 5/7/2010 10:28:46 AM |
| Period End | Jun 7 2010 12:00AM | Dave Chapman | 5/7/2010 10:28:46 AM |

History: Complete Drafting Project

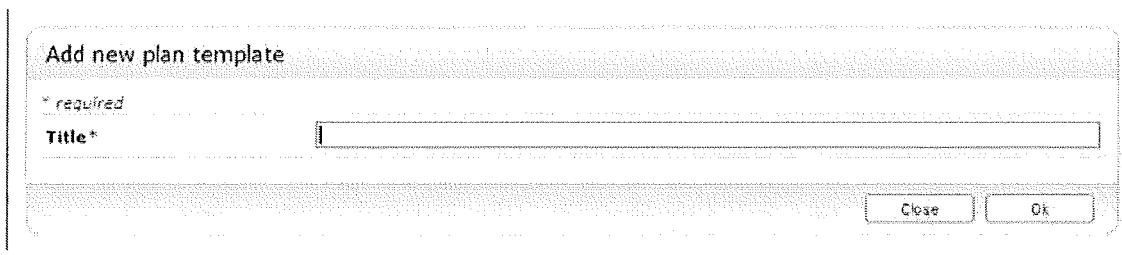
FIGURE 69
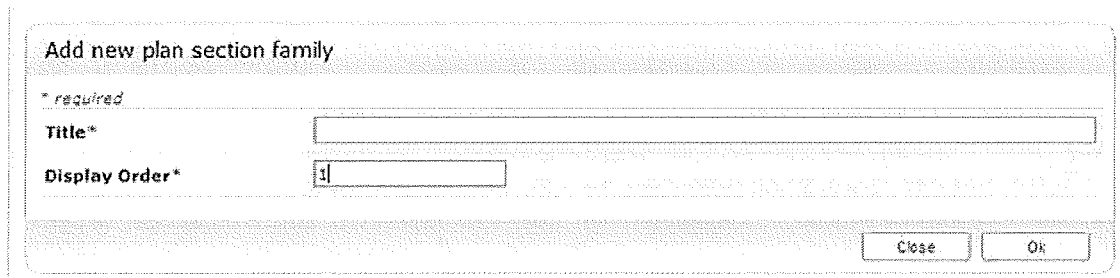
FIGURE 70

METHODS AND SYSTEMS FOR RESOURCE AND ORGANIZATION ACHIEVEMENT

CROSS-REFERENCE TO RELATED APPLICATIONS

This application is a continuation of U.S. application Ser. No. 12/785,398 filed May 21, 2010 now U.S. Pat. No. 10,002,332 issued on Jun. 19, 2018 which claims the benefit of U.S. provisional application Ser. No. 61/231,123 filed Aug. 4, 2009 and U.S. provisional application Ser. No. 61/180,360 filed May 21, 2009.

FIELD

This application relates to methods and systems for data processing, and in one embodiment to methods and systems for resource and organization achievement.

BACKGROUND

In order to become and remain competitive, organizations often use many different methods to track and influence the performance of their internal and external resources. However, current methods may not be effective in improving the performance of both the resources and the organization as a whole.

BRIEF DESCRIPTION OF THE DRAWINGS

FIGS. 8-82 are illustrations of example user interfaces, according to example embodiments;

DETAILED DESCRIPTION

Example methods and systems for resource and organization achievement are described. In the following description, for purposes of explanation, numerous specific details are set forth in order to provide a thorough understanding of example embodiments. It will be evident, however, to one of ordinary skill in the art that embodiments of the invention may be practiced without these specific details.

In the following description, methods and systems for resource and organization achievement are described that provide tools for resources (e.g., employees, non-employees and assets) that contribute to an organization's performance to gain insight into their performance and improve their likelihood of success, based on collected data.

The methods and systems for resource and organization achievement are not limited to top-down monitoring of resource performance. Rather, tools are provided to enable resources to specify their own desired goals, align to organizational goal, to track and report progress toward those goals, and to improve their likelihood of success of achieving those goals.

In some embodiments, the described methods and systems facilitate continuous performance improvement of organizations and their constituents using a bottom-up approach and a human-focused data set.

The use of the term "organization" in this document is not intended to limit the application of the methods and systems only to for-profit ventures of a particular structure. Rather, the use of the term organization includes a number of different types of groupings of resources that contribute to the success of the organization, and in which tools for improving the success rate of such resources may be sought.

In general, the use of the term "resources" in this document includes employees, contractors, or otherwise associated with an organization. However, use of the methods and system described herein are not limited to being directed by lower-level employees. Generally, throughout this document, the term "users" should be understood to refer not only to lower-level users, but also to any constituency that may have a connection with the organization and that may impact the organization's performance. Resources may therefore include, by way of example, lower-level employees, managers, executives, board members, contractors, partners, and any others who may make use of the methods and system described herein to improve their performance and their likelihood of success as it relates to the broader goal of organization success.

In some embodiments, resources include everyone internal to an organization and external. Examples of resources include contractors, partners and board members. In some embodiments, resources may include assets. In one embodiment, the resources include computing systems that have an expectation to achieve specific outcomes within defined periods of time.

Figure 1:
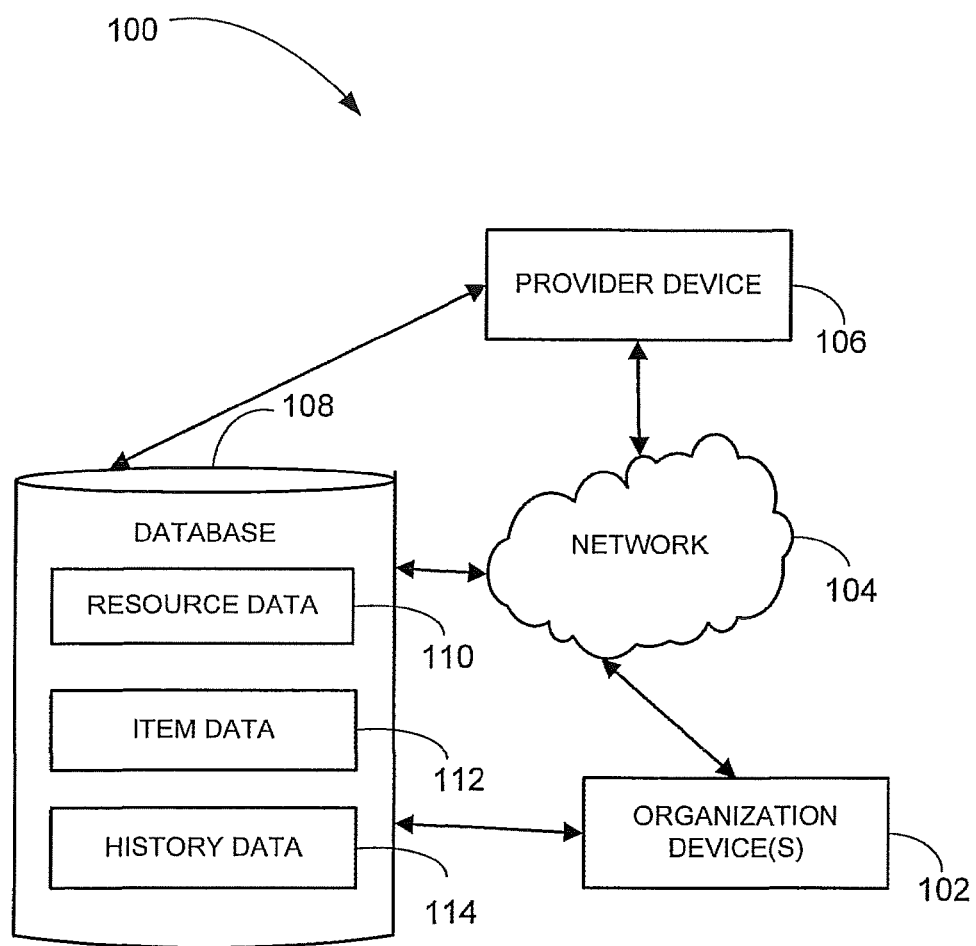
FIG. 1 is a block diagram of an example system, according to an example embodiment.

FIG. 1 illustrates an example system 100 in which resource and organization achievement may be performed. The system 100 is an example platform in which one or more embodiments of the methods may be used. However, the resource and organization achievement may also be performed on other platforms.

Achievement and its related performance evaluation may be measured by tracking achievement of outcomes. A resource of an organization may acts as an operator to seek resource and organization achievement by using the organization device 102 to use the resource and organization achievement functionality provided by a provider (e.g., a software application provider or vendor).

The resource and organization achievement functionality associated with the system 100 includes assigning multiple outcomes to a single goal. A goal typically identifies why a result is needed. An outcome typically identifies what is to be accomplished to achieve the goal.

The outcome of a resource may be maintained in the system 100 as an outcome item. Goals, plans, and incentives may also be maintained in the system 100 as goal items, plan items, and incentive items respectively. In general, if a resource is associated with an outcome item that links to other resources, links to a goal item, an incentive item, and a plan item, the resource will have a greater likelihood of achieving the outcome associated with the outcome item then if the links did not exist.

In some embodiments, multiple tasks may be assigned to a single outcome. The tasks may be assigned by the resource, automatically assigned based on outcome selection, or may otherwise be assigned. The tasks may identify actions to be performed to achieve the outcome or how the outcome will be achieved. By way of example, tasks may include reading e-mails, writing a report, perform research, training users, and have certain meetings. The outcome for the tasks may be the creation and publication of a new RFP process. The reason for the new RFP or the goal may be to reduce printing costs.

The operator may use the organization device 102 as a stand-alone device, or may use the organization device 102 in combination with a provider device 106 available over a network 104. The organization device 102 may be a single computing system or multiple computing systems. In some embodiments, the multiple computing systems may be in a defined architecture (e.g., client-server or peer-to-peer).

The organization device 102 may be in a client-server relationship with the provider device 106, a peer-to-peer relationship with the provider device 106, or in a different type of relationship with the provider device 106. In one embodiment, the client-service relationship may include a thin client on the organization device 102. In another embodiment, client-service relationship may include a thick client on the organization device 102.

The provider may operate the provider device 106 to provide the resource and organization achievement functionality. In one embodiment, the provider device 106 may include multiple computer systems. For example, the provider device 106 may include multiple computer systems in a cloud computing configuration. The functionality to perform the resource and organization achievement may be embodied solely on the organization device 102, solely on the provider device 106, or on both the organization device 102 and the provider device 106.

In one embodiment, the functionality for performing resource and organization achievement may be performed in a web based environment. The provider may implement the methods and systems via an intranet, the Internet, or an extranet by use of the network 104. Examples of the network 104 over which the organization device 102 and the provider device 106 may communicate include, by way of example, a Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The functionality of the provider may be offered on the vendor's web servers (e.g., the provider device 106), or it may be hosted by a company's own servers (e.g., the organization device 102) and made accessible only while a contract with the vendor is in place.

The functionality may be made available to the operator via a web browser or other similar portal. In one embodiment, the organization need only provide web access to its resources to use the functionality. In one embodiment, to additional hardware may be required by the organization, and no specialized software may be required to be resident on the organization devices 102 (e.g., the organization's servers, the computers operated by the resources, or both) other than the web browser.

In some embodiments, activities associated with providing the functionality, such as system set-up and configuration, may be managed from a central location, rather than at each resource's site. This may alleviate the need for each organization being provided with the functionality to have specially trained staff to administer the functionality, to apply updates, and to perform maintenance.

In some embodiments, access to the functionality may be via secured HTTP or any other suitable protocol. Usernames and passwords may be used to restrict access to authorized resources. Each organization may have its own access to the functionality. The data, configurations, and other items associated with the functionality for an organization may be made accessible only to that organization and to the provider.

In one embodiment, the provider may use a software-as-a-service (SaaS) model. In contrast to methods and system in which business plans and objectives are set and tracked via paper forms or via files and applications resident on a particular computer, a web-based or SaaS application may enable information to be made readily available on a 24/7 basis to a wider audience, such as across teams or departments, or company-wide.

A web-based or SaaS model may also support collaboration, in that connections may be more easily made between information from different individuals, teams, or departments, since all of the data may reside within the same database or set of databases. This may also allow connections to be more easily seen between disparate pieces of information that might otherwise be residing in separate, non-linked files.

The organization device 102, the provider device 106, or both may communicate with a database 108. The database 108 may be deployed on the organization device 102, the provider device 106, both the organization device 102 and the provider device 106, partially on the organization device 102 and partially on the provider device 106, on a separate device, or may otherwise be deployed. In some embodiments, there is a distinct database 108 for each site or organization, such that each organization's data may be stored and accessed separately.

The database 108 may include resource data 110, item data 112, and/or history data 114. A single database or multiple databases may be used to store the data 110, 112, 114. In one embodiment, all of the data 110, 112, 114 is stored in a single database. In another embodiment, each of the data 110, 112, 114 is stored in a separate database. In another embodiment, portions of the data 110, 112, 114 are distributed over multiple databases. The database may otherwise be configured for use in the system 100.

The resource data 110 stored in the database 108 includes information regarding the resources associated with an organization. For example, when the resources are users, the resource data 110 includes user data. When the resource data is user data, the user data for a particular user may include a user name, password, position with the organization, and the like.

The item data 112 stored in the database 108 reflects data regarding items. The items on which item data 112 may be stored include, by way of example, outcome items, goal items, plan items, and incentive items. Other or different types of items may be stored as the item data 112. The type of information stored for items may vary based on item category, examples of which are described in greater detail below. In general, the items are added to the system 100 when the resources are acting as operators.

The system 100 may record and resource actions within the database 108 as history items with the history data 114. For example, additions, deletions, and edits may be recorded as a number of different history items in the history data 114. By storing a history item reflecting a change, all changes may be viewed, reported, and documented even if items are changed or removed from view.

In some embodiments, the collection of history data 114 improves reporting and documentation. In some embodiments, the collection of history data 114 supports the ability to review information across different time periods.

Figure 2:
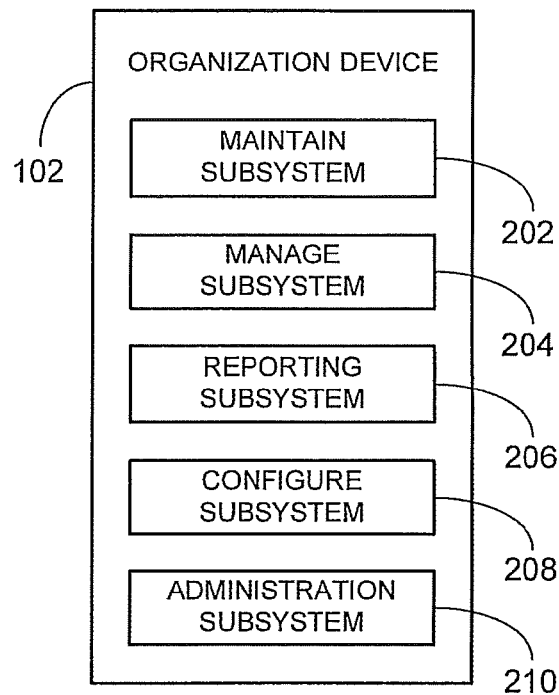
FIG. 2 is a block diagram of an example organization device that may be deployed within the system of FIG. 1, according to an example embodiment.

FIG. 2 illustrates an example organization device 102 that may be deployed in the system 100 (see FIG. 1), or otherwise deployed in another system.

A resource may operate the organization device 102 to obtain resource and organization achievement. Several features, as described in greater detail below, may facilitate the resource's navigation. For example, a tab-organized interface may be provided to enable access to certain functionality.

A display in the form of a dashboard may be generated and provided to the operator through a user interface. The dashboard may enable resources to increase their probability of improving their performance by use of the functionality, by sending and receiving information about their use of the functionality, and by enabling messaging between resources of the organization.

The organization device 102 is shown to include a maintain subsystem 202, a manage subsystem 204, a reporting subsystem 206, a configure subsystem 208, and/or an administration subsystem 210. The operator may use a single subsystem and/or multiple systems to access the resource and organization functionality. While a number of subsystems are shown as being deployed within the organization device 102, other or different subsystems may be deployed.

The maintain subsystem 202 and the manage subsystem 204 enable the operator to view and interact with a number of items associated with the operator and other resources. In general, the maintain subsystem 202 enables resources to access achievement functionality that includes setting outcomes, specifying business plan items, setting organizational goals, and tracking performance-based incentives. The manage subsystem 204 facilities effective management by a manager of resources that report to the manager.

The reporting subsystem 206 enables the operator to perform reporting and view reports associated with items and/or resources of the organization. In general, the reports are generated based on the information stored in the database 108.

The configure subsystem 208 enables the operator to configure functionality associated with other subsystems 202-206 and other elements of the system 100.

The administration subsystem 210 may enable the operator to modify administrative aspects of the system 100 including the security access. The administration subsystem 210 may enable certain resources to configure global settings such as user access rules and company specific logos for example.

Personal goal templates may be created from the maintain subsystem 202, the configure subsystem 208, or both subsystems 202, 208. The use of the personal goal templates is described in greater detail below.

An administrative interface may be generated and displayed for initial setup of the functionality, including, for example, specification of the list of available statuses, colors available for flagging statuses and notes, and tabs available for business planning. Options may be available for organizations to hire outside consultants to perform system setup or to train its own resources to operate or otherwise deploy the functionality.

Similarly, for ongoing use and administration, organizations may hire outside consultants or train their own administrators. Best practices may be specified for setup and for ongoing use, allowing organizations to benefit from the expertise of other users of the functionality as to what works well and what does not.

Figure 3:
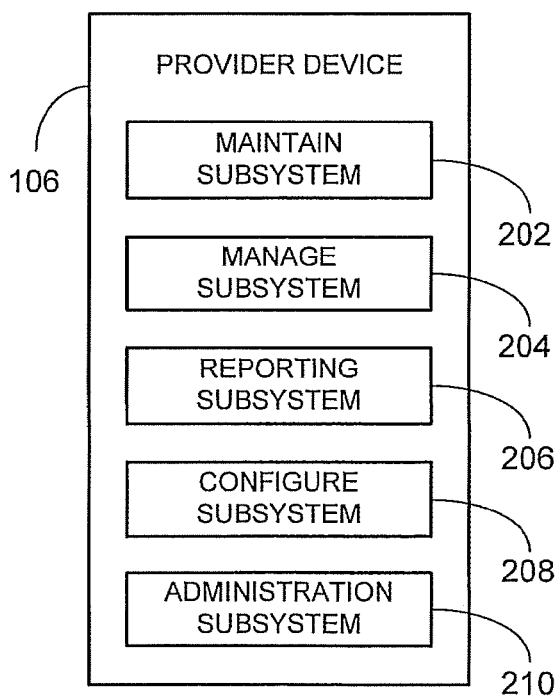
FIG. 3 is a block diagram of an example provider device that may be deployed within the system of FIG. 1, according to an example embodiment.

FIG. 3 illustrates an example provider device 106 that may be deployed in the system 100 (see FIG. 1), or otherwise deployed in another system. The provider device 106 is shown to include a maintain subsystem 202, a manage subsystem 204, a reporting subsystem 206, a configure subsystem 208, and/or an administration subsystem 210. A single subsystem or multiple subsystems may be included in the provider device 106. The functionality of the subsystems 202-210, or other subsystems, when deployed in the provider device 106 may operate as described above. The operation may be dependent on the architecture of the organization device 102, the provider device 106, or both the organization device 102 and the provider device 106.

Numerous options may be available when viewing and manipulating the data to use the resource and achievement functionality. These options may provide flexibility for different resources and different organization and to enable data to be used in the most appropriate way for a specific application.

Certain features may be consistent across the subsystems 202-210. For example, a user interface may have a header on each side or pane within the main window. The header may specify the name of the individual whose items are being viewed within that pane, as well as information such as what type of items are being viewed. The type of item may be indicated by color-coding of an icon. For example, a gray icon may indicate outcome items, a blue icon may indicate plan items, a green icon may indicate goal items, and a yellow icon may indicate incentive items. The colors that are used may be customizable, rather than standard.

The header may also offer options for manipulating the data view and performing specific actions. For example, the header in the left pane may have a button or other method for setting the selected user to the right pane (and vice verse for the right pane). The header may also have a button or other method for launching a Manage Connections dialog.

The user interface may also have tabs and sub-tabs below the header to enable navigation between different types of items. For example, tabs may be available to allow the user to view outcome items, plan items, goal items, or incentive items. Where appropriate, sub-tabs may be available to enable further specification. For example, within the plan tab, sub-tabs may be available to select risk items, timelines, financial items, market-related items, or other available information, depending on what information has been specified for that plan.

The user interface may also have filter settings to allow the user to specify only certain items to be viewed. For example, information may be reviewable for a custom period of time, such as the current fiscal quarter versus the previous fiscal quarter, or versus the previous year, or for another historic timeframe. A drop-down menu, calendar, or other selection field may enable an employee to specify the period of time to be reviewed.

Information may also be entered into the user interface by the operator for future periods of time. For example, a resource may decide that an outcome is not achievable during the current quarter, but that the outcome should be completed within the next quarter. Again via a drop-down menu, calendar, or other selection field, the employee may specify the desired future timeframe (such as the next quarter) and create an item corresponding to the desired outcome.

Items may be filtered based on active status. For example, a checkbox or other method may be provided to enable a user to view only active items.

Operators may also be able to filter data based on other criterion. For example, resources may wish to view outcome items specified by their manager. Via a drop-down menu, graphical organizational chart, or other method, resources may filter their view of the data to show only items created by their manager. Similarly, operators may have the option of filtering items by status, active/inactive condition, priority level, or other criteria.

An access level may be specified for items such as outcome items to limit the resources that can view the items. For example, when an item is added or edited, an option may be included to specify the access level of the item. Depending on the access level of the item, only certain resources may view that item, such as the resource that created the item and the managers above that resource.

In some embodiments, defining access level may enable resources to maintain confidential information. For example, if a manager has the outcome of reducing headcount in a department by 15%, it is likely that the manager may not want direct report employees in that department to be able to view that outcome item. The access level option may be configurable, so that organization may decide which access levels they wish to make available.

Color-coding may be used to differentiate, for instance, between different item types. Within the graphical user interface, boxes for outcome items may have a bar with one color, while another color may be used for business plan items, and a third color may be used for goal items. The colors that are used may be customizable rather than system-standard.

Items may also be collapsible, to improve the readability of items in the user interface. For example, by default, items may be displayed in minimized form, with only a summary of the item, including key aspects such as item priority, title, and status. Hovering over an item with the mouse may display a summary of additional information about the item. The item may also be highlighted, for example, with a different color and/or a darker line around the item box, indicating that the user can select that item. If a user clicks on an item, or on a specialized icon within the item, the item may be further highlighted, such as by a darker color fill, indicating that the item has been selected. Once an item has been selected, an expanded form of the item may be displayed, with additional information about the item. Buttons may also be available to expand all or minimize all. Both minimized and expanded forms may have icons or visual indicators available for communicating basic information about the item, such as access level, people connected to the item (via a drop-down menu or other display), whether there are connections between the item and other items on the right-hand side of the interface, and the number of active notes for the item, along with the highest-ranking status for active notes for that item.

Clicking on the title of an item may select that item for manipulation. This may or may not expand the item. In another embodiment, a specialized icon (such as an arrow) may be provided to expand the item, while clicking the title may simply select the item. In another embodiment, selecting an item may also expand that item, as well as making the item actionable.

Other aspects of the graphical user interface may be customizable. For example, the organizations may specify the statuses that should be made available for selection or the information fields to be specified for items. Organizations may specify what sections should be available for business plans and whether and how those sections should be made available to different types of resources. Organizations may also add custom fields for items, based on their specific business needs. In some embodiments, the customization increases flexibility by enabling data to be displayed and manipulated in the way that is most useful to each particular organization.

A number of functions may be table-driven for convenience in customizing options and the look and feel of the user interfaces.

In some embodiments, connections may be made between similar items at different levels. For example, outcome items for resources for the current fiscal quarter might be compared to the outcome items of their managers, or to those of their direct reports. Connections may also be made between different types of items. For example, the outcome items for an individual for the fiscal quarter may be linked items associated with perceived risks in the achievement of those outcome items, or to plan items that relate to the overall plans for the organization. In some embodiments, resources in the sales department of the organization may be able to view the user interfaces to determine how their sales targets match with their manager's targets for the department for the current quarter, or how market conditions and the actions of others across the company might affect their own sales performance for that quarter.

Resources, in some embodiments, may be provided with access to the functionality through a mobile application that may be made available via the organization device 102 in the form of a smart phone or other similar device.

In some embodiments, these organization devices 102 may be provided with access only to limited aspects of the complete functionality. For example, resources may have access to a limited view of current outcome items, so that resources may view at any time their current items and maintain awareness of the substance and status of their current goals. However, outcome items may or may not be editable via the mobile interface, and more complex information such as connections, business plans, and contributions to overall company plans may not be viewable via the mobile application.

Figure 4:
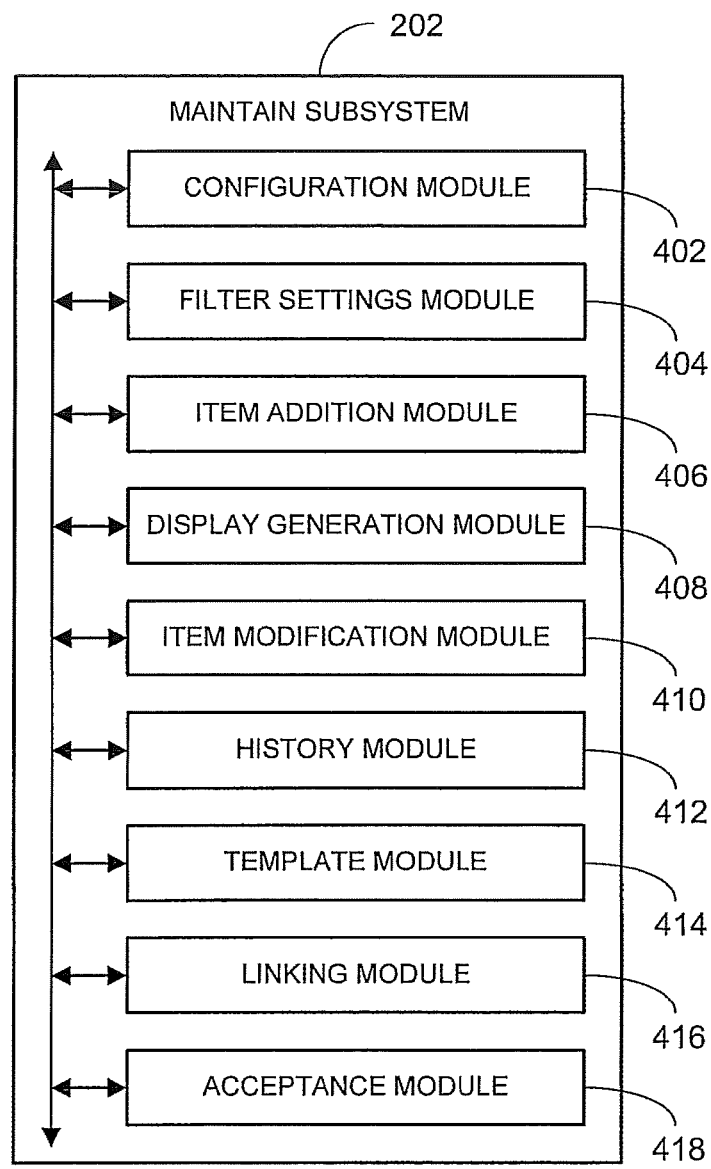
FIG. 4 is a block diagram of an example maintain subsystem that may be deployed within the organization device of FIG. 2 or the provider device of FIG. 3, according to an example embodiment.

FIG. 4 illustrates an example maintain subsystem 202 that may be deployed in the organization device 102, the provider device 106, or otherwise deployed in another system. One or more modules are included in the maintain subsystem 202 to enable the resources and organization obtain achievement by maintaining items. The modules of the maintain subsystem 202 that may be included are a configuration module 402, a filter settings module 404, an item addition module 406, a display generation module 408, an item modification module 410, a history module 412, a template module 414, a linking module 416, and an acceptance module 418. Other modules may also be included.

In various embodiments, the modules may be distributed so that some of the modules may be deployed in the organization device 102 and some of the modules may be deployed in the provider device 106. In one particular embodiment, the maintain subsystem 202 includes a processor, memory coupled to the processor, and a number of the aforementioned modules deployed in the memory and executed by the processor.

In general, the maintain subsystem generates 202 a number of user interfaces to enable the operator to maintain the items associated with the operator or other resources. The operator may select the resources through use of the configuration module 402. Information including items associated with selected resources may be generated for display based on resource selection.

The configuration module 402 may be used to select a single resource or multiple resources. The number of resources that are available for display at the same time may be based on the type and/or configuration of user interface used with the maintain subsystem 202.

The configuration module 402 may be used to alter the appearance of items in the user interface. For example, items appearing in the user interface may be minimized or maximized to provide a greater or lesser amount of information regarding the item.

The filter settings module 404, when used, limits the items or other information displayed in the user interface. Examples of filter settings include a start date, an end date, a status, and/or a show active only or show deleted. The start date may be used to limit the items displayed to items that are associated with a period of time that occurs on or after the start date. The end date may be used to limit the items displayed to items that are associated with a period of time that occur on or before the end date. The status may be used to include all items or items that have a status of "open-exceeding," "open-on target," "open-warning," "open-critical," "open-pending," "open-on hold," "open-pending," "closed-achieved," "closed-not achieved," and "closed-cancelled." The show active only may limit the items to items that are active, while the show deleted may show the items that are active or deleted.

Selections may be available through the filter settings module 404 to enable the operator to obtain desirable filter settings. For example, the operator may select open items that are past due, open items that are current, open items that are due in the future, all items that are current, or all items that are due in the future. In some embodiments, the filter settings module 404 generates a number that reflects the number of items associated with each selection.

The item addition module 406 may be used to add new items in the system 100. When created, the items may be stored as the resource data 1100 in the database 108 (see FIG. 1). The item addition module 406 may be used to add outcome items, goal items, plan items, or incentive items. Other types of items may also be added through the item addition module 406.

In some embodiments, the resource may create the item for the resource using the item addition module 406. In some embodiments, management or anyone above the resource on the organization chart may create the item for the resource using the item addition module 406.

The item addition module 406 may be used to add outcome items by receiving a period start date, a period end date, a description, a title, a priority, a status, an access level, and/or customized information provided by the operator.

The item addition module 406 may be used to add goal items by receiving a title, a description, a period start date, a period end date, a status, and/or an access level.

The item addition module 406 may be used to add plan items by receiving a period start date, a period end date, a description, a title, a priority, a status, and/or an access level.

Once added, the display generation module 408 may be used to generate a display of a user interface including a single item or multiple items. The item addition module 406 may be used to generate a display of a user interface including outcome items, goal items, plan items, and/or incentive items.

The display of a minimized outcome item generated by the display generation module 408 may include an outcome status, an outcome status indicator, a maximization button, an outcome title, one or more outcome indicators, and/or a period of time. Other or different elements may be displayed with the minimized outcome item.

In general, buttons are a visual representation of a selection area on a display. When the operator actuates a particular button, typically by locating a cursor within the selection area and pressing a button on an interface device (e.g., a mouse), functionality associated with selection of the button may be performed. For example, selection of the maximization button may cause an associated item that is currently minimized to be maximized. Buttons may encompass other ways of receiving operator input to cause certain functionality to be performed.

The display of a maximized outcome item generated by the display generation module 408 may include an outcome status, an outcome status indicator, a priority indicator, an outcome title, one or more outcome indicators, a period of time, a minimization button, a priority adjustment button, an attachment button, a notes button, an edit button, a view button, a history button, and/or a copy button. Other or different elements may be displayed with the maximized outcome item.

The display of a minimized goal item generated by the display generation module 408 may include goal status, a contribution indicator, a maximization button, a goal title, one or more goal indicators, and/or a period of time.

The display of a maximized goal item generated by the display generation module 408 may include goal status, a contribution indicator, a goal title, one or more goal indicators, a period of time, a minimization button, a goal description, a priority, an attachment button, an edit button, a view button, a history button, and/or a copy button.

The display of a minimized plan item generated by the display generation module 408 may include obstacle status, a maximization button, a plan obstacle title, a priority, one or more plan obstacle indicators, and/or a period of time.

The display of a maximized plan item generated by the display generation module 408 may include obstacle status, a minimization button, a plan obstacle title, a priority, one or more plan obstacle indicators, a period of time, a link button, an attachment button, a notes button, an edit button, a view button, a history button, and/or a copy button.

The display of a minimized incentive item generated by the display generation module 408 may include a maximization button, an incentive title, one or more incentive indicators, and/or a period of time.

The display of a maximized incentive item generated by the display generation module 408 may include an incentive title, one or more incentive indicators, and/or a period of time, a minimization button, a description, a notes button, and/or a history button.

In some embodiments, hovering over an indicator (e.g., an outcome indicator) may cause additional details regarding the indicator to be displayed.

The item modification module 410 may be used to modify items added by the item addition module 406 or previously modified by the item modification module 410.

In some embodiments, the resource may edit the item associated with the resource using the item modification module 410. In some embodiments, management or anyone above the resource on the organization chart may edit the item associated with the resource using the item modification module 410.

In some embodiments, the item modification module 410 edits the item. In some embodiments, the item modification module 410 attaches documents to the item. In some embodiments, the item modification module 410 attaches a note to the item.

The history module 412 obtains history information regarding an item.

The history module 412 may generate a display for the history of an item (e.g., an outcome item or a goal item) that includes a field, a value, a user, and/or a date of the creation of and/or modification to elements of the item.

The template module 414 may be used to manage the templates associated with an organization. The templates managed by the template module 414 include goal templates and plan templates. Other templates may also be managed by the template module 414.

Management of the templates by the template module 414 includes generating a display of goal templates, adding goal templates, and/or configuring goal templates. Other template management may be performed by the template module 414.

The linking module 416 links or unlinks items. The linking module 416 may link an outcome item to another outcome item, a goal item, a plan item, and/or an incentive item. The linking module 416 may link the goal item to an outcome or a goal item. The linking module 416 may link the plan item to another plan item. Other links may also be made.

The acceptance modulate 418 enables the manager to accept or un-accept items associated with resources. Ensuring the resources know management agrees with their outcome and that the outcome does not place other outcomes at risk due to the workload, in some embodiments, increases the likelihood that the resource will be successful at achieving their outcome.

The general use of the modules 402-418 is described above. Examples of use of the modules 402-418 are described in greater detail below.

Resources may set outcomes for themselves that are intended to specify their understanding of the daily tasks required for their role within the organization, typically within a specific timeframe. An outcome may correspond to a specific event that is desired to be completed within a specific timeframe.

An item may be created for each desired outcome by use of the item addition module 406. The outcome items may be reviewable and editable by other key resources within the organization, such as a resource's manager or their direct reports.

Custom options may be available for specifying other resources that may view the items. For example, it may be desirable to a resource or the organization to allow outcome associated with outcome items to be viewed by peers such as team members or by others with similar roles or outcomes where relationships or dependencies exist.

The information that may be included when creating a new outcome item by use of the item addition module 406 may be customizable. Typically, this information may include the start date for evaluating the outcome, the end date for evaluating the outcome (i.e., the desired completion date), a short title for the outcome item, a description of the outcome or desired outcome, a priority level for the outcome, the current status of the outcome, what other people should be allowed to view the outcome (i.e., access level), and the effort proposed toward that outcome (generally, estimated in hours), as well as some metric for determining when the item is complete.

Some information may be required, such as timeframe information and a title and status for the outcome item, while other information may be optional, such as the percentage of effort (i.e., the amount of overall available effort that the user is expected to contribute to that item) and what other people should be allowed to view the outcome. Custom fields may also be added, such as the primary department of the item's creator or the budgeting cost associated with the item.

Items may be created not only for a current timeframe, but also for future timeframes. Any timeframe may be chosen by specifying the intended start and end dates for an item.

The current status of an item may be specified via a drop-down menu offering a number of choices or may otherwise be specified. The list of choices of the current status may be customizable based on the needs of the organization. For example, statuses may be used to indicate that an item has been cancelled, that an item has been closed or completed, that an item is open or in progress, or that an item is pending. Within some of these statuses, more information may be specified. For example, if an item is closed, the status may specify whether the outcome associated with the outcome item was achieved or failed. If an item is open, the status may specify whether progress toward that outcome is on target, whether there is a warning due to lack of progress, or whether the status of the outcome is critical and in danger of failure.

All created items may be viewable on a display generated by the display generation module 408 and provided to the operator through a user interface. For example, boxes displayed on one side of the interface may each contain a created item, with basic information about the title of the item, its description, its desired timeframe, and its status and priority.

Item status may be a leading indicator of the probability of successfully completing a task associated with an item. Status information may be displayed graphically, in words, or both graphically and in words for each item. For example, items that are open and on target may be shown with their status in green, while items that have warnings may be shown in yellow and items that are critical may be shown in red. The color choices may be fully customizable based on the needs of a particular organization.

Each item may also indicate what access level should be set for that item, specifying what other resources should be allowed to view the item. For example, access levels may include private, anyone above, anyone above & below, anyone, and anyone above & direct reports. Other or different types of access levels including having a different number of access levels may be used.

A particular icon may be used to indicate the current access level of an item within the item display. For example, an eye with a slash may indicate a private item, while an eye with an arrow above and an arrow to the side may indicate access level anyone above & direct reports.

Once an item is created, its information may be edited by use of the item modification module 410, for example, via a button next to the item that leads to an edit display. Within the edit display, all or a portion of the information about an outcome item may be changed by the item modification module 410. For example, the current status of an item may be updated via any web browser at any time of day or night (not merely during business hours) so that real-time status information may be available for all items within the system 100.

By enabling editing through the item modification module 410, resources, as well as their managers and potentially their team or department members and their direct reports, may be able view and report the status of each of their outcomes. In some embodiments, the viewing and reporting of the information may yield a real-time sense of progress concerning the resources stated outcomes for a given timeframe and indicating the rough probability of achieving success for each outcome.

The edit button may be viewable by default, or it may be viewable only when an item is expanded to show details. For example, items may be displayed by default in a minimized or summary version, with only some information displayed. Each outcome item may have an option to expand that item, such as via a button, once the item is selected. Once the outcome item is expanded, buttons for editing the item, for viewing more details about the item, or for viewing and editing notes may be available. Examples of minimized/summary and expanded versions of items are described in greater detail below.

Information such as item priority may also be changed within the item display by use of the item modification module 410. For example, arrow buttons next to the current priority level may be used by the operator to raise or lower the priority of the item. The user may set the priority from 1 to X, and the display generation module 408 may organize the high priority (low numbered) items above the low priority (high numbered) items.

When an item is being added or edited, a message within the edit display may specify whether custom connections have been added to the item, allowing individuals other than those specified by access level to view the outcome item.

Notes specifying additional information about an item may be a leading indicator on a leading indicator. That is, the notes may provide additional indications of warnings or impending failure, based on information related to an outcome item, such as comments, attachments, or questions about the details for an item. The use of notes may be used to supplement the information for an item, while keeping that information connected to that item rather than as an isolated communication.

Notes may be added to items through use of the item modification 410, for example, via a button or icon next to the item that leads to a note display. Within the note display, information may be specified such as a name for the note, a description of the note, whether the note is currently active, and the status of the note. For notes, status options may be customizable, but may typically specify whether the note is critical, a warning, or for informational purposes only. Notes may be added by the owner of an item, or by another individual with a connection to that item (such as a manager).

The note display, when generated by the display generation module 410, may also be used to view existing notes, for example, by listing their name, description, active/inactive state, and current status, as well as information about who created the note and when. An option may be available to edit each existing note, for example, via an edit button next to each note. An option may also be available to filter the view of existing notes, such as by drop-down menu, for example, specifying whether to view all notes or only active notes.

Additional information may also be specified within each item displayed in the user interface. For example, if a note button on each item is used to reach the note display, the color of the text on that button may be used to specify the most urgent note status for active notes. For instance, if an item has two notes associated with it, and one note is informational but the other is critical, then the color of the note button or icon may indicate that a critical note is associated with the item. The colors used to indicate status may be customizable.

The note button or icon may also indicate the number of notes associated with an outcome item. Only the number of active notes for that item may be indicated, or the information may also include the total number of notes for that item. For example, "2/5" may indicate that there are five notes, two of which are active.

The information specified for an item may be customizable. For example, options may be included to add attachments to items, or to include custom fields based on a company's needs.

The item display may be filterable by use of the filter settings module 404, for example, by timeframe, by active state, or by status. This may be used, for instance, to view items for the previous fiscal quarter, or to view only items that are currently active and critical.

When an outcome item is selected in the user interface, details concerning that item may be displayed on the other side of the interface. For example, the display may indicate the resource that created the item. The name of the creating resource may be linked to additional information such as the resource's contact information.

In some embodiments, the user interface may display linked or connected items on either side of the interface. For example, the user interface may be divided into left and right sides or panes, and tabs at the top of each side may allow the user to select what is displayed on each side. Thus, for example, if a user selects a tab labeled "outcomes" on the left side, and selects an item within the displayed list of outcomes, the user may then select a tab labeled "plan" on the right side to show plan items that are associated with the selected outcome item. The items that are displayed may be related to the user, or they may be related to another individual to whom the user is connected (such as a manager or direct report). The two sides of the interface may therefore allow side-by-side comparison of related items, and what is displayed may be related to the person selected on each side.

The user interface may enable employees to make connections between their own outcomes and the outcomes of others, such as their manager or direct reports. The connections may be accomplished, for example, via a tab in the user interface that shows items created by others that are viewable to the user.

A drop-down menu may be used to specify whose items to view. For example, resources may wish to view their manager's outcome items to determine whether and how their own outcomes may be connected to their manager's outcomes. Only those resources whom a resource is authorized to view may appear in this drop-down menu. Typically, this may include one level of resource above and below the operator. However, this may be configurable. For example, resources may be enabled to view items created by their peers, or by other resources with similar roles or outcomes where a relationship or dependency exists.

In addition to a drop-down menu for selecting whose items to view, a graphical organizational chart may be generated for display by the display generation module 408 and available for selecting items to view. This may allow resources to see more clearly where they fit within the organization, while viewing items created in parts of the organization beyond their own sphere of influence.

The graphical organizational chart may also be used to view connections between items. For example, if an item is selected, the chart may graphically indicate links associated with that item. The chart may make clearer the relationship between different parts of the organization and indicate to resources where their outcomes fit within the overall organization. In addition, the chart may highlight key resources or items within the organization. In some embodiments, an employee or item with many connections may be deemed to be more important to the organization.

The display of items created by other resources may be similar to the operator's own display of items, with a box for each item indicating information such as timeframe, title, status, and priority.

Items created by other resources may not be editable. However, resources may be able to make connections between their own items and items created by others. This may be accomplished by simply providing a connections button for each item created by another user. For example, by selecting one of their own items and then clicking the connections button associated with another resource's item, a connection may be made between those two items. The establishment of a connection may then allow updated information to be propagated automatically to the connected members.

For outcome items that have connections to other items or to other resources' items, an icon may be displayed within the item's expanded view to indicate that a connection has been made. When the operator hovers over that icon, a pop-up may display summary information about that connection, such as which resources are connected to that item. If the resource selects a connection from that pop-up, the selected connection may populate the right pane.

In some embodiments involving a two-column user interface, the operator may select which resource's information the operator wants to view in each column on the display. The resource may select himself or herself as one of the selections, or may select up to two other individuals to display, one on the left side of the screen (left pane) and one on the right (right pane). By default, the operator's own items may be displayed in both the left and right panes.

A drop-down menu may be provided to enable the operator to select from a list of resources to which the operator is affiliated, thereby displaying items associated with a selected resource. By default, the list may include the operator's manager and, if applicable, the operator's direct reports. However, other connections may be established. For example, a "manage connections" button may be provided to launch another display within which the operator may request connections to other individuals or delete existing connections.

In some embodiment, custom connections may also be made available within the edit item display. For example, the operator may select a "custom access level" tab to manage the connections for that item that may differ from the operator's existing global connections. When an item is being added or edited, a message within the edit display may specify whether custom access levels have been added to the item. When added, the custom access level allows access to that item to resources other than those specified by the pull-down access level option for that item or by the resource's existing global connections.

For example, when the manage connections button is selected within the main user interface, or when the custom access level tab is selected within the edit item dialog, a new display may be presented to enable the operator to manage which resource can view that operator's items. The manage connections button may be used to set global connections for that user, while the custom access level tab may set access only for the selected item.

In either case, the operator may be presented with a dialog showing the existing/allowed connections and available connections. For example, existing/allowed connections may be presented on the right side of the display, and available connections may be presented on the left side of the display. Selecting a resource on the left (for example, by clicking a checkbox) and selecting an add (e.g., arrow) button may move the selected resource to the allowed list on the right. Selecting a resource on the right and clicking remove may remove that resource from the allowed list on the right. Options may also be available to allow the user to select all or deselect all individuals on the left.

When a connection is requested, the resource for whom a connection is requested may receive a notification. The notification may specify a global connection (when the manage connections button is used) or may specify access to a particular item (when the custom access level tab within an item is used). This notification may be received via email or via some other method (e.g., through a display). The notification may include a link to view the requested connection. The link may offer options for accepting or rejecting the requested connection. In either case, the operator requesting the connection may receive a notification as to whether the individual has accepted or rejected the requested connection.

Some connections may be accepted automatically, without requiring a resource to accept or reject a connection. For example, if an operator wishes to add a connection to a resource beneath the operator in the organization, the connection may be made automatically. For those resources that are not added automatically, the operator may be able to customize the request that is sent to each individual. For example, when a connection is requested, a pop-up may appear with the requested resource's email address populated. The operator requesting the connection may have the option of creating a customized message to the requested resource, which may be added to the standard message requesting the connection.

For any item to which the operator has access and that belongs to another resource, the operator may receive an additional notification when changes are made to the item. For example, when a note is added to an item, all resources with access to that item may receive a notification specifying the addition of that note. Notifications may be added for notes or for other items as well, such as changes in item status or changes in end date for an item. These notifications may be customizable based on organizational needs.

The ability to connect to a resource's profile may be different from what the resource's can see within that profile (i.e., access level). For example, the operator may establish a connection with another individual within the organization, enabling those two resources to view each other's profiles. However, the operator may specify an access level for a particular item that does not include a connected resource. Thus, a connected resource may be able to view the operator's profile, and may view some of that operator's items, but may be restricted from viewing specific items by access level.

Within the main user interface, a drop-down menu may be the primary method for selecting which resource's items to view in the left pane and in the right pane. However, as previously noted, as an alternative to a drop-down menu for selecting whose items to view within the user interface, a graphical organizational chart may be available for selecting items to view. This may allow resources to view more clearly where they fit within the organization, while viewing items created in parts of the organization beyond their own sphere of influence.

The user interface may display linked or connected items on either side of the interface. For example, user the interface may be divided into left and right sides, and tabs at the top of each side may allow the operator to select what is displayed on each side. Thus, for example, if the operator selects an outcomes tab on the left side, and selects an item within the displayed list of outcomes, the operator may then select a plan tab on the right side to show plan items that are associated with the selected outcome item. The items that are displayed may be related to the operator, or they may be related to another resource to whom the operator is connected (such as a manager or direct report). In some embodiments, the two sides of the interface may allow side-by-side comparison of related items, and what is displayed may be related to the resource selected on each side.

In addition, the tab that is selected on the left may affect what tabs are available on the right. For example, if the operator selects the operator's own information in the left pane, and also selects the operator's own information in the right pane, then the operator may view connections between the operator's outcomes and plans, goals, and incentives. However, if the operator selects another resource on the right, the viewable information may be restricted depending on whether the individual is a direct report or a colleague or manager. Similarly, a manager may be allowed to edit certain items such as incentives for his or her direct reports, but may not be allowed to edit such items for his or her own manager or colleagues.

Within the list of available, connected resources, such as on the right side of the interface or within an item, selecting a resource may display the items for the selected resource that are accessible to the operator. Thus, for example, the operator may be able to see another resource's outcomes, but only those outcomes that have been set to the appropriate access level to allow access to that particular resource.

Access levels may be set on an item-by-item basis. The default access level may be anyone above & direct reports. The default level of access may not be removable. However, additional individuals may be given access on an organizational level basis (e.g., all individuals below the user given access to an item) or on an individual-by-individual basis.

In some embodiments, the creation and evaluation of business plans may improve the chances of obtaining achievement. Resources may be advised on their expectations for their jobs and how to achieve their specified outcomes. Plan items, based on the business plan, may increase the probability of the successful completion of outcomes.

Resources, particularly those in management roles, may create business plans using templates appropriate for their roles and requirements. These plans may then be made available to all employees so that individuals may be made aware of their manager's desired plan items. Employees may then create plan items that are in line with their managers' plans so that individual plan items are in support of team, department, and company goals.

Plans may be reviewable by managers above the employee who created the plan, to ensure that business plans for a team or department are aligned with plans for broader groups within the company. For example, a regional manager might review and adjust plans submitted by sales managers within that region, to ensure that all sales plans support the sales goals for that region for the specified time period.

The business plan user interface may be similar to that for outcome items, with a box for each business plan item specifying information such as the start date for the plan item, the end date for the plan item (i.e., the desired completion date), a title for the plan item, a description of the plan item, a priority level for the plan item, the current status of the plan item, and the access level of the plan item (as described earlier). Some information may be required, such as timeframe information and a title and status for the plan item, while other information may be optional, such as a description of the item and the access level of the item.

Business plan items may be created not only for a current timeframe, but also for future timeframes. Any timeframe may be chosen by specifying the intended start and end dates for a plan item.

Whereas all outcome items may be displayed together in the user interface, business plan items may fall into several sections. The business plan items within each section may be displayed, for example, by selecting a corresponding tab in the user interface. Typically, sections may include items such as risks, assumptions, and timelines.

Organizations may differ in terms of the information that is important for successful operation. Some organization may want their business plans to specify timelines, while others may focus more on risks, opportunities, and market conditions, and still others may want their business plans to include all of that information and more. Thus, the set of business plan sections available to resources may be selectable when the functionality is first configured. For example, during setup, an administrator may specify the entire list of sections that the organization deems appropriate for a business plan. In this way, the organization may specify the information that is important for that organization, and not be restricted to a pre-defined business plan template.

Within an organization, the information used for business planning may differ based on who is viewing the information, and the requirements of resources based on their role within the organization. For example, lower-level resources may not need to present a detailed business plan for their own roles. However, a manager may need to provide considerably more information and a vice president might be expected to provide yet more information. At different levels of the organization, resources filling different roles may have different planning requirements, different documentation needs, and different information to provide. Thus, tailoring may be made based on, for example, a resource's role or level within the organization. For instance, some resources may be required to provide information only about risks and opportunities within their role, while managers may be required to add information about timelines and market conditions, and high-level executives may be required to address a much larger set of issues. Therefore, different templates may be specified for different types of users through use of the template module 414.

In one embodiment, the template module 414 provides templates on a resource's role, level, or department, with room to incorporate only the information deemed necessary and sufficient for that resource. This may have the additional effect of forcing resources to input all of the information deemed necessary for their specific role, and only the information deemed necessary for that role, thus encouraging each resource to think critically about what is needed for a particular job and what information really needs to be included.

In some embodiments, the template module 414 may cause display of all sections that have been specified during setup, but may only allow resources to access certain sections. For example, a tab may be shown in the user interface for every section that the organization has chosen to specify as a part of its standard business plan. Within a specific template, only those sections deemed relevant for that template may be accessible and other tabs may be "grayed out" or otherwise made inaccessible.

In some embodiments, the display of all sections and providing limit access to certain of these sections may encourage critical thinking on the part of resources. For example, if resources in a particular role see a tab that has been specified as important to the organization for business planning, but that tab has been made inaccessible to them, those resources may think about why that tab has been made inaccessible, and whether or not that tab is actually needed for their role. In one embodiment, one or more of the resources may produce key insights as they determine which tabs are actually needed for their own roles.

The business planning aspect may be tailored not only by the type of information to be provided, but also by the amount of information to be provided. Again, as an example, a lower-level employee might need only to provide basic information on plans and perceived risks, with limited detail, while a higher-level employee such as a manager or a vice president might be expected to document plans and risks more thoroughly, with additional documentation as needed. Thus, it may be useful to limit the amount of information that can be entered. One method for accomplishing this may be to limit the size of the fields for entering information, for example, based on an employee's role, level, or department. Another method may be to set templates to allow, disallow, or require additional documentation, such as attachments, depending on an employee's reporting requirements.

Business plan items may be created, edited, and viewed using similar methods as those described for managing outcome items.

As with outcome items, when a plan item is selected in the user interface, details concerning that plan item may be displayed on the other side of the interface. For example, the display may indicate the resource that created the item. The name of the creating resource may be linked to additional information about that resource, such as contact information.

As with other types of plan items, the item display may be filterable, for example, by timeframe, by active state, or by status. This may be used, for instance, to view items for the previous fiscal quarter, or to view only items that are currently active and critical.

The user interface may also enable resources to make connections between their plans items and their own outcomes, or between their own plan items and the plan items of others such as their managers, by use of the linking module 416.

In some embodiment, connections may be made via tabs in the user interface that show viewable items. One tab may be used to view and create connections to the operator's outcome items, and another tab may be used to view and create connections to business plan items created by others (i.e., plan connections tab). Within the plan connections tab, a drop-down menu may be used to specify whose plan items to view. For example, resources may wish to view their manager's items to determine whether and how their own plan items may be connected to their manager's items. Only those resources whom the operator is authorized to view may appear in this drop-down menu. Typically, this may include one level of resource above and below the operator. However, this may be configurable so that other options are available. For example, resources may be enabled to view plan items created by their peers, or by other resources with similar roles.

Plan items created by others may not be editable. However, operators may be able to make connections between their own plan items and plan items created by others through use of the linking module 416. For example, a connections button may be associated with the display of each item created by another resource. By selecting one of the operator's own plan items and then clicking the connections button associated with another resource's plan item, a connection may be made between those two items by the linking module 416. Similarly, a connections button may be provided for each of the operator's outcome items, which may then be used to create a connection between the selected plan item and an outcome item. This may indicate clearly to resources how their own items fit into their business plans, and how their own plan items are connected to the business plan items of others within the organization.

In some embodiments, a graphical organizational chart may be provided to enable resources to make and view connections for their plan items. In some embodiment, a drop-down menu may list available connections between the operator and other resources.

In some embodiments, the functionality may include the ability to assess whether resource's high-priority outcomes are aligned with the goals of their teams, their departments, and the organization as a whole. Resources may be provided with information to understand the goals of the organization beyond their own respective sphere. In some embodiments, when the goals for a team, department, or organization are not clearly articulated and understood by the resources, and if resource outcomes are not in support of those goals, then success may be less likely and effort may be wasted.

Resources may connect their efforts to the successful achievement of group and company goals through use of the linking module 416. In some embodiments, connecting efforts to achievement improves understanding of how to achieve personal goals and contribute to the success of the company as a whole. In some embodiments, connecting efforts to achievement improves performance of resources in terms of their contributions to the organization and makes resources more aware of their value to the organization and how their own outcomes contribute to that value. Also, the ability to view explicitly-stated organization goals and to view connections between resource outcomes and organization goals may enable resources to contribute alternative ideas of how best to achieve organization goals, or to address the fit between the goals of their team or department and the goals of the organization as a whole. In some embodiments, this may encourage deeper thought about the decisions and priorities that resources make in completing their activities and tasks.

Employees may be authorized to see only a subset of all of the goals that have been specified within the company. For example, employees may see only the goals specified for their department and for the overall company, but not the goals specified for other departments.

Connections to organization goals may be specified somewhat differently than connections between outcome items and business planning items. For example, rather than a connections button making a simple connection between items, resources may specify a contribution percentage. That is, for each item that resources create, the resources may specify what percentage they believe that outcome item will contribute to a particular department or company goal. This contribution may be a subjective evaluation, causing resources to consider not only whether their outcomes contribute to larger goals, but how much each outcome is expected to contribute. The use of contributions may affect the focus of resources on each of their outcome items, the priority they place on each item, and how they plan to achieve each item.

The connections between resource outcomes and larger goals may provide additional insight into the operation of the organization and its likelihood of success. For example, the manager of a department may specify a goal for that department, but the resources within that department may indicate that their outcomes do not contribute well to that particular goal. In such a case, the manager may need to consider whether that goal is actually appropriate or even achievable, or whether resources understand their contributions toward that goal. In some embodiments, the connections may support a dynamic strategy for the department and for the organization as a whole, as resources and management work together to specify and achieve goals. The availability of such information may also allow goals to be adjusted quickly, as disconnects between resource outcomes and department or organization goals become apparent, rather than waiting until end-of-quarter or longer to address missed goals.

As part of their compensation packages, many organizations offer resources (e.g., employees and other contributors) the possibility of achieving bonuses based on their performance. Such performance-based incentives may be tied to the realization of a particular outcome or the achievement of a particular team or organization goal.

Certain resources (or other personnel associated with an organization) may use the item addition module 406 to input performance-based incentives in the form of incentive items. In general, organization operators create incentive items that the management of resources can link to specific outcomes of the eligible. Once created, the incentives items may then be tied to specific outcome items, such that resources and their managers can easily view the progress of outcome item upon which incentives items depend.

Incentive items may closely resemble other types of items, with minimized and expanded displays indicating summary information or additional information about an item. For incentive items, the information may include the name of the item, the target dates, and a description of the item, as with other items. Each incentive item may also indicate a target (up to) value, specifying the percentage of incentive earnings that is tied to a specific outcome item (for example, "20% of total possible incentive earnings is tied to this outcome item"), and an achievement value, specifying the progress toward the target (up to the target percentage, with a maximum of 100%). Each incentive item may also specify all of the outcome items to which that incentive item is connected, with the maximum total target (up to) value of all the connected items to be 100%. As with other items, icons may indicate available notes or connections.

Incentive items may differ from other types of items as to who can edit the information within an incentive item. For example, editing of target values and connections to outcome items may be performed only by a user's manager, or by another manager above the user in the organization. This may ensure, for example, that the operator cannot link a performance-based item to an outcome item not specified by management.

Figure 5:
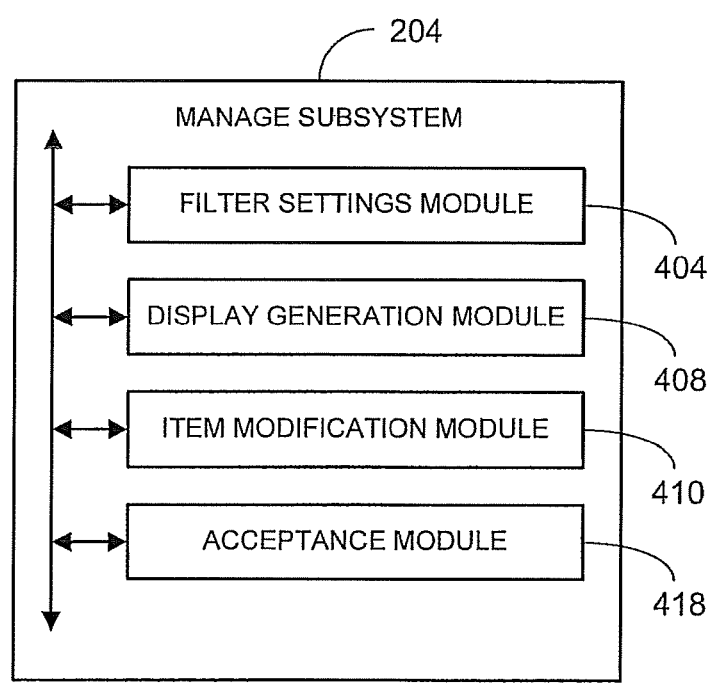
FIG. 5 is a block diagram of an example manage subsystem that may be deployed within the organization device of FIG. 2 or the provider device of FIG. 3, according to an example embodiment.

FIG. 5 illustrates an example management subsystem 204 that may be deployed in the organization device 102, the provider device 106, or otherwise deployed in another system. One or more modules are included in the manage subsystem 204 to enable the operator to manage resources. The modules of the manage subsystem 204 that may be included are the filter settings module 404, the display generation module 408, the item modification module 410, and the acceptance module 418. Other modules may also be included. In various embodiments, the modules may be distributed so that some of the modules may be deployed in the organization device 102 and some of the modules may be deployed in the provider device 106. In one particular embodiment, the manage subsystem 204 includes a processor, memory coupled to the processor, and a number of the aforementioned modules deployed in the memory and executed by the processor.

The modules 404, 408, 410, 418 of the management subsystem 204 may perform as above while providing a different user interface to the operator. The user interfaces presented through use of the management subsystem 204, in some embodiments, enables the manager to effectively manage its resources. Examples of the user interfaces are described in greater detail below.

Figure 6:
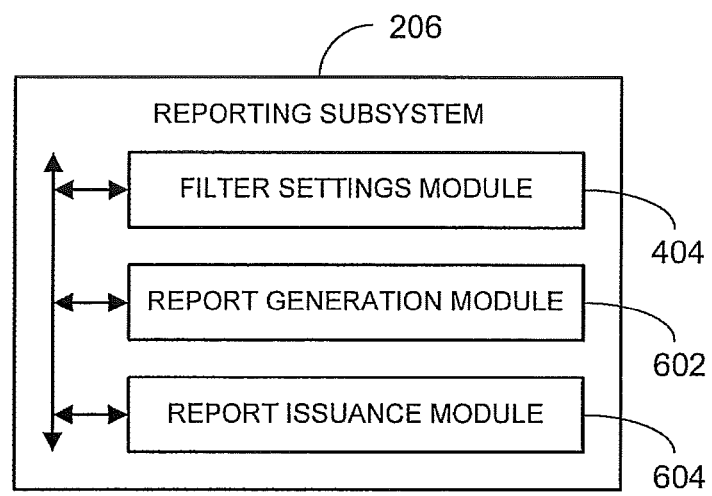
FIG. 6 is a block diagram of an example reporting subsystem that may be deployed within the organization device of FIG. 2 or the provider device of FIG. 3, according to an example embodiment.

FIG. 6 illustrates an example reporting subsystem 206 that may be deployed in the organization device 102, the provider device 106, or otherwise deployed in another system. One or more modules are included in the reporting subsystem 206 to enable the operator to generate reports. The modules of the reporting subsystem 206 that may be included are the filter settings module 404, a report generation module 602, and a report issuance module 604. Other modules may also be included. In various embodiments, the modules may be distributed so that some of the modules may be deployed in the organization device 102 and some of the modules may be deployed in the provider device 106. In one particular embodiment, the reporting subsystem 206 includes a processor, memory coupled to the processor, and a number of the aforementioned modules deployed in the memory and executed by the processor.

In general, the report generation module 602 generates a report that is then issued by the report issuance module. A greater description of the use of the reporting subsystem 206 is described in greater detail below.

The item data 112 of the database 108 may include data that reflects resource specified performance outcomes and statuses, connections between resources and between items, and connections between outcome and overall business plans and company goals.

In some embodiments, the database 108 enables continuous, dynamic analysis of the progress of an individual resource.

In some embodiments, the database 108 enables continuous, dynamic analysis of the progress of an individual resource. The item data 112 of the database may enable an entirely different set of analyses to be performed by the report generation module 602 including:

What is the response of a particular resource within a particular timeframe?

What progress is being made towards a particular outcome or goal?

How are items connected between resources, or across teams, departments, or the entire organization?

In some embodiments, the database 108 enables analysis of a role, a team, a department, or an entire organization, such as:

What are the risks currently being specified by a particular department? Does the consideration of risk improve the performance of a department?

Which departments delivered on their outcomes at the end of the last quarter? (This may provide insight as to how to weight the performance predictions of particular departments, or whether certain departments need additional training. This may also indicate departments wherein individual goals do not match larger goals.)

What percentage of outcomes was met at the end of the last quarter? (This may provide insight as to whether additional training is needed, or whether to take seriously the predictions being made by resources and managers.)

The reporting subsystem 206 system may monitor and report on the actual adoption of the functionality. For example, it may provide data as to whether resources are using the functionality, and whether the resources are using the functionality consistently and effectively. This monitoring and reporting may allow organization to determine how use of the functionality affects resources performance and overall organization performance.

Other questions that may be answerable through use of the database 108 that considers resource aspect of the organization performance. These questions may include:

What percentage of resources is meeting their performance outcomes? How does this differ by department?

What is the current status of resource outcomes, and how many are likely to fail as of mid-quarter?

Do resources who consider the risks associated with their outcomes perform better (i.e., achieve a higher percentage of their outcomes) than resources who are not asked to consider risks?

In addition to allowing organization to answer highly specific performance-related questions, the database 108 may also enable guidance or predictions for future performance. For example, if resources do not deliver on their outcomes for a quarter, the data may allow their manager to examine whether those resources set inappropriate goals, or whether some resources might benefit from additional use of the functionality to improve performance.

The database 108 may also be used to prompt resources with information that may improve their future performance. For instance, if analysis of data from previous quarters indicates that certain items improve the likelihood of success, such information may be provided to resources. For example, emails or prompts may encourage the resources to make use of the functionality, as in the following examples:

Did you know that considering risks improves your probability of success by N %?

If you review notes on your items more frequently, it will double your probability of success this quarter.

Your current probability of success is P %. If you fill out the risks section of your business plan, create more connections between your items and those of your peers, and review the notes on your items weekly, your probability of success will increase to Q %!

In order to answer such questions or perform such analyses, the database that may include a record of every transaction that has occurred in the system 100, such as every item that has been added and every change that has been made to an item, and may be saved as the history data 114. The history data 114 may be used to measure progress on a continual basis, such as throughout a fiscal quarter, or it may be used to examine performance during a certain time period, such as at the end of a fiscal quarter.

Specific standard reports may be generated by the report generation module 602. Organizations may create their own reports to answer specific questions. For example, the system may leverage a SOAP (Simple Object Access Protocol) architecture model to provide open access so that reports may be created either within the reporting subsystem 206, using tools that may be provided with the reporting subsystem 206, or outside of the reporting subsystem 206, using other software capable of running reports on the database 108. The information provided in reports may be used in a number of ways, such as:

As noted earlier, information may be used to prompt the resource, suggesting methods for improvement.

Traditional management reporting may assess the current status of outcome items, the current list of risks, and other similar information.

Information on human aspects of performance may be combined with traditional data sets, such as those from customer relationship management (CRM) or business intelligence (BI) databases to gain additional insights.

Data may be used in a predictive way: "Based on previous analyses, if you do X, Y, and Z, you are more likely to succeed."

Data may be used to determine trends. For example, "Based on our observations, only 40% of employees succeed in the first quarter of using this system, but by the second quarter, the success rate increases to 85%."

In some embodiments, employees may be reminded of their outcomes to keep them focused on their intended results and to provide tools for achieving their objectives.

One way to do this may be to provide timely reminders of item status, along with additional information. For example, the reporting subsystem 206 may send an email automatically to each resource at a specific time each week, such as Monday morning, to renew each resource's focus at the start of the week. The organization may specify the information that should be included in that email. The email may list all open outcome items with the current status of each item and suggestions for how to address each item. Reviewing each item and its status may help resources prioritize their work for the coming week.

In some embodiments, the email may also encourage the frequency of status reports. For example, the email may prompt the resource to update the current status of each item. In one embodiment, this may reduce the likelihood that critical items do not get forgotten and that any items with warnings are addressed quickly.

In some embodiments, the email may also incorporate an option for escalating potentially problematic items. For example, there may be an option to report an item to a manager. The item may then be transferred into the manager's list of outcome items. The manager may choose to accept the item, may escalate the item further, or may address the item and redirect it back to the resource. In one embodiment, the escalation option may reduce the likelihood that critical items do not get forgotten and that any items with warnings are addressed quickly.

It may also be desirable to provide tools for employees to view the progress of their team members or other peers. For example, simple reports may specify the current progress of an employee's peers toward particular goals, and may also provide information about which team members are successful and how other team members are achieving their outcomes. This may encourage team members to work together to achieve team goals and to contribute to larger goals.

Figure 7:
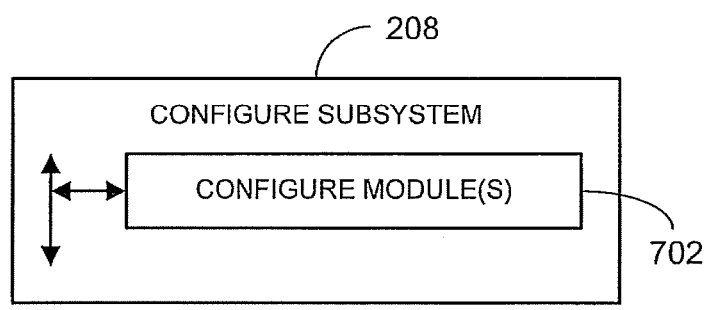
FIG. 7 is a block diagram of an example configure subsystem that may be deployed within the organization device of FIG. 2 or the provider device of FIG. 3, according to an example embodiment.

FIG. 7 illustrates an example configure subsystem 208 that may be deployed in the organization device 102, the provider device 106, or otherwise deployed in another system. One or more modules are included in the configure subsystem 208 to enable the operator to configure the system 100. A single configuration module 702 or multiple configuration modules 702 may be included in the configure subsystem 208. Other modules may also be included. In various embodiments, the modules may be distributed so that some of the modules may be deployed in the organization device 102 and some of the modules may be deployed in the provider device 106. In one particular embodiment, the configure subsystem 208 includes a processor, memory coupled to the processor, and a number of the aforementioned modules deployed in the memory and executed by the processor.

Using the configure subsystem 702, resources that are template owners can create a new business goal template. After creation, goal items can be created for the goal template. Once the goal item is created, the goal owner or management of the goal owner can edit the goal item and determine who can link to the goal template and who can report on the template and/or a specific goal item.

The use of the configure subsystem 208 enables certain resources to configure aspects of the functionality such as which items are allowed or required within plan templates or items.

Figure 8:
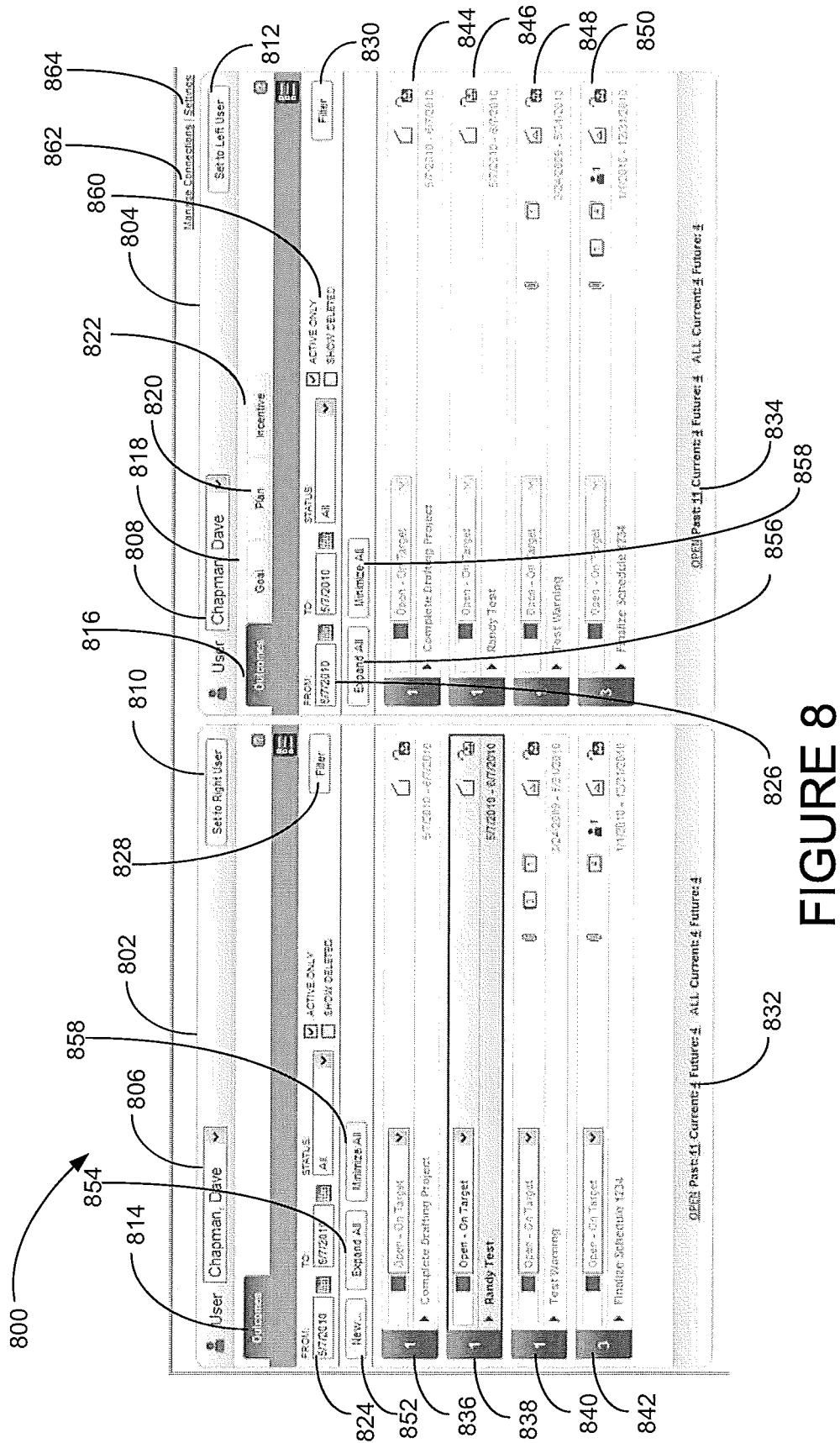
Figure 82:
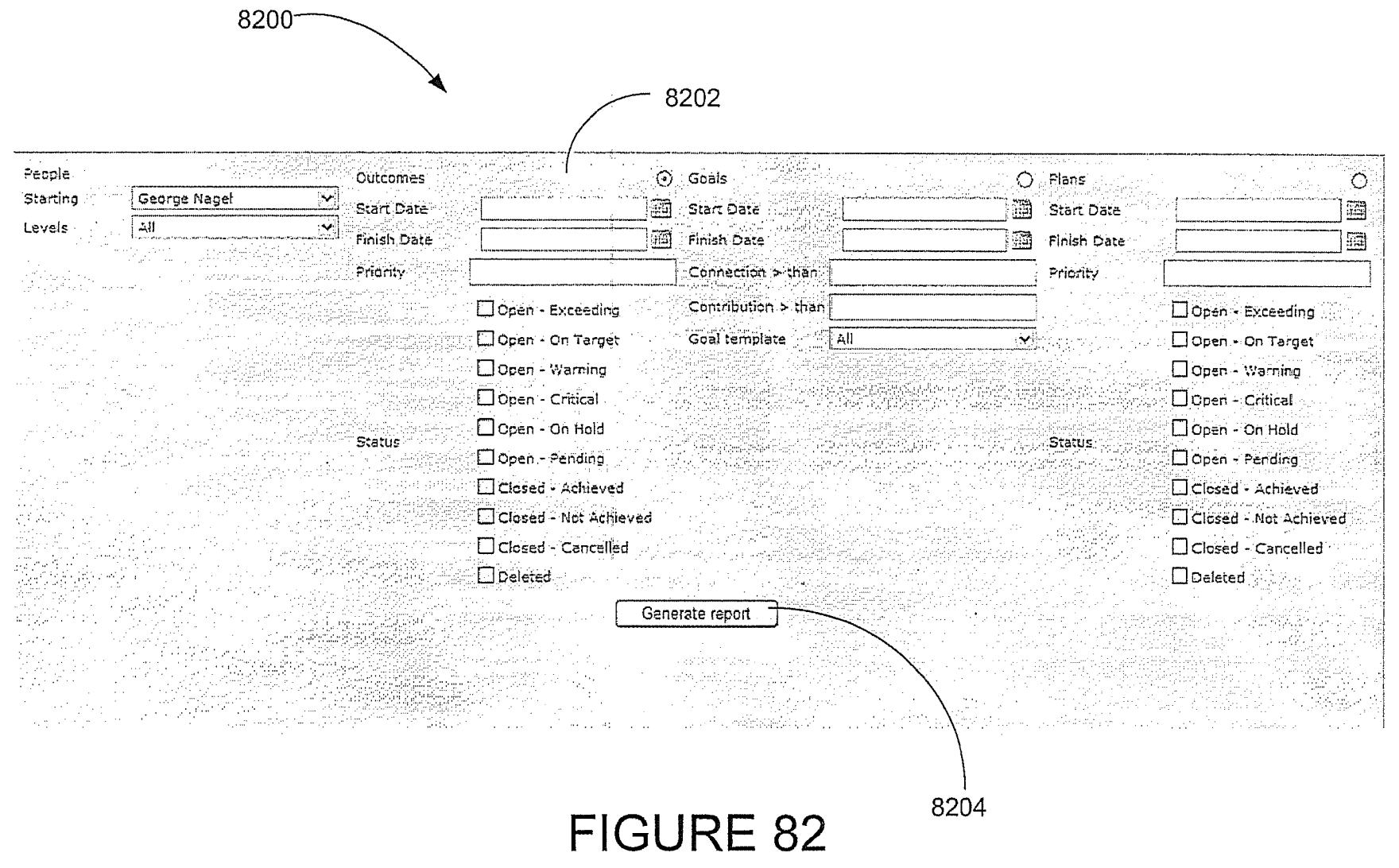

FIGS. 8-82 are illustrations of user interfaces, according to example embodiments. The user interfaces 800-8200 may be generated by the subsystems 202-210 to enable interaction between the operator (e.g., a person) and a computing device. Other types and configurations of interfaces may be used.

The user interfaces 800-8200 enable the operator to effectively operate and control one or more devices of the system 100, and feedback from the devices may aid the operator in making operational decisions. The generated user interfaces may be displayed on a display associated with the organization device 102, the provider device 106, or may otherwise be displayed.

While the user interfaces 800-8200 generally involve resources that are users, other types of resources (e.g., computers) may also be involved with similar interfaces.

In some embodiments, the displays associated with one or more of the user interfaces 800-8200 are presented on a monitor of a computing system. In some embodiments, the displays include in the user interfaces 800-8200 are transmitted via e-mail for display on the user interfaces 800-8200 of the receiving device. The user interfaces 800-8200 may otherwise be presented.

FIG. 8 illustrates a user interface 800 to the maintain subsystem 202, according to an example embodiment. The user interface 800 enables the operator to view and interact with items of one or more categories. In general, items include outcome items, goal items, plan items, and incentive items. However, other types of items may also be displayed. While the user interface 800 includes only outcome items, other user interfaces to the maintain subsystem 202 may display other types of items.

The user interface 800 provides split pane viewing of items in a left pane 802 and a right pane 804. As shown in the user interface 800, the same resource is identified in a left resource selection 806 and a right resource selection 808 for the left pane 802 and the right pane 804 respectively. The operator may select a different resource for the left pane 802 by the left resource selection 806. The operator may select a different resource for the right pane 804 by the right resource selection 808. By selecting different resources, the operator can view items or other information associated with other resources to which they have been permitted to have access. If the operator is management of the resource or has proxy privileges, they can perform all the same functions of the resource although the history records who made the changes. Any operator with access to another resource's outcomes can create notes if they are not a manager of the resource. The information viewable by the operator may be based on the organizational position of the resources relative to the operator, access defined by the resources or different resources, or may otherwise be set.

While the user interface 800 is shown as a two pane user interface, other types and configurations of user interfaces may also be used. These user interfaces may include, by way of example, a single pane user interface, a user interface with more than two panes, a user interface with panes in different positions beyond left and right, a user interface with panes of different sizes, a user interface with non-rectangular panes, a user interface with intersecting panes, a user interface with overlapping panes, and the like.

In addition to selecting resources with the resource selections 806, 808, resources for the first pane 802 and the second pane 804 may be selecting by use of the set resource buttons 810, 812. The set resource button 810 sets the resource associated with the left pane 802 to the resource associated with the right pane 804. The set resource button 812 sets the resource associated with the right pane 804 to the resource associated with the left pane 802. When a different resource is associated with the left pane 802 or the right pane 804 by use of the buttons 810, 812, the resource selections 806, 808 may be updated to reflect the new resource associated with the respective panes 802, 804.

A single table or multiple tabs may be available for operator selection in each of the panes 802, 804 of the user interface 800. The left pane 802 includes an outcome tab 814 and the right pane 804 includes an outcome table 816, a goal tab 818, a plan tab 820, and an incentive tab 822. The outcome tab 816 is shown in a different color than the other tabs 818-822 to indicate that it is the active tab of the right pane 804 and that the remaining tabs 818-822 are inactive in the right pane 804.

In general, an active tab reflects that the user interface or portion of the user interface includes information associated with the active tab. The active tab may be associated with the selection of information present in the user interface or portion of the user interface, the active tab limit the information present in the user interface or portion of the user interface, or may otherwise be used in the configuration or display of the user interface or portion of the user interface.

Filter settings 824, 826 may be used to limit the number of items shown in the left pane 802 and the right pane 804. Example filters of the filter settings 824, 826 as shown in the user interface 800 include a start date, an end date, a status, and/or a show active only or show deleted. Other filters may be used. Once selected, the filter settings 824, 826 may be applied by selecting filter buttons 828, 830. In some embodiments, one or more of the filters of the filter settings 824, 826 may be applied without the resource selecting the filter buttons 828, 830.

A number of left pane items 810-816 are included in the left pane 802 and a number of right pane items 818-824 are included in the right pane 804. As shown in the user interface 800, the right pane items 818-824 are the same as the left pane items 810-816. In this case, the pane items 810-824 are the same because the same resource is identified in the left resource selection 806 and the right resource selection 808, the outcome tabs 814, 816 are selected for the left pane 802 and the right pane 804, and the same filter settings 824, 826 are selected for the left pane 802 and the right pane 804.

Additional filter options 832, 834 may also be included in the user interface 800. In some embodiments, the additional filter options 832, 834 provide a number of items that meet a certain criterion. As shown in the user interface 800, the number of items reflected include past open items, current open items, future open items, all current items, and all future items.

Once an additional filter option of the additional filter options 832, 834 is selected, the corresponding filter settings 824, 826 may be modified to reflect the filter settings associated with the additional filter options 832, 834. The corresponding items appear in the left pane 802 based on selection of the additional filter options 832. The corresponding items appear in the right pane 804 based on selection of the additional filter options 834.

As described above, the items displayed in the user interface 800 are outcome items. The left pane 802 includes outcome items 836-842 and the right pane includes outcome items 844-850.

Creation of a new outcome item may be initiated by operator selection of a new outcome item button 852. An example interface used to receive information from the operator to create the new outcome item is described in greater detail below. The new outcome item, when created, may the displayed to the operator in the user interface 800.

The operator may configure the display of the outcome items 836-850 in the user interface 800 through a number of buttons. The outcome items 836-842 may be maximized or expanded in the left pane 802 by use of an expand-all button 854. Similarly, the outcome items 844-850 may be maximized in the left pane 804 by use of an expand-all button 856. In general, maximizing or expanding items enables the operator to view additional details regarding the items. Multiple items may be maximized by use of the buttons 854, 856, or individual items may be maximized by use of associated maximization buttons as described in greater detail below.

The outcome items 836-842 may be minimized or contracted in the left pane 802 by use of a minimize-all button 858. Similarly, the outcome items 844-850 may be minimized in the left pane 804 by use of minimize-all button 860. In general, minimizing or contracting items enables the operator to view less detail regarding the items. By viewing fewer details, more outcome items may appear in the panes 802, 804. An example interface that displays a minimized outcome item is described in greater detail below.

A manage connections link 862, a settings link 864, or both may be select to enable the operator to make further alterations. Selection of the manage connections link 862 may generate a manage connections display, while selection of the settings link 864 may generate a settings display. The manage connections display enables the operator to selects the resources that can view the operators items. The settings display enables the operator to modify settings of the various user interfaces used to interaction with the system 100. Examples of the connections display and the settings display are described in greater detail below.

In some embodiments, such as when the user interface 800 is generated for display on the organization device 102 in the form of a mobile device, the view of the items 824-850 may also be simplified. For example, only the basic information (e.g., boxes) for each item may be displayed, without additional display of details upon selecting an item. More specific information, such as connections to outcome items or business plans created by others, may not be viewable in these embodiments.

Figure 9:
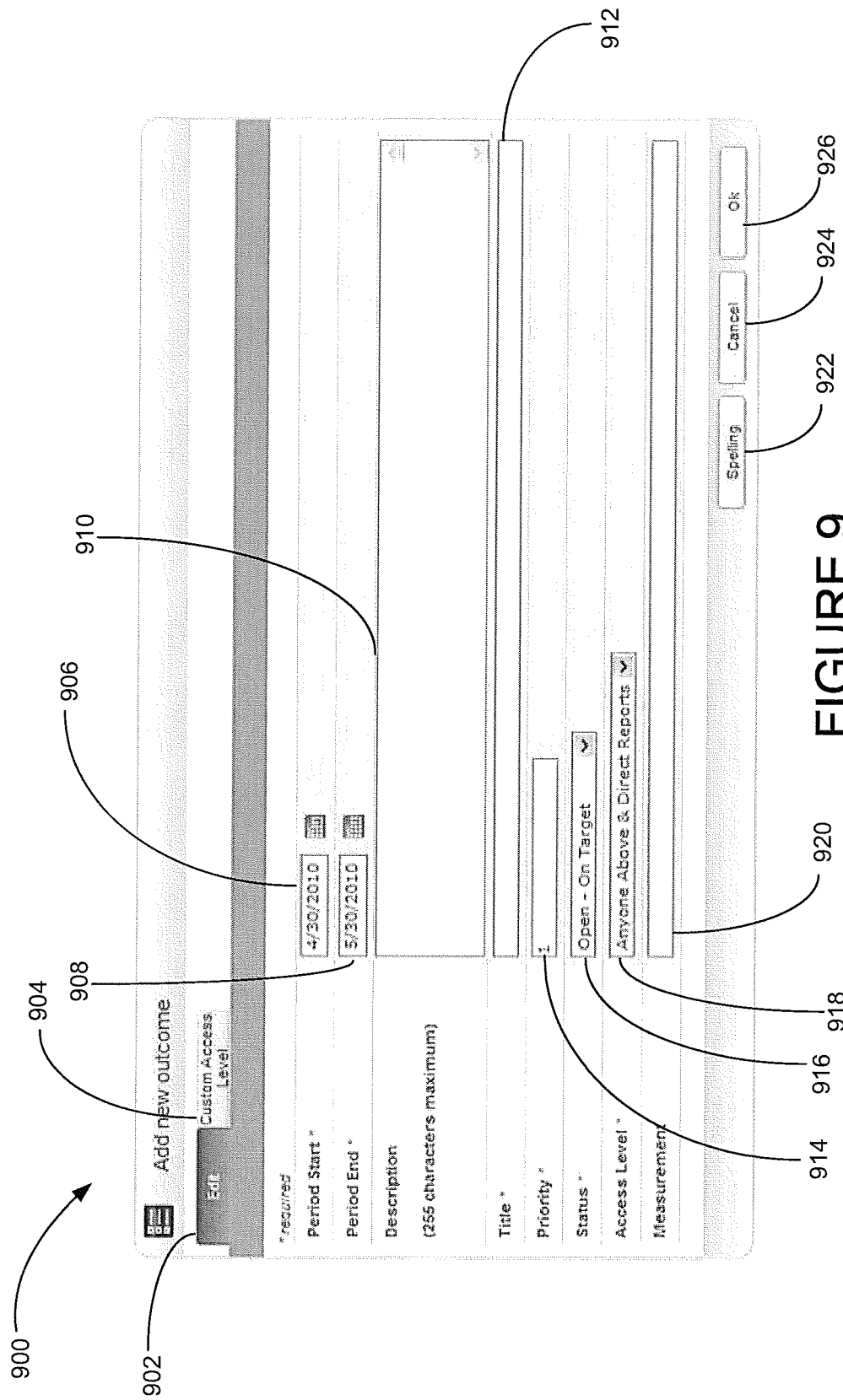

FIG. 9 illustrates a user interface 900 to the maintain subsystem 202, according to an example embodiment. The user interface 900 enables the operator to add a new outcome item. In some embodiments, the outcome item once added is displayed in the user interface 800 (see FIG. 8).

The user interface 900 includes an edit tab 902 and a custom access level tab 904. As shown in the user interface 900, the edit tab 902 is highlighted to indicate that it is the active tab. By providing a custom access level through availability of the custom access level tab 904, the new outcome item may be viewable to specific resources within the organization or external resources if applicable.

The operator may specify a period start date and a period end date for the new outcome item by use of a period start field 906 and a period end field 908 displayed on the user interface 900. In some embodiments, the period start field 906 and the period end field 908 may be populated with dates when the user interface 900 is generated for display to the operator. For example, the period start field 906 may include the current date and the period end field 908 may include one month from the current date. The fields 906, 908 may be populated with other dates.

A description field 910 displayed on the user interface 900 enables the operator to include a description regarding the new outcome item. Descriptions allow the operator to describe the outcome in more detail as the length of the title is generally restrictive. If the operator need more detail that the defined length of the description, they can utilize attachments. In some embodiments, the description may be limited to a certain number of characters (e.g., a 255 character maximum).

A title field 912 displayed on the user interface 900 enables the operator to specify a title for the new outcome item. The title generally describes the outcome item in a few words. In some embodiments, the title is visible in the user interface 800 (see FIG. 8) when the filter criterion (or filter criteria) is met.

A priority field 914 enables the operator to specify a priority for the outcome item. In general, priority is the perceived importance of the item relative to other items. Resources generally prioritize their time and organizations put greater focus on the lowest priority numbers as they are typically be deemed the most important. The priority may a numerical value in a numerical range (e.g., a range of 1-9 with 1 being the highest priority and 9 being the lowest priority). In some embodiments, a default priority of the outcome item may be populated in the user interface 900. For example, the default priority may be a priority of 1 (e.g., having the highest priority). Other ways of defining may also be used.

A status field 916 enables the operator, the management, or proxy to designate a status of the outcome item. In some embodiments, the operator may designate status of the outcome item as open-exceeding, open-on target, open-warning, open-critical, open-pending, closed-achieved, closed-not achieved, closed-cancelled, or deleted. The open-exceeding status may be used to indicate that the user (or other resource) associated with the outcome item is achieving ahead of plan. The open-on target status may be used to indicate that the resource is achieving as planned. In one embodiment, the open-on target status may be a default status assigned to outcome items. The open-warning status may be used to indicate that the resource is concerned about achieving as planned. The open-critical status may be used to indicate that the resource is not achieving as planned. The open-pending status may be used to indicate that that the resource is waiting to start. The closed-achieved status may be used to indicate that the resource has completed the outcome and achieved the planned result. The closed-not achieved status may be used to indicate that the resource did not achieve the results as planned. The closed-cancelled status may be used to indicate that the resource is no longer required to achieve the result. The deleted status may be used to indicate that the outcome created for the resource was done in error or is a duplicate. Other status schemes may be used for designated outcome status of the outcome items. These schemes may include a greater or lesser amount of granularity.

In some embodiments, a default status of the outcome item may be populated in the status field 916. For example, the default status may be a status of "open-on target."

An access level field 918 enables the operator to specify an access level of the outcome item. In some embodiments, the operator may designate the outcome access levels as anyone above, anyone above and direct reports, anyone above and below, anyone, private, or private custom. The anyone above access level provides the manager of the operator and any manager in direct line to the CEO with access to the outcome item. The anyone above and direct reports access level provides the manager of the operator, any manager in direct line to the CEO, and anyone who directly reports to the operator with access to the outcome item. The anyone above and below access level provides the manager of the operator, any manager in direct line to the CEO, and anyone in the department/team of the operator with access to the outcome item. The anyone access level provides anyone in the organization that can connect to the operator with access to the outcome item. The private access level provides only the operator with access to the outcome item. The private custom access level provides access to resources of the organization to which the operator has specifically granted access. In one embodiment, the operator may provide custom access level to the resources by selecting the custom access level tab 904.

While the outcome access levels described in one embodiment above reflect person organization levels in an organization, the access levels in another embodiment may also be based on relative importance and/or function of computer machinery in a system architecture. Other types access levels for these resources or other resources may also be used in other embodiments.

In some embodiments, a default access level of the outcome item may be populated in the access level field 918. For example, the default access level may be an access level of "anyone above & direct reports."

In some embodiments, a single customized field or multiple customized fields may be included in the user interface 900. As shown in FIG. 9, the user interface 900 includes a single customized field labeled as a measurement field 920. The measurement field 920 enables the operator to specify measurement information. Other customized fields desired by the organization may be used. Examples of these fields include expected effort, costs, and the like. In some embodiments, customized fields may be used in additional user interfaces that enable the functionality to be provided.

A number of buttons 922-926 may be included on the user interface 900. A spelling button 926 checks the spelling of the description included in the description field 910, the title included in the title field 912, or both. A cancel button 924 returns the operator to a previous user interface without adding the new outcome item.

An ok button 926 submits the outcome item for addition. In some embodiments, the outcome item is added. In some embodiments, a verification check of one or more fields of the user interface 900 is made prior to addition. For example, a verification check is made to ensure that the period start field 906, the period end field 908, the title field 912, the priority field 914, the status field 916, and the access field 918 include acceptable data. If the verification check does not identify any unacceptable data, the outcome item is added. If the verification check identifies unacceptable data, the operator may be represented with the user interface 900.

The representation may include notification that unacceptable data is included on the user interface 900, notification that one or more fields of the user interface 900 that have unacceptable data, or both.

Figure 10:
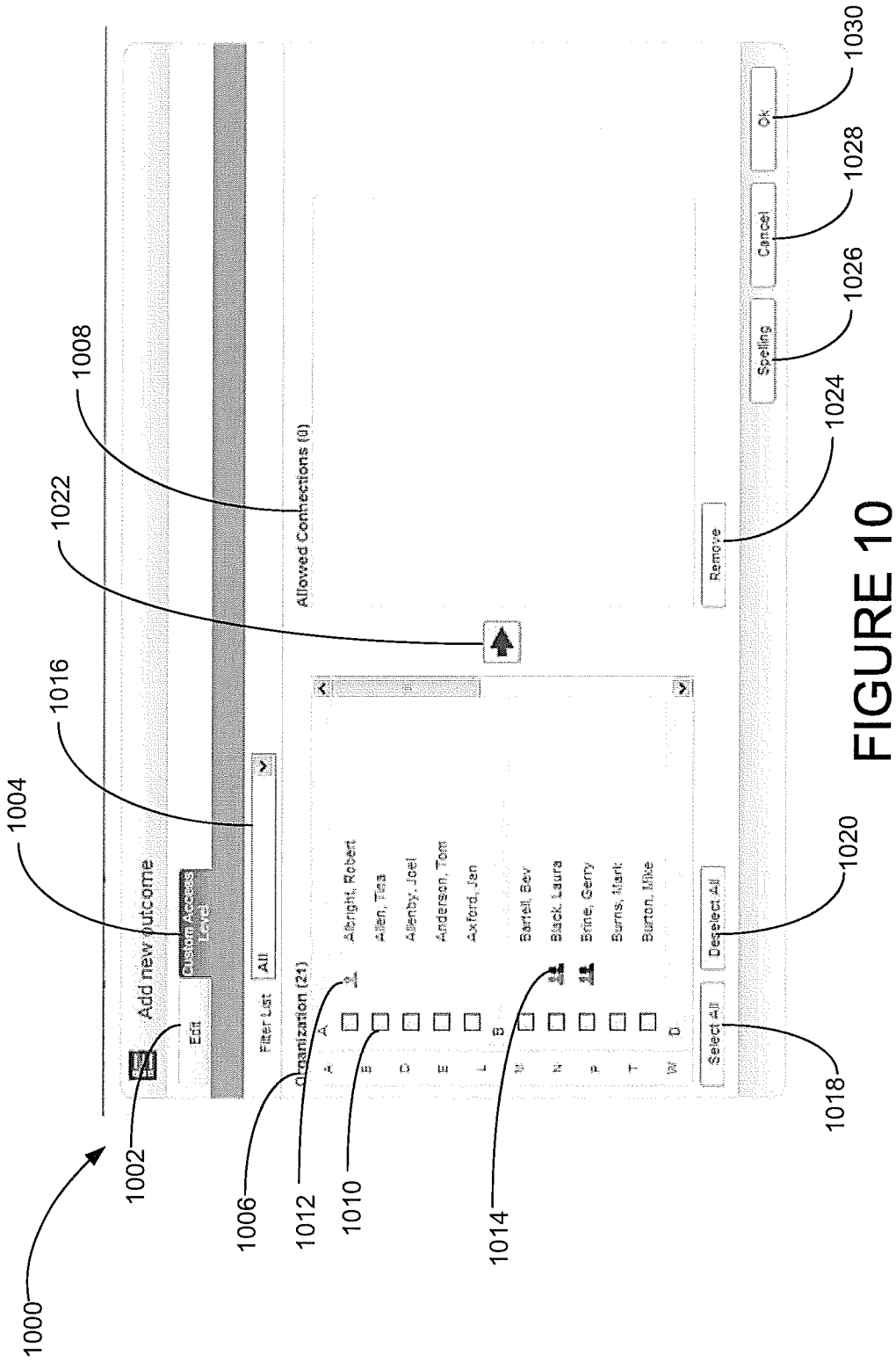

FIG. 10 illustrates a user interface 1000 to the maintain subsystem 202, according to an example embodiment. The user interface 1000 enables the operator to provide a custom access level to a new outcome item. In some embodiments, the added outcome item becomes viewable in the user interface 800 (see FIG. 8).

The user interface 1000 includes an edit tab 1002 and a custom access tab 1004. As shown in the user interface 1000, the custom access level tab 1004 is highlighted to indicate that it is the active tab.

The edit tab 1002 and the custom access level tab 1004 correspond to the edit tab 902 and the custom access level tab 904 of the user interface 900. In some embodiments, the user interface 900 with the edit tab 902 highlighted was displayed prior to the user interface 1000. The user interface 1000 is generated for display based on operator selection of the custom access tab 904.

An organization identifier 1006 displayed on the user interface 1000 identifies a total number of resources associated with the organization. An allowed connection identifier 1008 identifies the number of resources that have been permitted to have access to the new outcome item.

The resources of the organization may be selected for access to the item through resource check boxes 1010. A single check box may be associated with each resource of the organization displayed in the user interface 1000 for selection. Resources that are direct reports to the operator may be identified with a direct report identifier 1012. Resources that have connected with the operator may be identified with a colleague identifier 1014. By having the resources connected with the operator, these resources may be added without further approval from the resources.

The resources shown in the user interface 1000 and available for selection by the check boxes 1010 may be filtered by use of a filter list field 1016. For example, the filter list may limit the resources to direct reports and below from the operator in the organization.

All of the resources shown in the user interface 1000 may be selected by use of a select all button 1018. Any selected resources shown in the user interface 1000 may be unselected by use of a deselect all button 1020. The use of the buttons 1018, 1020 may change the resource selections from the check boxes 1010.

After resources are selected, the resources may be added to a list of resources 1023 allowed to access the outcome item by use of an add button 1022. Resources may be removed from the list of resources 1023 by selecting one or more of the resources and selecting a remove button 1024.

A number of additional buttons 1026-1030 may be included on the user interface 1000. A spelling button 1026 checks the spelling of any text based fields, if any, included in the user interface 1000. A cancel button 1028 returns the operator to a previous user interface (e.g., the user interface 900) without altering the custom access level. An ok button 1026 saves the changes to the custom access level to the returns the operator to the user interface 900 (see FIG. 9).

Figures 11, 12:
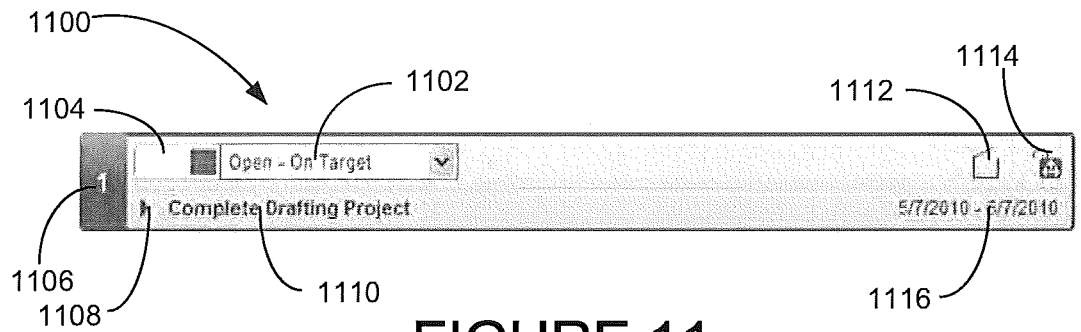

FIG. 11 illustrates a user interface 1100 to the maintain subsystem 202, according to an example embodiment. The user interface 1100 displays an example of a minimized outcome item. In some embodiments, the minimized outcome item may be displayed in the user interface 800 (see FIG. 8). For example, one or more of the outcome items 836-850 of the user interface 800 may be minimized outcome items.

In some embodiments, the outcome item displayed in the user interface 1100 may be created by the operator of the user interface 900. In other embodiments, the outcome item displayed in the user interface 1100 may be created by another resource associated with the organization.

The user interface 1100 displays outcome status of the outcome item. The outcome status generally reflects how the operator or other resource is proceeding towards an outcome.

In some embodiments, the outcome status is displayed through a status field 1102 and a visual identifier 1104. For example, the status field 1102 may indicate outcome status of the outcome item as "open-exceeding," "open-on target," "open-warning," "open-critical," "open-pending," "closed-achieved," "closed-not achieved," "closed-cancelled," or "deleted." Other types of outcome statuses may be displayed.

The visual identifier 1104 may provide a visual indicator to reflect the current outcome status. The visual indicator 1104 may include a color, a pattern, a block length, or the like. Multiple indictors may be used with the visual indicator. For example, a green indicator may indicate that the outcome item is "open-on target" or "open-exceeding," an orange indicator may indicate that the outcome item is "open-warning," a red indicator may indicate that the outcome item is "open-critical," a grey indicator may indicate that the outcome item is "open-on hold" or "open-pending," a blue indicator may indicate that the outcome item is "closed-achieved," a black indicator may indicate that the outcome item is "closed-not achieved," and a burgundy indicator may indicate that the outcome item has been deleted. Other color schemes or visual indicators may be used. When block length is used, a bigger block length indicates closer to being finished with the outcome while a smaller block length indicates still working towards the outcome.

A priority indicator 1106 may be displayed in the user interface 1100 and indicate the priority of the outcome item. The priority may be reflected as a numerical indicator, or may otherwise be reflected in the user interface 1100.

A maximization button 1108 may be displayed in the user interface 1100 and, when selected, may provide additional details regarding the outcome item through a maximized outcome item. An example of a maximized outcome item is described in greater detail below.

An outcome title 1110 of the outcome item may be displayed in the user interface 1100. The title of the outcome item may be specified by operator input of the outcome title through the title field 912 (see FIG. 9).

One or more outcome indicators of the outcome item may be displayed. The user interface 1100 shows that the outcome item has an acceptance status indicator 1112 and an access level indicator 1114. Other outcome indicators regarding the outcome item may also be displayed.

The acceptance status indicator 1112 is a visual indicator that relays to the operator whether a manager has accepted the outcome status. An example of visual indicators that may be used for the acceptance status indicator 1112 is described in greater detail below.

The access level indicator 1114 is a visual indicator that relates to the operator who can view the outcome item. In general, the access level indicator provides a visual representation of the access level to enable the operator to visually identify the access level by viewing the display of the outcome item. The access level for the outcome item may be specified by the operator through the access level field 918 (see FIG. 9). The access level generally defines other resource access to a particular item beyond the resource (e.g., beyond the resource that is the owner of the item). An example of visual indicators that may be used for the access level indicator 1114 is described in greater detail below.

A period of time 1116 associated with the outcome item may also be displayed in the user interface 1100. The period of time for the outcome item may be specified by operator through the period start field 906 and the period end field 908 (see FIG. 9).

FIG. 12 illustrates a user interface 1200, according to an example embodiment. The user interface 1200 displays examples of possible acceptance status indicators that may be used with an outcome item. For example, one of the possible acceptance status indicators may be displayed as the acceptance status indicator 1112 for the outcome item of the user interface 1100 (see FIG. 11). Other types of indicators may be used.

As shown, the indicators may have a transparent background and an open box when the outcome acceptance is open and a dark background and a closed box when the outcome acceptance is closed. A check in the box may be used to indicate that a manager has accepted the outcome item. A delta symbol in the box may be used to indicate that the manager has accepted the outcome item. A number in the box may be used to indicate that the manager has reaccepted the outcome item a number of times indicated by the number in the box.

FIG. 13 illustrates a user interface 1300, according to an example embodiment. The user interface 1300 displays examples of possible access level indicators that may be used with an outcome item. For example, one of the outcome access level indicators may be displayed as the outcome access level indicator 1114 for the outcome item of the user interface 1100 (see FIG. 11). Other types of indicators may be used.

An icon appearing as an open or closed lock is shown in the user interface 1300 as visually indicating access level of outcome items. However, other types of icons or other images may also be used.

A closed lock may be used to indicate that only the operator can view the outcome item. An open locked may be used to indicate that others beyond the operator can view the outcome item.

An arrow pointing up within the open lock indicates that the manager and any manager direct in line to the CEO may view the outcome item. An arrow pointing up and side to side within the open lock indicates that the manager of the operator, and any manager in direct line with the CEO, and anyone who reports to the operator may view the item. An arrow pointing side to side within the open lock indicates that the CEO and anyone in the department/team of the operator may see the outcome item. The open lock without an arrow indicates that anyone in the organization who connects with the operator may view the outcome item.

FIG. 14 illustrates a user interface 1400 to the maintain subsystem 202, according to an example embodiment. The user interface 1400 displays an example of a maximized outcome item. In some embodiments, the maximized outcome item may be displayed in the user interface 800 (see FIG. 8). For example, one or more of the outcome items 836-850 of the user interface 800 may be maximized outcome items.

The example of the maximized outcome item displayed in the user interface 1400 may be a version of the minimized outcome item displayed in the user interface 1100 (see FIG. 11). The outcome item of the user interface 1400 is shown to include the outcome status field 1102, the visual identifier 1104, the priority indicator 1106, the outcome title 1110, the outcome acceptance status indicator 1112, the outcome access level indicator 1114, and the period of time 1116 of the outcome item of the user interface 1100.

A minimization button 1402, when selected, may provide fewer details regarding the item. In some embodiments, selection of the minimization button 1402 may cause the minimized outcome item displayed in the user interface 1100 (see FIG. 11) to be displayed in place of the outcome item displayed in the user interface 1400.

The priority of the item may be adjusted by a priority button 1404. For example, the priority may be increased or decreased by use of the priority button 1404.

A number of action buttons 1406-1416 may be displayed with the outcome item in the user interface 1400. These actions buttons 1406-1416 may include an attachment button 1406, a notes button 1408, an edit button 1410, a view button 1412, a history button 1414, and a copy button 1416. Additional or different outcome actions buttons may be included.

The attachment button 1406 enables documents to be attached to the item. The notes button 1408 enables notes related to the item to be included with the outcome item. The edit button 1410 enables the operator to change item details.

The view button 1412 enables the operator to view details of the item.

The history button 1414, when selected, displays the history of the item. When selected, the operator may view when the item was added, changed, or deleted and the resource involved with the addition, change, or deletion.

The copy button 1416 creates a copy of the item. Examples of user interfaces generated by selection of the buttons 1460-1416 is described in greater detail below.

Figure 15:
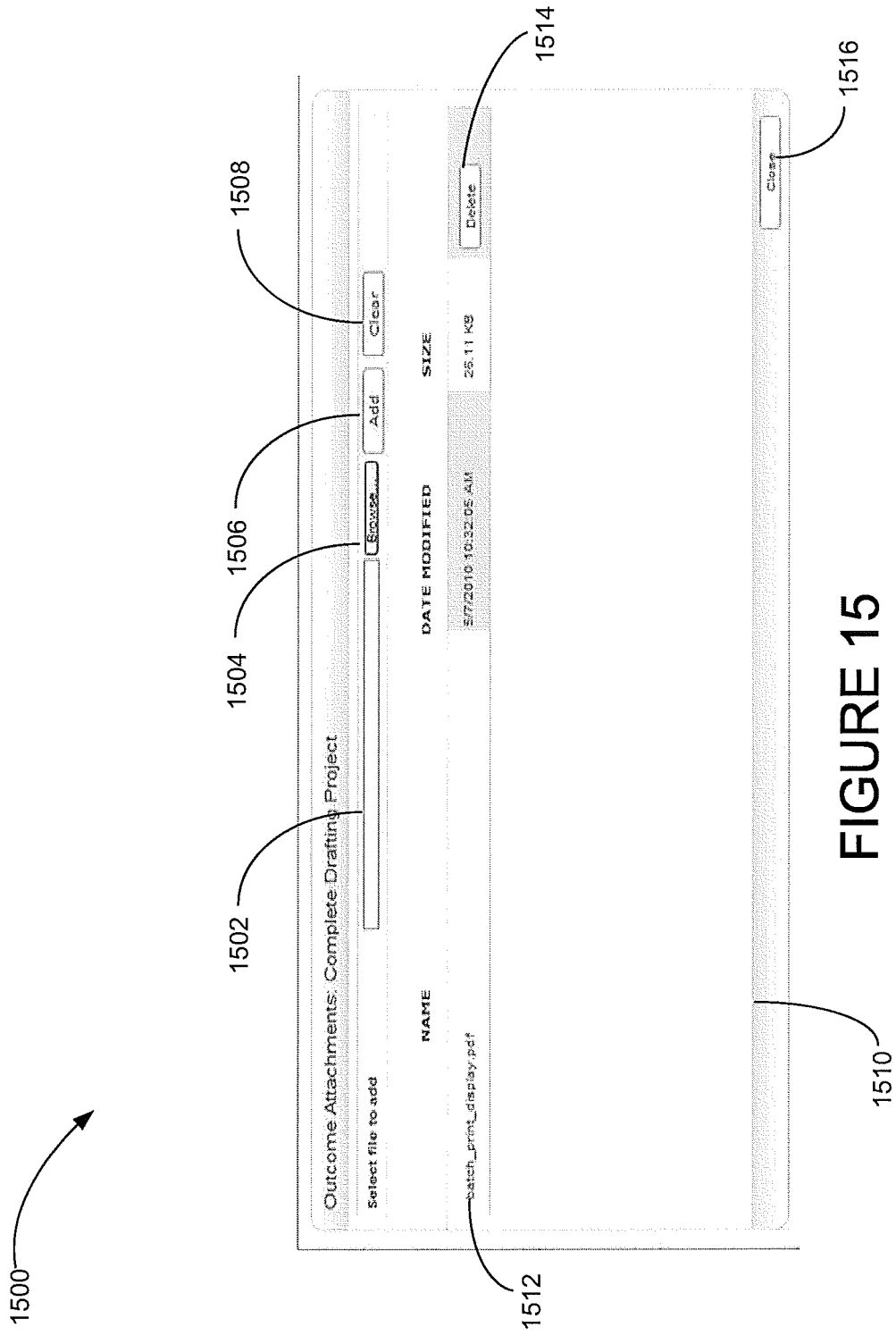

FIG. 15 illustrates a user interface 1500 to the maintain subsystem 202, according to an example embodiment. The user interface 1500 displays an outcome item attachment display that may be used to add an attachment to an outcome item. Adding an attachment to the outcome item may enable the operator or other resources to readily locate and review associated documents regarding the outcome item. Large quantities of data do not clutter the overview of the outcome. Links allow documents to remain in their primary location to minimize duplication and allow the outcome items to act as indexes to the versions. In some embodiments, the user interface 1500 may be displayed when the attachment button 1406 (see FIG. 14) is selected.

The operator may specify a file name and/or file location of a file in a file selection field 1502 of the user interface 1500. The operator may directly enter the information in the file selection field 1502, or use a browse button 1504 to identify the file on a computing system. After the file is identified in the file selection field 1502, the file may be added to the outcome item as an attachment by operator selection of an add button 1506. The file selection field 1502 may be cleared by operation selection of a clear button 1508. Additional or different buttons beyond the buttons 1504-1508 may be displayed in the user interface 1500.

An attachment area 1510 identifies attachments associated with the outcome item. The attachment area 1510 may reflect no attachments, a single attachment, or multiple attachments are associated with the outcome item. Each attachment 1512 identified in the attachment area 1510 may be identified by name, data modified, and size. Additional or different attributes regarding the attachments (e.g., file type) may be displayed in the user interface 1500.

Attachments 1512 may be disassociated with the outcome item by selection of a delete button 1514. In some embodiments, the delete button 1514 removes a single associated attachment. In other embodiments, the delete button 1514 removes all associated attachments.

Once the operator is finished adding or removing the attachments 1512, a close button 1516 may be selected. In some embodiments, the close button 1516 returns the operator to the outcome item displayed in the user interface 1400 (see FIG. 14).

Figure 16:
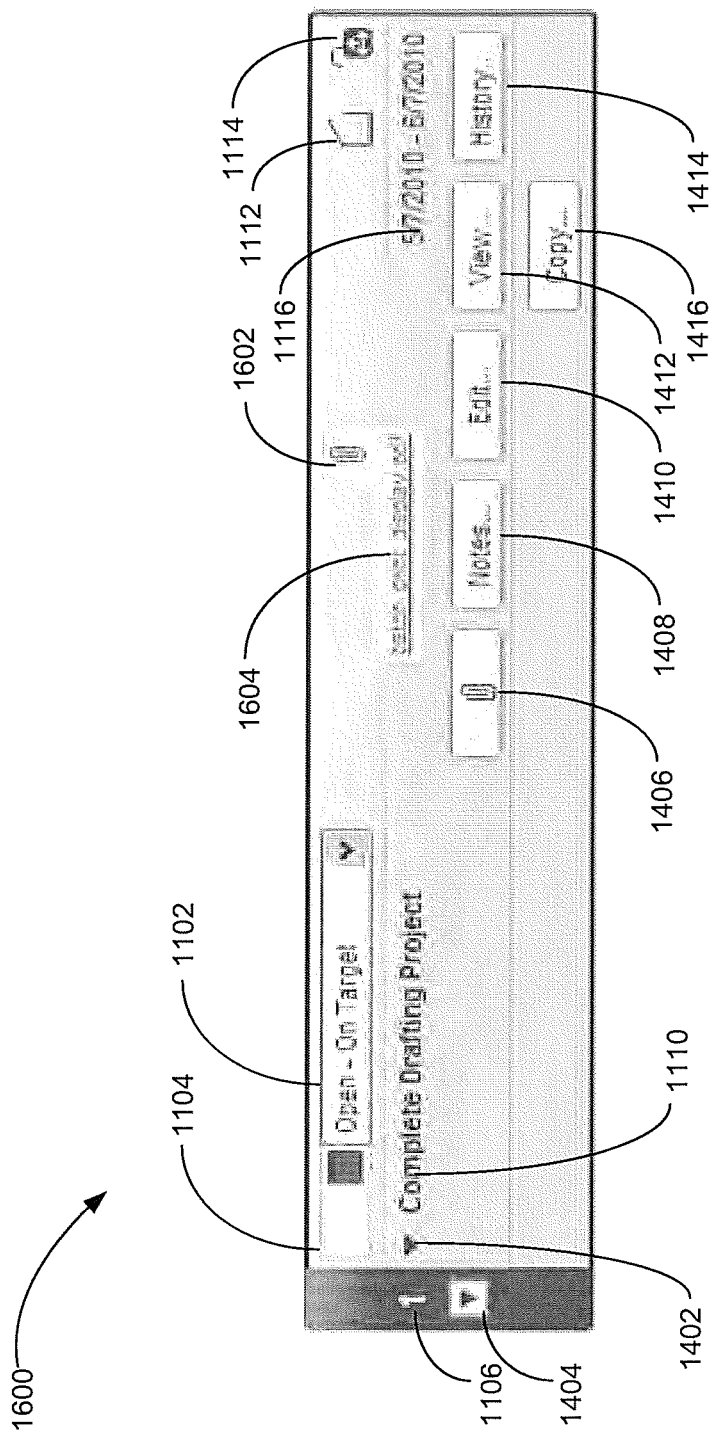

FIG. 16 illustrates a user interface 1600 to the maintain subsystem 202, according to an example embodiment. The user interface 1600 displays an example of a maximized outcome item. In some embodiments, the maximized outcome item added outcome item may be displayed in the user interface 800 (see FIG. 8). For example, one or more of the outcome items 836-850 of the user interface 800 may be maximized outcome items.

The outcome item displayed in the user interface 1600 may be a version of the outcome item displayed in the user interface 1400 (see FIG. 14) with the addition of an associated attachment. The user interface 1600 may include the outcome status field 1102, the visual identifier 1104, the priority indicator 1106, the outcome title 1110, the outcome acceptance status indicator 1112, the outcome access level indicator 1114, the period of time 1116, the minimization button 1402, the priority button 1404, and the outcome action buttons 1406-1416 of the user interface 1400.

An attachment indicator 1602 may be included on the user interface 1600 to provide a visual indication that an attachment has been associated with the outcome item. In some embodiments, hovering over (e.g., mouse over) the attachment indicator 1602 may cause a file attachment indicator 1604 to occur. The file attachment indicator 1604 lists the names of the attachments associated with the outcome item.

Figure 17:
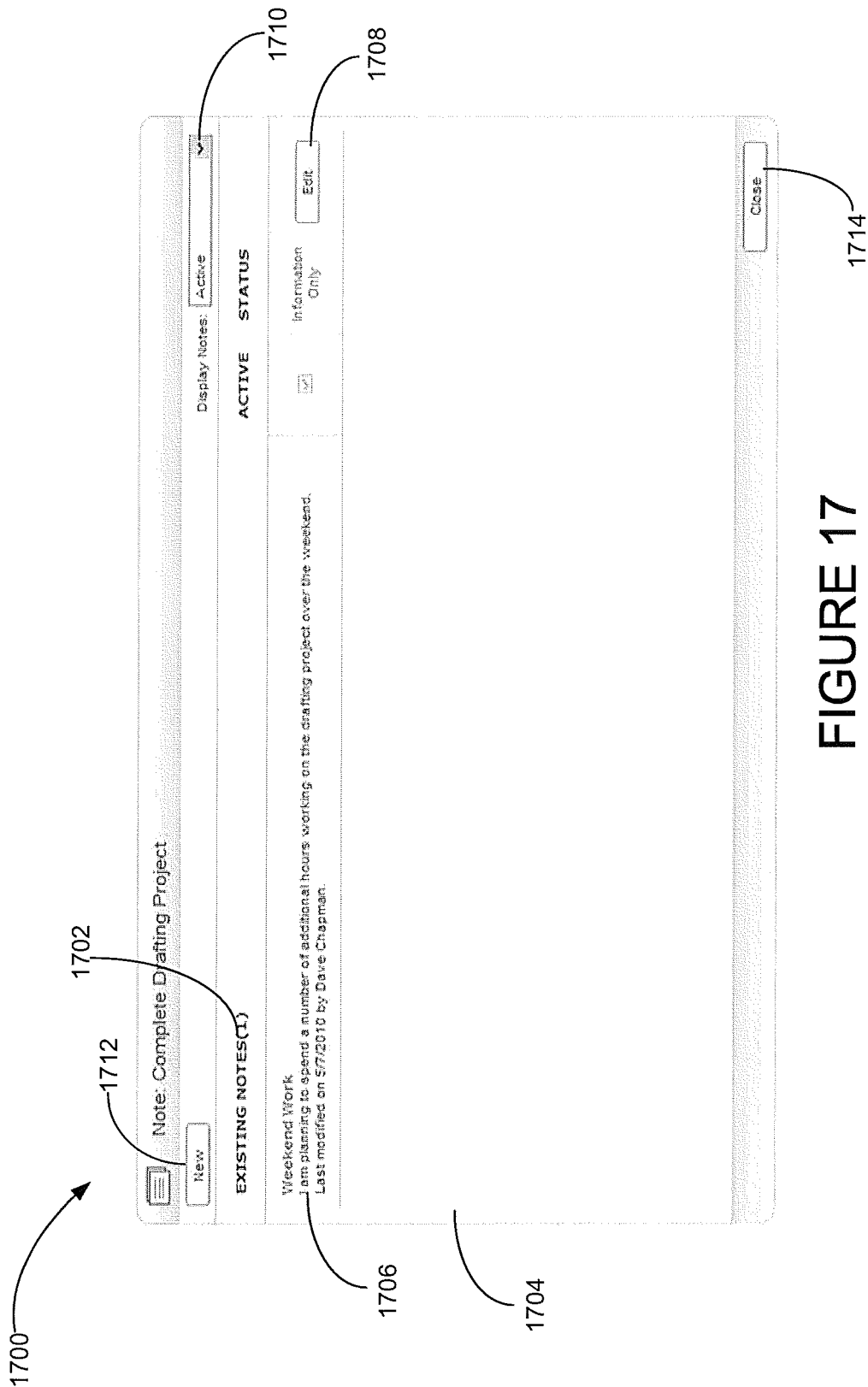

FIG. 17 illustrates a user interface 1700 to the maintain subsystem 202, according to an example embodiment. The user interface 1700 displays an outcome item note screen that may be used to add a note to the outcome item. Adding a note to the outcome item may enable the operator or other resources to readily locate and review notes regarding the outcome item. When another resource adds a note to a resource's outcome, an email may be sent to the resource and the history remains with the Outcome. In some embodiments, the user interface 1700 may be displayed when the note button 1408 is selected.

An existing notes identifier 1702 of the user interface 1700 identifies a number of notes, if any, that have been associated with the outcome item.

A notes area 1704 identifies notes associated with the outcome item. A title, a portion or an entire note message, a last modification date, a last modification person, an active indicator, and a status may be included for each note 1706 identified in the notes area 1704. A single note or multiple notes may be associated with the outcome item.

Notes may be edited by selection of an edit button 1708. In some embodiments, the edit button 1708 is associated with and edits a single note.

A notes filter selection 1710 may filter the notes shown in the user interface 1700. For example, a notes filter selection of "active" may limit the notes shown in the user interface 1700 to active notes while a notes filter selection of "all" may include all notes associated with the outcome item.

A new note may be associated with the outcome item by selection of a new button 1712. An example of creation of a new note is described in greater detail below. Once the operator is finished adding or editing notes, the operator may select a close button 1714.

Figure 18:
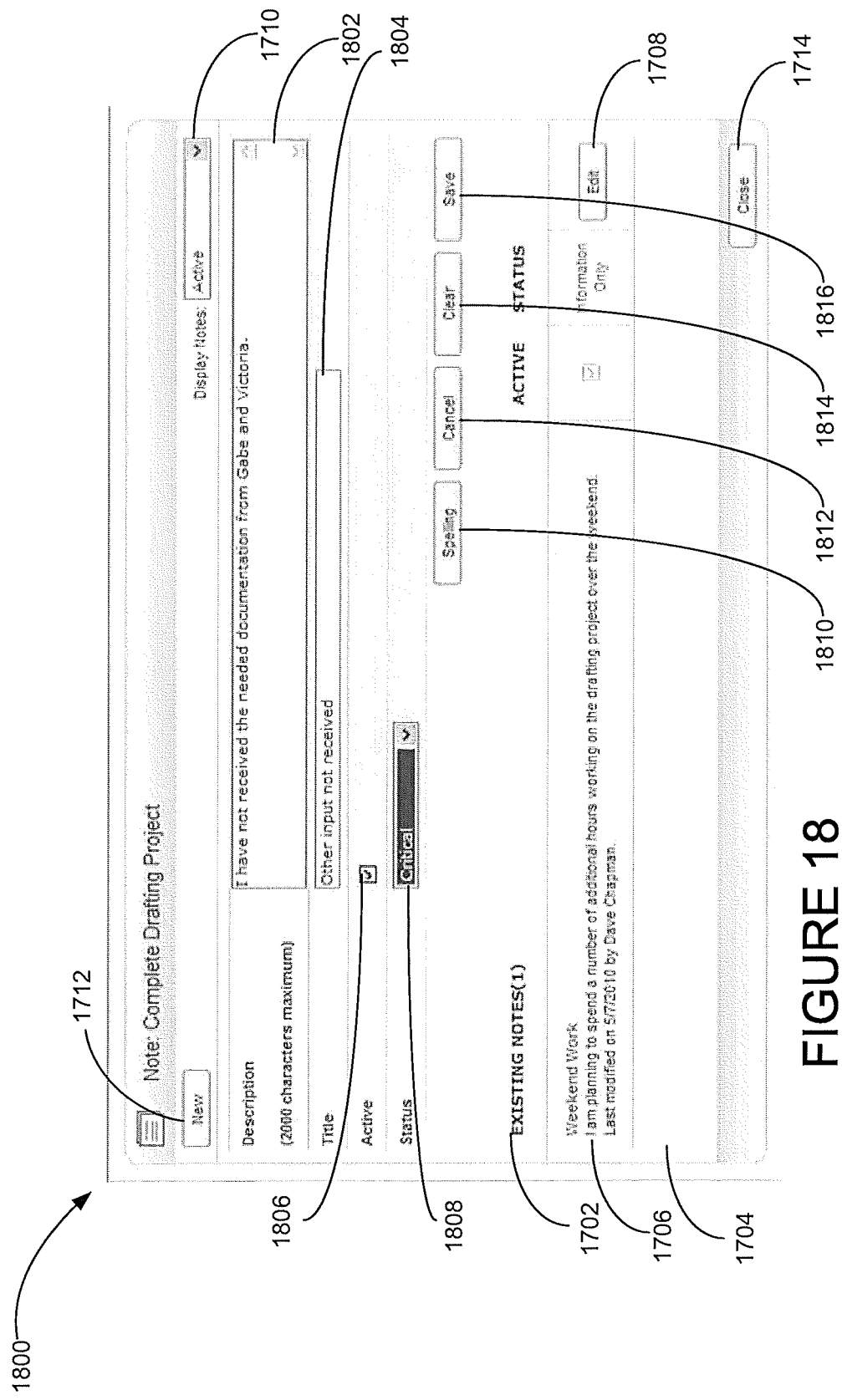

FIG. 18 illustrates a user interface 1800 to the maintain subsystem 202, according to an example embodiment. The user interface 1800 displays an outcome item note screen that may be used to add a note to the outcome item. In some embodiments, the user interface 1800 may be displayed when the new button 1712 is selected on the user interface 1700 (see FIG. 17).

In some embodiments, the addition of a note to an item may enable collaboration between the resource associated with the item and other resources in the organization. For example, the another resource may have linked an item to the item associated with the resource, viewed the note, and then take some action based on viewing the note.

The user interface 1800 may include the existing notes identifier 1702, the notes area 1704, the notes 1706, the edit button 1708, the filter selection 1710, the new button 1712, and the close button 1714 of the user interface 1700. Additional elements may also be displayed in the user interface 1800.

The operator may specify a description for the note in a description field 1802. A title of the note may be received from the operator in a title field 1804. An active checkbox 1806 may be used to indicate whether the note is active. A status field 1808 may be used to identify the status of the note. For example, the status of the note may be information only, warning, critical, or deletion.

A spelling button 1810 checks the spelling of the description included in the description field 1802 and the title included in the title field 1804. A cancel button 1812 returns the operator to a previously displayed user interface without adding the new note. A clear button removes the information in one or more fields (e.g., the description field 1802 and the title field 1804) of the user interface 1800. A save button 1816 may be used to save the note and associate the note with the outcome item.

Figure 19:
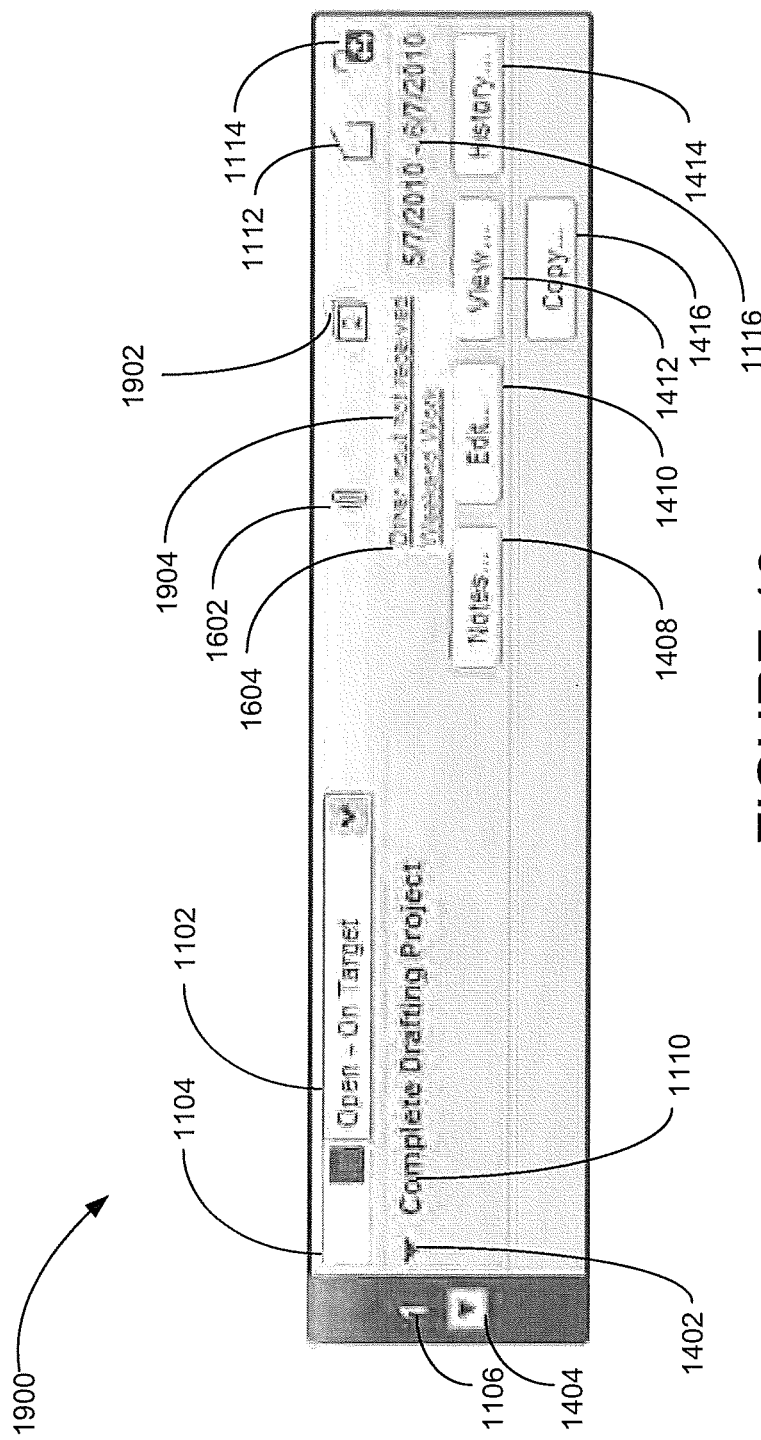

FIG. 19 illustrates a user interface 1900 to the maintain subsystem 202, according to an example embodiment. The user interface 1900 displays an example of a maximized outcome item. In some embodiments, the maximized outcome item may be displayed in the user interface 800 (see FIG. 8). For example, one or more of the outcome items 836-850 of the user interface 800 may be maximized outcome items.

The outcome item displayed in the user interface 1900 may be a version of the outcome item displayed in the user interface 1600 (see FIG. 16) with the addition of an associated note. The user interface 1900 may include the outcome status field 1102, the visual identifier 1104, the priority indicator 1106, the outcome title 1110, the outcome acceptance status indicator 1112, the outcome access level indicator 1114, the period of time 1116, the minimization button 1402, the priority button 1404, the outcome action buttons 1406-1416, and the attachment indicator 1602 of the user interface 1600.

A note indicator 1902 may be included on the user interface 1900 to provide a visual indication that a note has been associated with the outcome item, a number of notes associated with the outcome item, or both. In some embodiments, hovering over (e.g., mouse over) the note indicator 1902 may cause a note attachment indicator 1904 to occur. The note attachment indicator 1904 lists the names of the attachments associated with the outcome item. In some embodiments, notes that have a status of critical may be listed in a different color than the other notes.

In some embodiments, the note indicator 1902 may be one color (e.g., blue) when no notes are identified as not being in critical status, and another color (e.g., red) when one or more notes are identifies as being in critical status.

In some embodiments, portions of the note attachment indicator 1904 may be one color (e.g., blue) when the associated notes are identified as not being in critical status, and other portions of the note attachment indicator 1904 may be another color (e.g., red) when the associated notes are identified as being in critical status.

Figure 20:
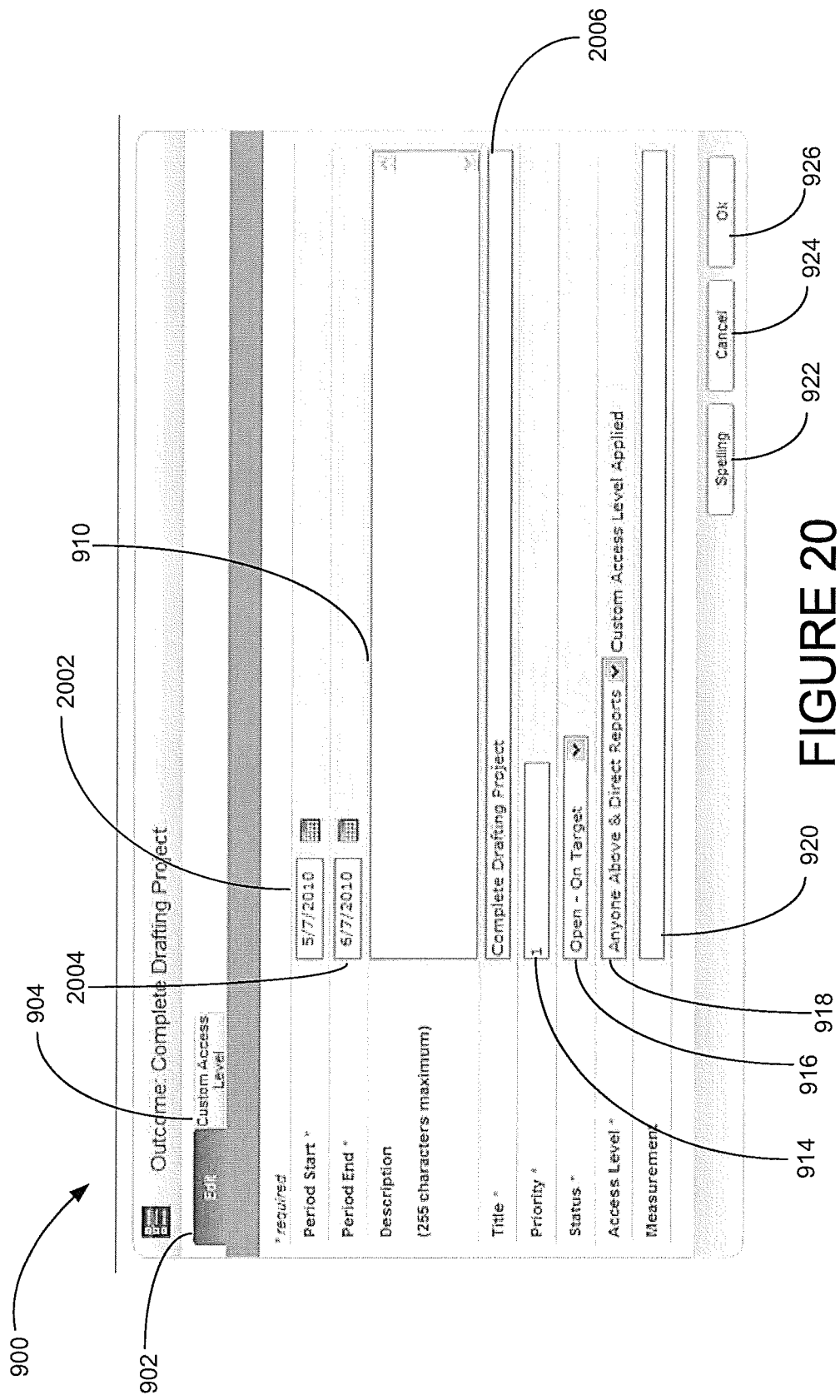

FIG. 20 illustrates a user interface 2000 to the maintain subsystem 202, according to an example embodiment. The user interface 2000 enables the operator to edit an outcome item. In some embodiments, the user interface 2000 may be displayed by selection of the edit button 1410 (see FIGS. 14, 16, and 19).

In general, the user interface for editing the outcome item includes the same elements as the user interface 900 used by the operator to add the outcome item. As such, the elements of the user interface 2000 generally correspond to the elements of the user interface 900.

The user interface 2000 includes the edit tab 902, the custom access level tab 904, the description field 910, the priority field 914, the status field 916, the access level field 918, and the buttons 922-926 that of the user interface 900.

Certain fields are populated versions of field from the user interface 900. The period start field 2002 is populated with data and corresponds to the period start field 906, the period end field 2004 is populated with data and corresponds to the period end field 908, and the title field 2006 is populated with data and corresponds to the title field 912. Other fields in the user interface 900 may be populated with data and correspond to populated versions of elements in the user interface 2000.

Figure 21:
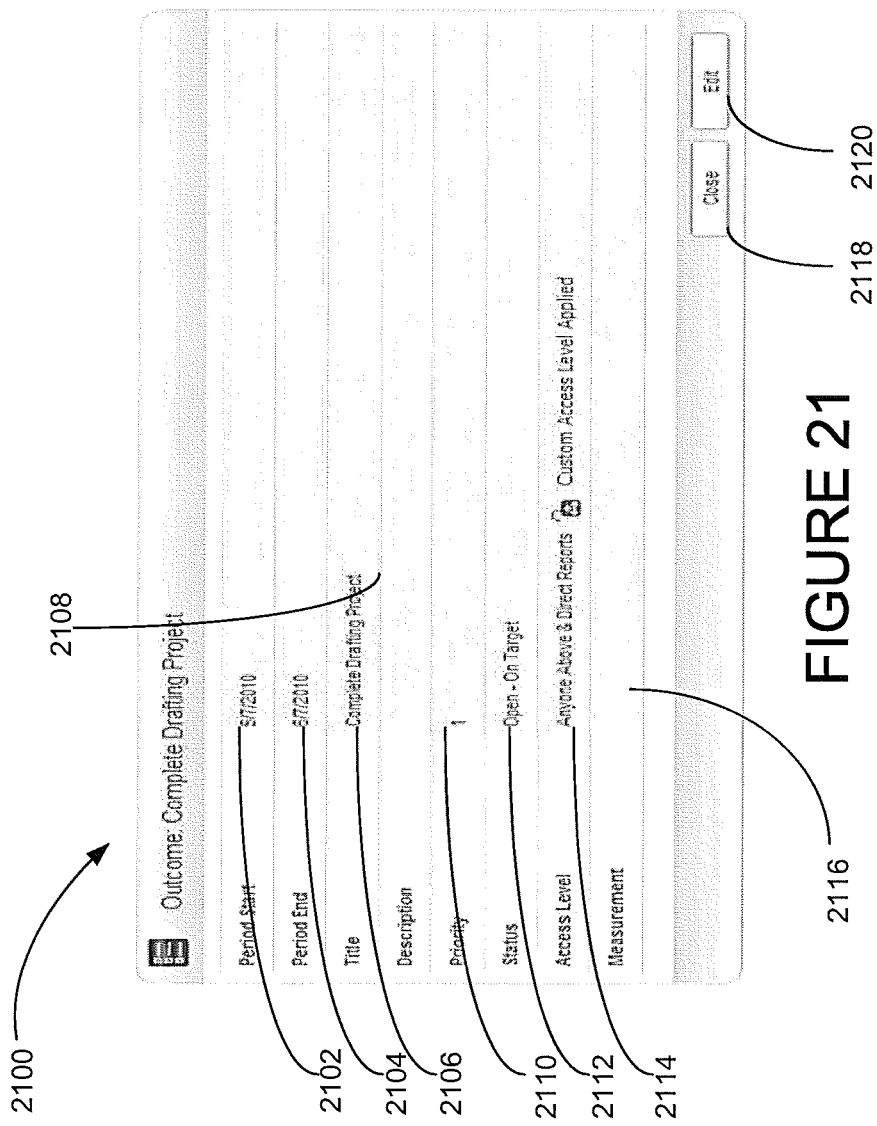

FIG. 21 illustrates a user interface 2100 to the maintain subsystem 202, according to an example embodiment. The user interface 2100 enables the operator to view an outcome item. In some embodiments, the user interface 2100 may be displayed by selection of the view button 1412 (see FIGS. 14, 16, and 19).

The user interface 2100 displays data based on the creation or editing of the outcome item. As shown, the user interface 2100 includes period start data 2102, period end data 2104, title data 2106, description data 2108, priority data 2110, access level data 2114, and measurement data 2116. The data may be received through the user interface 900, the user interface 2000, or may otherwise be received.

Selection by the operator of a close button 2118 may cause the previously displayed user interface to be displayed (e.g., the user interface 1400). Selection by the operator of an edit button 2120 may cause the user interface 2000 (see FIG. 20) to be displayed.

FIG. 22 illustrates a user interface 2200 to the maintain subsystem 202, according to an example embodiment. The user interface 2200 enables the operator to display the history of an outcome item. In some embodiments, the user interface 2200 may be displayed by selection of the history button 1414 (see FIGS. 14, 16, and 19).

A history area 2202 of the user interface 2200 identifies creations and modifications to portions of the outcome item. Each history item 2204 identified in the history area 2202 may be identified by field, value, user, and date.

Once the operator is finished viewing the history of the outcome item, a close button 2206 may be selected.

Figure 23:
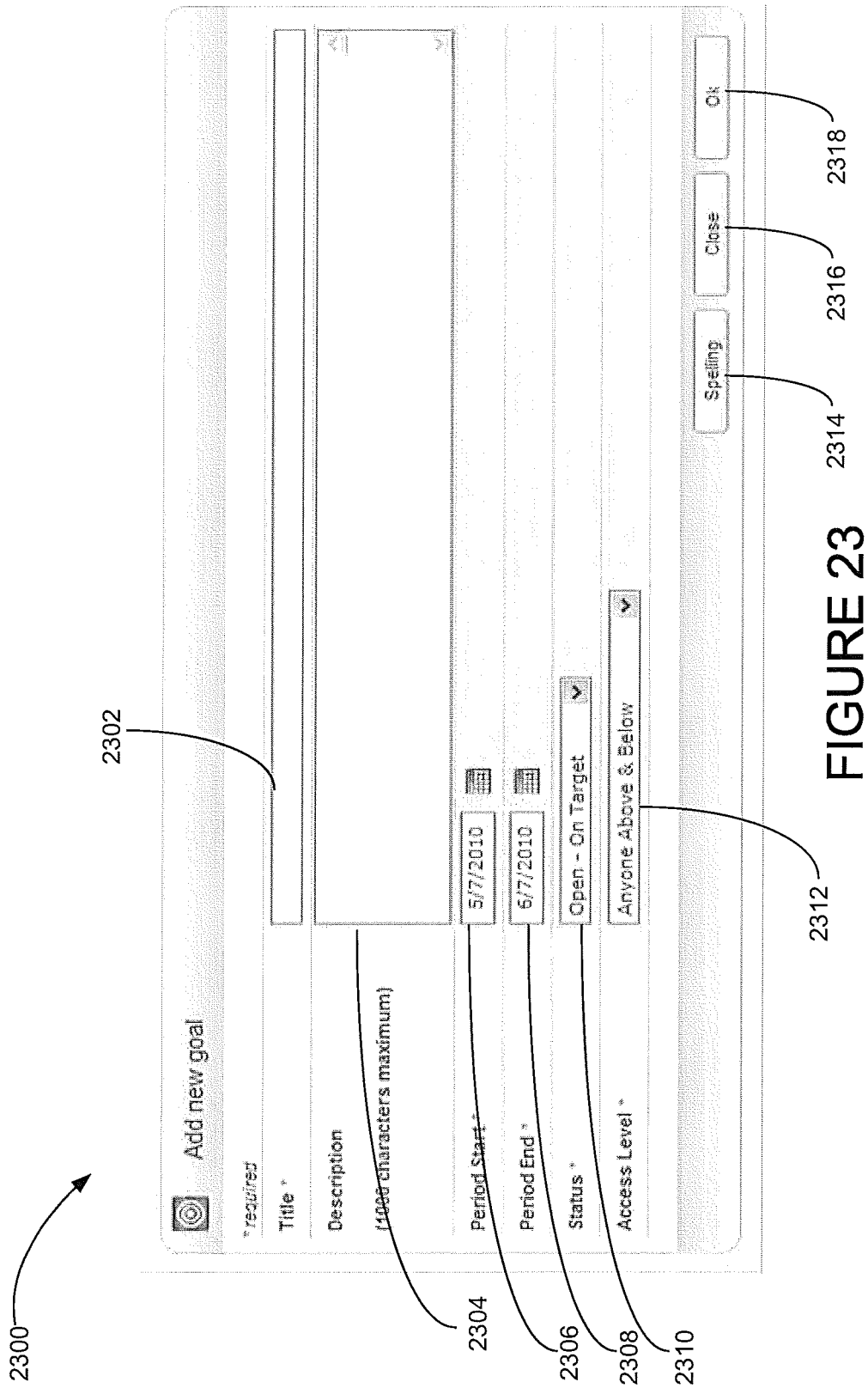

FIG. 23 illustrates a user interface 2300 to the maintain subsystem 202, according to an example embodiment. The user interface 2300 enables the resource to add a new goal item. One or more goal items may be presented in a version of the user interface 800 (see FIG. 8) as shown in greater detail below.

A title field 2302 enables the operator to specify a title for the goal item.

A description field 2304 enables the operator to include a description regarding the goal item. In some embodiments, the description may be limited to a certain number of characters (e.g., a 1000 character maximum).

The operator may specify the period start date and the period end date for the new goal item by use of a period start field 2306 and a period end field 2308 respectively. In some embodiments, the period start field 2306 and the period end field 2308 may be populated with dates when the user interface 2300 is presented to the operator. For example, the period start field 2306 may include the current date and the period end field 2308 may include one month from the current date. The fields 2306, 2308 may be populated with other dates.

A status field 2310 enables the operator to designate a status of the goal item. In some embodiments, the operator may designate status of the goal item as open-exceeding, open-on target, open-warning, open-critical, open-pending, closed-achieved, closed-not achieved, closed-cancelled, or deleted. The open-exceeding status may be used to indicate that the user (or other resource) associated with the goal item is achieving ahead of plan. The open-on target status may be used to indicate that the resource is achieving as planned. In one embodiment, the open-on target status may be a default status assigned to goal items. The open-warning status may be used to indicate that the resource is concerned about achieving as planned. The open-critical status may be used to indicate that the resource is not achieving as planned. The open-pending status may be used to indicate that that the resource is waiting to start. The closed-achieved status may be used to indicate that the resource has completed the goal and achieved the planned result. The closed-not achieved status may be used to indicate that the resource did not achieve the results as planned. The closed-cancelled status may be used to indicate that the resource is no longer required to achieve the result. The deleted status may be used to indicate that the goal created for the resource was done in error or is a duplicate. Other status schemes may be used for designated goal status of the goal items. These schemes may include a greater or lesser amount of granularity.

In some embodiments, a default status of the goal item may be populated in the user interface 2300. For example, the default status may be a status of "open-on target."

An access level field 2312 enables the operator to specify an access level of the outcome item. In some embodiments, the operator may designate the goal access levels as anyone above, anyone above and direct reports, anyone above and below, anyone, or private. The anyone above access level provides the manager of the operator and any manager in direct line to the CEO with access to the goal item. The anyone above and direct reports access level provides the manager of the operator, any manager in direct line to the CEO, and anyone who directly reports to the operator with access to the goal item. The anyone above and below access level provides the manager of the operator, any manager in direct line to the CEO, and anyone in the department/team of the operator with access to the goal item. The anyone access level provides anyone in the organization that can connect to the operator with access to the goal item. The private access level provides only the operator with access to the goal item.

In some embodiments, a default access level of the goal item may be populated in the user interface 2300. For example, the default access level may be an access of "anyone above & below."

A number of buttons 2314-2318 may be included on the user interface 2300. A spelling button 2314 checks the spelling of the description included in the description field 2304 and the title included in the title field 2302. A cancel button 2316 returns the operator to a previous user interface without adding the new goal item.

An ok button 2318 submits the outcome item for addition. In some embodiments, the goal item is added. In some embodiments, a verification check of one or more fields of the user interface 2300 is made prior to addition. For example, a verification check is made to ensure that the title field 2302, the period start field 2306, the period end field 2308, the status field 2310, and the access level field 2312 include acceptable data. If the verification check identifies no problems, the goal item is added. If the verification check identifies unacceptable data, the operator may be represented with the user interface 2300. The representment may include notification that unacceptable data has been received, notification of the fields that have unacceptable data, or both.

Figures 24, 25:
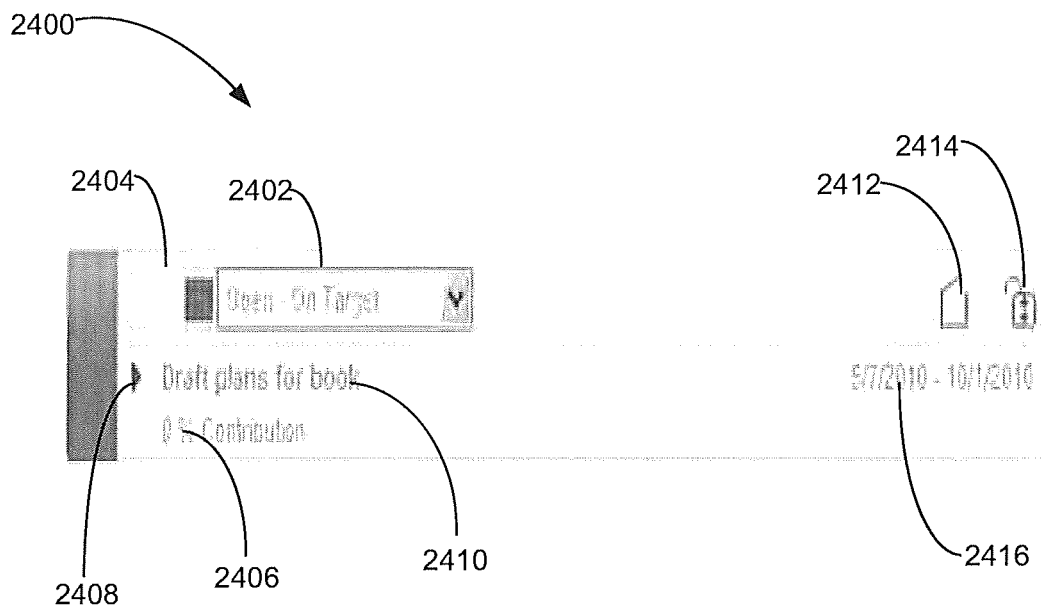

FIG. 24 illustrates a user interface 2400 to the maintain subsystem 202, according to an example embodiment. The user interface 2400 displays an example of a minimized goal item. The minimized goal item may be created through use of the user interface 2300, or may otherwise be created.

The user interface displays 2400 goal status. The goal status is displayed through a goal status field 2402 and a goal status visual identifier 2404. For example, the goal status field may indicate goal status of the goal item as "open-exceeding," "open-on target," "open-warning," "open-critical," "open-pending," "closed-achieved," "closed-not achieved," "closed-cancelled," or "deleted."

The goal status visual identifier 2404 may provide a visual indicator to reflect the current goal status. The goal status visual indicator may include a color, a pattern, a block length, or the like. For example, a green indicator may indicate that the goal item is "open-on target" or "open-exceeding," an orange indicator may indicate that the goal item is "open-warning," a red indicator may indicate that the goal item is "open-critical," a grey indicator may indicate that the goal item is "open-on hold" or "open-pending," a blue indicator may indicate that the goal item is "closed-achieved," a black indicator may indicate that the goal item is "closed-not achieved," and a burgundy indicator may indicate that the goal item has been deleted. Other color schemes or visual indicators may be used.

A contribution indicator 2406 may indicate the amount of contribution that a particular outcome item has with the goal item. The contribution may be reflected as a contribution percentage, or may otherwise be reflected in the user interface 2400.

A maximization button 2408, when selected, may provide additional details regarding the goal item through a maximized goal item. An example of a maximized goal item is described in greater detail below.

A goal title 2410 of the goal item may be displayed. The title of the goal item may be specified by operator input of the goal title through the title field 2302 (see FIG. 23).

A single goal indicator or multiple goal indicators of the goal item may be displayed. The user interface 2400 shows that the goal item has a goal acceptance status indicator 2412 and a goal access level indicator 2414. Other goal indicators regarding the goal item may also be displayed.

The acceptance status indicator 2412 is a visual indicator that relays to the operator whether a manager has accepted the goal item. An example of visual indicators that may be used for the acceptance status indicator 2412 is described in greater detail below.

The goal access level indicator 2414 is a visual indicator that relays to the operator who can view the goal item. An example of visual indicators that may be used for the access level indicator 2414 is described in greater detail below. The goal access level indicator 2414 may be based on the access level defined in the access level field 2312.

A period of time 2416 associated with the goal item may also be displayed in the user interface 2400. The period of time for the goal item may be specified by operator input of the goal title through the period start field 2306 and the period end field 2308 (see FIG. 9).

FIG. 25 illustrates a user interface 2500, according to an example embodiment. The user interface 1200 displays examples of possible acceptance status indicators that may be used with a goal item. For example, one of the possible acceptance status indicators may be displayed as the acceptance status indicator 2412 for the goal item of the user interface 2400 (see FIG. 24). Other types of indicators may be used.

As shown, the indicators may have a transparent background and an open box when the goal acceptance is open and a dark background and a closed box when the goal acceptance is closed. A check in the box may be used to indicate that a manager has accepted the goal item. A delta symbol in the box may be used to indicate that the manager has accepted the goal item. A number in the box may be used to indicate that the manager has reaccepted the goal item a number of times indicated by the number in the box.

Figures 26, 27:
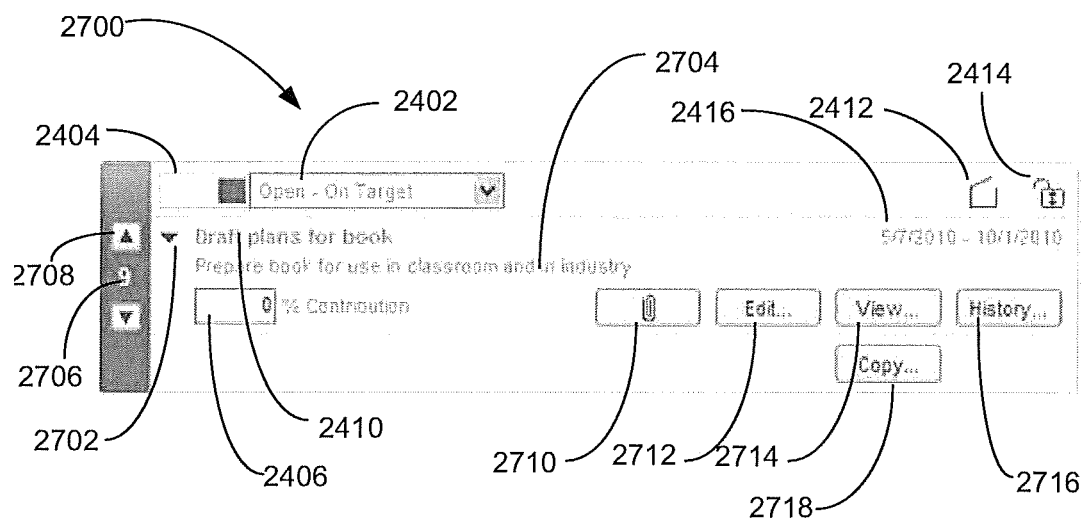

FIG. 26 illustrates a user interface 2600, according to an example embodiment. The user interface 2600 displays examples of possible goal access level indicators that may be used with a goal item. For example, one of the goal access level indicators may be displayed as the goal access level indicator 2414 for the goal item of the user interface 2400 (see FIG. 11). Other types of indicators may be used.

As shown, a lock is used to indicate goal access level. A closed lock may be used to indicate that only the operator can view the goal item. An open locked may be used to indicate that other resources can view the goal item.

An arrow pointing up within the open lock indicates that the manager and any manager direct in line to the CEO may view the goal item. An arrow pointing up and side to side within the open lock indicates that the manager of the operator, and any manager in direct line with the CEO, and anyone who reports to the operator may view the goal item. An arrow pointing side to side within the open lock indicates that the CEO and anyone in the department/team of the operator may view the goal item. The open lock without an arrow indicates that anyone in the organization who connects with the operator may view the goal item.

FIG. 27 illustrates a user interface 2700 to the maintain subsystem 202, according to an example embodiment. The user interface 2700 displays an example of a maximized goal item.

The goal item displayed in the user interface 2700 may be a maximized version of the goal item displayed in the user interface 2400 (see FIG. 24). The user interface 2700 may include the goal status field 2402, the goal status visual identifier 2404, the contribution indicator 2406, the goal title

2410, the goal acceptance status indicator 2412, the goal access level indicator 2414, and the period of time 2416 of the user interface 2400.

A minimization button 2702, when selected, may provide fewer details regarding the goal item through a minimized goal item.

A goal description 2704 may be included on the goal item. The goal description 2704 may be received through the description field 2304 of the user interface 2300 (see FIG. 23).

A priority 2706 of the outcome item may be adjusted by priority buttons 2708. For example, the priority may be increased or decreased by use of the priority buttons 2708.

A number of goal action buttons 2710-2718 may be included in the user interface 2700. These goal actions buttons 2710-2718 may include an attachment button 2710, an edit button 2712, a view button 2714, a history button 2716, and a copy button 2718. Additional or different outcome actions buttons may be included.

The attachment button 2710 enables documents to be attached to the goal item. The edit button 2712 enables the operator to change goal item details.

The view button 2714 enables the operator to view details of the goal item. The history button 2716 enables display of changes to the goal item. The copy button 2716 creates a copy of the goal item.

Figure 28:
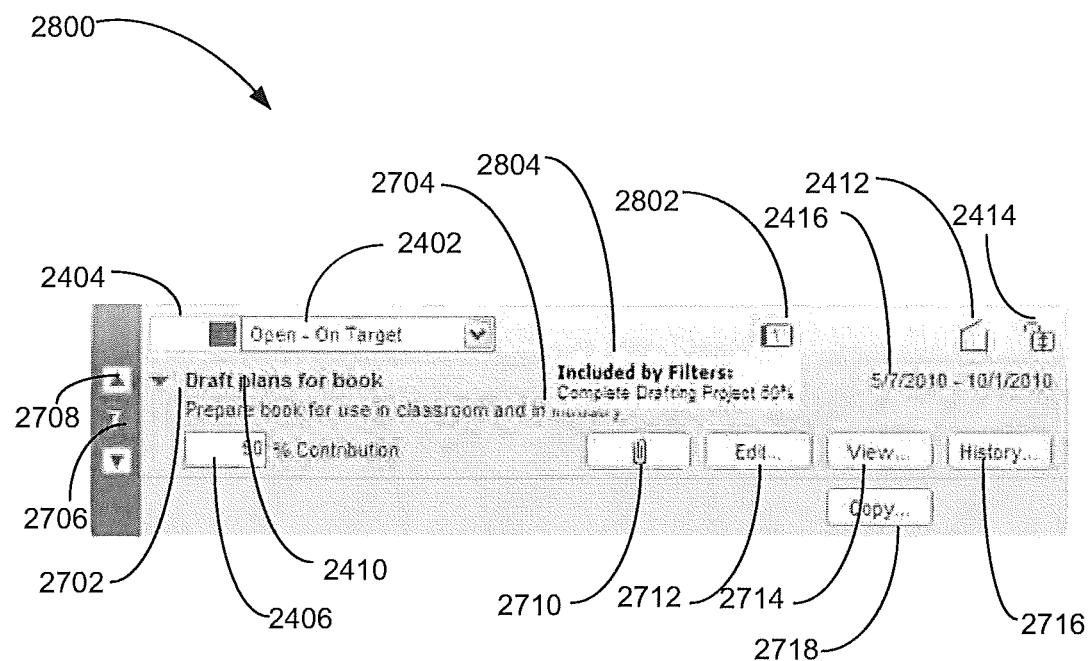

FIG. 28 illustrates a user interface 2800 to the maintain subsystem 202, according to an example embodiment. The user interface 2800 displays an example of a maximized goal item.

The goal item displayed in the user interface 2800 may be a version of the goal item displayed in the user interface 2700 (see FIG. 27) with the addition of linking between the goal item and an outcome item. The user interface 2800 may include the goal status field 2402, the goal status visual identifier 2404, the contribution indicator 2406, the goal title 2410, the goal acceptance status indicator 2412, the goal access level indicator 2414, the period of time 2416, the minimization button 2702, the goal description 2704, the priority 2706, the priority buttons 2708, and the goal action buttons 2710-2718 of the user interface 2700.

A link indicator 2802 may be included on the user interface 2800 to provide a visual indication that a link has been associated between the goal item and another item (e.g., an outcome item).

In some embodiments, hovering over (e.g., mouse over) the link indicator 2802 may cause a link details indicator 2804 to display. The link details indicator 2804 lists the names of the items associated with the goal item and an amount (e.g., a percentage) by which the items are associated. The link details indicator 2804 may identify whether the linked items are included or excluded by filters.

Figure 29:
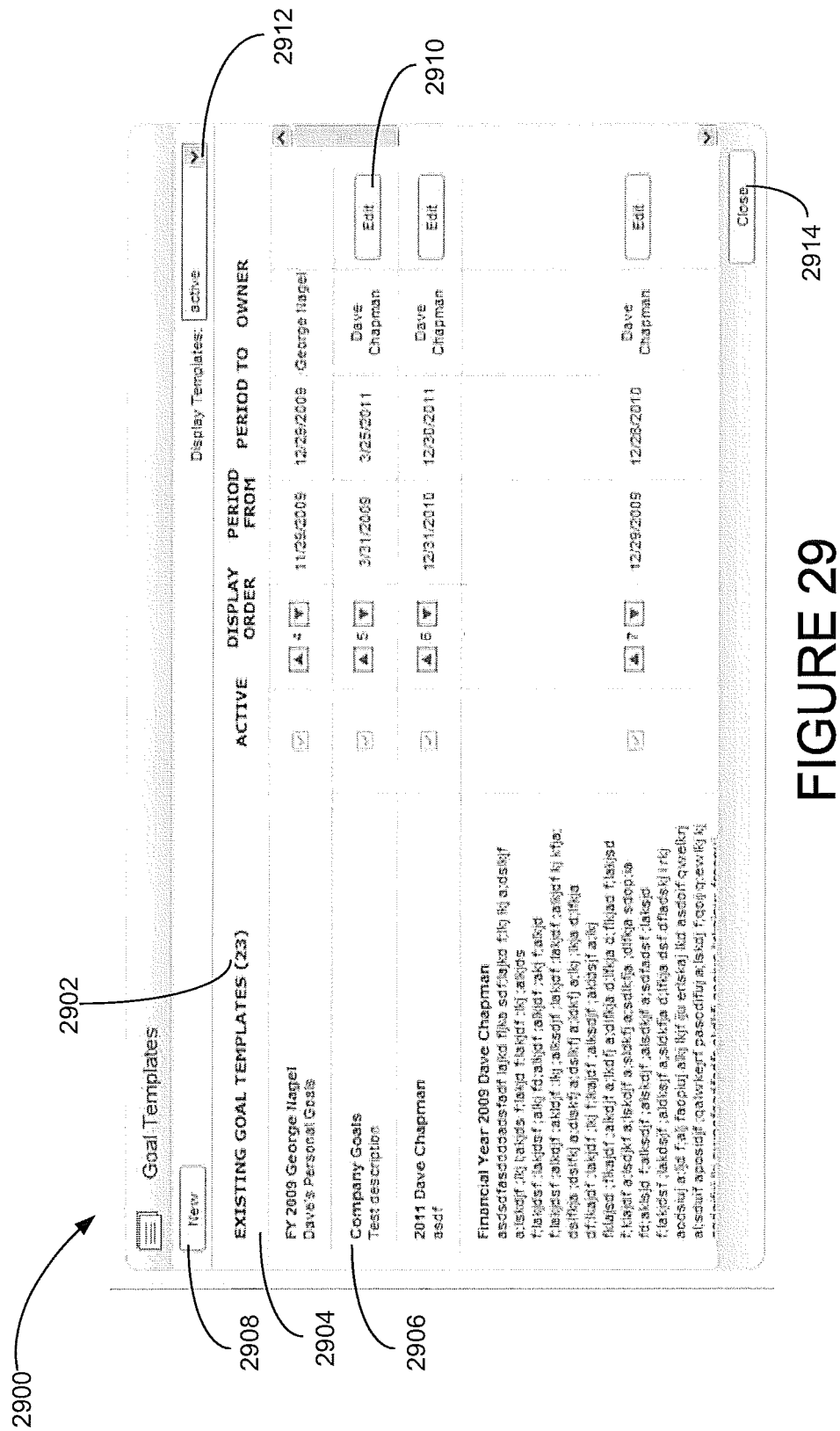

FIG. 29 illustrates a user interface 2900 to the maintain subsystem 202, according to an example embodiment. The user interface 2900 displays the goal templates of the organization. The goal templates are groupings of goals associated with the organization or a user (e.g., the operator).

For example, a goal template may be the goals of the organization for a particular fiscal year. The goals template display of the user interface 2900 may be generated for display when a manage templates button is selected as described in greater detail below.

An existing goals template identifier 2902 identifies the number of goal templates that are associated with the organization.

A goal template area 2904 identifies goal templates that are associated with the organization. A title, a description, a display order, a period start date, a period end date, and an owner may be included for each goal template 2906 identified in the notes area 2904.

In some embodiments, the display order may be adjusted by display order buttons. In general, the display order modifies the placement of the goal templates in the goal template area 2904 (see FIG. 29).

A new goal template may be created based on selection of a new button 2908. The user interface generated by the selection of the new button 2908 may include a description field, a title field, an active selection, a period start date field, a period end date field, a spelling button, a cancel button, a clear button, an ok button, an existing goal template area, and a close button. The existing templates in the existing goal template area may be displayed as they are displayed in the user interface 2900.

Goal templates may be edited by selection of an edit button 2910. In some embodiments, the edit button 2910 is associated with and edits a single goal template. The user interface generated by the selection of the edit button 2910 may include a number of the elements displayed in the user interface generated for displayed by the new button 2908 except that one or more of the elements may be populated with data already defined for the goal template.

A filter selection 2912 may filter the goal templates shown in the user interface 2900. For example, a filter selection of "active" may limit the goal templates shown in the user interface 2900 to active notes.

Once the operator is finished adding or editing goal templates, a close button 2914 may be selected.

FIG. 30 illustrates a user interface 3000 to the maintain subsystem 202, according to an example embodiment. The user interface 3000 enables the operator to display the history of a goal item. In some embodiments, the user interface 3000 may be displayed by selection of the history button 2716 (see FIGS. 27 and 28).

A history area 3002 identifies creations and modifications to elements of the goal item. Each goal item 3004 identified in the history area 3002 may be identified by field, value, user, and date.

Once the operator is finished viewing the history of the goal item, a close button 3006 may be selected.

Figure 31:
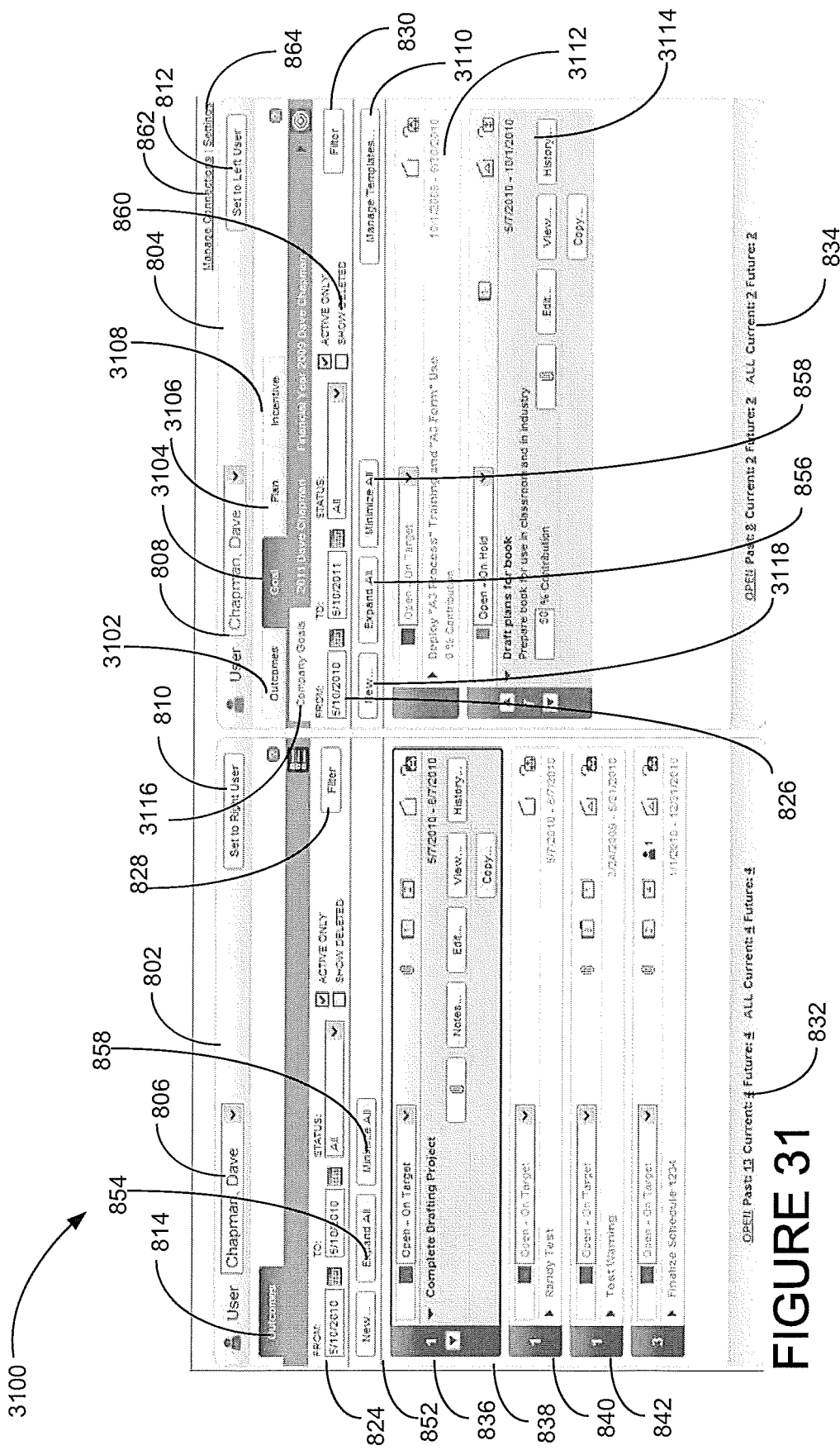

FIG. 31 illustrates a user interface 3100 to the maintain subsystem 202, according to an example embodiment. The user interface 3100 enables the operator to view items of one or more categories. The user interface 3100 includes outcome items on a left pane 802 and goal items on a right pane 804 (see FIG. 8).

The user interface 3100 is a version of the user interface 800 with the goal tab 818 selected instead of the outcome tab 816 (see FIG. 8). As such, a number of elements included on the user interface 800 are included on the user interface 3100.

A single tab or multiple tabs may be available for selection in each of the panes 802, 804 of the user interface 800. The left pane 802 includes the outcome tab 814 and the right pane 804 includes an outcome tab 3102, a goal tab 3104, a plan tab 3106, and an incentive tab 3108. The tabs 3102-3108 correspond to the tabs 816-822 of the user interface 800 except that the goal tab 3104 is active in the user interface 3100. As such, the goal tab 3104 is shown in a different color.

A manage template button 3110 may be select to manage goal templates. In one embodiment, selection of the template button 3110 may cause the user interface 2900 (see FIG. 29) to be generated for display.

Unlike the user interface 800, items included in the right pane 804 are goal items 3112, 3114. An outcome item 836 and a goal item 3114 are shown as being linked to one another in the user interface 3100. In some embodiments, the linking of the outcome item 836 and the goal item 3114 are shown as the items 836, 3114 being a different color (e.g., highlighted) then the remainder of the items.

A goal template tab selection 3116 may be made among a single tab or multiple tabs. The selection of a goal template tab may cause associated goal items associated with the goal template to be visible in the right pane 804.

A new goal may be created by selecting a new button 3118. In some embodiments, selection of the new button 3118 may cause the user interface 2300 (see FIG. 23) to be generated for display.

Figure 32:
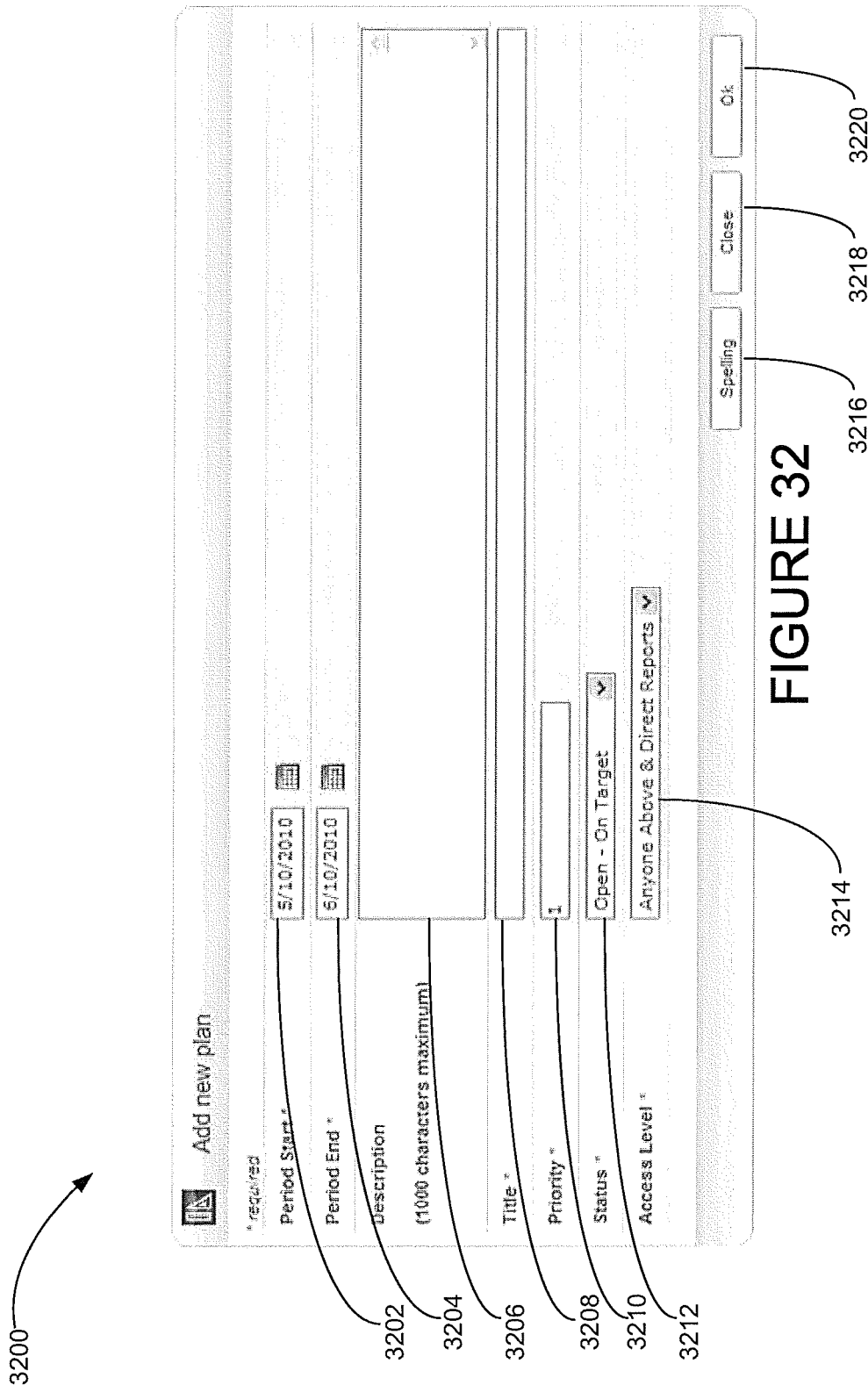

FIG. 32 illustrates a user interface 3200 to the maintain subsystem 202, according to an example embodiment. The user interface 3200 enables the resource to add a new plan item (e.g., a plan obstacle item or a plan milestone item). One or more plan items may be presented in a version of the user interface 800 (see FIG. 8) as shown in greater detail below.

The operator may specify the period start date and the period end date for the new plan item by use of a period start field 3202 and a period end field 3204 respectively. In some embodiments, the period start field 3202 and the period end field 3204 may be populated with dates when the user interface 3200 is presented to the operator. For example, the period start field 3202 may include the current date and the period end field 3204 may include one month from the current date. The fields 3202, 3204 may be populated with other dates.

A description field 3206 enables the operator to include a description regarding the plan item. In some embodiments, the description may be limited to a certain number of characters (e.g., a 1000 character maximum).

A title field 3208 enables the operator to specify a title for the plan item.

A priority field 3210 enables the operator to specify a priority for the plan item. In some embodiments, a default priority of the plan item may be populated in the user interface 3200. For example, the default priority may be a priority of 1.

A status field 3212 enables the operator to designate a status of the plan item. In some embodiments, the operator may designate status of the plan item as open-exceeding, open-on target, open-warning, open-critical, open-pending, closed-achieved, closed-not achieved, closed-cancelled, or deleted. The open-exceeding status may be used to indicate that the user (or other resource) associated with the plan item is achieving ahead of schedule. The open-on target status may be used to indicate that the resource is achieving as schedule. In one embodiment, the open-on target status may be a default status assigned to plan items. The open-warning status may be used to indicate that the resource is concerned about achieving as planned. The open-critical status may be used to indicate that the resource is not achieving as scheduled. The open-pending status may be used to indicate that that the resource is waiting to start. The closed-achieved status may be used to indicate that the resource has completed the goal and achieved the scheduled result. The closed-not achieved status may be used to indicate that the resource did not achieve the results as scheduled. The closed-cancelled status may be used to indicate that the resource is no longer required to achieve the result. The deleted status may be used to indicate that the plan created for the resource was done in error or is a duplicate. Other status schemes may be used for designated plan status of the plan items. These schemes may include a greater or lesser amount of granularity.

In some embodiments, a default status of the plan item may be populated in the user interface 3200. For example, the default status may be a status of "open-on target."

An access level field 3214 enables the operator to designate an access level of the plan item. In some embodiments, the operator may designate the plan access levels as anyone above, anyone above and direct reports, anyone above and below, anyone, or private. The anyone above access level provides the manager of the operator and any manager in direct line to the CEO with access to the plan item. The anyone above and direct reports access level provides the manager of the operator, any manager in direct line to the CEO, and anyone who directly reports to the operator with access to the plan item. The anyone above and below access level provides the manager of the operator, any manager in direct line to the CEO, and anyone in the department/team of the operator with access to the plan item. The anyone access level provides anyone in the organization that can connect to the operator with access to the plan item. The private access level provides only the operator with access to the plan item.

In some embodiments, a default access level of the plan item may be populated in the user interface 3200. For example, the default access level may be an access of "anyone above & direct reports."

A number of buttons 3216-3220 may be included on the user interface 3200. A spelling button 3216 checks the spelling of the description included in the description field 3206 and the title included in the title field 3208. A close button 3218 returns the operator to a previous user interface without adding the new plan item.

An ok button 3220 submits the plan item for addition. In some embodiments, the plan item is added. In some embodiments, a verification check of one or more fields of the user interface 3200 is made prior to addition. For example, a verification check is made to ensure that the period start field 3202, the period end field 3204, the title field 3208, the priority field 3210, the status field 3212, and the access level field 3214 include acceptable data. If the verification check identifies no problems, the access item is added. If the verification check identifies unacceptable data, the operator may be represented with the user interface 3200. The representment may include notification that unacceptable data has been received, notification of the fields that have unacceptable data, or both.

Figure 33:
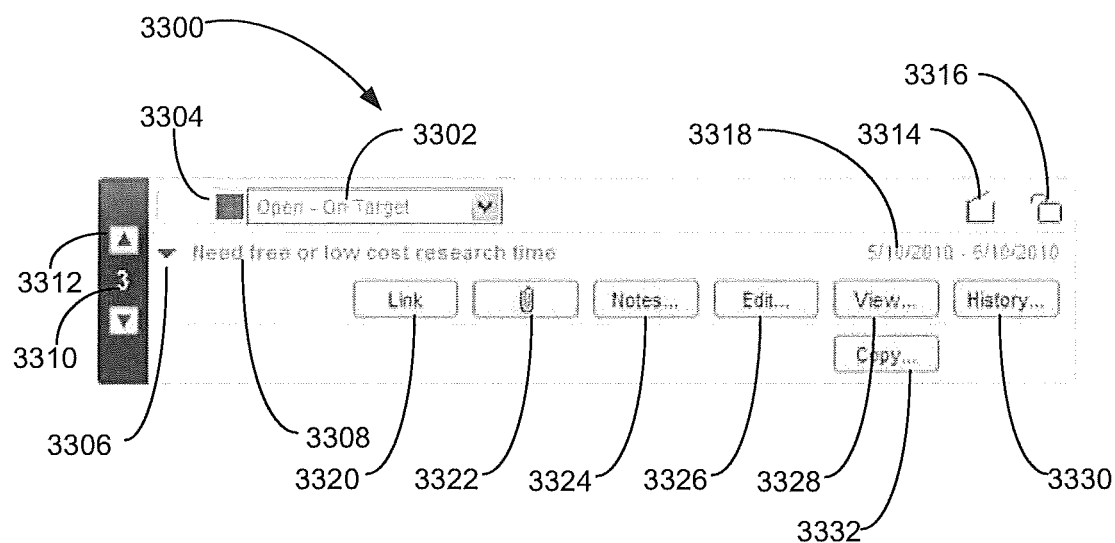

FIG. 33 illustrates a user interface 3300 to the maintain subsystem 202, according to an example embodiment. The user interface 3300 displays an example of maximized plan obstacle item. The maximized plan obstacle may be created through use of the user interface 3200 (see FIG. 32), or may otherwise be created.

The user interface displays 3300 plan obstacle status. The plan obstacle status is displayed through a plan obstacle status field 3302 and a plan obstacle status visual identifier 3304. For example, the plan obstacle status field may indicate plan obstacle status of the plan obstacle item as "open-exceeding," "open-on target," "open-warning," "open-critical," "open-pending," "closed-achieved," "closed-not achieved," "closed-cancelled," or "deleted."

The plan obstacle status visual identifier 3304 may provide a visual indicator to reflect the current plan obstacle status. The plan obstacle status visual indicator may include a color, a pattern, a block length, or the like. For example, a green indicator may indicate that the plan obstacle item is "open-on target" or "open-exceeding," an orange indicator may indicate that the plan obstacle item is "open-warning," a red indicator may indicate that the plan obstacle item is "open-critical," a grey indicator may indicate that the plan obstacle item is "open-on hold" or "open-pending," a blue indicator may indicate that the plan obstacle item is "closed-achieved," a black indicator may indicate that the plan obstacle item is "closed-not achieved," and a burgundy indicator may indicate that the plan obstacle item has been deleted. Other color schemes or visual indicators may be used.

A minimization button 3306, when selected, may provide fewer details regarding the plan obstacle item through a minimized plan obstacle item.

A plan obstacle title 3308 of the plan obstacle item may be displayed. The title of the plan obstacle item may be specified by operator input of the goal title through the title field 3208 (see FIG. 32).

A priority 3310 of the plan obstacle item may be adjusted by priority buttons 3312. For example, the priority may be increased or decreased by use of the priority buttons 3312.

A single plan obstacle indicator or multiple plan obstacle indicators of the plan obstacle item may be displayed. The user interface 3300 shows that the plan obstacle item has a plan obstacle acceptance status indicator 3314 and a plan obstacle access level indicator 3316. Other plan obstacle indicators regarding the plan obstacle item may also be displayed.

The acceptance status indicator 3314 is a visual indicator that relays to the operator whether a manager has accepted the plan obstacle item. The plan obstacle access level indicator 3316 is a visual indicator that relays to the operator who can see the plan obstacle item. The visual indicators for the acceptance status indicator 3314 and/or the access level indicator 3316 may be similar to those used for the indicators 1112, 1114 or the indicators 2412, 2414.

A period of time 3318 associated with the plan obstacle item may also be displayed. The period of time for the plan obstacle item may be specified by operator input of the plan obstacle title through the period start field 3202 and the period end field 3204 (see FIG. 32).

A number of plan obstacle action buttons 3320-3332 may be included in the user interface 3300. These plan obstacle actions buttons 3320-3332 may include a link button 3320, an attachment button 3322, a notes button 3324, an edit button 3326, a view button 3328, a history button 3330, and a copy button 3332. Additional or different plan obstacle actions buttons may be included.

The link button 3320 links the plan obstacle item with another item (e.g., an outcome item). An example embodiment of using the link button 3320 is described in greater detail below.

The attachment button 3322 enables documents to be attached to the plan obstacle item. The notes button 3324 enables notes related to the plan obstacle item to be included with the plan obstacle item. The edit button 3326 enables the operator to change plan obstacle item details.

The view button 3328 enables the operator to view details of the plan obstacle item. The history button 3330 enables display of changes to the plan obstacle item. The copy button 3332 creates a copy of the plan obstacle item.

Figure 34:
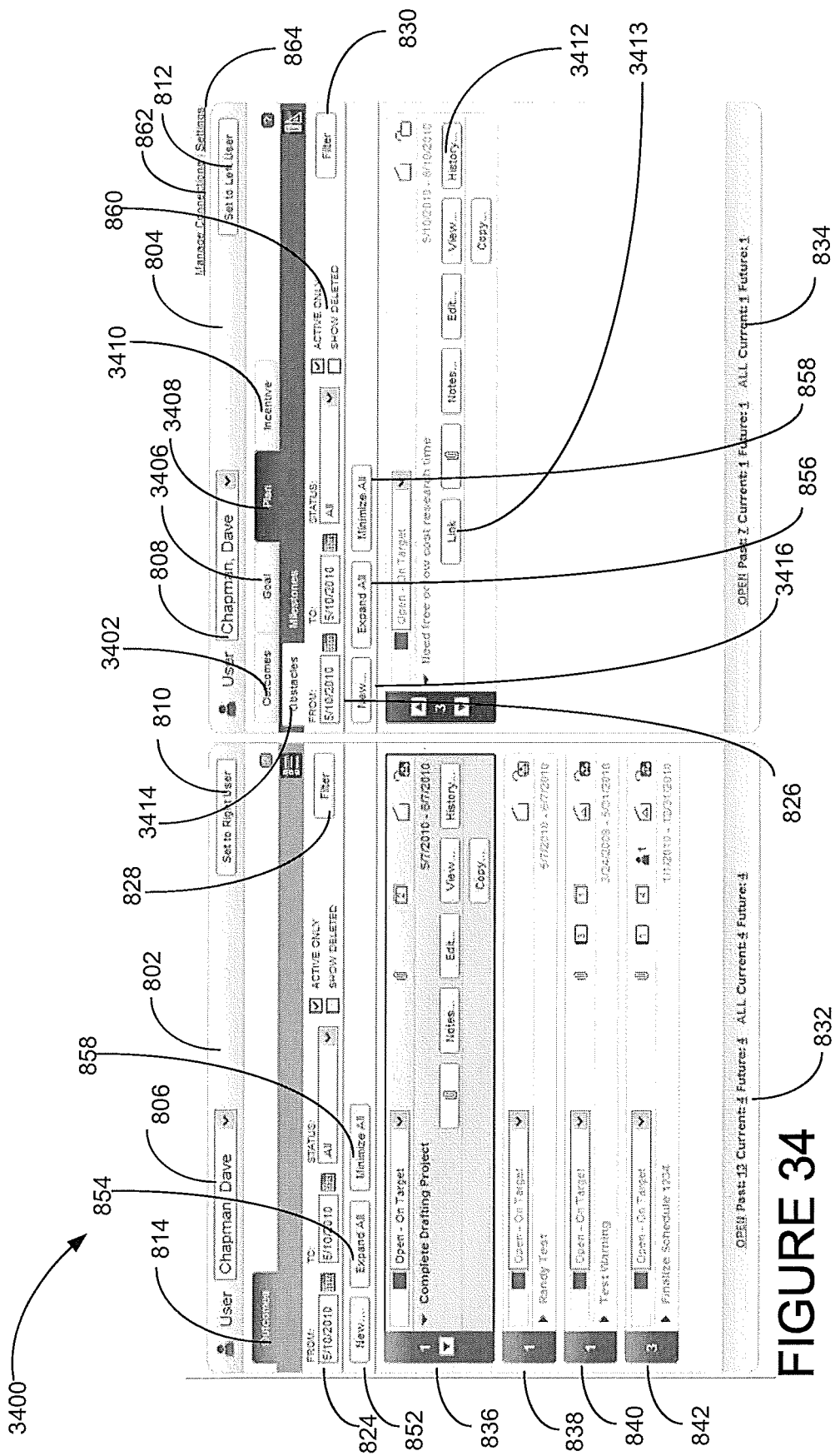

FIG. 34 illustrates a user interface 3400 to the maintain subsystem 202, according to an example embodiment. The user interface 3400 enables the operator to view items of one or more categories. The user interface 3400 includes outcome items on a left pane 802 and plan obstacle items on a right pane 804 (see FIG. 8).

The user interface 3400 is a version of the user interface 800 with the plan tab 820 selected instead of the outcome tab 816 (see FIG. 8). In addition, the obstacles sub-tab is selected instead of the milestones sub-tab. As such, a number of elements included on the user interface 800 are included on the user interface 3400.

A single tab or multiple tabs may be available for selection in each of the panes 802, 804 of the user interface 800. The left pane 802 includes the outcome tab 814 and the right pane 804 includes an outcome tab 3402, a goal tab 3406, a plan tab 3408, and an incentive tab 3410. The tabs 3402-3410 correspond to the tabs 816-822 of the user interface 800 except that the plan tab 3408 is active in the user interface 3400. As such, the plan tab 3408 is shown in a different color.

Unlike the user interface 800, items included in the right pane 804 are plan obstacle items 3412. The plan obstacle item 3412 is unlinked to the active outcome items 836 as a link button 3413 is shown in the plan obstacle item 3412.

A plan type tab selection 3414 may be made among a single tab or multiple tabs. The selection of a plan type tab may cause an obstacles sub-tab or a milestones sub-tab to become active in the user interface 3400. As shown, the obstacles sub-tab is the active sub-tab.

A new plan obstacle may be created by selecting a new button 3416. In some embodiments, selection of the new button 3416 may cause the user interface 3200 (see FIG. 32) to be displayed.

Figure 35:
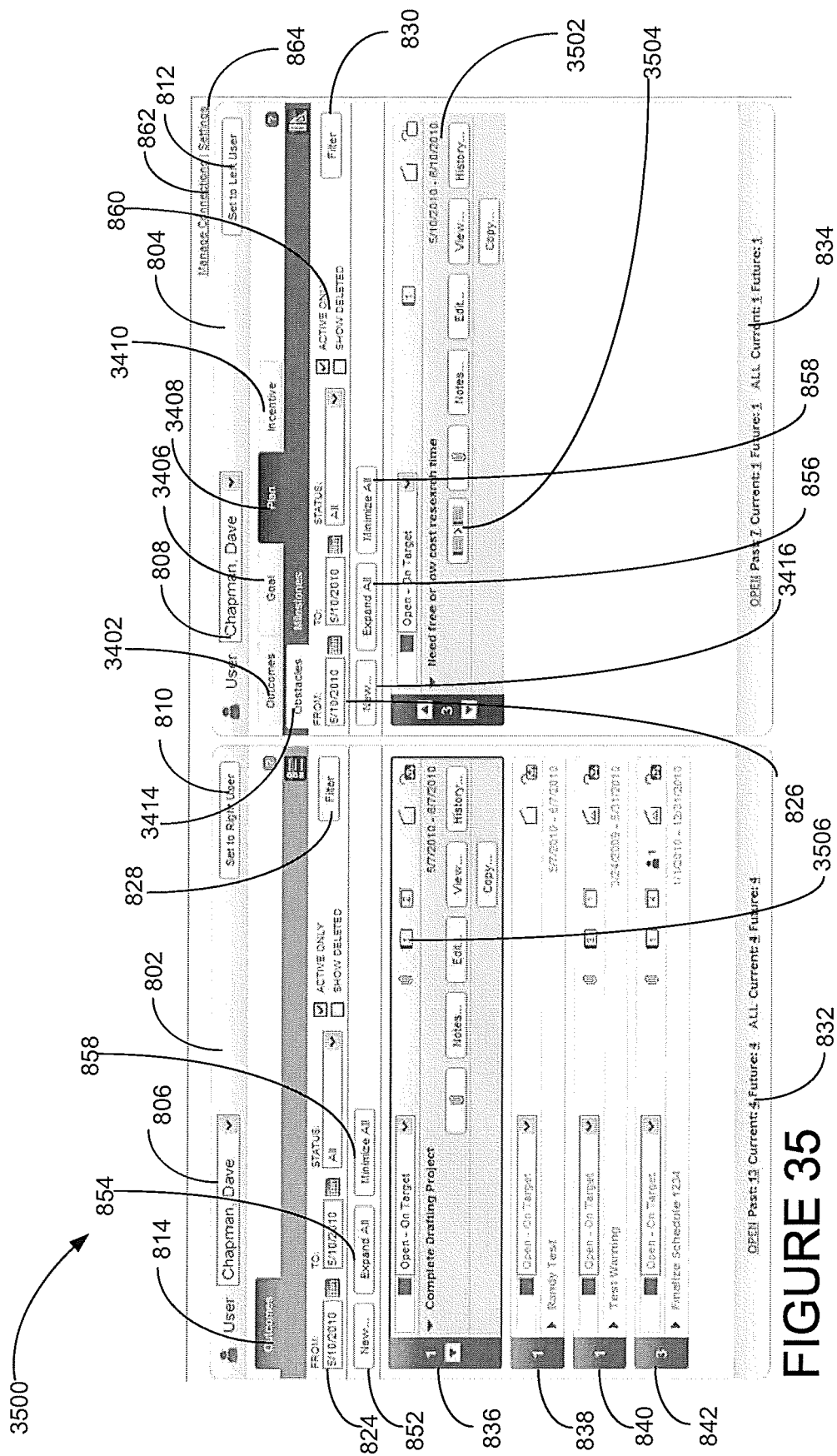

FIG. 35 illustrates a user interface 3500 to the maintain subsystem 202, according to an example embodiment. When the operator selects the link button 3413 in the user interface 3400, the plan obstacle item 3412 becomes a linked plan obstacle item 3502. The linked plan obstacle item 3502 includes a linked button 3504. The appearance of the linked button 3504 and the highlighting of the plan obstacle item 3502 and the outcome item 836 in the user interface 3500 provide a visual display to the operator that the outcome item 836 and the plan obstacle item 3502 are linked.

In some embodiments, selection of the linked button 3504 unlinks the linked items. For example, selection of the linked button 3504 may cause the user interface 3400 to be redisplayed with the link button 3413 in place of the linked button 3504.

In some embodiments, a plan item visual indicator 3506 may be displayed with the outcome item 836. The plan item visual indicator 3506 may include the number of plan items associated with the outcome item 836.

Figure 36:
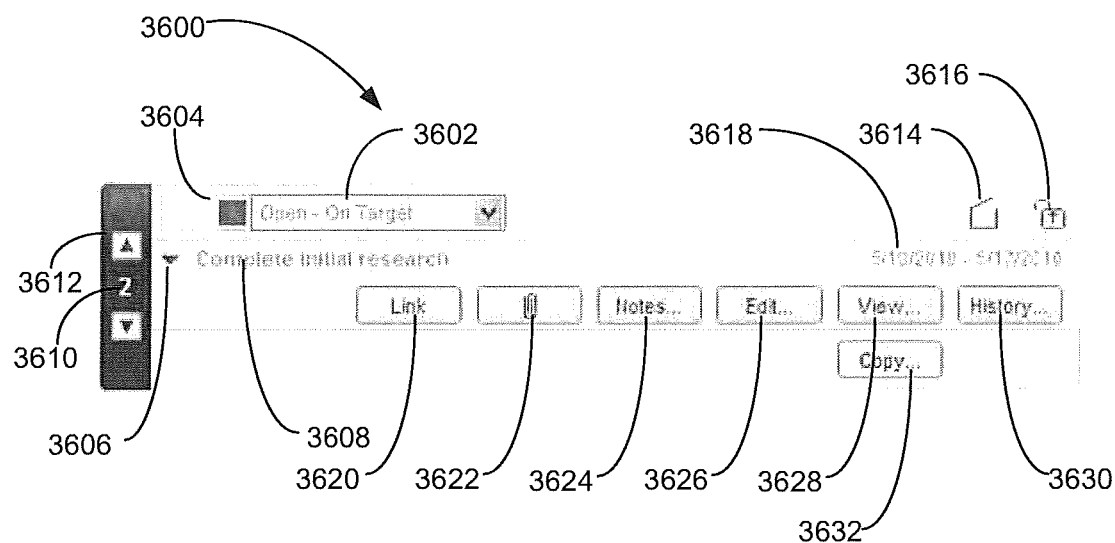

FIG. 36 illustrates a user interface 3600 to the maintain subsystem 202, according to an example embodiment. The user interface 3600 displays an example of maximized plan milestone item. The maximized plan milestone item may be created through use of the user interface 3200 (see FIG. 32), or may otherwise be created.

The user interface displays 3600 plan milestone status. The plan milestone status is displayed through a plan milestone status field 3602 and a plan milestone status visual identifier 3604. For example, the plan milestone status field may indicate plan milestone status of the plan milestone item as "open-exceeding," "open-on target," "open-warning," "open-critical," "open-pending," "closed-achieved," "closed-not achieved," "closed-cancelled," or "deleted."

The plan milestone status visual identifier 3604 may provide a visual indicator to reflect the current plan milestone status. The plan milestone status visual indicator may include a color, a pattern, a block length, or the like. For example, a green indicator may indicate that the plan milestone item is "open-on target" or "open-exceeding," an orange indicator may indicate that the plan milestone item is "open-warning," a red indicator may indicate that the plan milestone item is "open-critical," a grey indicator may indicate that the plan milestone item is "open-on hold" or "open-pending," a blue indicator may indicate that the plan milestone item is "closed-achieved," a black indicator may indicate that the plan milestone item is "closed-not achieved," and a burgundy indicator may indicate that the plan milestone item has been deleted. Other color schemes or visual indicators may be used.

A minimization button 3606, when selected, may provide fewer details regarding the plan milestone item through a minimized plan milestone item.

A plan obstacle title 3608 of the plan milestone item may be displayed in the user interface 3600.

A priority 3610 of the plan milestone item may be adjusted by priority buttons 3612. For example, the priority may be increased or decreased by use of the priority buttons 3612.

A single plan milestone indicator or multiple plan milestone indicators of the plan milestone item may be displayed. The user interface 3600 shows that the plan milestone item has a plan milestone acceptance status indicator 3614 and a plan milestone access level indicator 3616. Other plan milestone indicators regarding the plan milestone item may also be displayed.

The acceptance status indicator 3614 is a visual indicator that relays to the operator whether a manager has accepted the plan milestone item. The plan obstacle access level indicator 3616 is a visual indicator that relays to the operator who can see the plan milestone item. The visual indicators for the acceptance status indicator 3614 and/or the access level indicator 3616 may be similar to those used for the indicators 1112, 1114 or the indicators 2412, 2414.

A period of time 3618 associated with the plan milestone item may also be generated for display in the user interface 3600.

A number of plan milestone action buttons 3620-3632 may be included in the user interface 3600. These plan milestone actions buttons 3620-3632 may include a link button 3620, an attachment button 3622, a notes button 3624, an edit button 3626, a view button 3628, a history button 3630, and a copy button 3632. Additional or different plan obstacle actions buttons may be included.

The link button 3620 links the plan milestone item with another item (e.g., an outcome item). When used, the link button 3620 functions like the link button 3320 and causes highlighting in the user interface 3600 and a linked button to be displayed in place of the link button 3620 to reflect the linking.

The attachment button 3622 enables documents to be attached to the plan milestone item. The notes button 3624 enables notes related to the plan milestone item to be included with the plan milestone item. The edit button 3626 enables the operator to change plan milestone item details.

The view button 3628 enables the operator to view details of the plan milestone item. The history button 3630 enables display of changes to the plan milestone item. The copy button 3632 creates a copy of the plan milestone item.

Figure 37:
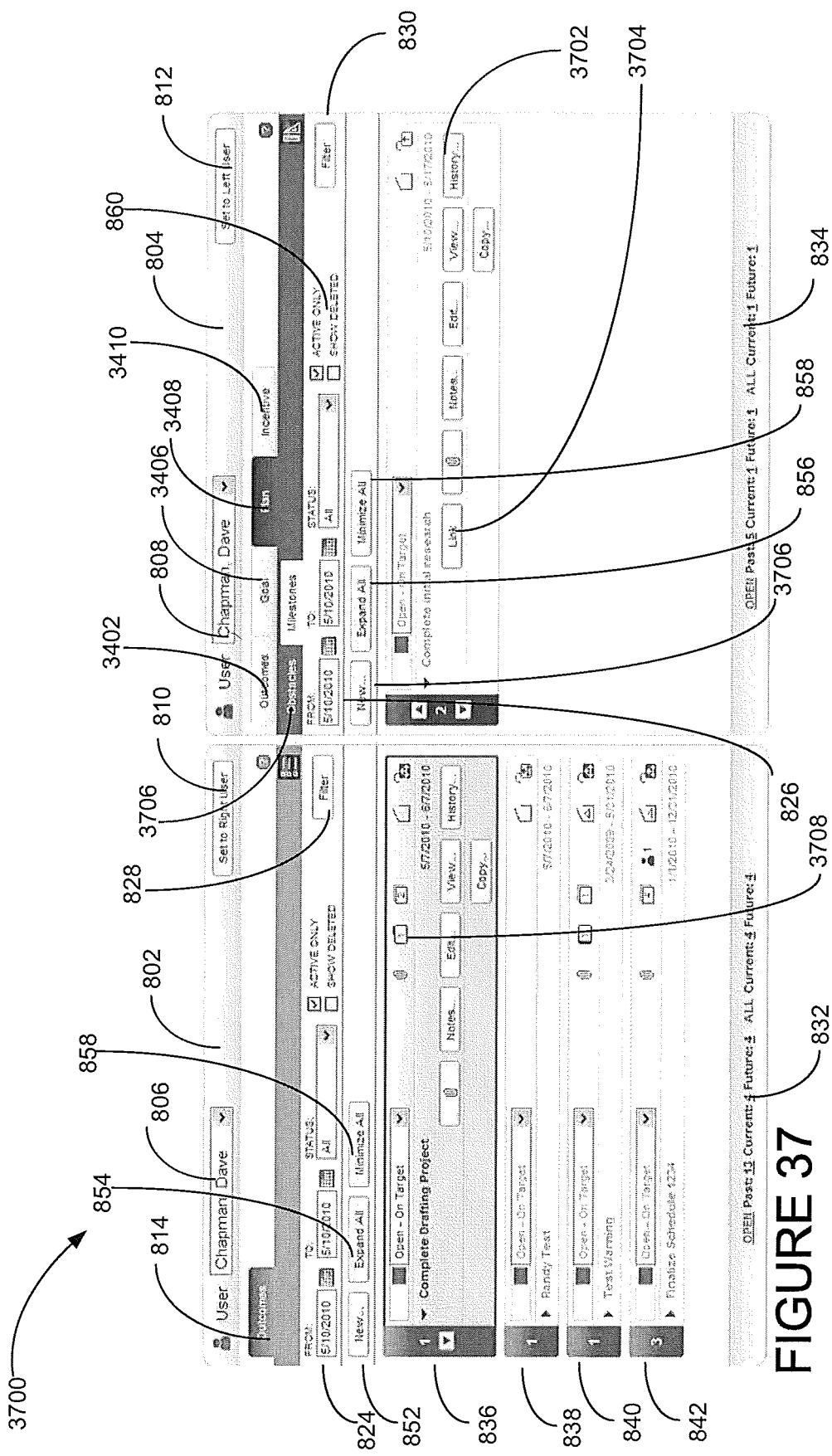

FIG. 37 illustrates a user interface 3700 to the maintain subsystem 202, according to an example embodiment. The user interface 3700 enables the operator to see items of one or more categories. The user interface 3700 includes outcome items on a left pane 802 and plan obstacle items on a right pane 804 (see FIG. 8).

The user interface 3700 is a version of the user interface 3400 with the milestones sub-tab selected instead of obstacles sub-tab. As such, a number of elements included on the user interface 3400 are included on the user interface 3700.

Unlike the user interface 3400, items included in the right pane 804 are plan milestone items 3702. The plan milestone item 3702 is unlinked to the active outcome items 836 as a link button 3704 is shown in the plan milestone item 3712.

A plan type tab selection 3706 may be made among a single tab or multiple tabs. The selection of a plan type tab may cause an obstacles sub-tab or a milestones sub-tab to become active in the user interface 3700. As shown, the milestones sub-tab is the active sub-tab.

A new plan milestone may be created by selecting a new button 3716. In some embodiments, selection of the new button 3708 may cause the user interface 3200 (see FIG. 32) to be displayed.

The plan item visual indicator 3506 may be displayed with the outcome item 836. The plan item visual indicator 3506 may include the number of plan items associated with the outcome item 836.

Figure 38:
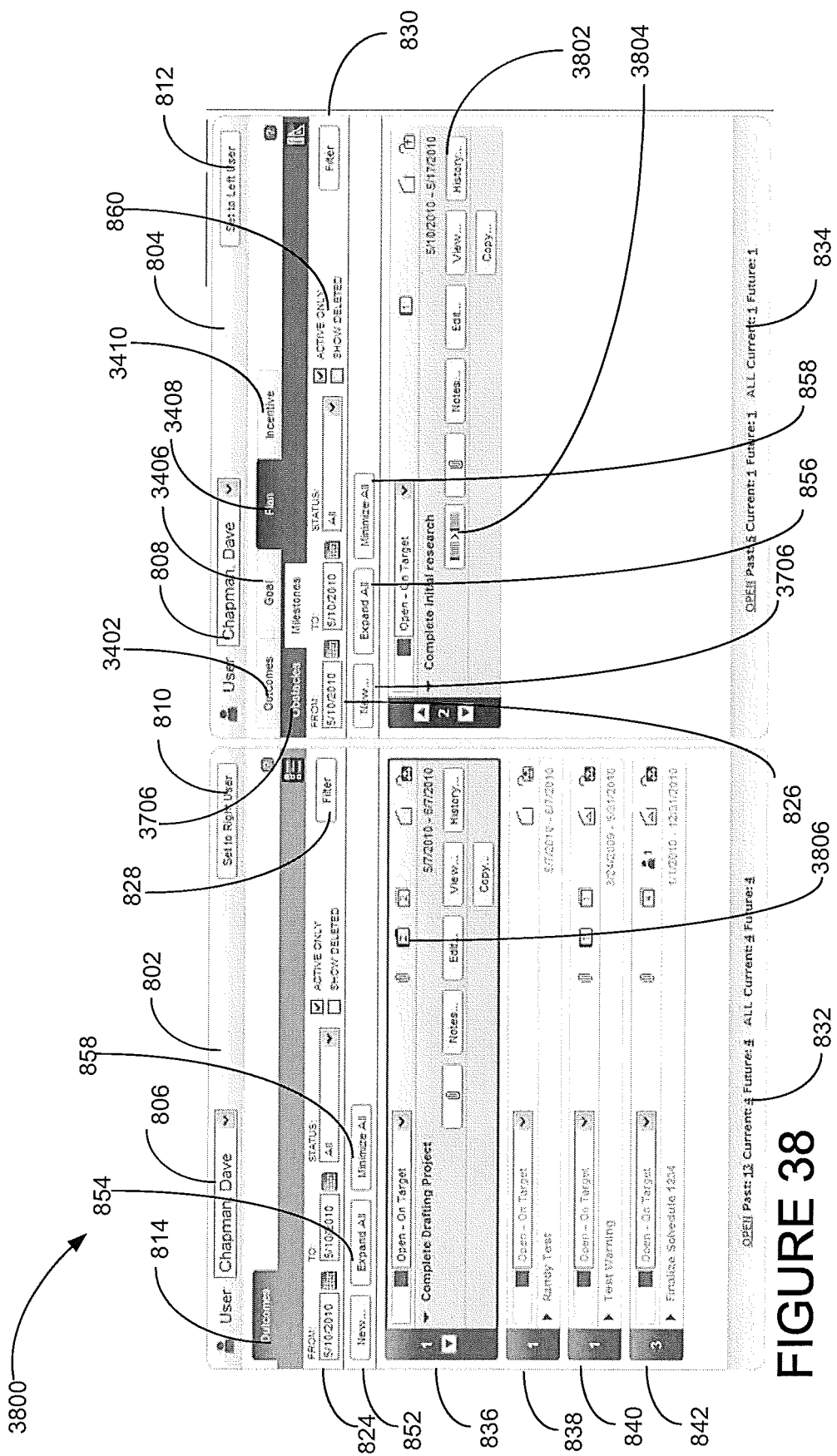

FIG. 38 illustrates a user interface 3800 to the maintain subsystem 202, according to an example embodiment. When the operator selects the link button 3704 in the user interface 3700, the plan milestone item 3702 becomes a linked plan milestone item 3802. The linked plan milestone item 3802 includes a linked button 3804. The appearance of the linked button 3804 and the highlighting of the plan milestone item 3802 and the outcome item 836 in the user interface 3800 provide a visual display to the operator that the outcome item 836 and the plan milestone item 3502 are linked.

In some embodiments, selection of the linked button 3804 unlinks the linked items. For example, selection of the linked button 3804 may cause the user interface 3700 to be redisplayed with the link button 3704 in place of the linked button 3708.

In some embodiments, a plan item visual indicator 3806 may be displayed with the outcome item 836. The plan item visual indicator 3806 may include the number of plan items associated with the outcome item 836. For example, the plan item visual indicator 3706 may become the plan item visual indicator 3806 to reflect that an additional plan item has been associated with the outcome item 836.

Figure 39:
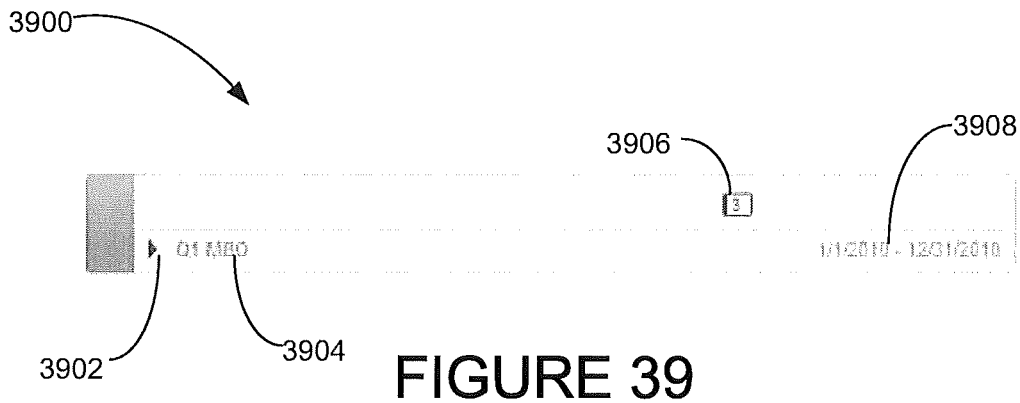

FIG. 39 illustrates a user interface 3900 to the maintain subsystem 202, according to an example embodiment. The user interface 3900 displays an example of a minimized incentive item.

A maximization button 3902, when selected, may provide additional details regarding the incentive item through a maximized incentive item. An example of a maximized incentive item is described in greater detail below. An incentive title 3904 of the incentive item may be displayed.

An incentive title 3904 of the incentive item may be displayed in the user interface 3900.

One or more incentive indicators of the incentive item may be displayed. The user interface 3900 shows that the incentive item has a links indicator 3906. Other incentive indicators regarding the incentive item may also be displayed. The links indicator 3906 visually indicates a number of items (e.g., outcome items) linked to the incentive.

A period of time 3908 associated with the incentive item may also be displayed. In general, the period of time is associated with a quarter of a year or a year. However, other periods of time may also be used.

Figure 40:
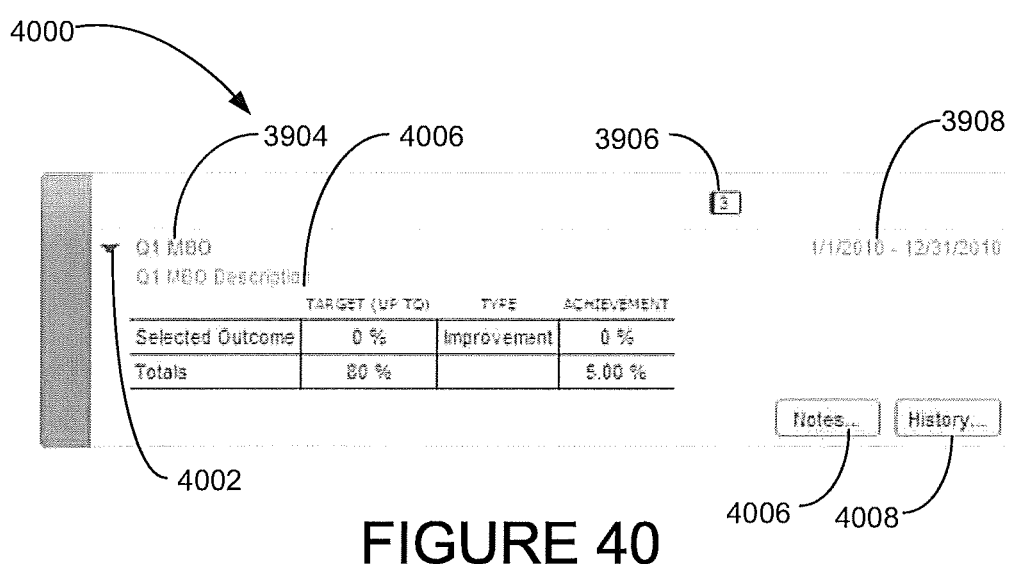

FIG. 40 illustrates a user interface 4000 to the maintain subsystem 202, according to an example embodiment. The user interface 4000 displays an example of a maximized incentive item.

The incentive item displayed in the user interface 4000 may be a maximized version of the incentive item displayed in the user interface 3900 (see FIG. 39). The user interface 4000 may include the incentive title 3904, the links indicator 3906, and the period of time 3908 of the user interface 3900.

A minimization button 4002, when selected, may provide fewer details regarding the incentive item through a minimized incentive item.

A description field 4004 may include a description of the incentive item.

A number of incentive action buttons 4006, 4008 may be included in the user interface 4000. These incentive actions buttons 4006, 4008 may include a notes button 4006 and a history button 4008. Additional or different outcome actions buttons may be included.

The notes button 4006 enables notes related to the incentive item to be included with the incentive item. The history button 4008 enables display of changes to the incentive item.

Figure 41:
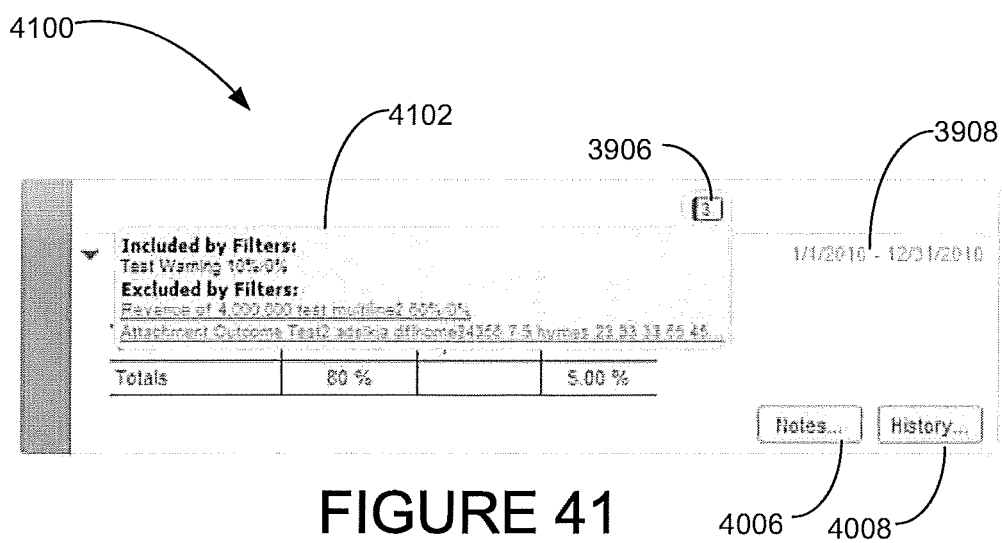

FIG. 41 illustrates a user interface 4100 to the maintain subsystem 202, according to an example embodiment. The user interface 4100 displays an example of a maximized incentive item.

The incentive item displayed in the user interface 4100 may be a maximized version of the incentive item displayed in the user interface 3900 (see FIG. 39). The user interface 4100 may include the incentive title 3904, the links indicator 3906, and the period of time 3908 of the user interface 3900.

The user interface 4100 may be a version of the user interface 4000 where the operator hovers over the links indicator 3906. Hovering over (e.g., mouse over) the links indicator 3906 may cause an items links indicator 4102 to occur. The file attachment indicator 4102 lists the names of the links associated with the incentive item. In some embodiments, the names of the links are segmented based on filtering (e.g., included by filters and excluded by filters).

Figure 42:
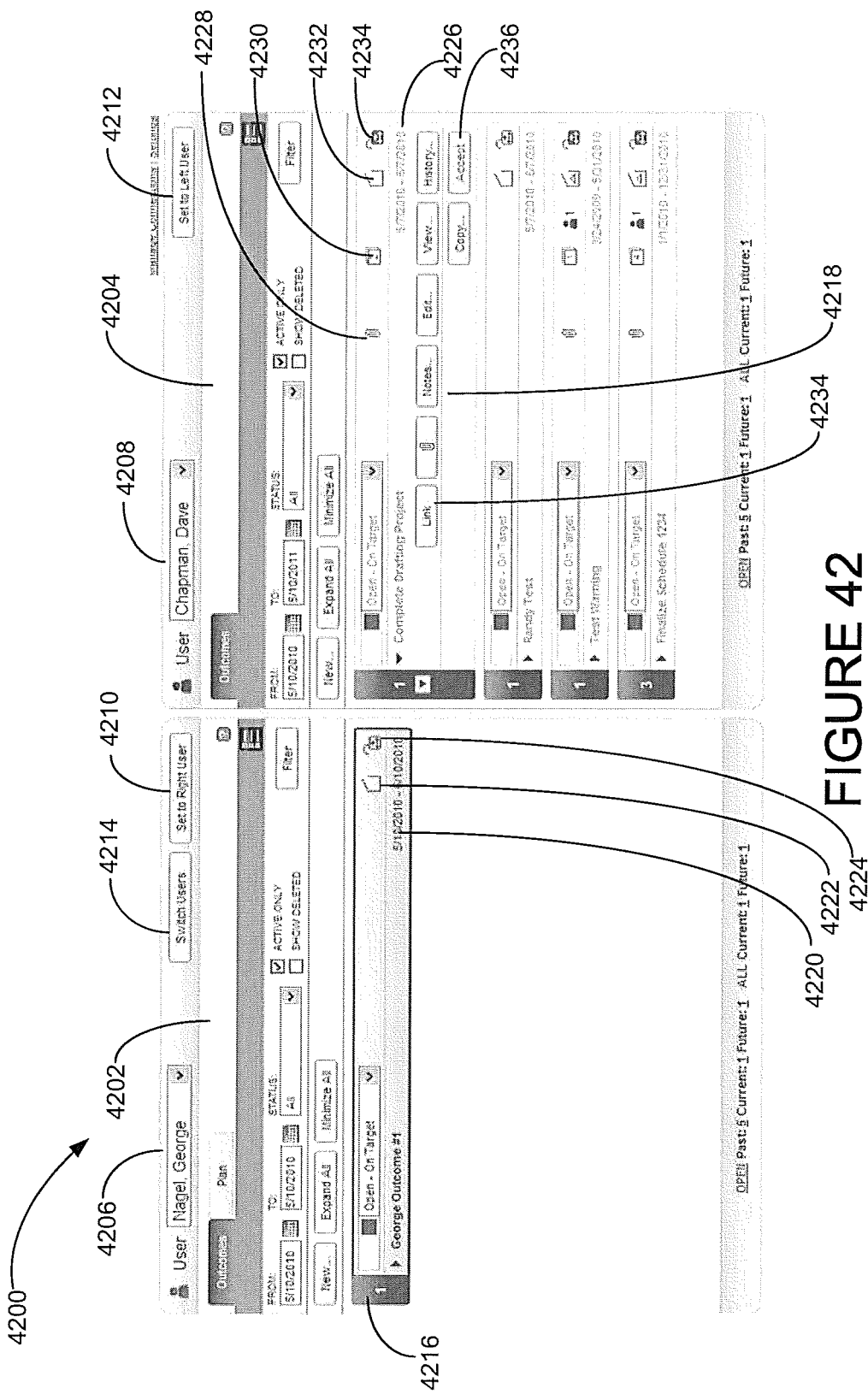

FIG. 42 illustrates a user interface 4200 to the maintain subsystem 202, according to an example embodiment. The user interface 4200 enables the operator to view items of one or more categories. While the user interface 4200 includes only outcome items, in other embodiments the user interface 4200 may display other types of items.

The user interface 4200 enables split pane viewing in a left pane 4202 and a right pane 4204. As shown in the user interface 4200, a different resource is identified in a left resource selection 4206 for the left pane 4202 than the resource identified in the right resource selection 4208 for the right pane 4204.

The resource identified in the left resource selection 4206 may become the resource identified in the right resource selection 4208 by selection of a set to right resource button 4210. The resource identified in the right resource selection 4208 may become the resource identified in the left resource selection 4206 by selection of a set to left resource button 4212. The resource identified in the left resource selection 4206 and the resource identified in the right resource selection 4208 may be switched by selecting a switch resources button 4214. By selection of the set to right resource button 4210, the set to left resource button 4212, or the switch resources button 4214, the associated items with each of the resources may be updated according in the user interface 4200.

The left pane 4202 includes a single outcome item 4216 associated with the left user, and the right pane 4204, while the right pane 4204 includes multiple outcome items including outcome item 4218.

The outcome item 4216 includes a period of time 4220, an acceptance status indicator 4222, and an outcome access level indicator 4224 that correspond that correspond to the period of time 1116, the acceptance status indicator 1112, and the access level indicator 1114 respectfully.

The outcome item 4218 includes a period of time indicator 4226, a file attachment indicator 4228, a note indicator 4230, an acceptance status indicator 4232, and an access level indicator 4234 that correspond to the file attachment indicator 1604, the note indicator 1902, the acceptance status indicator 1112, and the access level indicator 1114 respectfully.

A link button 4234 may be displayed on the outcome item 4218 to enable linking of the outcome item 4218 with another item. As shown the link may be made between the outcome item 4218 associated with the right resource and the outcome item 4216 associated with the left resource.

An accept button 4236 may be displayed on the outcome item 4218 to enable a manager to accept the linking of the outcome item 4218 associated with the right resource to the outcome item 4216 associated with the left resource.

Figure 43:
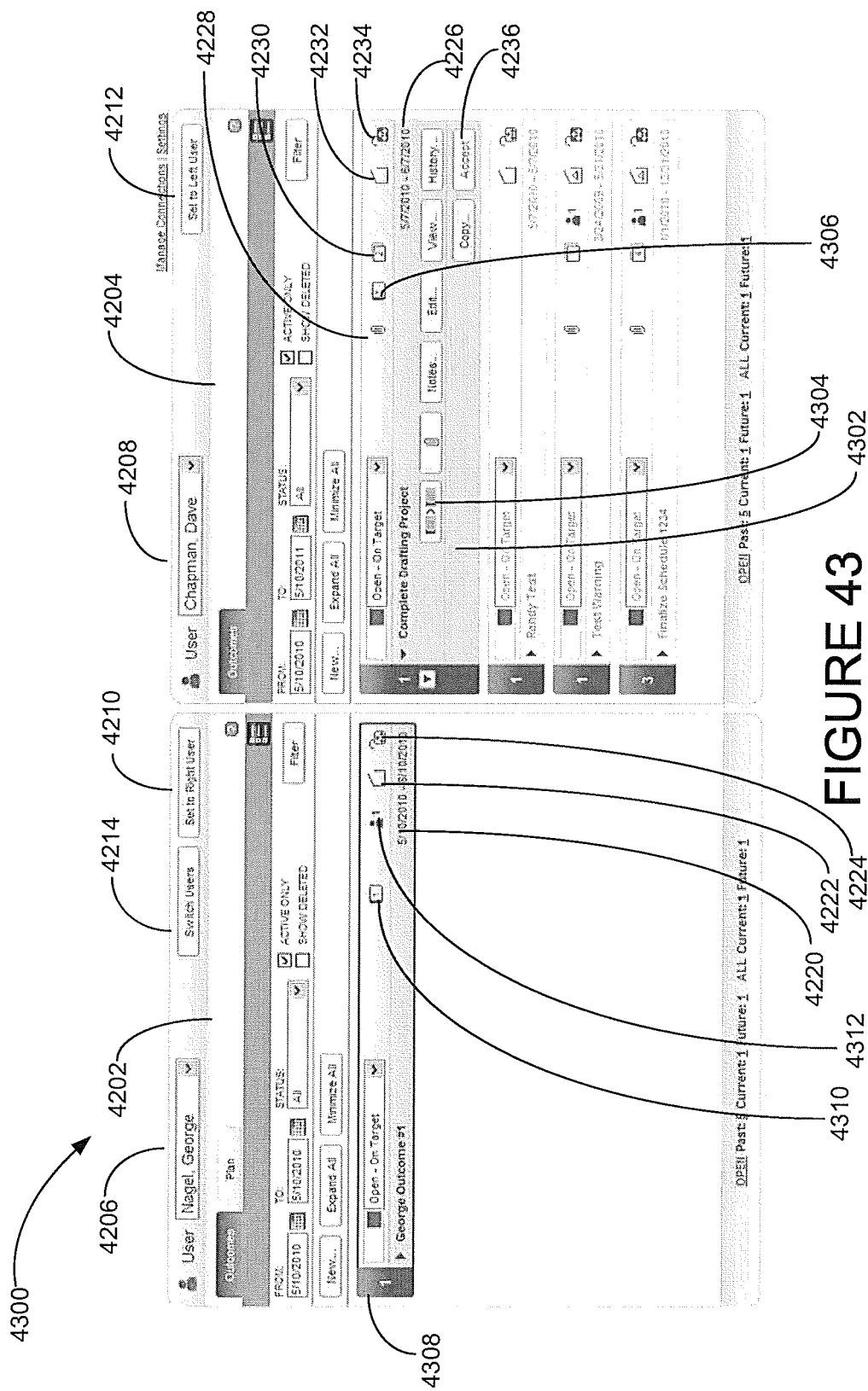

FIG. 43 illustrates a user interface 4300 to the maintain subsystem 202, according to an example embodiment. The user interface 4300 enables the operator to view items of one or more categories. While the user interface 4300 includes only outcome items, in other embodiments the user interface 4300 may display other types of items.

When the operator in the user interface 4200 selects the link button 4234 on the outcome item 4218, the outcome item 4218 is displayed as the outcome item 4302 in the user interface 4300 with a linked button 4304. In addition, a linked indicator 4306 may be displayed with the outcome item 4302. The outcome item 426 is then displayed as the outcome item 4308 in the user interface 4300. A linked indicator 4310 may be displayed with the outcome item 4308. In addition, a connections indicator 4312 may be displayed with the outcome item 4308. In general, the connections indicator 4312 indicates that people are associated with the outcome item 4308 and the number of people that are associated with the outcome item 4308.

Figure 44:
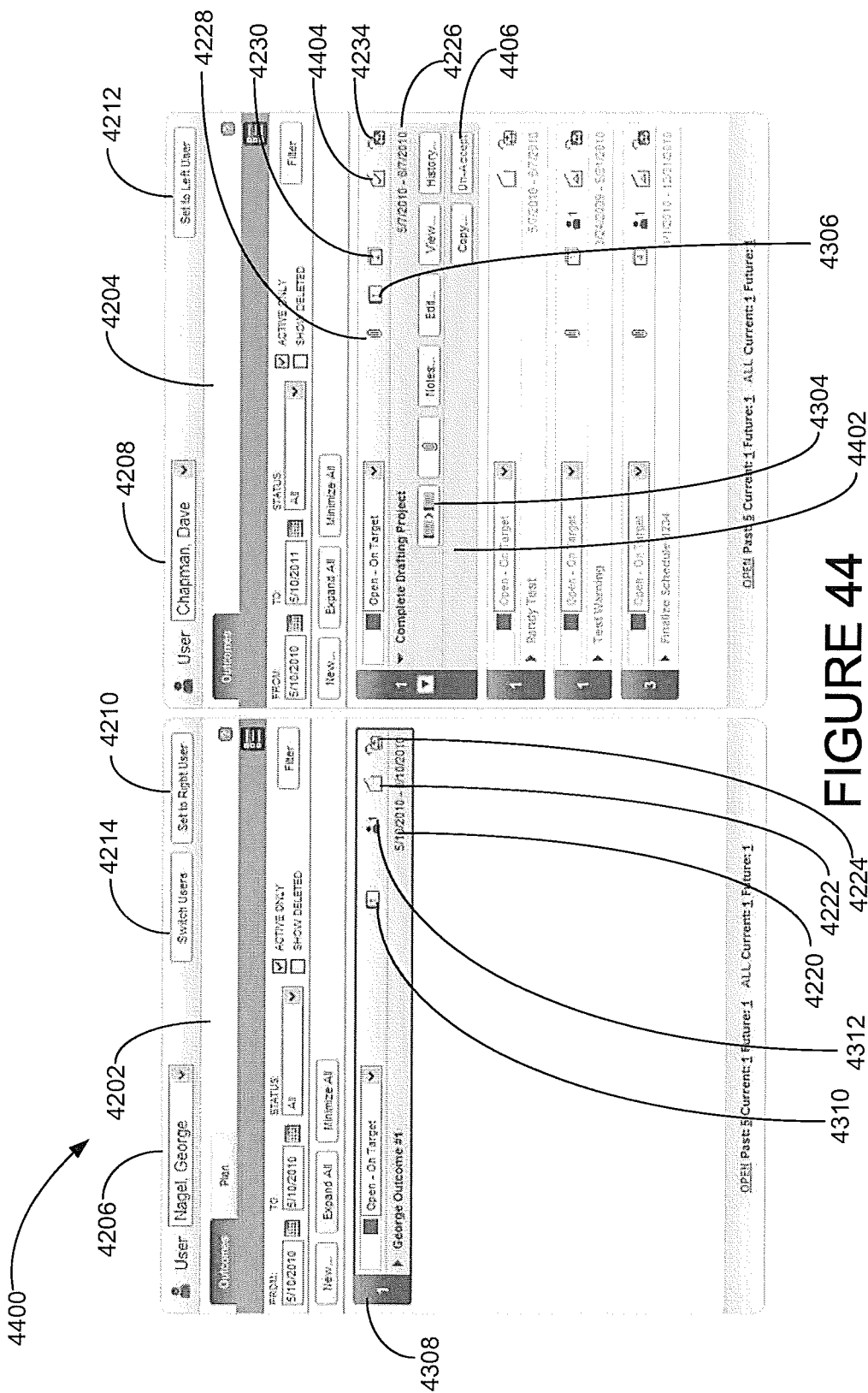

FIG. 44 illustrates a user interface 4400 to the maintain subsystem 202, according to an example embodiment. The user interface 4400 enables the operator to view items of one or more categories. While the user interface 4400 includes only outcome items, in other embodiments the user interface 4400 may display other types of items.

When the operator in the user interface 4300 selects the accept button 4236 on the outcome item 4302, the outcome item 4302 is displayed as the outcome item 4402 in the user interface 4400 with an un-accept button 4406. In addition, the acceptance status indicator 4232 associated with the outcome item 4302 is displayed as an acceptance status indicator 4404 in the user interface 4400.

Figure 45:
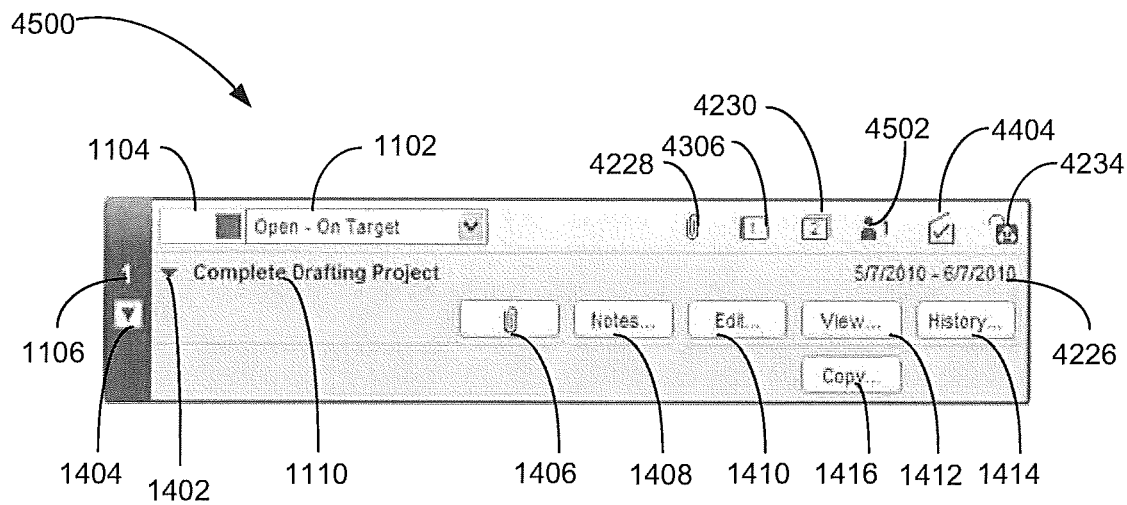

FIG. 45 illustrates a user interface 4500 to the maintain subsystem 202, according to an example embodiment. The user interface 4500 displays an example of a maximized outcome item.

The outcome item displayed in the user interface 4500 may be a version of the outcome item 4402 in the user interface 4400 (see FIG. 44). The user interface 4500 for the outcome item may include the outcome status field 1102, the visual identifier 1104, the priority indicator 1106, the outcome title 1110, the minimization button 1402, the priority button 1404, the outcome action buttons 1406-1416, the period of time indicator 4226, the file attachment indicator 4228, the note indicator 4230, the access level indicator 4234, the linked indicator 4306, and the acceptance status indicator 4404.

A connections indicator 4502 may also be displayed with the outcome item to reflect that one other resource is connected to the outcome item.

Figure 46:
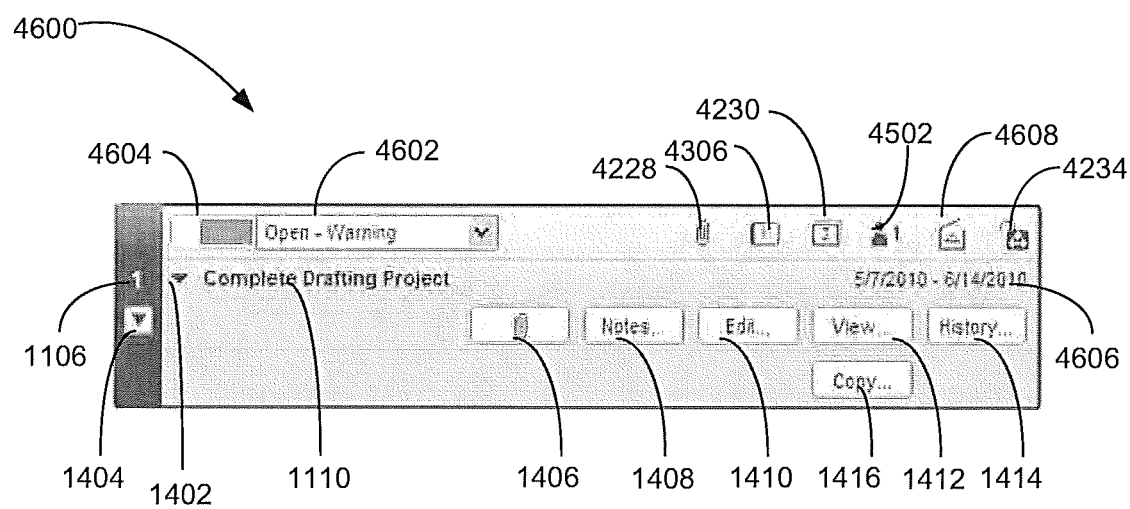

FIG. 46 illustrates a user interface 4600 to the maintain subsystem 202, according to an example embodiment. The user interface 4600 displays an example of a maximized outcome item.

The outcome item displayed in the user interface 4600 may be a version of the outcome item displayed in the user interface 4500 (see FIG. 44) based on modifications made by the operator to the outcome item displayed in the user interface 4500.

The user interface 4600 for the outcome item may include the priority indicator 1106, the outcome title 1110, the minimization button 1402, the priority button 1404, the outcome action buttons 1406-1416, the file attachment indicator 4228, the note indicator 4230, the access level indicator 4234, the linked indicator 4306, and the connections indicator 4502.

An outcome status field 4602 and a visual identifier 4604 have been modified from the outcome status field 1102 and the visual identifier 1104 displayed in the user interface 4500 based on operator modification to the outcome item displayed in the user interface 4500. In some embodiments, the operator changed the outcome status of the outcome item. As shown, the outcome status field 4602 reflects "open-warning" instead of the "open-on target" shown in the outcome status field 1102.

The period of time indicator 4606 has been modified from the period of time indicator 4226 displayed in the user interface 4500 based on operator modification to the outcome item displayed in the user interface 4500. In some embodiments, the operator changed the period end date. As shown, the period of time indicator 4606 reflects "5/7/2010-6/14/2010" instead of the "5/7/2010-6/7/2010" shown in the period of time indicator 4226.

An acceptance status indicator 4608 has been modified from the acceptance status indicator 4404 displayed in the user interface 4500 based on operator modification to the outcome item displayed in the user interface 4500. In some embodiments, the operator modification to the outcome status, the period end date, or both automatically caused the change from the acceptance status indicator 4404 to the acceptance status indicator 4606.

FIG. 47 illustrates a user interface 4700 to the maintain subsystem 202, according to an example embodiment. The user interface 4700 enables the operator to display the history of an outcome item. In some embodiments, the user interface 4700 may be displayed by selection of the history button 1414 from the outcome item displayed in the user interface 4600 (see FIG. 14).

A history area 4702 identifies creations and modifications to portions of the outcome item. Each history item 4704 identified in the history area 4702 may be identified by field, value, user, and date. As shown in the history of the user interface 4700, after a manager accepted the outcome, the resource modified the status and period end. By such modifications, the manager acceptance was unaccepted.

Once the operator is finished viewing the history of the outcome item, a close button 4706 may be selected. In some embodiments, the close button 4706 returns the operator to the outcome item displayed in the user interface 4600 (see FIG. 46).

Figure 48:
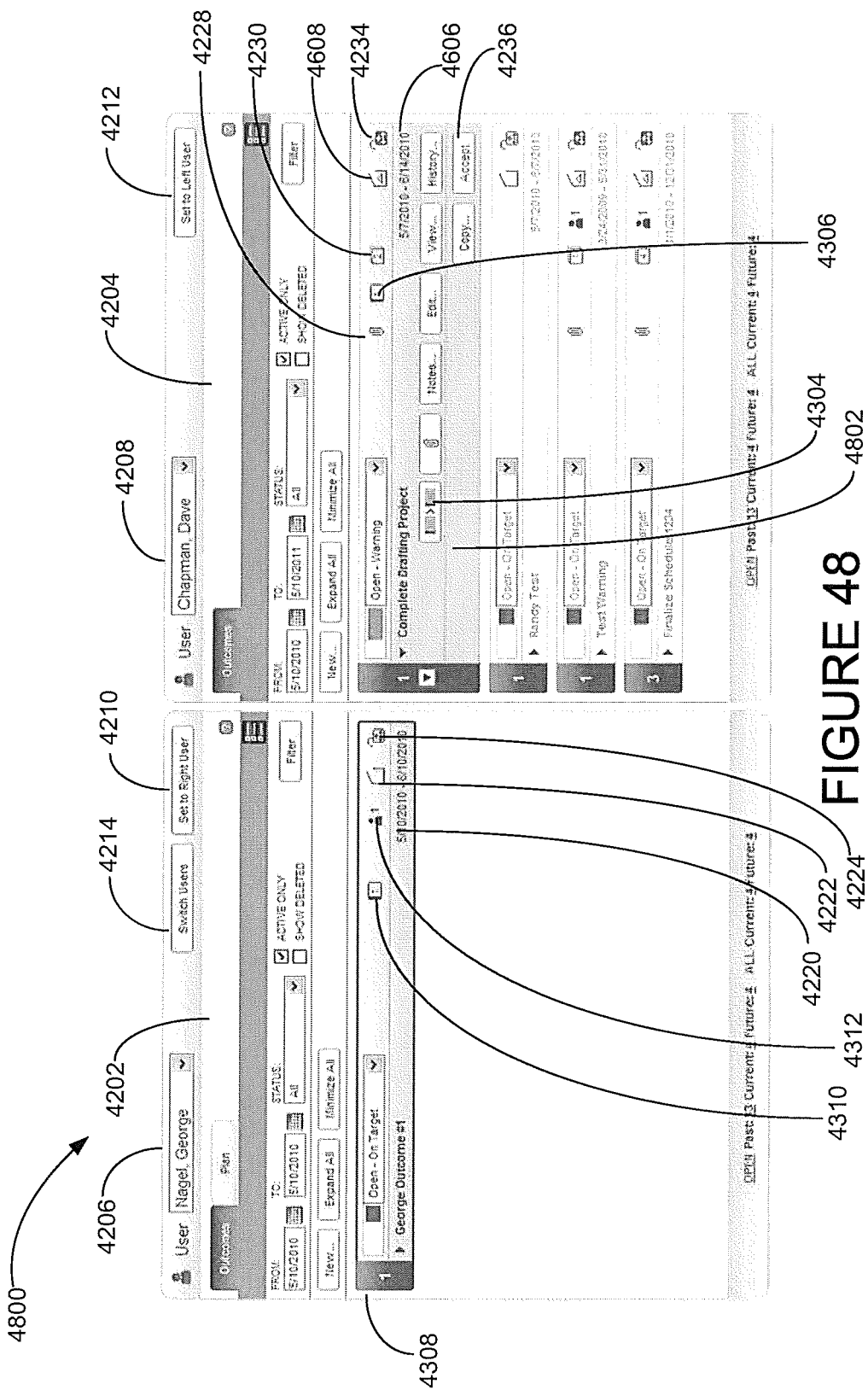

FIG. 48 illustrates a user interface 4800 to the maintain subsystem 202, according to an example embodiment. The user interface 4800 enables the operator to view items of one or more categories. While the user interface 4800 includes only outcome items, in other embodiments the user interface 4800 may display other types of items.

When the resource associated with the outcome item 4402 modifies the outcome item 4402 that has already been accepted by the manager, the outcome item 4402 is displayed as the outcome item 4802 in the user interface 4800 with the accept button 4236 to the operator (e.g., the manager). In addition, the acceptance status indicator 4404 is displayed as the acceptance status indicator 4608 in the user interface 4800. The acceptance status indicator 4608 reflects operator modifications to the outcome item 4402 displayed in the user interface 4400.

Figure 49:
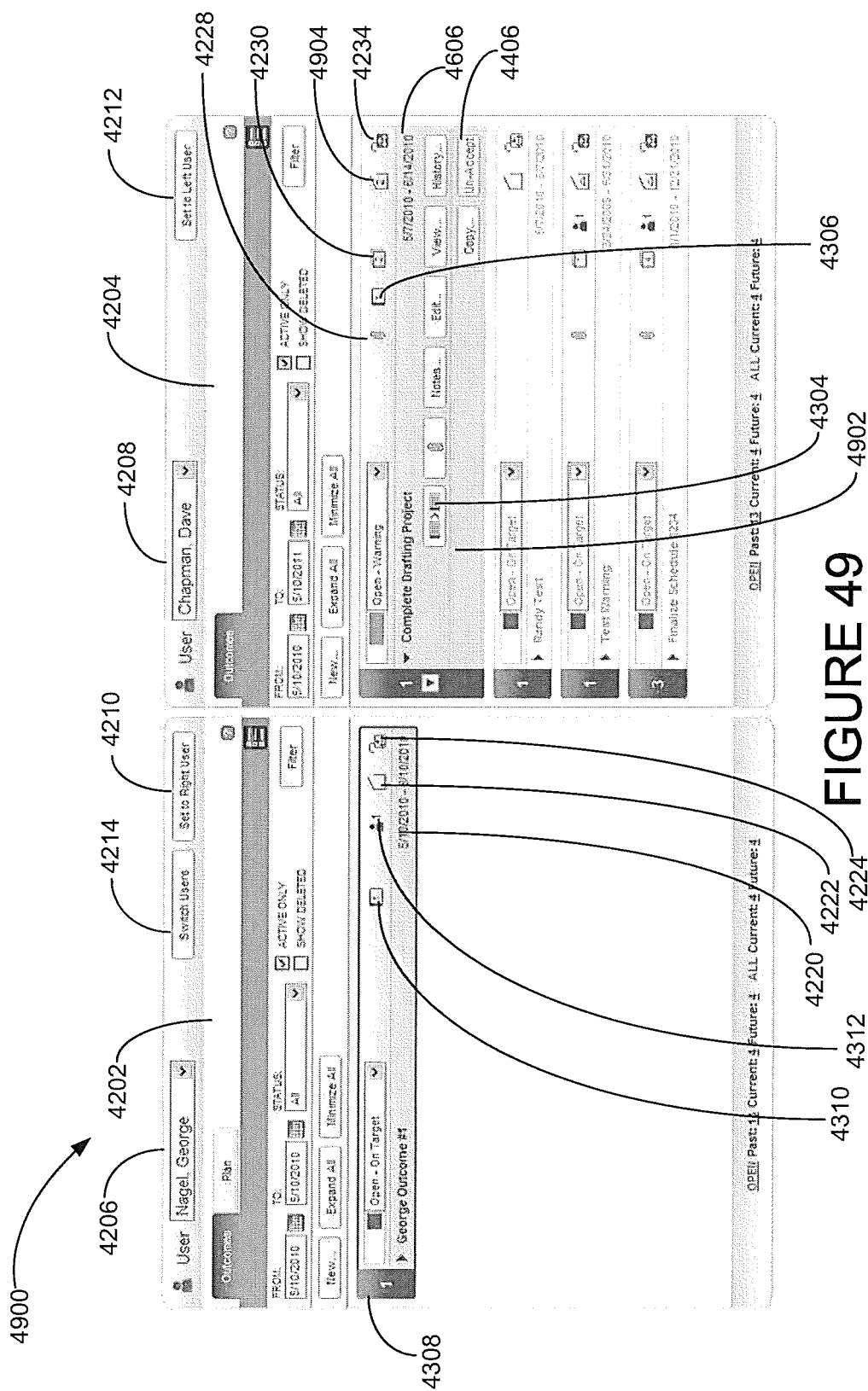

FIG. 49 illustrates a user interface 4900 to the maintain subsystem 202, according to an example embodiment. The user interface 4900 enables the operator to view items of one or more categories. While the user interface 4900 includes only outcome items, in other embodiments the user interface 4900 may display other types of items.

When the operator acting as a manager selects the accept button 4236 in the user interface 4800 to accept the modifications made to the outcome item 4802 by the resource associated with the outcome item 4802, the outcome item 4902 is displayed on the user interface 4900.

An acceptance status indicator 4904 of the outcome item 4902 is displayed in the user interface 4900 instead of the acceptance status indicator 4608 to reflect that the outcome item 4902 has been twice accepted by the manager. The outcome item 4902 has been twice accepted because the outcome item was first created by the user, then accepted by the manager, modified by the resource after manager acceptance, and then reaccepted by the manager.

In some embodiments, if the manager selects the unaccept button 4406, the manager may be re-presented with the user interface 4800.

Figure 50:
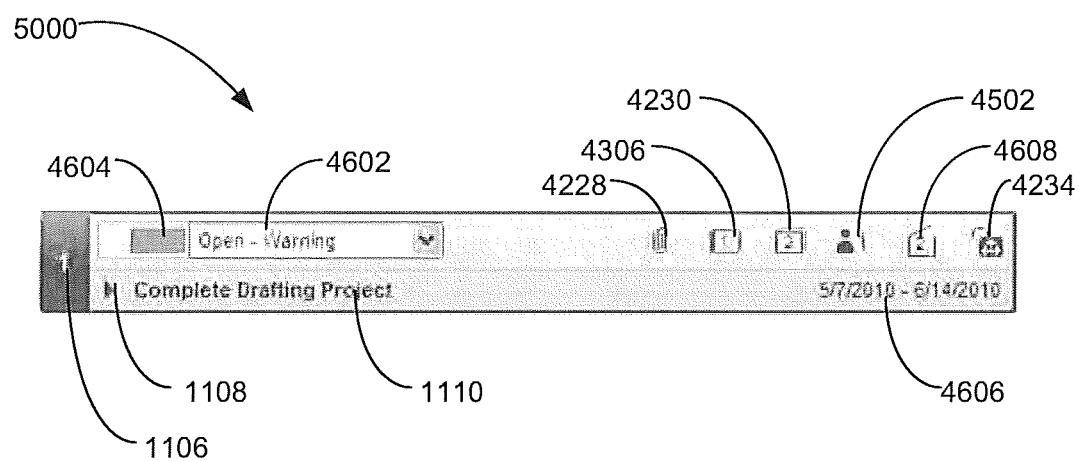

FIG. 50 illustrates a user interface 5000 to the maintain subsystem 202, according to an example embodiment. The user interface 5000 displays an example of a minimized outcome item. The minimized outcome item of the user interface 5000 may be displayed to the resource associated with the minimized outcome item acting as the operator.

The user interface 5000 for the outcome item may include the priority indicator 1106, the maximization button 1108, the outcome title 1110, the file attachment indicator 4228, the note indicator 4230, the access level indicator 4234, the linked indicator 4306, the connections indicator 4502, the period of time indicator 4606, and the acceptance status indicator 4608.

The outcome item displayed in the user interface 5000 may be a version of the outcome item displayed in the user interface 4600 (see FIG. 46) after the manager of the resource has accepted the modifications made by the resource to the outcome item 4500. As described in greater detail above, the manager may accept the changes by selecting the accept button 4236 in the user interface 4800.

Figure 51:
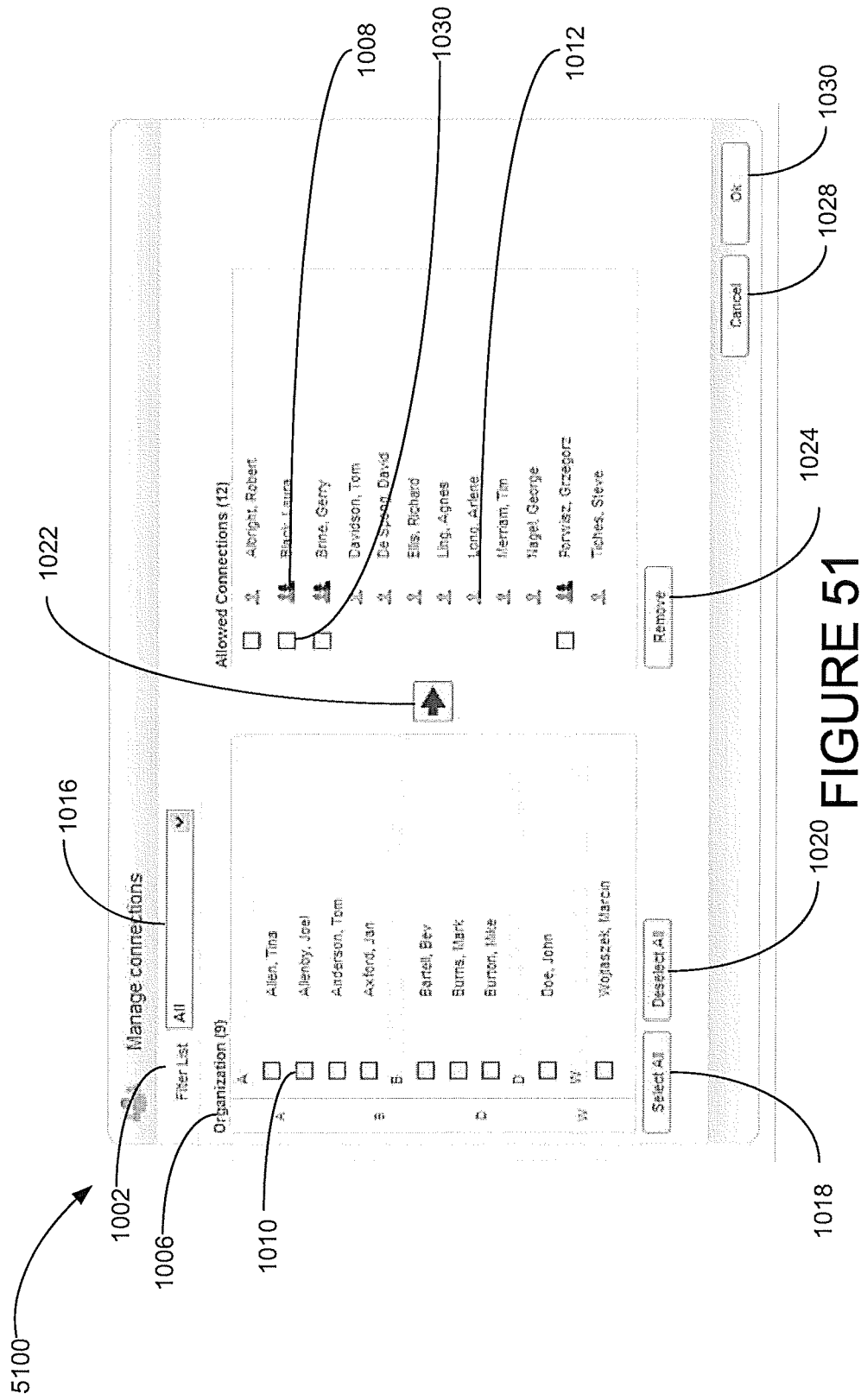

FIG. 51 illustrates a user interface 5100 to the administration subsystem 210, according to an example embodiment. The user interface 5100 enables the operator to manage connections. In some embodiments, the user interface 5100 may be generated for display based on selection of the manage connections button 862 (see FIG. 8).

The organization identifier 1006 identifies the number of resources associated with the organization. The allowed connection identifier 1008 in the user interface 5100 identifies the number of resources that have been permitted to connect with the operator.

The resources of the organization may be selected for permission through the resource check boxes 1010.

The resources shown in the user interface 5100 and available for selection by the resource check boxes 1010 may be filtered by use of the filter list field 1016. For example, the filter list may limit the resources to direct reports and below from the operator in the organization.

All of the resources shown in the user interface 5100 may be selected by use of a select all button 1018. Any selected resources shown in the user interface 5100 may be unselected by use of a deselect all button 1020. The use of the buttons 1018, 1020 may change the resource selections of the check boxes 1010.

After resources are selected, they may be added to the list of resources permitted to connect 1029 to the operator by the add button 1022. Resources may be removed from the list by selecting one or more of the resources and selecting the remove button 1024.

The cancel button 1028 returns the operator to a previous user interface without altering the connections. The ok button 1026 returns the operator to the previous user interface (e.g., the user interface 800 of FIG. 8).

Figure 52:
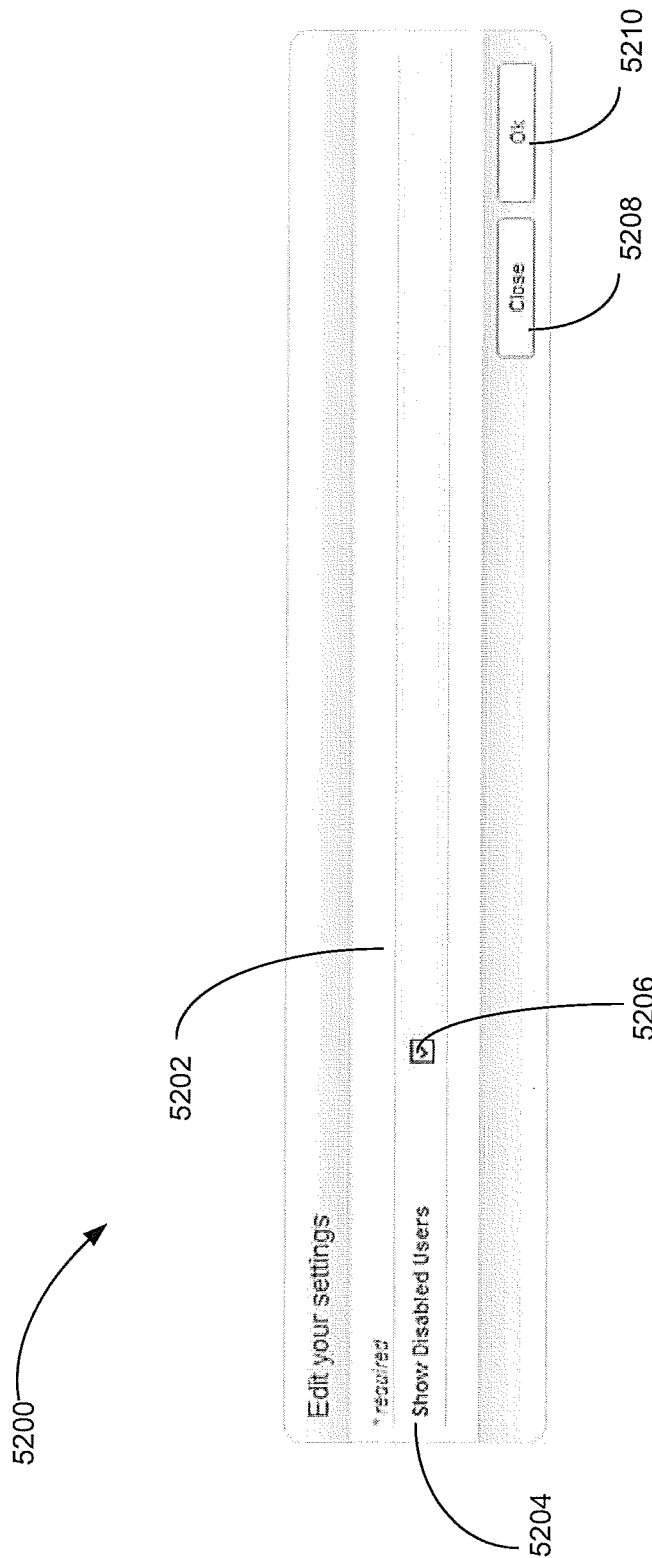

FIG. 52 illustrates a user interface 5200 to the administration subsystem 210, according to an example embodiment. The user interface 5200 enables the operator to edit settings. In some embodiments, the user interface 5100 may be generated for display based on selection of the settings button 864 (see FIG. 8).

A settings area 5202 may include one or more settings 5204 that may be set by the operator. For example, the setting 5204 may be whether or not to show resources that have been disabled (e.g., no longer provided with access). A setting box 5204 may be used for the operator to select whether to turn on the settings 5204.

A close button 5208 may be used to return to a previous user interface (e.g., the user interface 800) without saving the changes to the settings. An ok button 5210 may be used to return to the previous user interface with savings the changes to the settings.

Figure 53:
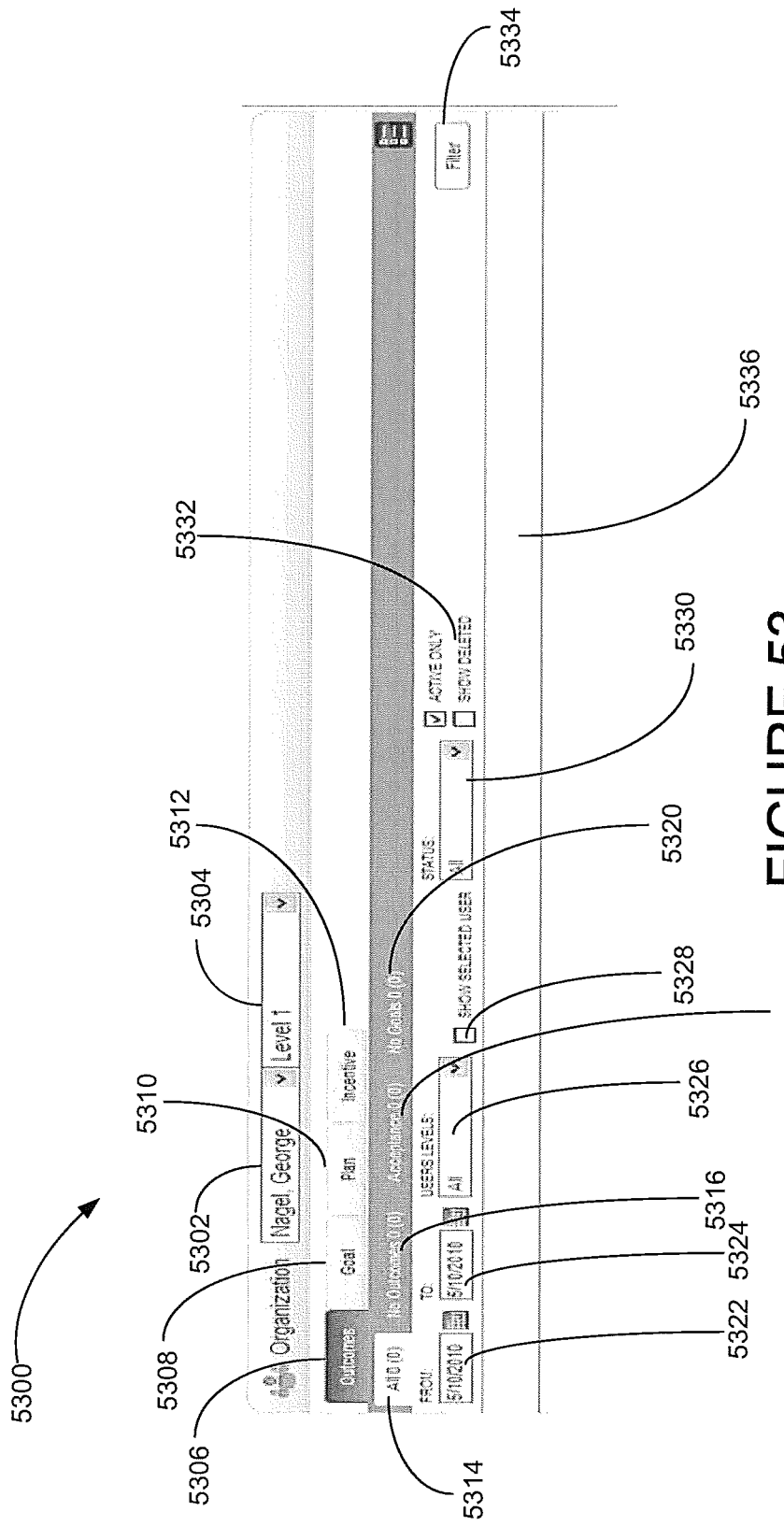

FIG. 53 illustrates a user interface 5300 to the manage subsystem 204, according to an example embodiment. The user interface 5400 enables the operator to manage outcome items associated with the operator and certain other resources.

The operator may select a resource (e.g., the operator or another resource) for management view by a resource selection 5302. By selecting different resources, the operator can view management information associated with other resources to which they have been permitted to have access. The viewable information of the resources to the operator may be based on the organizational position of the resources relative to the operator, access defined by the resources or different resources, or may otherwise be set.

A level 5304 for the resource selected by the resource selection 5304 may be selected. The level identifies the number of levels in the organization for which resource information may be sought. For example, the zero level may show the resource only in the user interface 5300. The first level may show the resource and the direct reports to the resource. The second level may show the resource, the direct reports to the resource, and the direct reports to the direct reports. Additional levels may also be available for selection.

The user interface 5300 includes an outcome tab 5306, a goal tab 5308, a plan tab 5310, and an incentive tab 5312. The outcome tab 5306 is shown in a different color than the other tabs 5308-5312 to indicate that it is the active tab and that the remaining tabs 5308-5312 are inactive.

A number of alert indicators 5314-5320 may be included in the user interface 5300. As shown, the alert indicators include an all indicator 5314, a no outcomes indicator 5316, an acceptance number indicator 5318, and a no goals indicator 5320. Additional or different indicators may also be included.

The all indicator 5314 indicates a total number of indications for the operator. The no outcomes indicator 5316 indicates a total number of resources that do not have at least one outcome item. The acceptance number indicator 5318 indicates a total number of items that the operator has not yet accepted. The no goals indicator 5320 indicates a total number of resources who have an outcome item that is not linked to a goal item.

Filter settings may be used to limit the number of items shown in the user interface 5300. Example filters of the filter settings as shown in the user interface 5300 include a start date 5322, an end date 5324, a resource levels 5326, a show selected resource 5328, a status 5330, and an active only/show deleted check boxes 5332. Other filters may be used. Once selected, the filter settings may be applied by selecting a filter button 5334. In some embodiments, one or more of the filters of the filter settings may be applied without the resource selecting the filter button 5334.

An items area 5336 shows that the user interface 5300 does not have any items (e.g., outcome items).

Figure 54:
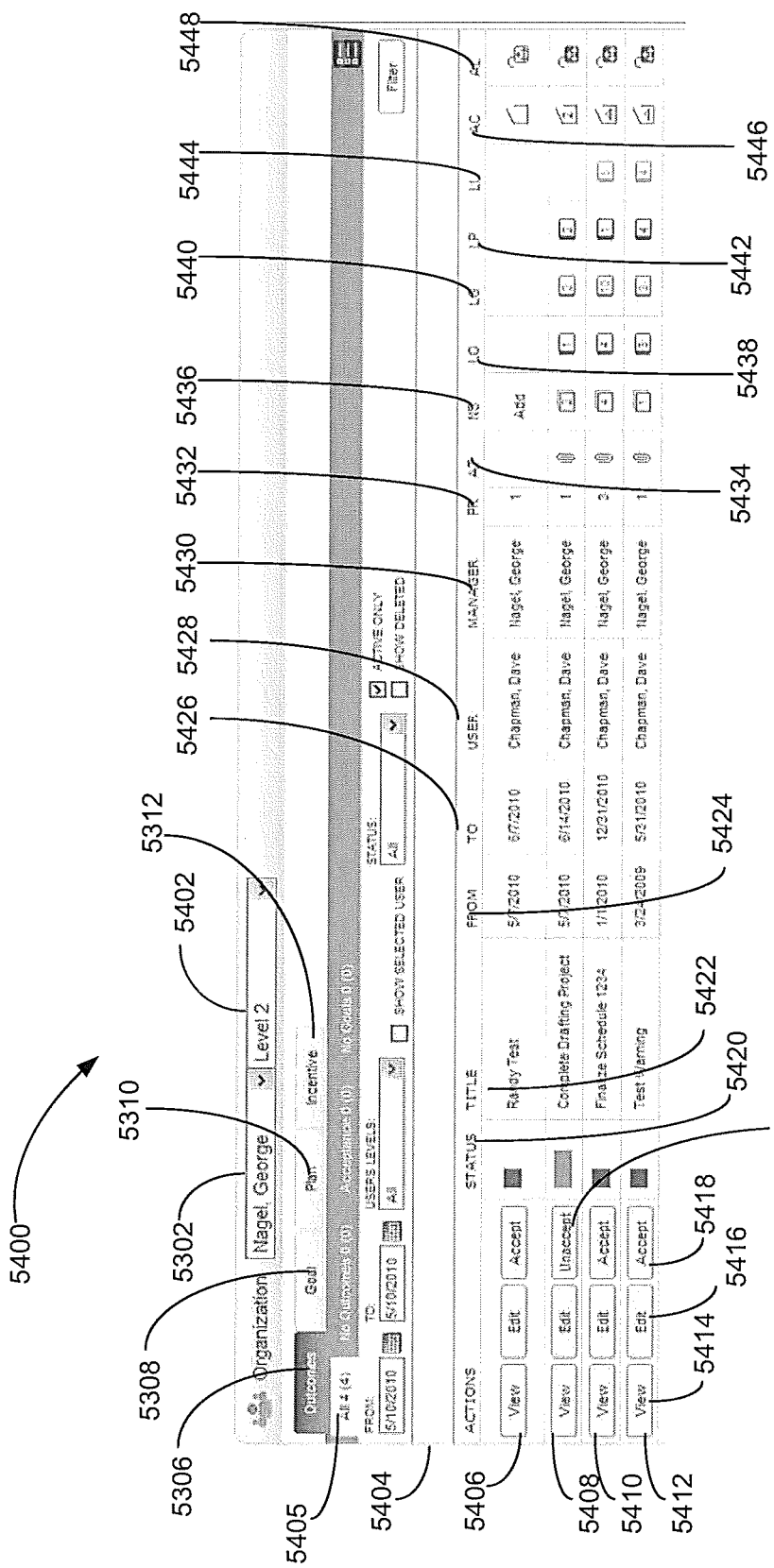

FIG. 54 illustrates a user interface 5400 to the manage subsystem 204, according to an example embodiment. The user interface 5400 enables the operator to manage outcome items associated with the operator and certain other resources.

The user interface 5400 is a version of the user interface 5300 with a different level. Thus the user interface 5400 includes selection of a level 5402 instead of the level 5304 of the user interface 5300 (see FIG. 53).

The items area 5336 of the user interface 5300 is shown as an items area 5404 with four outcome items 5406-5412 in the user interface 5400. As such, the all indicator 5314 of the user interface 5300 that reflects zero items are displayed is an all indicator 5405 reflecting four items are displayed in the user interface 5400.

Each of the outcome items 5406-5412 is associated with a view button 5414 and an edit button 5416. The view button 5414 enables the operator to view an associated outcome item, while the edit button 5416 enable the operator to edit an associated outcome item.

One or more of the outcome items (e.g., the outcome items 5406, 5410, 5412) may not yet be accepted by a manager and may be associated with an accept button 5418. Other outcome items (e.g., the outcome item 5408) may already be accepted by a manager and may be associated with an unaccept button 5419.

Additional information regarding the outcome items 5406-5412 may be included in the user interface. The additional information may include a visual status indicator 5410, a title 5422, a period start date 5424, a period end date 5426, an associated resource (e.g., associated with the outcome item) 5428, and a manager of the resource 5430.

A number of outcome indicators 5432-5448 may be included with the outcome items 5406-5412. The outcome indicators 5432-5448 include a priority indicator 5432, an attachment indicator 5334, a notes indicator 5436, a linked outcomes indicator 5438, a linked goals indicator 5440, a linked plans indicator 5442, a linked incentives indicator 5444, an acceptance indicator 5446, and an access level indicator 5448.

The priority indicator 5432 indicates a priority of the outcome item. In some embodiments, the priority for the outcome item is the priority identified in the priority field 914 (see FIG. 9).

The attachment indicator 5334 indicates whether the outcome item is associated with an attachment. In some embodiments, the attachment may be associated with the outcome item by selection of the attachment button 1406 (see FIG. 14).

The notes indicator 5436 indicates whether a note is associated with the outcome item, a number of notes associated with the outcome item, or both. In some embodiments, the note may be associated with the outcome item by selection of the note button 1408.

The linked outcomes indicator 5438 indicates whether the outcome item is linked to another outcome item, indicates a number of outcome items to which the outcome item is linked, or both. In some embodiments, the linking of the outcome item may be performed by selection of the link button 4234 (see FIG. 42).

The linked goals indicator 5440 indicates whether the outcome item is linked to a goal item, indicates a number of goal items to which the outcome item is linked, or both.

The linked plans indicator 5442 indicates whether the outcome item is linked to a plan item, indicates a number of plan items to which the outcome item is linked, or both.

The linked incentives indicator 5444 indicates whether the outcome item is linked to an incentives item, indicates a number of incentives item items to which the outcome item is linked, or both.

The acceptance indicator 5446 indicates an acceptance status of the outcome item. In some embodiment, the acceptance indicator 5446 may be an indicator shown in the user interface 1200 (see FIG. 12).

The access level indicator 5448 indicates an access level of the outcome item. In some embodiment, the access level indicator 5448 may be an indicator shown in the user interface 1300 (see FIG. 13).

Figure 55:
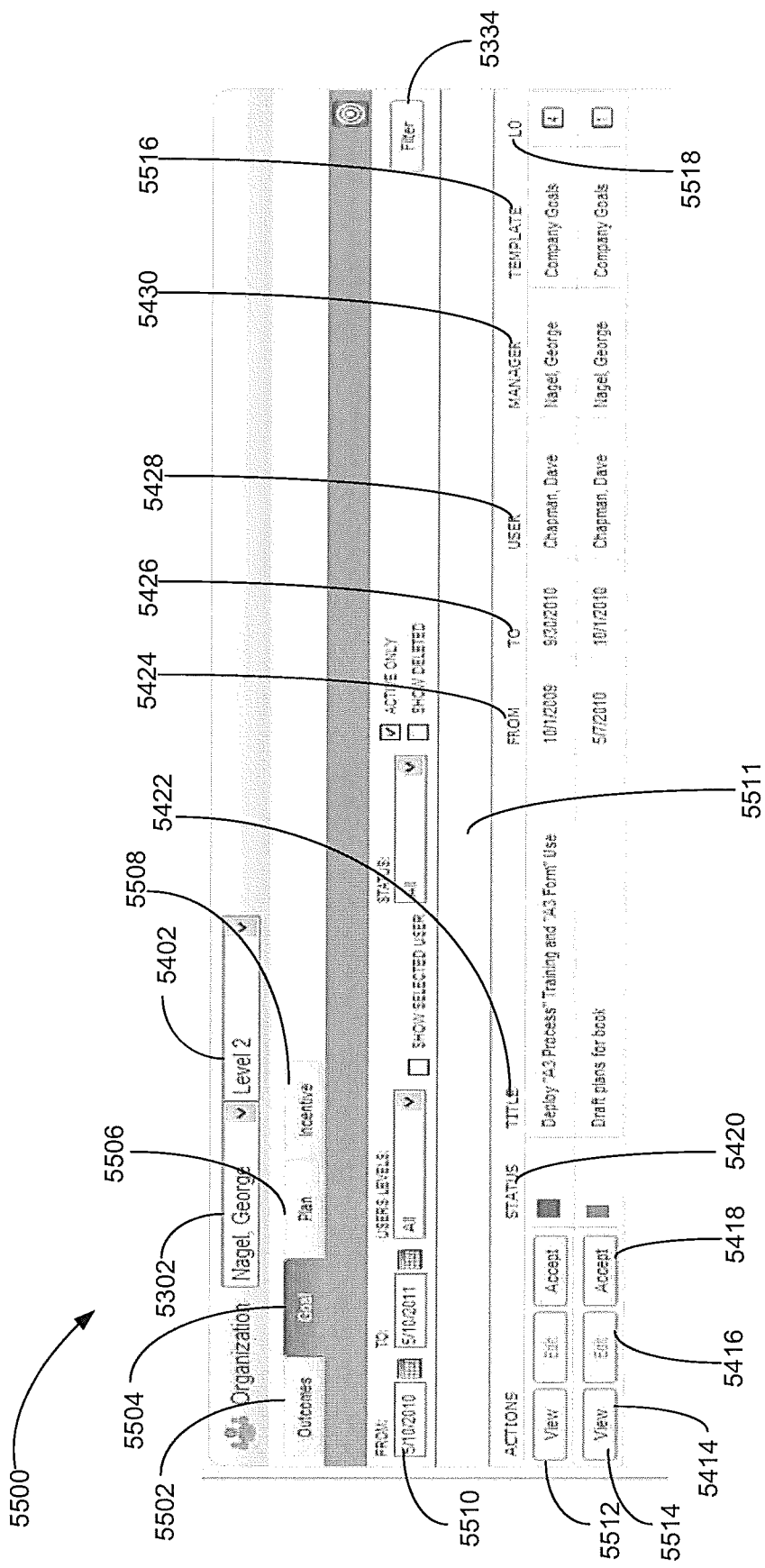

FIG. 55 illustrates a user interface 5500 to the manage subsystem 204, according to an example embodiment. The user interface 5500 enables the operator to manage goal items associated with the operator and certain other resources.

The user interface 5500 includes an outcome tab 5502, a goal tab 5504, a plan tab 5506, and an incentive tab 5508. The tabs 5502-5508 correspond to the tabs 5306-5312 of the user interface 5300. In the user interface 5500, the goal tab 5504 is shown in a different color than the other tabs 5502, 5506, 5508 to indicate that it is the active tab and that the remaining tabs 5502, 5506, 5508 are inactive.

Filter settings 5510 may be used to limit the number of items shown in the user interface 5500. Example filters of the filter settings as shown in the user interface 5500 include a start date, an end date, a resource levels, a show selected user, a status, and an active only/show deleted check boxes. Other filters may be used. Once selected, the filter settings may be applied by selecting a filter button 5334. In some embodiments, one or more of the filters of the filter settings may be applied without the resource selecting the filter button 5334.

An items area 5511 of the user interface 5500 is shown as having two goal items 5512, 5514. Each of the goal items 5512, 5514 is associated with a view button 5414 and an edit button 5416. The view button 5414 enables the operator to view an associated goal item, while the edit button 5416 enable the operator to edit an associated goal item.

One or more of the goal items (e.g., the goal items 5512, 5514) may not yet be accepted by a manager and may be associated with an accept button 5418. Other goal items may already be accepted by a manager and may be associated with an unaccept button 5419.

Additional information regarding the goal items 5512, 5514 may be included in the user interface 5500. The additional information may include a visual status indicator 5420, a title 5422, a period start date 5424, a period end date 5426, an associated resource (e.g., associated with the goal item) 5428, a manager of the resource 5430, and a goal template 5516.

A single goal indicator or multiple goal indicators may be included with the goal items 5512, 5514.

The linked outcomes indicator 5518 indicates whether the goal item is linked to an outcome item, indicates a number of outcome items to which the goal item is linked, or both.

Figure 56:
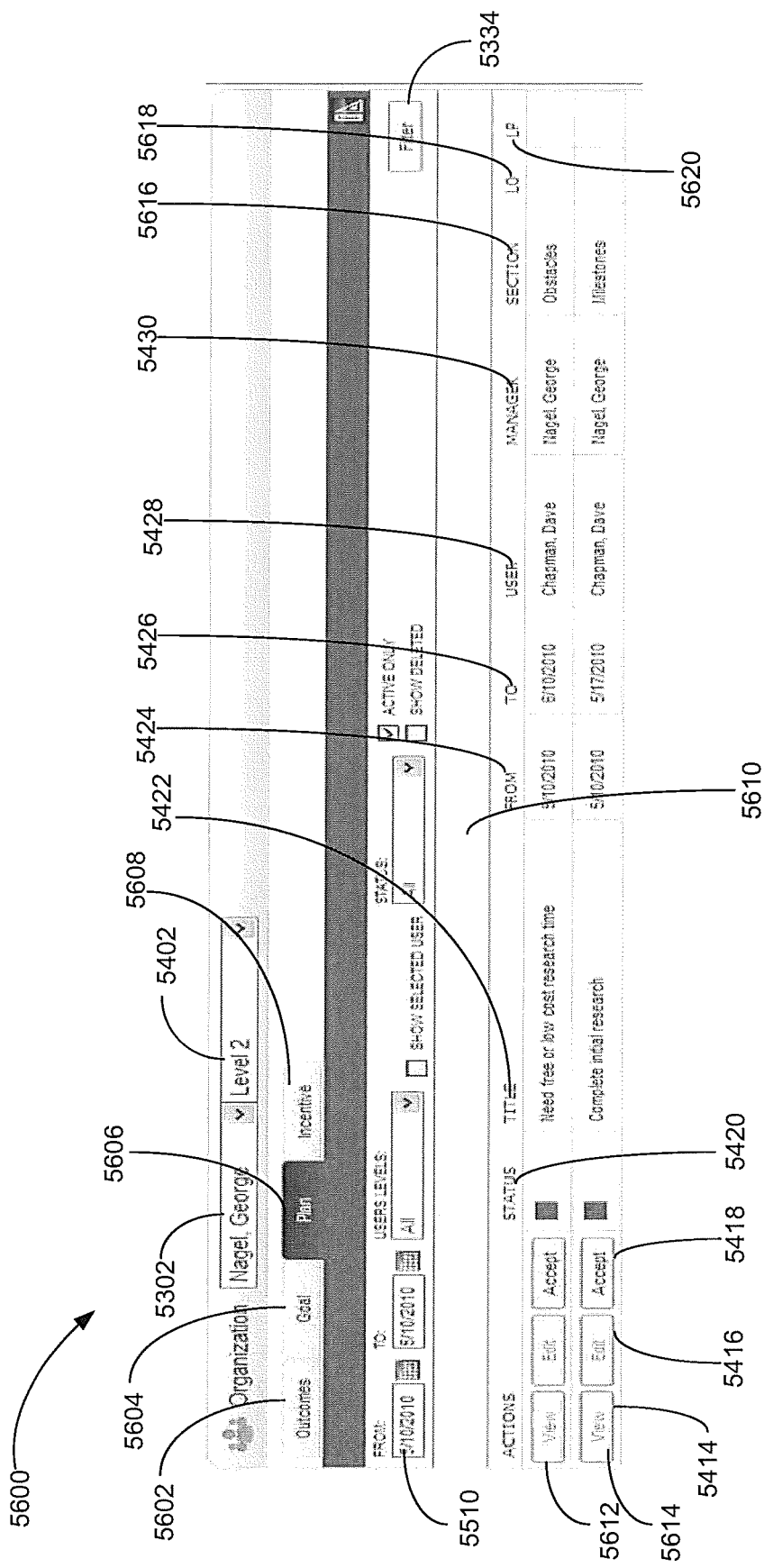

FIG. 56 illustrates a user interface 5600 to the manage subsystem 204, according to an example embodiment. The user interface 5600 enables the operator to manage plan items associated with the operator and certain other resources.

The user interface 5600 includes an outcome tab 5602, a goal tab 5604, a plan tab 5606, and an incentive tab 5608. The tabs 5602-5608 correspond to the tabs 5306-5312 of the user interface 5300. In the user interface 5600, the plan tab 5606 is shown in a different color than the other tabs 5602, 5604, 5608 to indicate that it is the active tab and that the remaining tabs 5602, 5604, 5608 are inactive. Filter settings 5510 may be used to limit the number of items shown in the user interface 5500.

An items area 5610 of the user interface 5600 is shown as having two plan items 5612, 5614. Each of the plan items 5612, 5614 is associated with a view button 5414 and an edit button 5416. The view button 5414 enables the operator to view an associated plan item, while the edit button 5416 enable the operator to edit an associated plan item.

One or more of the plan items (e.g., the plan items 5612, 5614) may not yet be accepted by a manager and may be associated with an accept button 5418. Other plan items may already be accepted by a manager and may be associated with an unaccept button 5419.

Additional information regarding the plan items 5612, 5614 may be included in the user interface 5600. The additional information may include a visual status indicator 5420, a title 5422, a period start date 5424, a period end date 5426, an associated resource (e.g., associated with the plan item) 5428, a manager of the resource 5430, and a section 5516. The section 5516 may indicate whether the plan item is an obstacle or a milestone.

A single plan indicator or multiple plan indicators may be included with the plan items 5612, 5614.

The linked outcomes indicator 5618 indicates whether the plan item is linked to an outcome item, indicates a number of outcome items to which the plan item is linked, or both.

The linked plans indicator 5620 indicates whether the plan item is linked to another plan item, indicates a number of other plan items to which the plan item is linked, or both.

Figure 57:
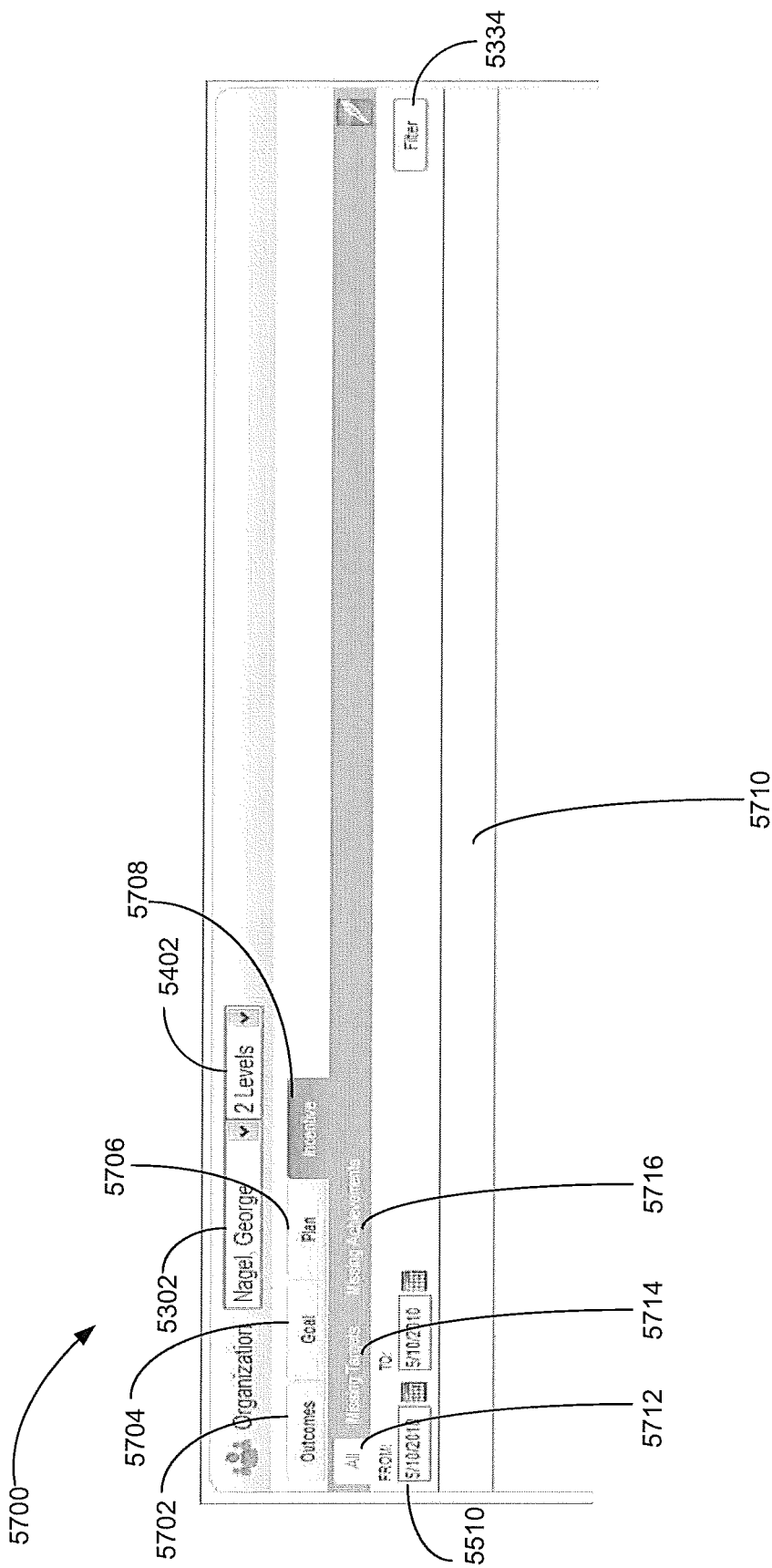

FIG. 57 illustrates a user interface 5700 to the manage subsystem 204, according to an example embodiment. The user interface 5700 enables the operator to manage incentive items associated with the operator and certain other resources.

The user interface 5700 includes an outcome tab 5702, a goal tab 5704, a plan tab 5706, and an incentive tab 5708. The tabs 5702-5708 correspond to the tabs 5306-5312 of the user interface 5300. In the user interface 5700, the incentive tab 5708 is shown in a different color than the other tabs 5702-5706 to indicate that it is the active tab and that the remaining tabs 5702-5706 are inactive.

Filter settings 5510 may be used to limit the number of items shown in the user interface 5500. The incentive items shown in the user interface 5700 may be limited by sub-tabs 5712-5716. An all sub-tab 5712 may display all incentive items that otherwise meet the filter settings 5510. A missing targets sub-tab 5714 may limit the incentive items displayed in the user interface 5700 to incentive items involving missing targets. A missing achievements sub-tab 5716 may limit the incentive items displayed in the user interface 5700 to incentive items involving missing achievements.

An items area 5710 of the user interface 5700 is shown as having no incentive items.

Figure 58:
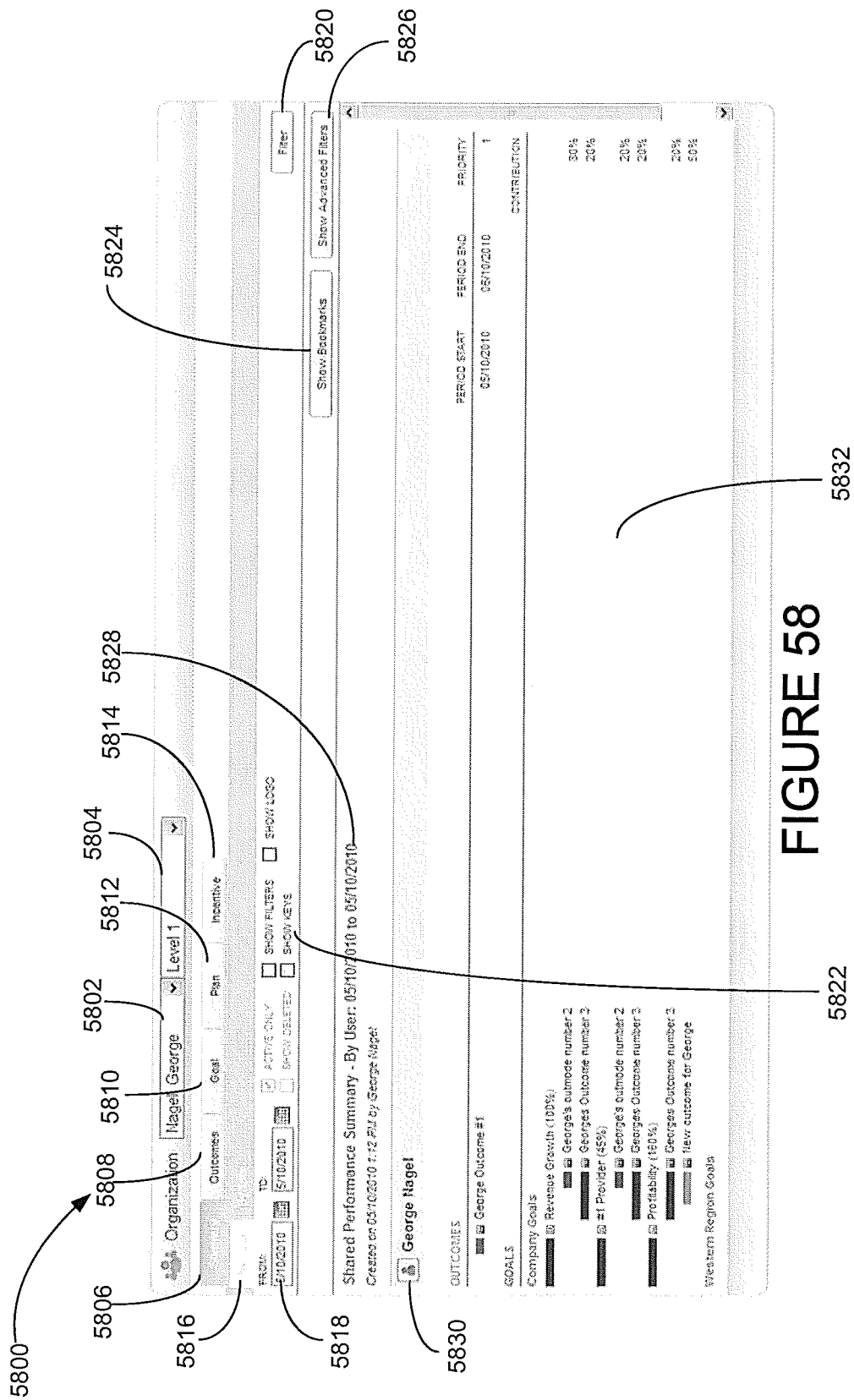

FIG. 58 illustrates a user interface 5800 to the reporting subsystem 206, according to an example embodiment. The user interface 5800 enables the operator to view reports associated with the operator and certain other resources.

The operator may select a resource (e.g., the operator or another resource) for reporting view by a resource selection 5802. By selecting different resources, the operator can view reporting information that would be provided to other resources to which they have been permitted to have access. The reporting information associated with other resources may be based on the organizational position of the resources relative to the operator, access defined by the resources or different resources, or may otherwise be set.

A level 5804 for the resource selected by the resource selection 5804 may be selected. The level may be used to filter data displayed for performance reasons. The more levels selection, the greater the amount of data that is processed.

The user interface 5800 includes a summary tab 5806, an outcome tab 5808, a goal tab 5810, a plan tab 5812, and an incentive tab 5814. The summary tab 5806 is shown in a different color than the other tabs 5808-5814 to indicate that it is the active tab and that the remaining tabs 5808-5814 are inactive.

A number of organization sub-tabs 5816 may be used to alter the organization of the report. As shown, the organization sub-tabs 5816 include a by resource sub-tab and a by item sub-tab. Additional or different organization sub-tabs may be used.

Filter settings 5818 may be used to limit the number of items shown in the user interface 5300. Example filters of the filter settings as shown in the user interface 5800 include a start date, an end date, or an active only/show deleted. Other filters may be used. Once selected, the filter settings may be applied by selecting a filter button 5820. In some embodiments, one or more of the filters of the filter settings 5818 may be applied without the resource selecting the filter button 5820.

A number of reporting options 5822 may be selected for inclusion of information in the report. The reporting options 5822 may include show filters, show keys, and show logo. Additional or different reporting options may be used.

A show bookmarks button 5824 may be selected to include bookmarks in the report. The bookmarks may be used to save filter settings for a later date. For example, a bookmark may be used to run common reports desired by resources.

A show advanced filters button 5826 may be selected to generate for display additional filters for the filter settings 5818. A number of database fields may be used as filters. For example, outcome status and acceptance status may be used as filters A report title 5828 may be generated for display on the user interface 5800. The report title may include, by way of example, a company name, an identification of the report type (e.g., summary, outcome, goal, plan, or incentive), an organization type (e.g., by resource or by item), and a date range. Additional or different information may be used in the report title 5828.

Resource identification 5830 may identify the resource associated with the report or a portion of the report. By way of example, George Nagel is shown as the resource associated with the report in the user interface 5800

A reporting area 5832 may include reporting information associated with the report. For example, the reporting information may summarize the outcome items and goal items associated with the resource identified by the resource identification 5830.

Figure 59:
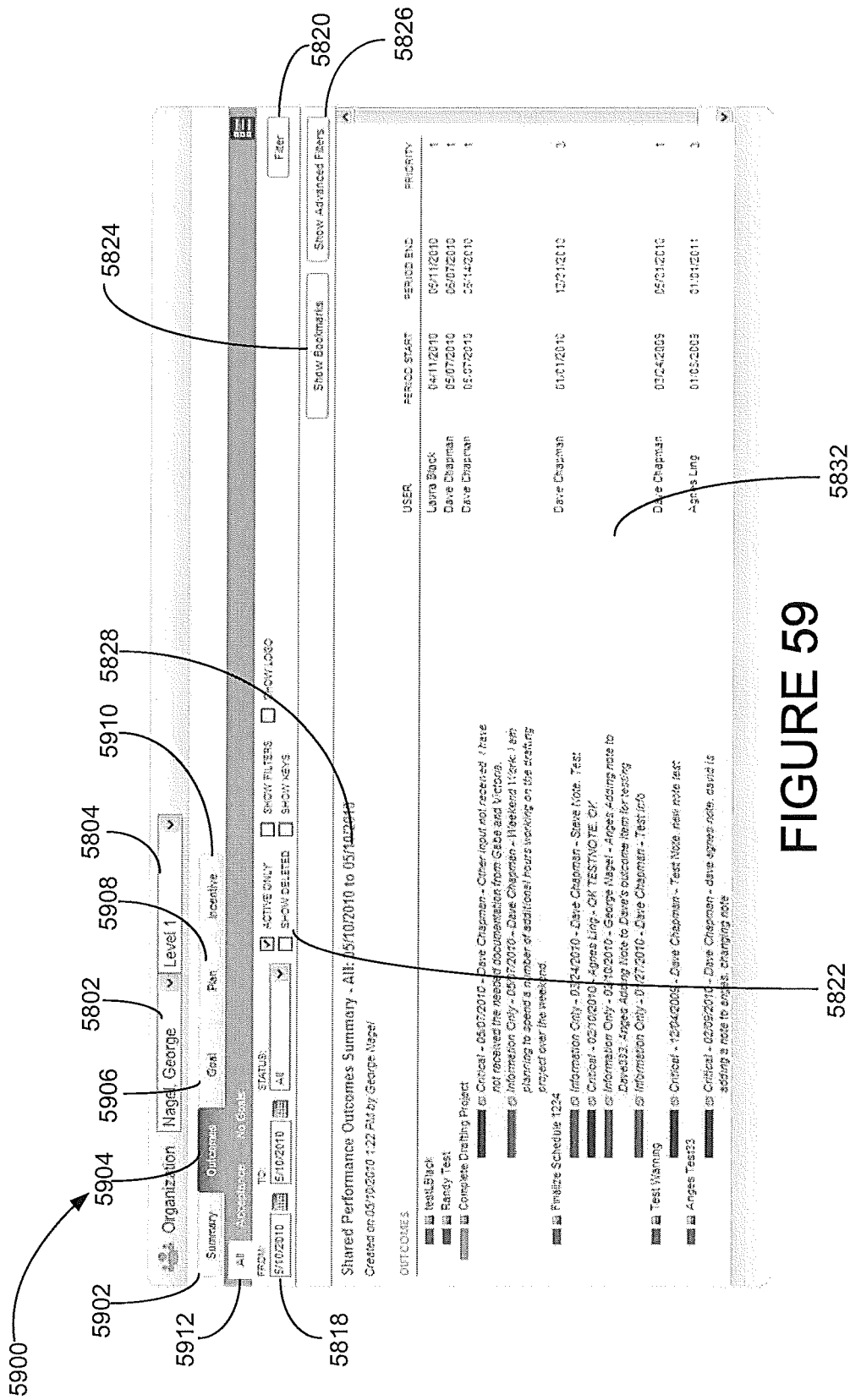

FIG. 59 illustrates a user interface 5900 to the reporting subsystem 206, according to an example embodiment. The user interface 5900 enables the operator to view reports associated with the operator and certain other resources.

The user interface 5900 includes a summary tab 5902, an outcome tab 5904, a goal tab 5906, a plan tab 5908, and an incentive tab 5910 that correspond to the summary tab 5806, the outcome tab 5808, the goal tab 5810, the plan tab 5812, and the incentive tab 5814 of the user interface 5800. The outcome tab 5904 is shown in a different color than the other tabs 5902, 5906-5910 to indicate that it is the active tab and that the remaining tabs 5902, 5906-5910 are inactive.

A number of organization sub-tabs 5912 may be used to alter the organization of the report. The organization sub-tabs 5912 may be used to limit the items displayed in the report. As shown, the organization sub-tabs 5912 include an all sub-tab, an acceptance sub-tab, and a no goals sub-tab. Additional or different organization sub-tabs may be used.

The filter settings 5818 may be used to limit the number of items shown in the user interface 5900. Once selected, the filter settings may be applied by selecting the filter button 5820. The reporting options 5822 may be selected for inclusion of information in the report. The show bookmarks button 5824 may be selected to include bookmarks in the report. The show advanced filters button 5826 may be selected to generate for display additional filters for the filter settings 5818. The report title 5828 may be generated for display on the user interface 5800.

The reporting area 5832 may include reporting information associated with the report. For example, the reporting information may summarize the outcome items.

Figure 60:
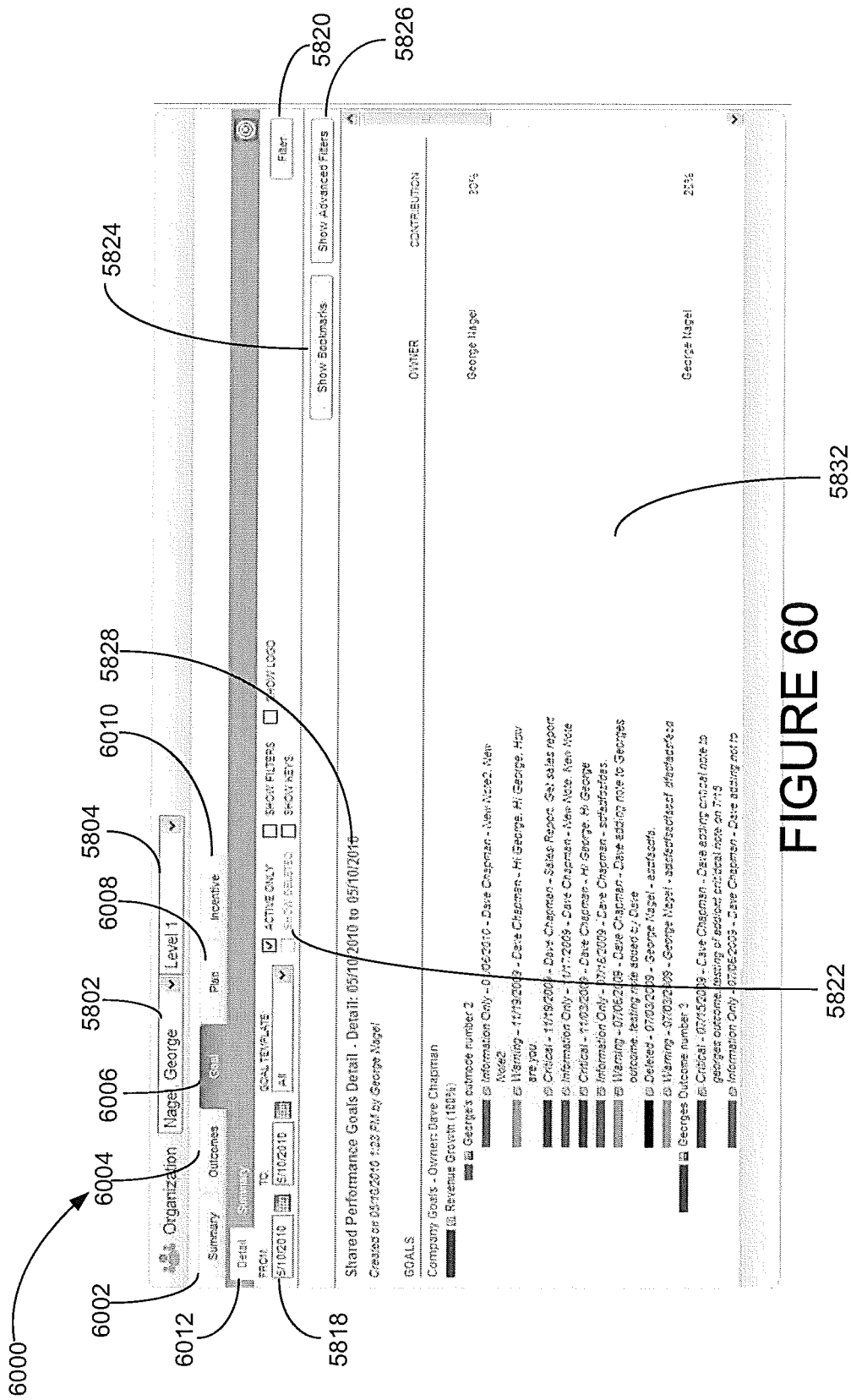

FIG. 60 illustrates a user interface 6000 to the reporting subsystem 206, according to an example embodiment. The user interface 6000 enables the operator to view reports associated with the operator and certain other resources.

The user interface 6000 includes a summary tab 6002, an outcome tab 6004, a goal tab 6006, a plan tab 6008, and an incentive tab 6010 that correspond to the summary tab 5806, the outcome tab 5808, the goal tab 5810, the plan tab 5812, and the incentive tab 5814 of the user interface 5800. The goal tab 6006 is shown in a different color than the other tabs 6002, 6004, 6008, 6010 to indicate that it is the active tab and that the remaining tabs 6002, 6004, 6008, 6010 are inactive.

A number of organization sub-tabs 6012 may be used to alter the organization of the report. The organization sub-tabs 6012 may be used to limit the items displayed in the report. As shown, the organization sub-tabs 6012 include a detail sub-tab and a summary sub-tab. Additional or different organization sub-tabs may be used.

The filter settings 5818 may be used to limit the number of items shown in the user interface 5900. Once selected, the filter settings may be applied by selecting the filter button 5820. The reporting options 5822 may be selected for inclusion of information in the report. The show bookmarks button 5824 may be selected to include bookmarks in the report. The show advanced filters button 5826 may be selected to generate for display additional filters for the filter settings 5818. The report title 5828 may be generated for display on the user interface 5800.

The reporting area 5832 may include reporting information associated with the report. For example, the reporting information may summarize the goal items.

Figure 61:
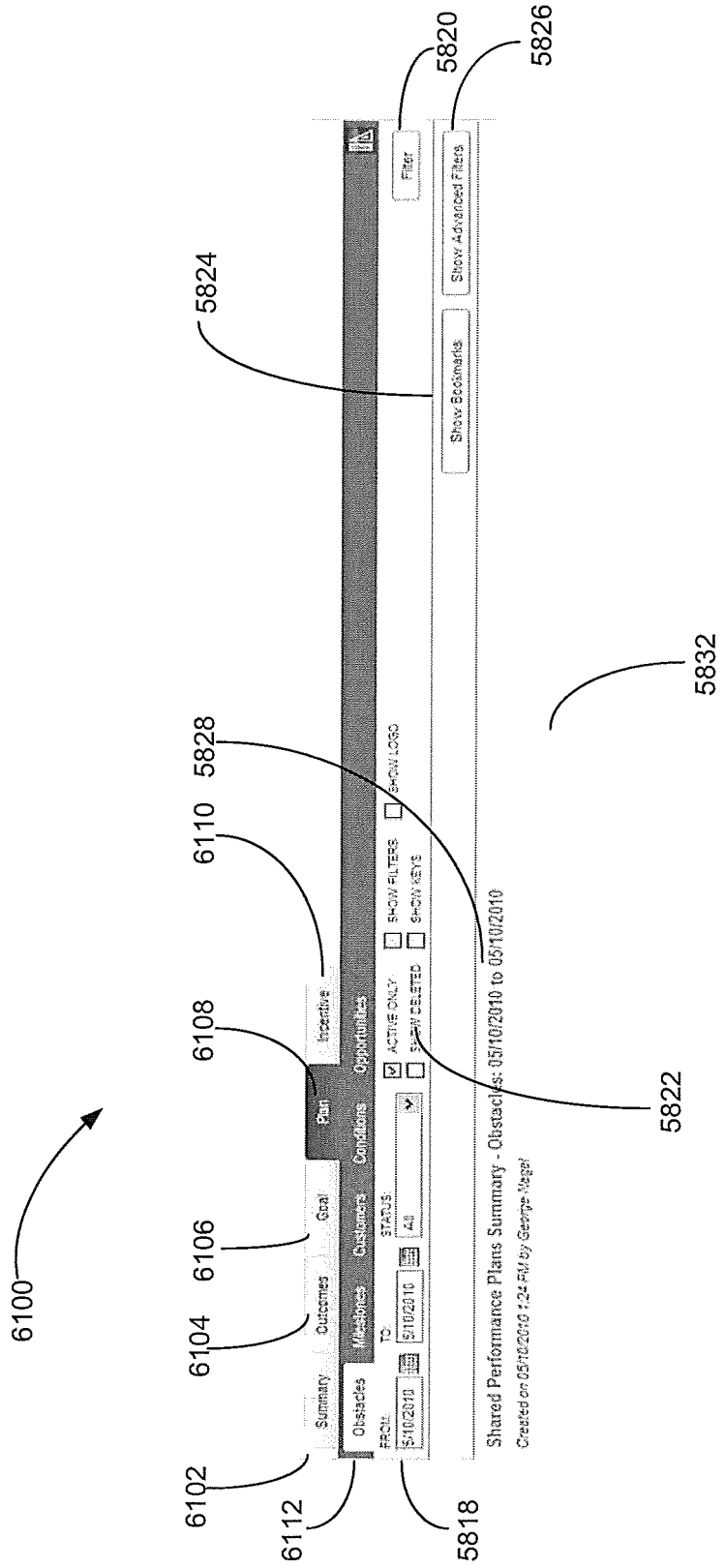

FIG. 61 illustrates a user interface 6100 to the reporting subsystem 206, according to an example embodiment. The user interface 6100 enables the operator to view reports associated with the operator and certain other resources.

The user interface 6100 includes a summary tab 6102, an outcome tab 6104, a goal tab 6106, a plan tab 6108, and an incentive tab 6110 that correspond to the summary tab 5806, the outcome tab 5808, the goal tab 5810, the plan tab 5812, and the incentive tab 5814 of the user interface 5800. The plan tab 6108 is shown in a different color than the other tabs 6102-6106, 6010 to indicate that it is the active tab and that the remaining tabs 6102-6106, 6010 are inactive.

A number of organization sub-tabs 6112 may be used to alter the organization of the report. The organization sub-tabs 6012 may be used to limit the items displayed in the report. As shown, the organization sub-tabs 6012 include an obstacles sub-tab, a milestones sub-tab, a customers sub-tab, a conditions sub-tab, and an opportunities sub-tab. Additional or different organization sub-tabs may be used.

The filter settings 5818 may be used to limit the number of items shown in the user interface 5900. Once selected, the filter settings may be applied by selecting the filter button 5820. The reporting options 5822 may be selected for inclusion of information in the report. The show bookmarks button 5824 may be selected to include bookmarks in the report. The show advanced filters button 5826 may be selected to generate for display additional filters for the filter settings 5818. The report title 5828 may be generated for display on the user interface 5800.

The reporting area 5832 may include reporting information associated with the report.

Figure 62A:
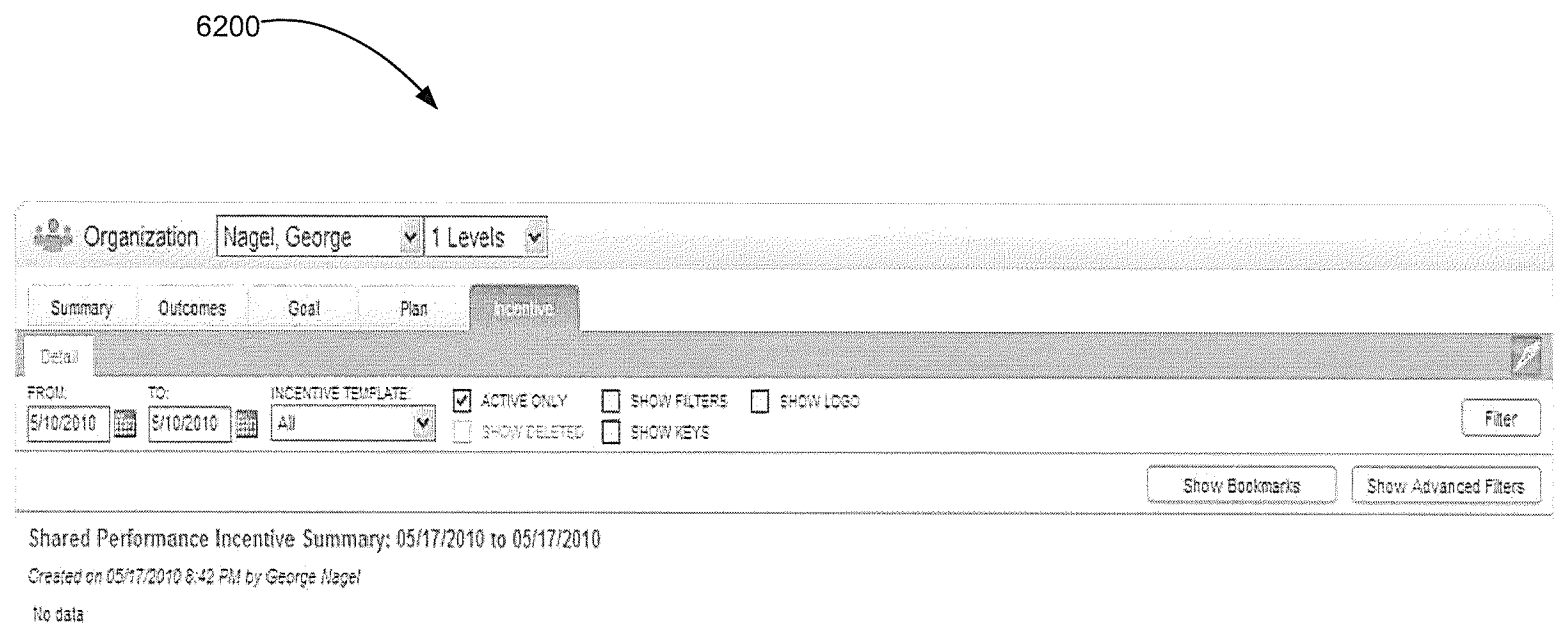

FIG. 62A illustrates a user interface 6200 to the reporting subsystem 206, according to an example embodiment. The user interface 6200 enables the operator to view reports associated with the operator and certain other resources.

The user interface 6200 includes a summary tab 6202, an outcome tab 6204, a goal tab 6206, a plan tab 6208, and an incentive tab 6210 that correspond to the summary tab 5806, the outcome tab 5808, the goal tab 5810, the plan tab 5812, and the incentive tab 5814 of the user interface 5800. The incentive tab 6210 is shown in a different color than the other tabs 6202-6208 to indicate that it is the active tab and that the remaining tabs 6202-6208 are inactive.

A number of organization sub-tabs 6212 may be used to alter the organization of the report. The organization sub-tabs 6012 may be used to limit the items displayed in the report. As shown, the organization sub-tabs 6012 include a detail sub-tab. Additional or different organization sub-tabs may be used.

The filter settings 5818 may be used to limit the number of items shown in the user interface 5900. Once selected, the filter settings may be applied by selecting the filter button 5820. The reporting options 5822 may be selected for inclusion of information in the report. The show bookmarks button 5824 may be selected to include bookmarks in the report. The show advanced filters button 5826 may be selected to generate for display additional filters for the filter settings 5818. The report title 5828 may be generated for display on the user interface 5800.

The reporting area 5832 may include reporting information associated with the report.

The report includes a bookmark. The bookmark may be used to save characteristics of a desired search report so that the same characteristics may be used to quickly run the same search again. By way of example, the user interface 6200 includes a bookmark identified as outcomes only.

Figure 62B:
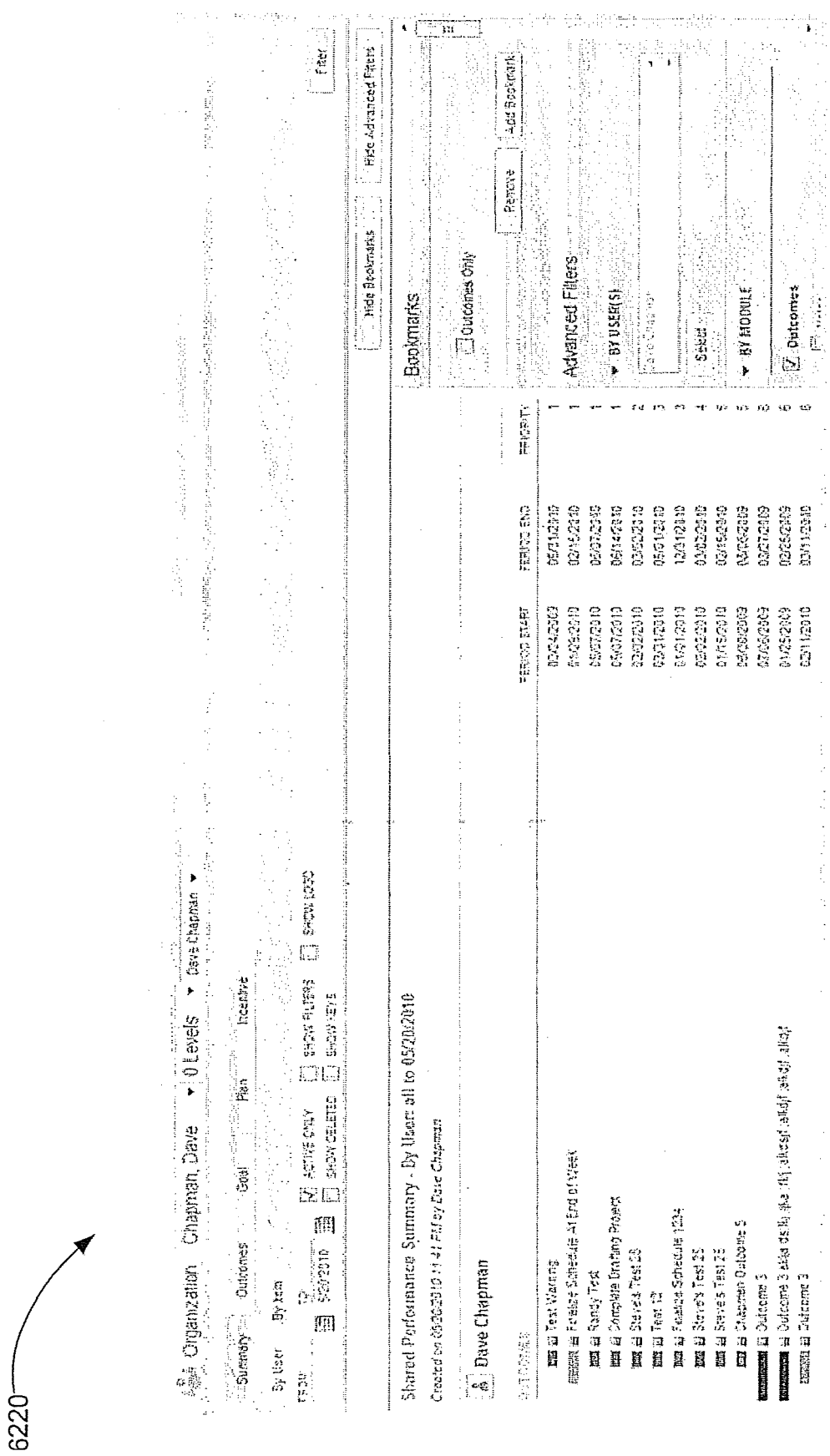

FIG. 62B illustrates a user interface 6200 including an example report, according to an example embodiment. The user interface may be generated by the organization device 102 or the processor device 106 of the system 100 (see FIG. 1), or may otherwise be generated.

Figure 62C:
Figure 63:
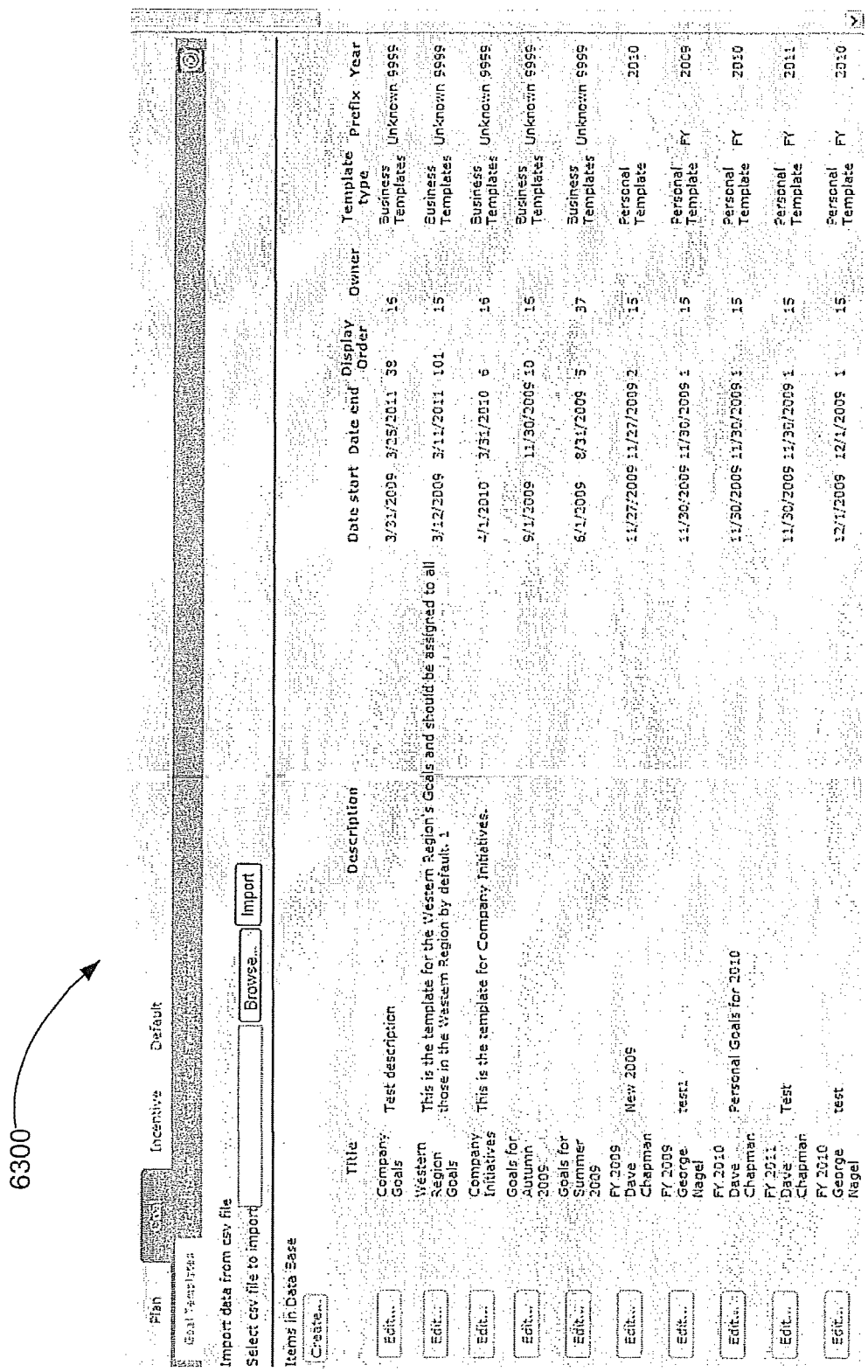
Figure 64:
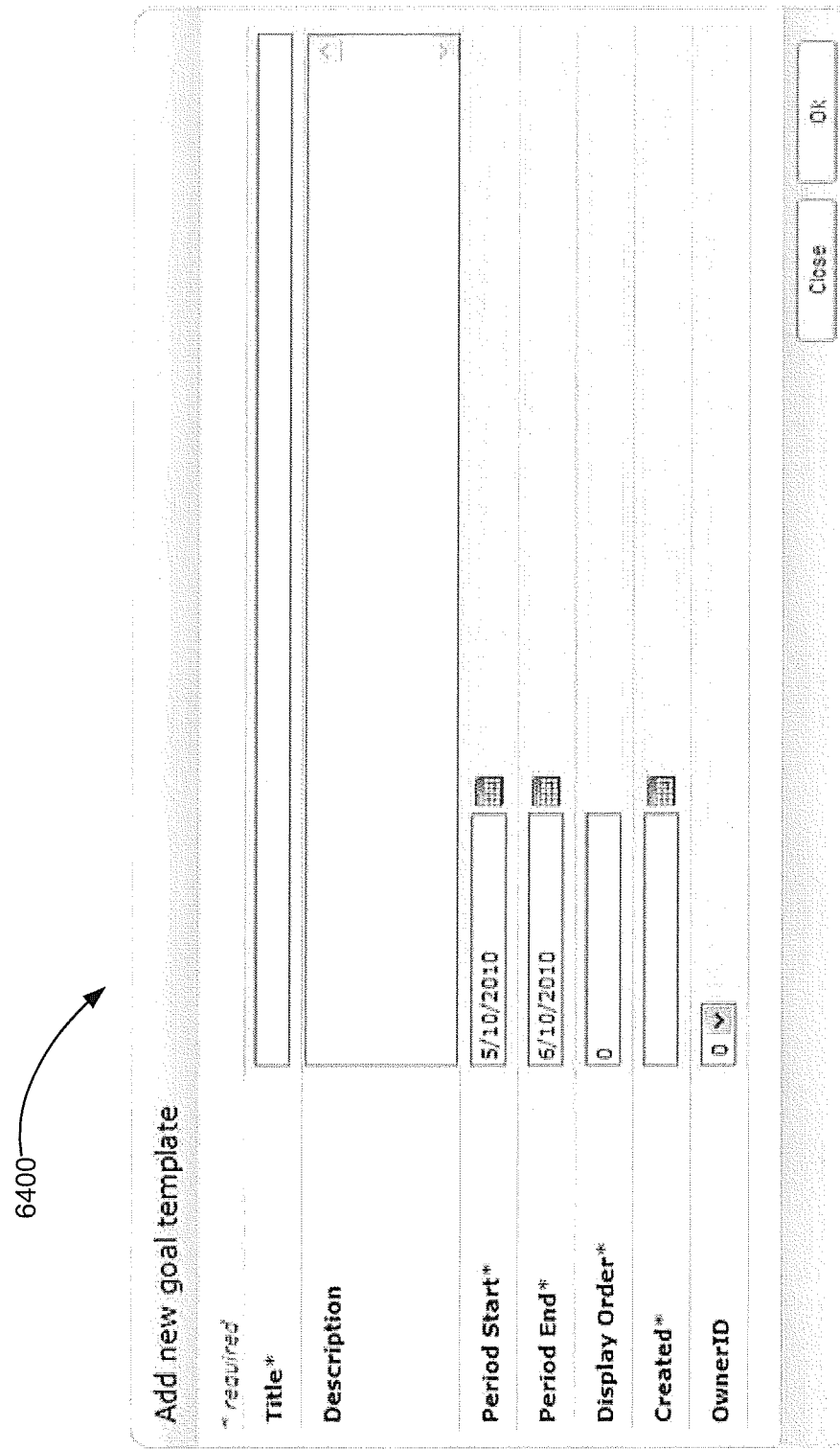
Figure 65:
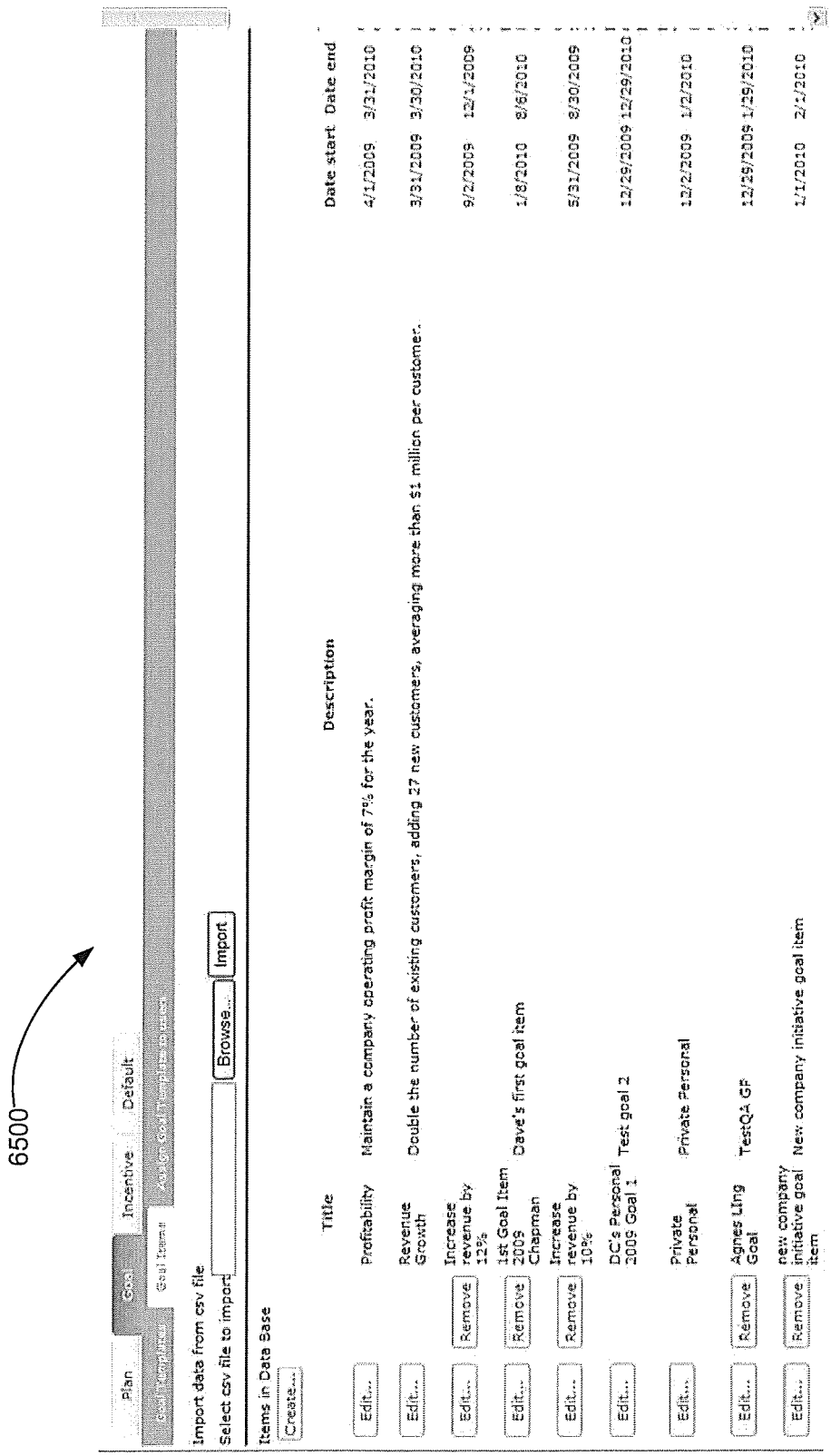
Figure 67:
Figure 68:
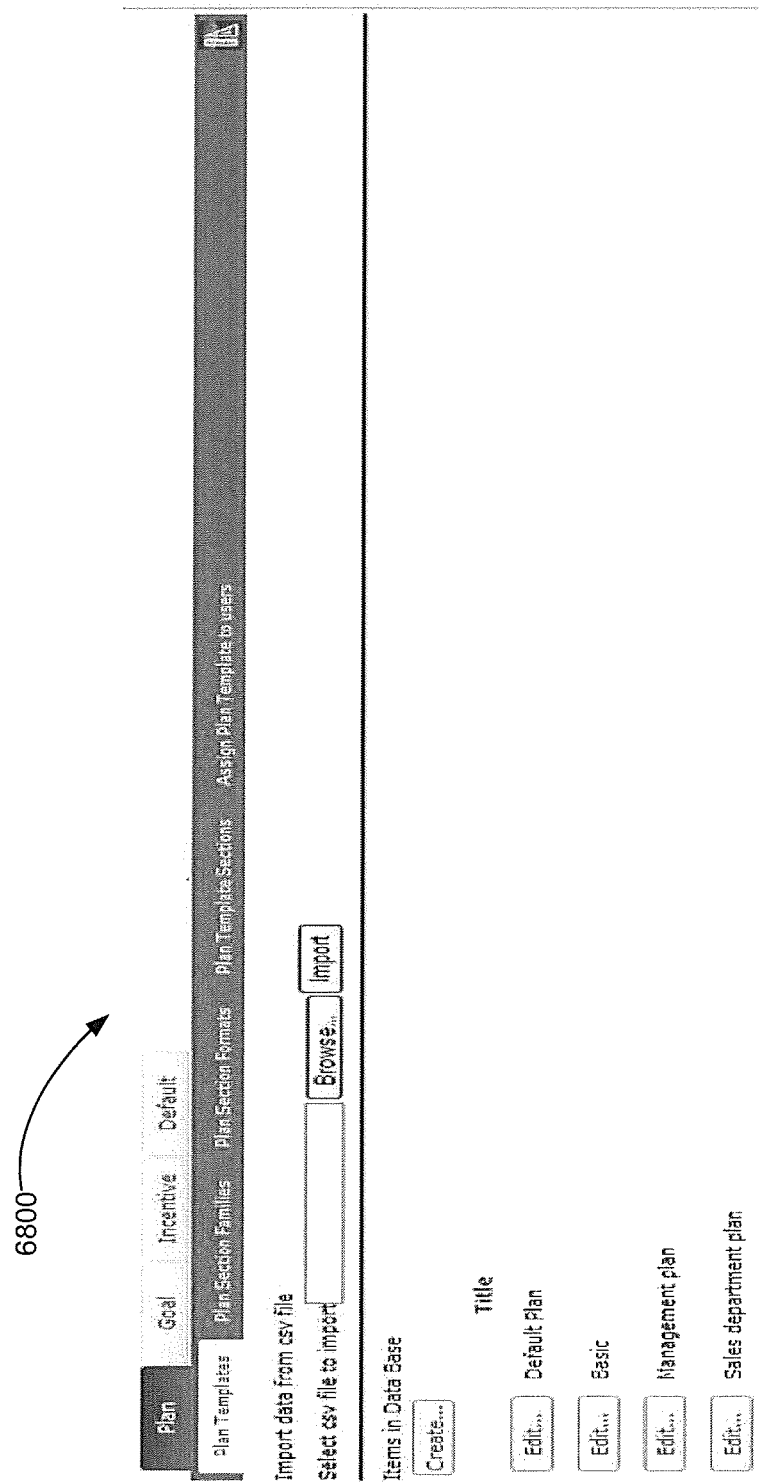
Figure 71:
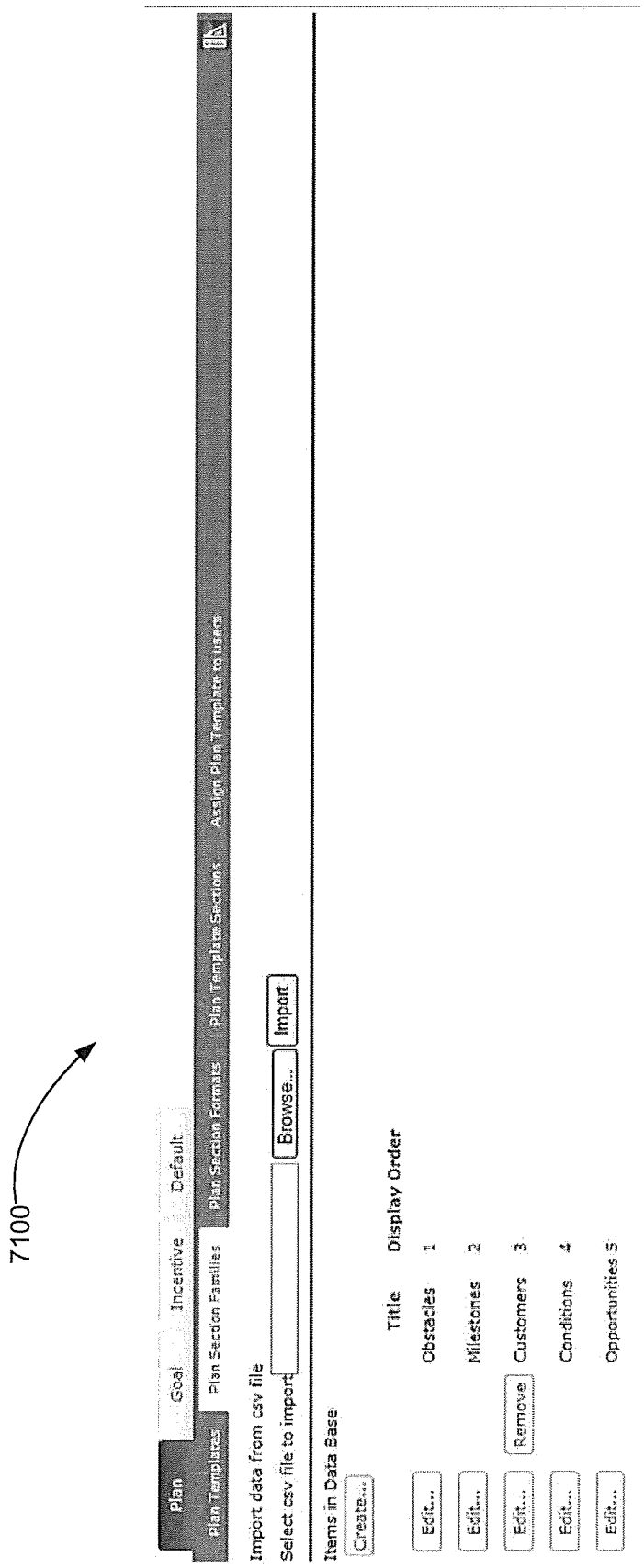
Figure 72:
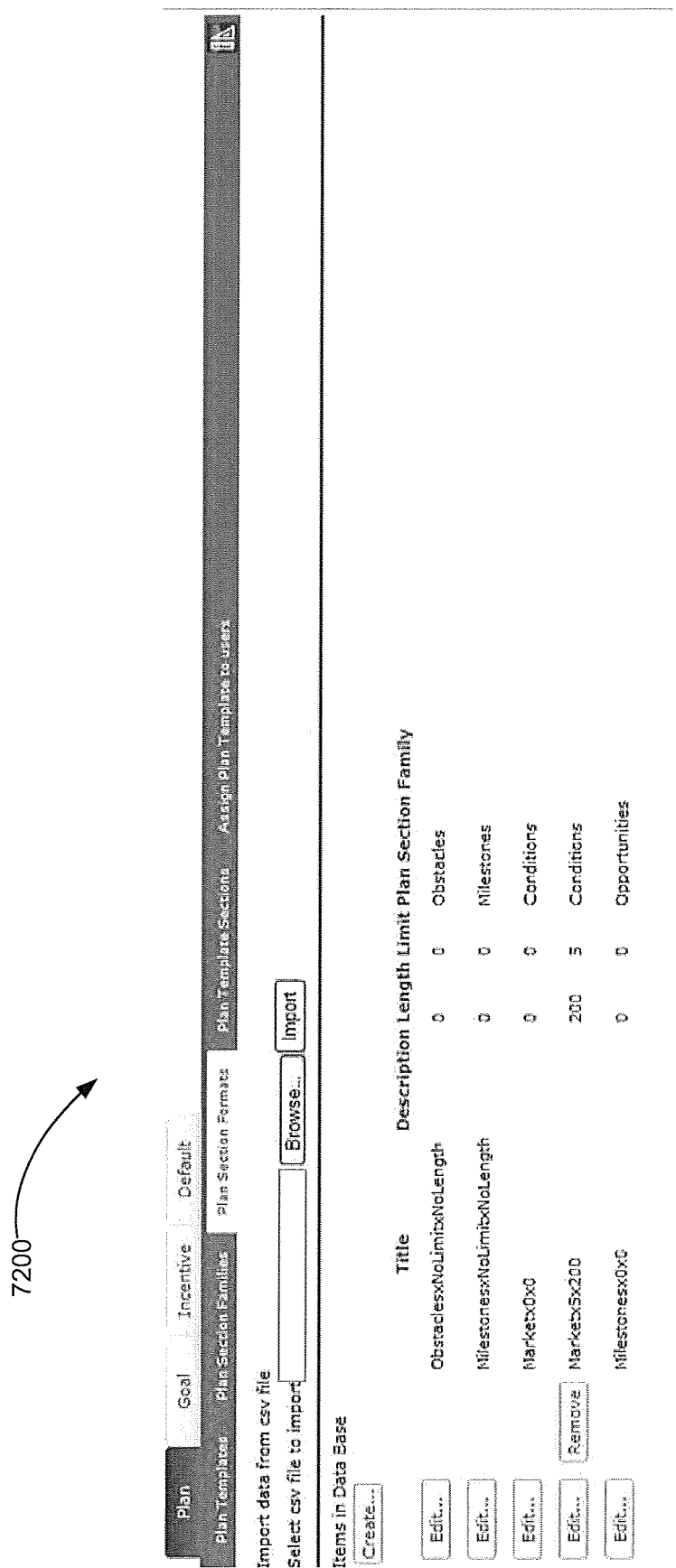
Figure 73:
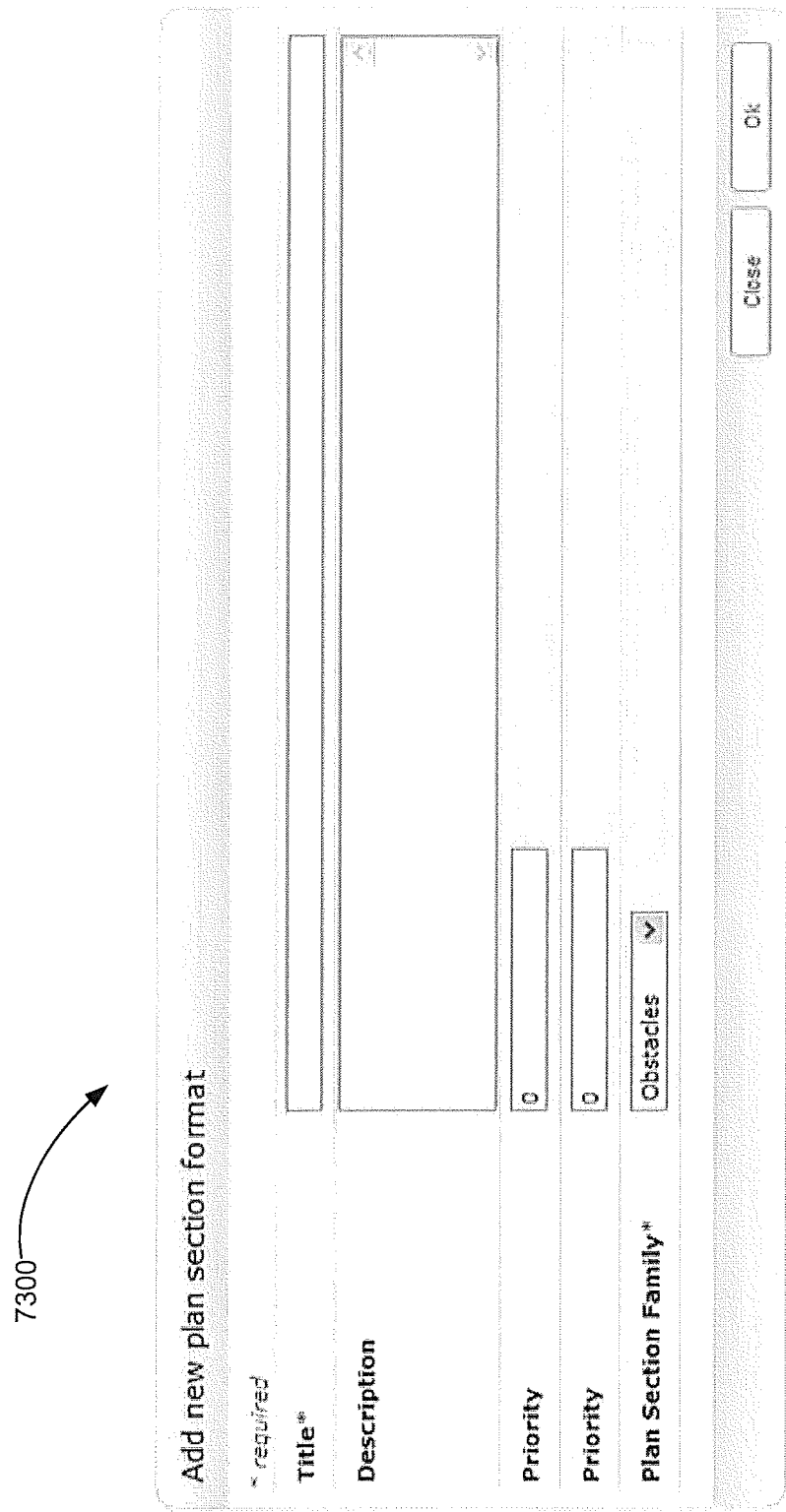
Figure 74:
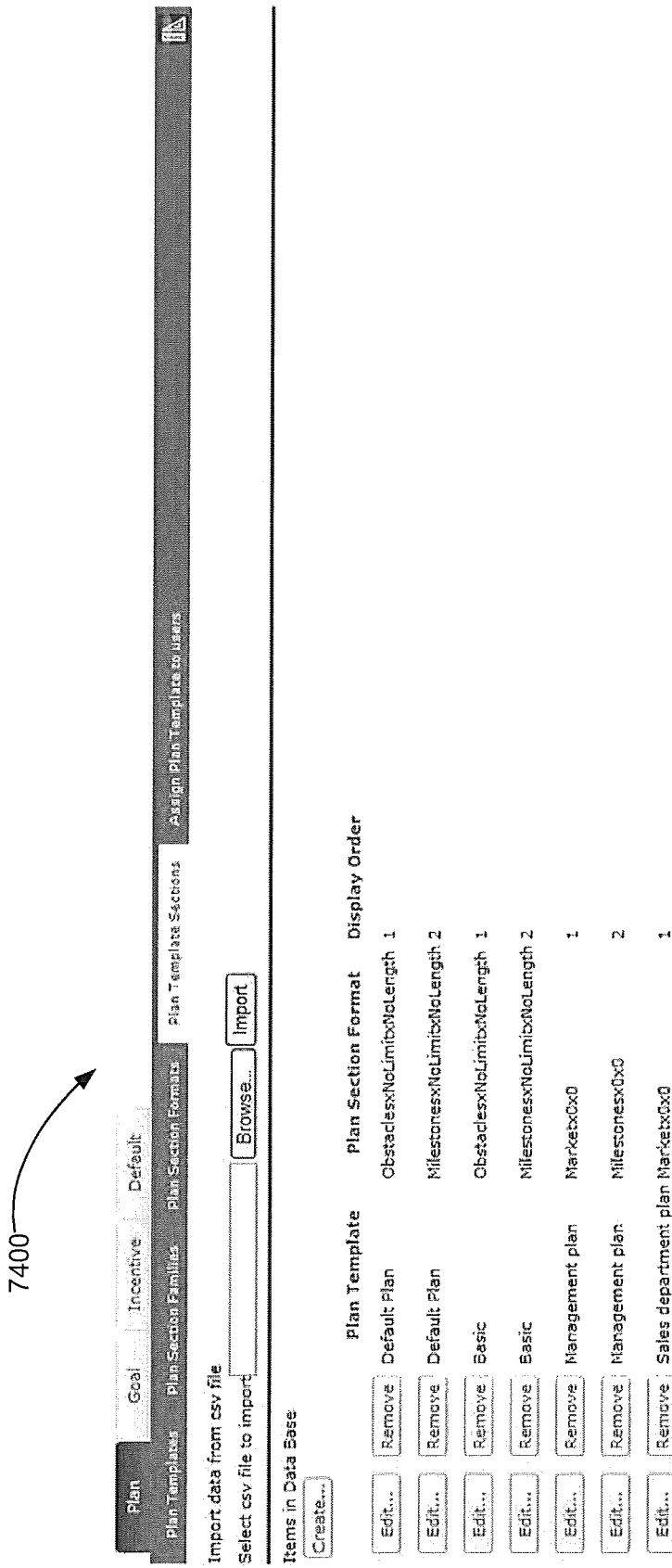
Figure 75:
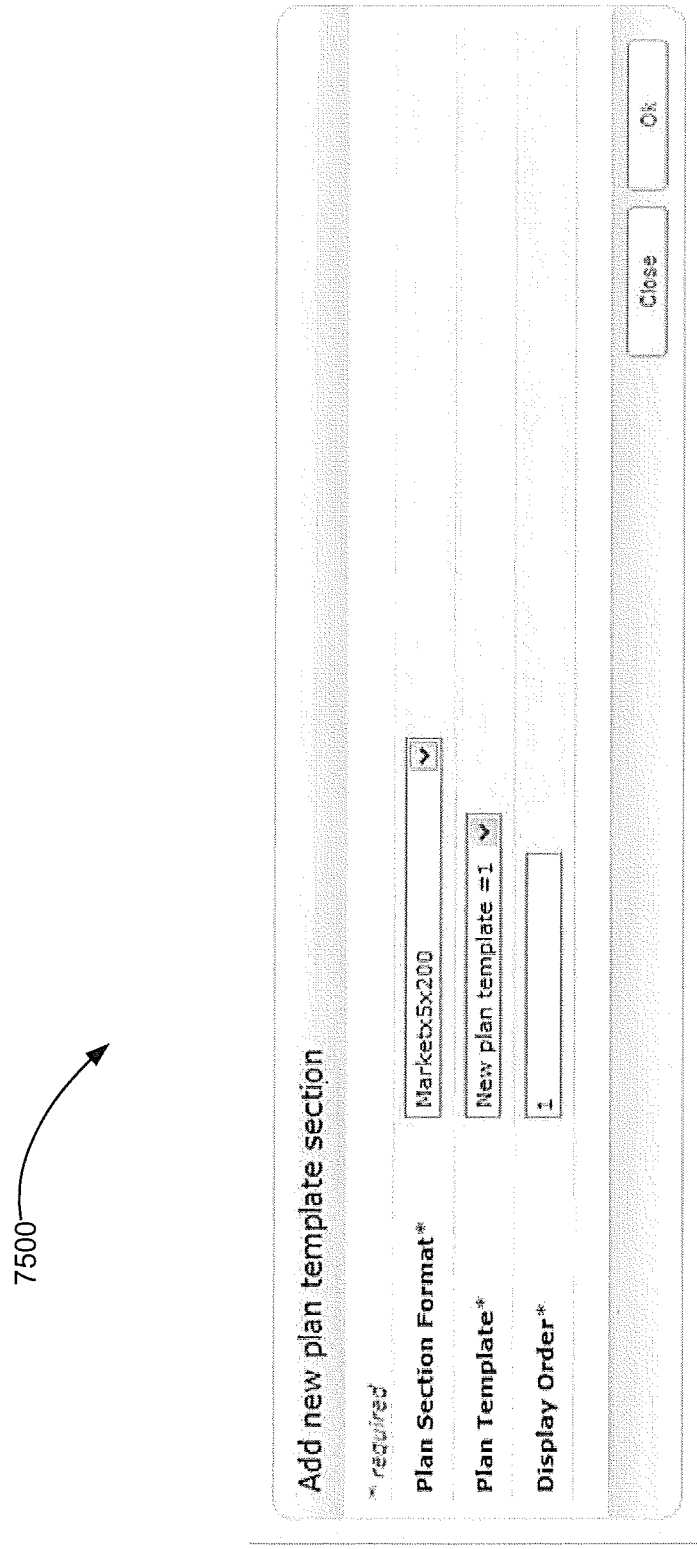
Figure 76:
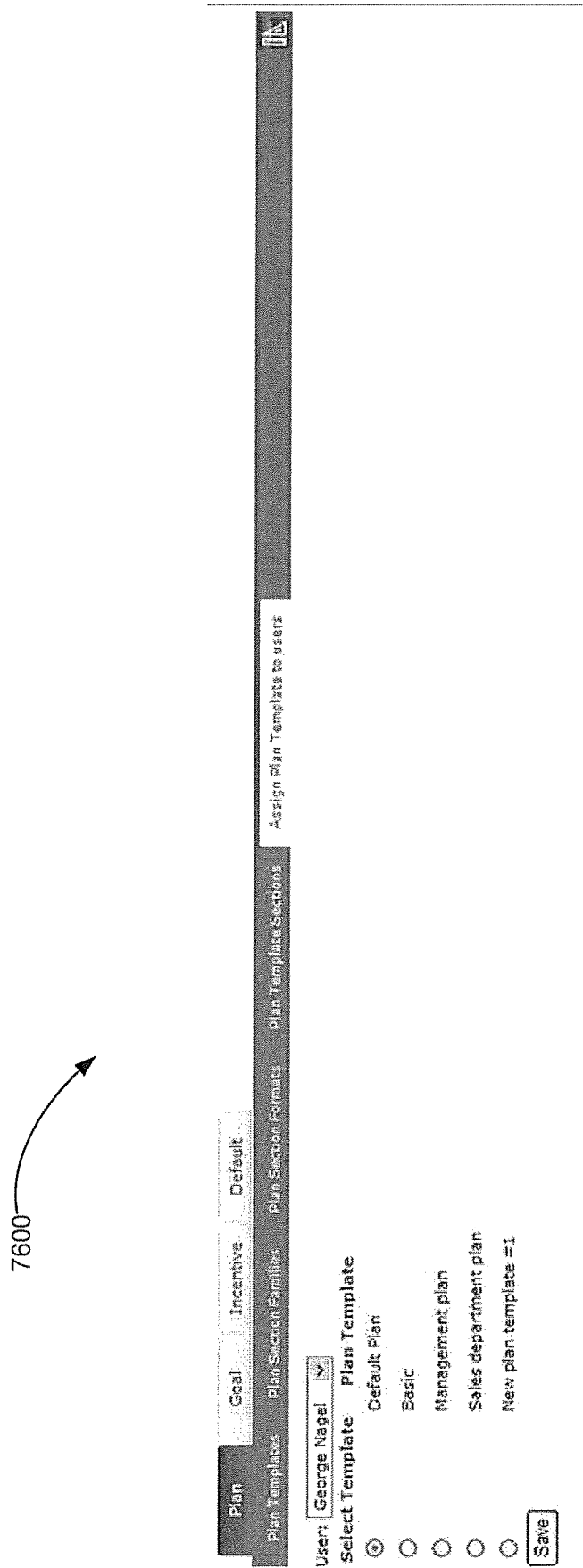
Figure 77:
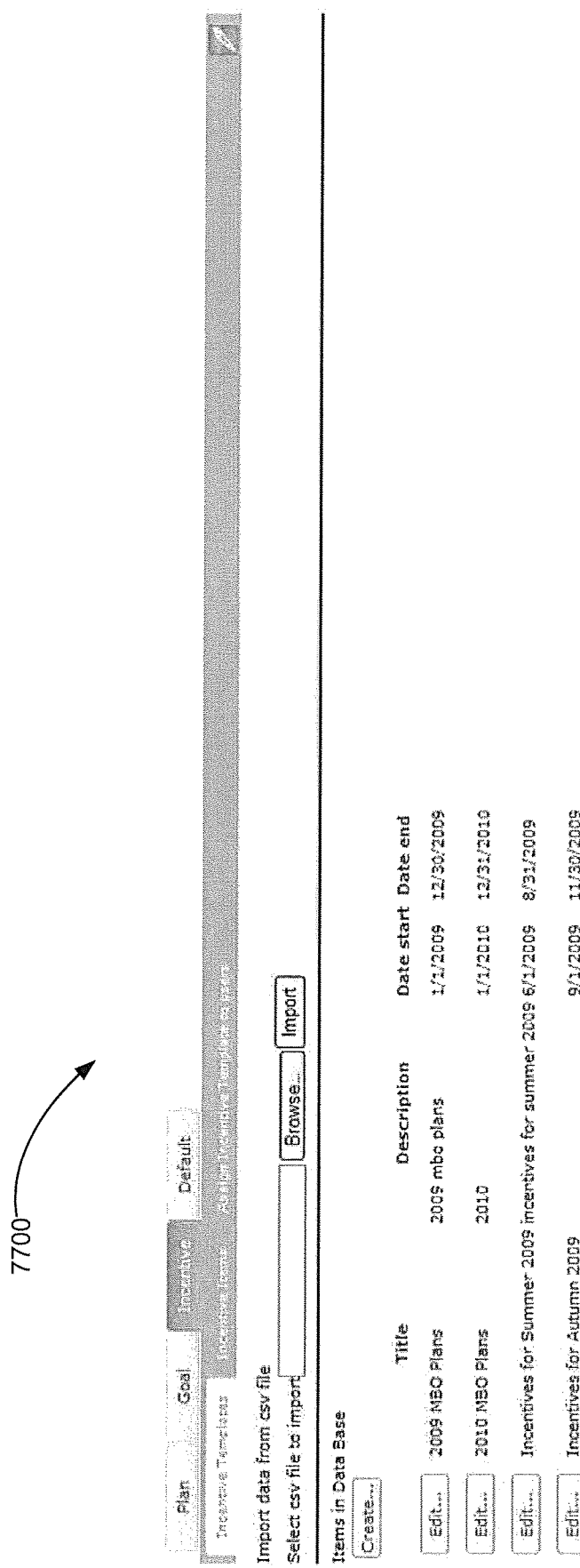
Figure 80:
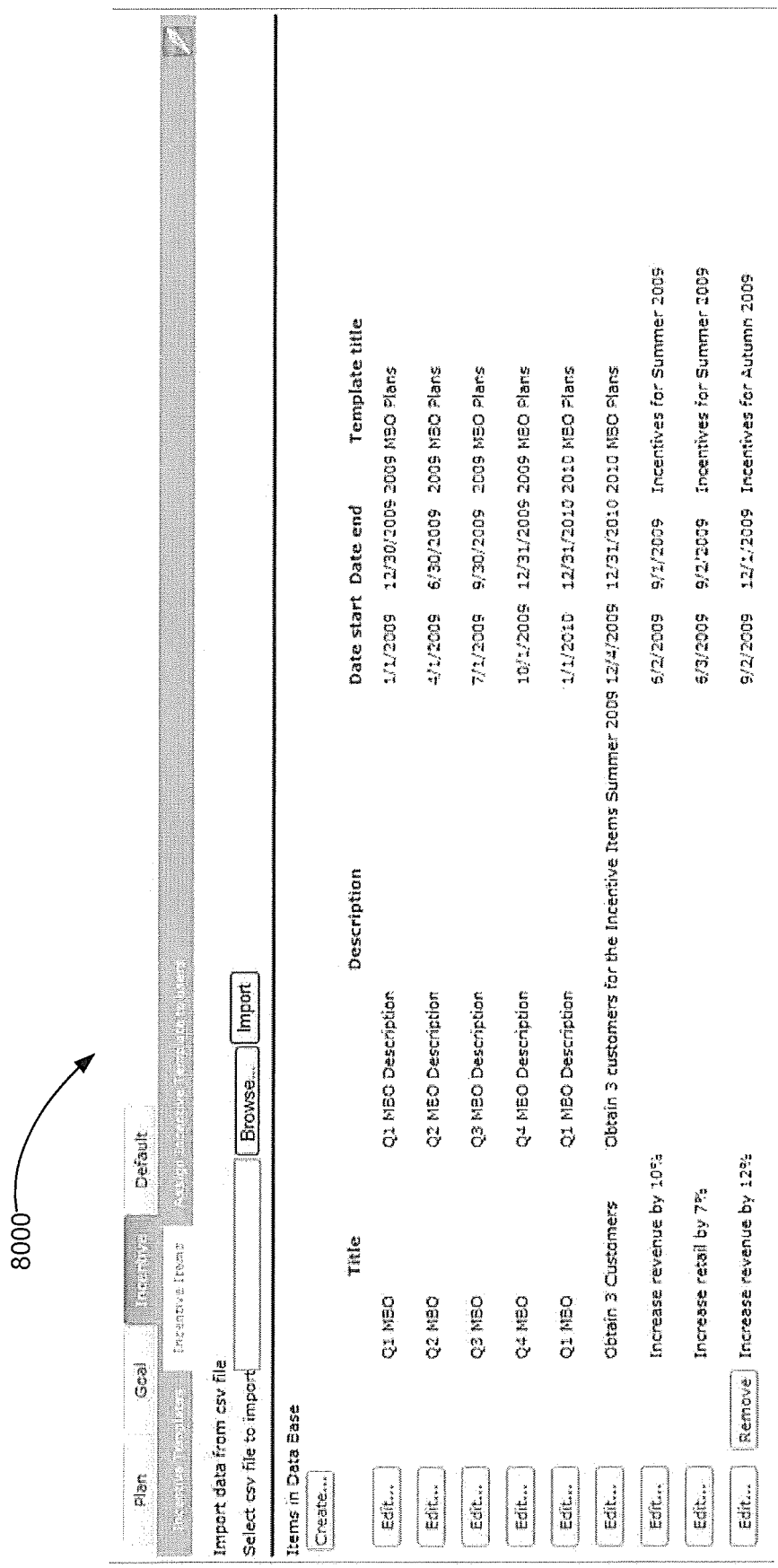

FIG. 62C illustrates a user interface 6200 including an example report, according to an example embodiment. The report may be generated by the organization device 102 or the processor device 106 of the system 100 (see FIG. 1), or may otherwise be generated.

The report is shown to display the results, indicators, and impact on a variety of scenarios based on outcome status. However, other reports may be results, indicators, and impact on a variety of scenarios based on a different attribute.

The results of the report include a total number of outcome items for a total number of users. This, as well as other information in the report, is broken down by status. An average number is also provided.

The report also includes a number of indicators. The report indicates the number of goal templates linked to each of the outcome items, whether outcome items are linked to goal items, whether outcome items are linked to other outcome items, whether outcome items are linked to obstacles, whether outcome items are linked to MBOs, and whether the outcome items have been accepted by management. These indicators may assist an organization in identifying issues and improving the likelihood of achievement. The impact of the foregoing data is computed to determine a potential for improvement.

FIG. 62C illustrates a user interface 6200, according to an example embodiment. The user interface 6200 enables the operator to view and initiation creation of a new goal template. Existing templates may be edited and new templates may be created. New goal items may also be created by use of the user interface 6200.

Figure 62D:
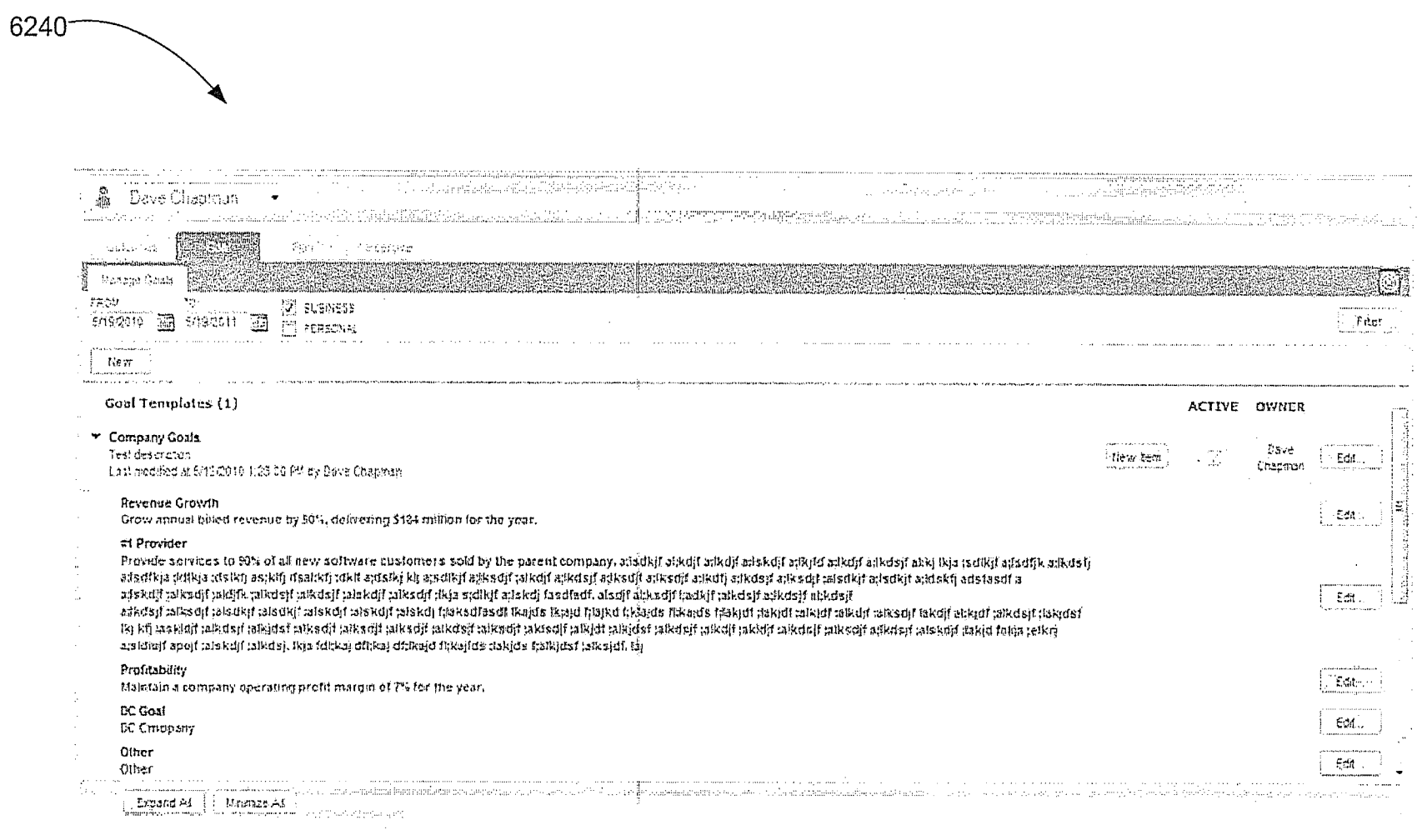
Figure 62E:
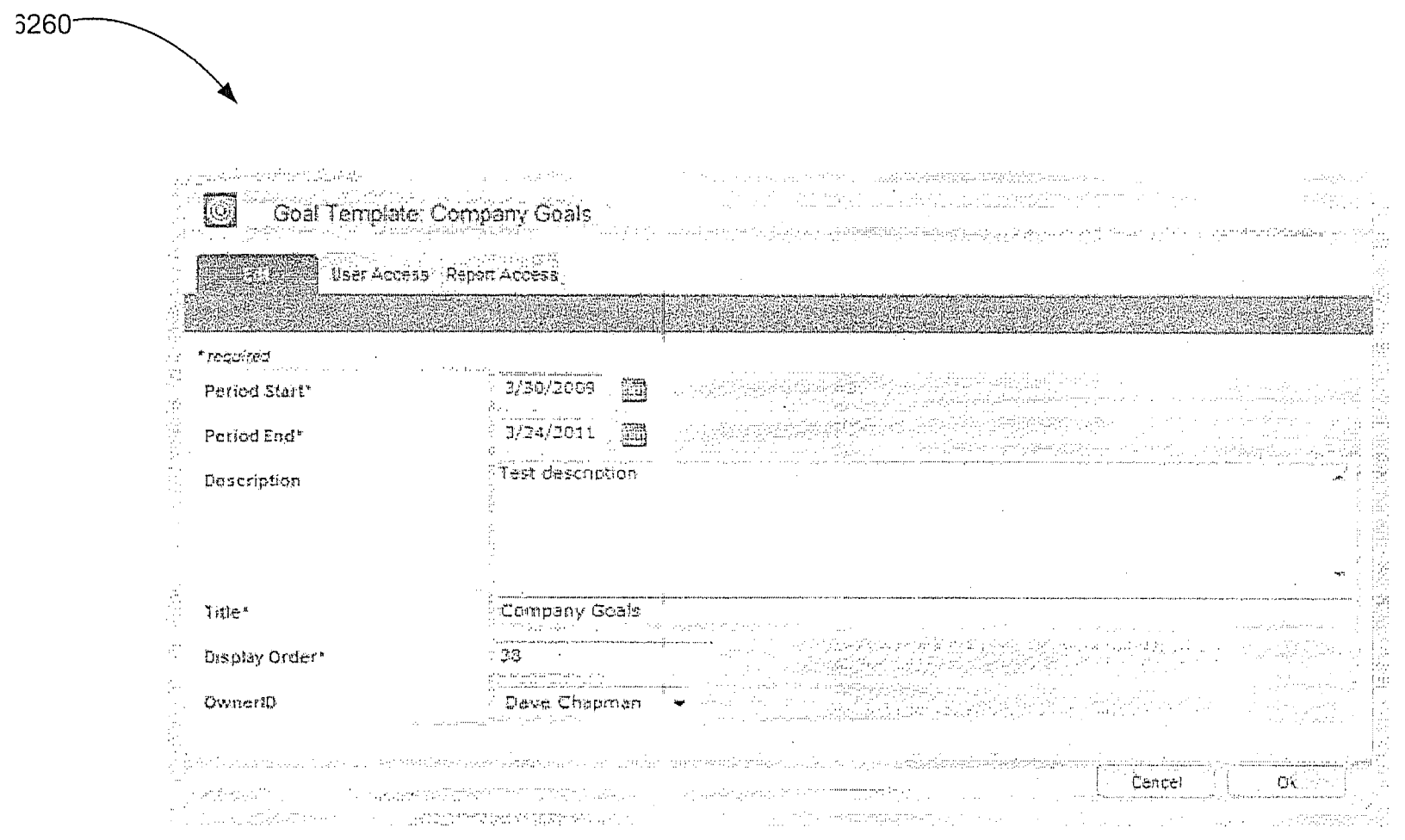

FIG. 62D illustrates a user interface 6200 including an example report, according to an example embodiment. The user interface 6200 enables the operator to create a new goal template. For example, a period start, a period end, a description, a title, a display owner, and an owner ID may be used by the user interface 6200 to create the new goal template.

FIGS. 63-81A illustrate user interfaces 6300-8100 to the configure subsystem 208, according to an example embodiment. The user interfaces 6300-8100 enables the operator to configure the system 100.

The user interface 6300 enables the operator to configure a goal template. The user interface 6400 enables the operator to add a new goal template. The user interface 6500 enables the operator to configure goal items. The user interface 6600 enables the operator to add goal items. The user interface 6700 enables the operator to assign a goal template to resources.

The user interface 6800 enables the operator to configure plan templates. The user interface 6900 enables the operator to add new plan templates.

The user interface 7000 enables the operator to add a new plan section family. The user interface 7100 enables the operator to configure plan section families.

The user interface 7200 enables the operator to configure plan section formats. The user interface 7300 enables the operator to add a new plan section format.

The user interface 7400 enables the operator to configure plan template sections. The user interface 7500 enables the operator to add a new plan template section. The user interface 7600 enables the operator to assign a plan template to resources.

The user interface 7700 enables the operator to configure incentive templates.

The user interface 7800 enables the operator to add a new incentive template. The user interface 7900 enables the operator to add a new incentive item.

The user interface 8000 enables the operator to configure incentive items. The user interface 8100 enables the operator to assign incentive templates to resources.

Figure 81A:
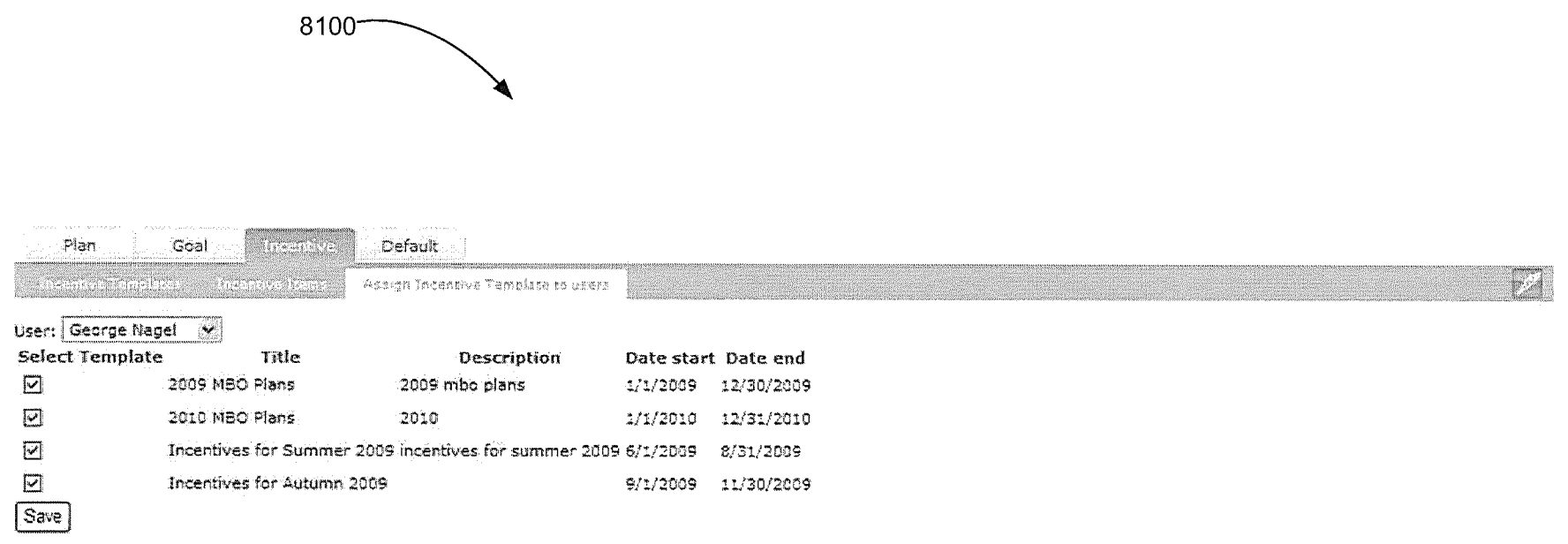
Figure 81B:
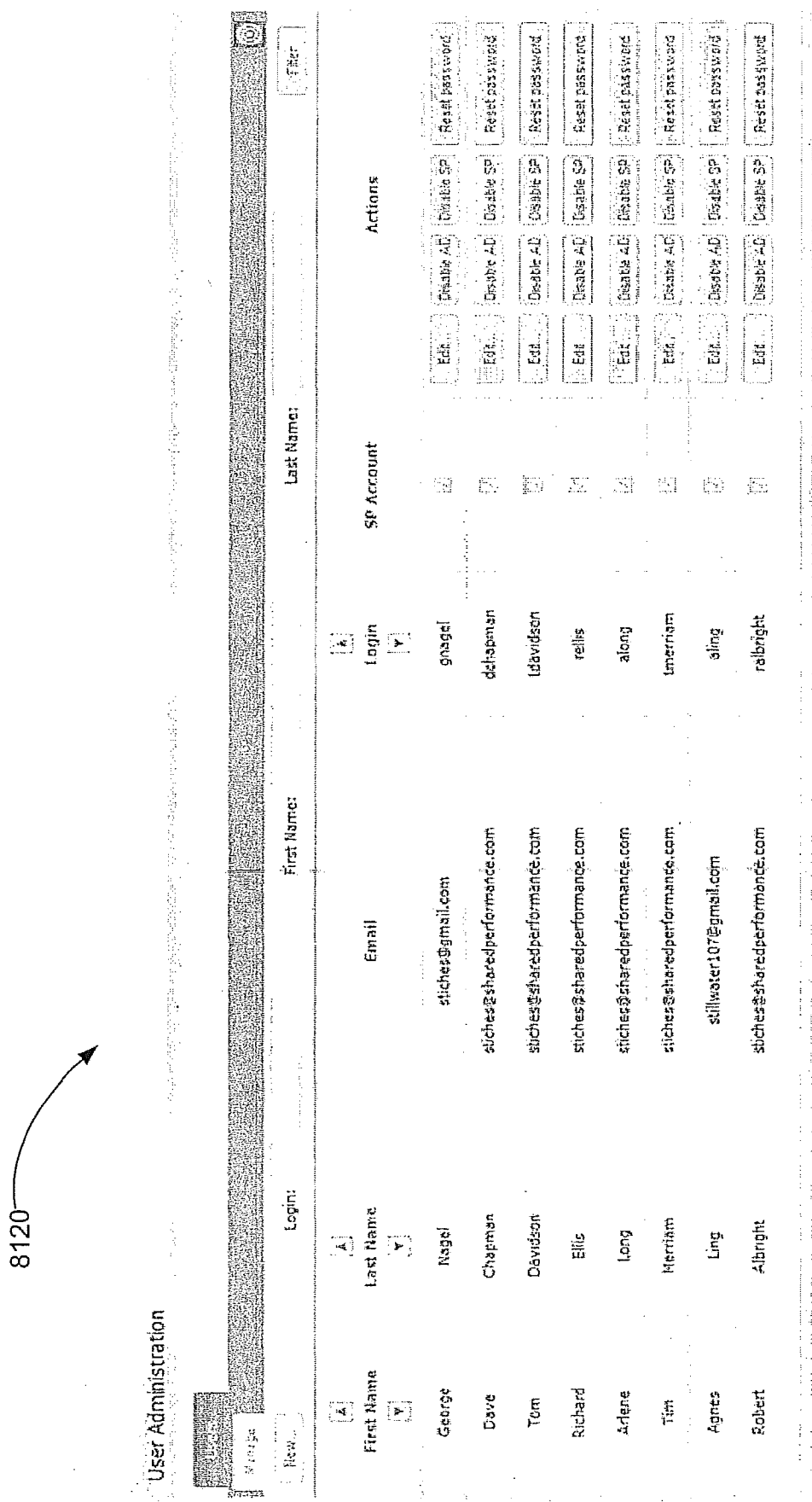

FIG. 81B illustrates a user interface 8120 to the administration subsystem 210, according to an example embodiment. The user interface 8120 enables the operator to administer users of the organization. In general, operators that have access to view the user interface 8120 have sufficient organizational authority to do so.

Through the user interface 8120, the operator can add new resources or modify attributes or access to existing resources. As shown, a first name, a last name, an e-mail address, and a login identifier are displayed for the resources of the organization. The operator can modify the access of the resources by selection of an edit button, a disable button, or a reset button. A new resources may be added by selection of a new button.

Figure 81C:
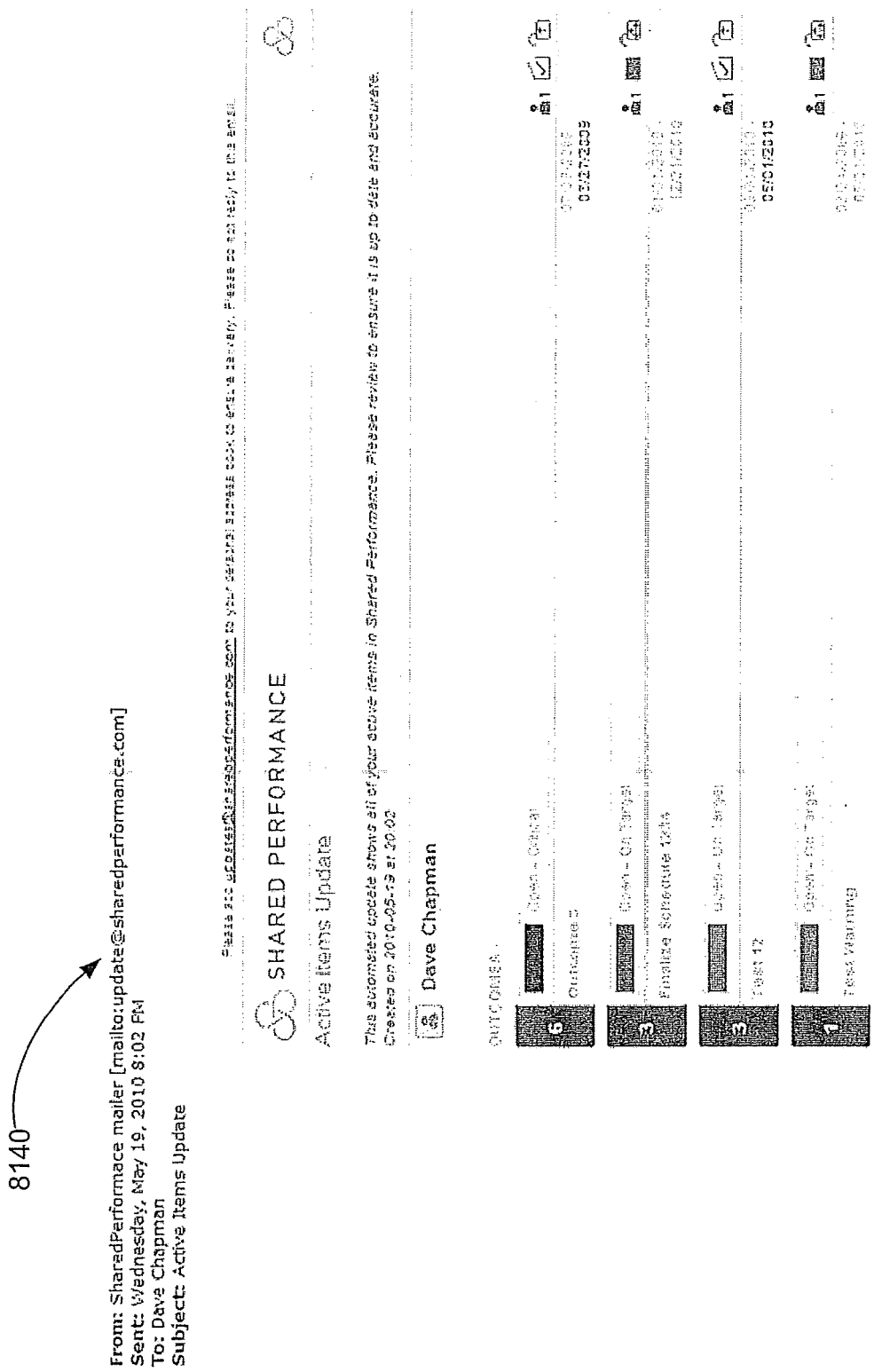

FIG. 81C illustrates a user interface 8140 to the reporting subsystem 206, according to an example embodiment. The user interface 8140 is transmitted to resources via electronic mail. In general, the user interface 8140 is sent to the resource on a periodic basis (e.g., once a week) to notify the resource of information of possible interest. The information may include notification about items that meet a certain criterion. The items may be associated with the resource, or other resources with whom the resource is connected.

Figure 81D:

FIG. 81D illustrates a user interface 8160 to the reporting subsystem 206, according to an example embodiment. The user interface 8160 is generated for display on a mobile device.

The methods and systems may be deployed on the user interface 8160 of the organization device 102 shown in FIG. 81C. The functionality associated with the methods and functions may be implemented as a lightweight, easily accessible mobile application for viewing and/or editing one's own items at any time. The functionality may support a variety of mobile development platforms including, but not limited, to WINDOWS MOBILE, BLACKBERRY, IPHONE, and ANDROID.

FIG. 82 illustrates a user interface 8200 to the reporting subsystem 206, according to an example embodiment. The user interface 8200 enables the operator to create custom reports.

The user interface 8200 includes a number of settings 8202 that may be used to create the report. The settings may include resources settings that identify a starting resource and a number of levels associated with the resource. Outcome, goals, or plans may be selected. Start and end dates may be selected. Priority may be selected. Status may be selected. Goal template may be selected. Connection may be selected. Contribution may be selected. Additional or different settings may be selected.

Once the settings 8202 are selected, a generate report button 8204 may be selected to generation the report according to the settings 8202.

Figure 83:
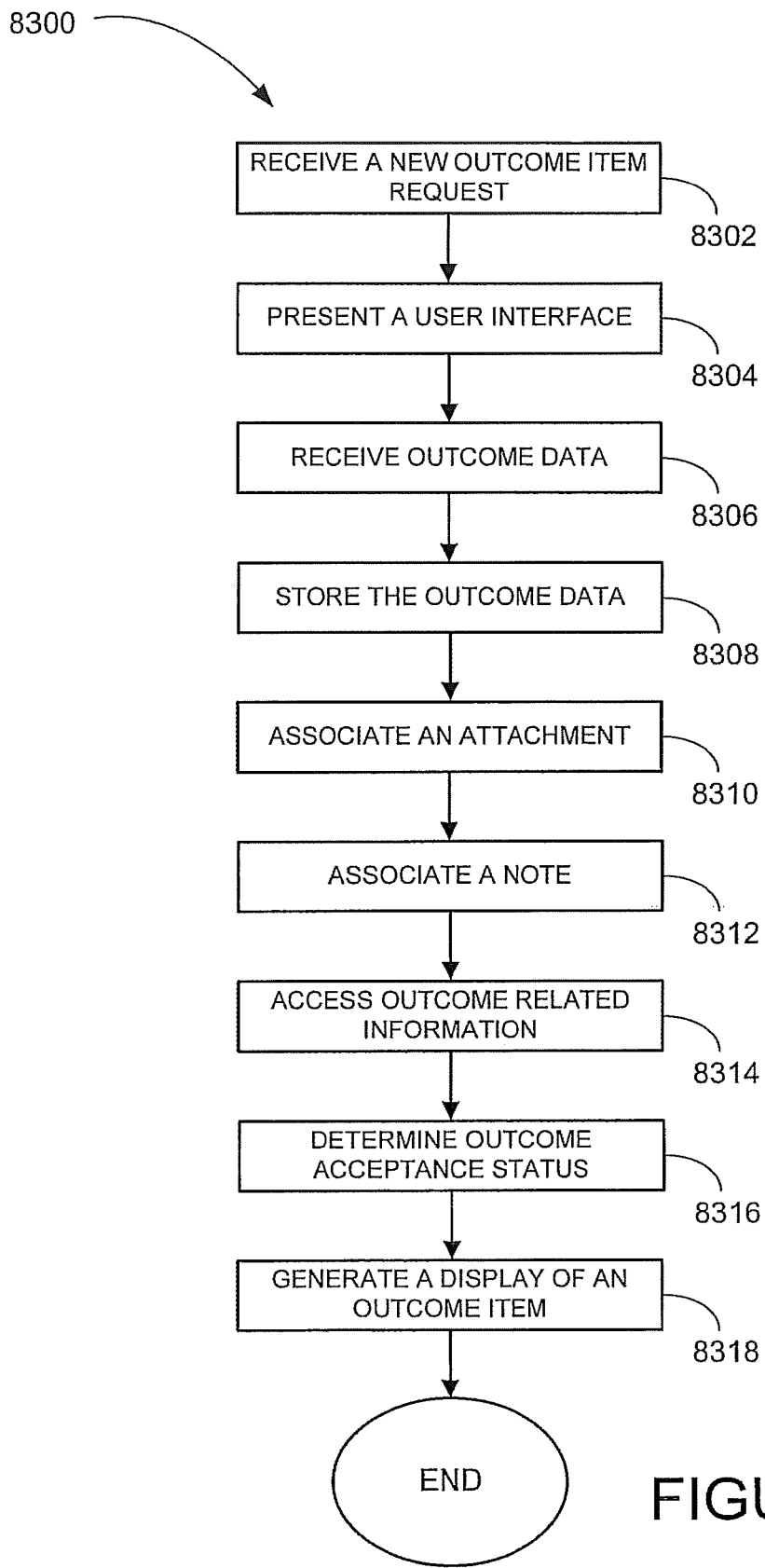
FIG. 83 is a block diagram of a flowchart illustrating a method for outcome data processing, according to an example embodiment.

FIG. 83 illustrates a method 8300 for outcome data processing according to an example embodiment. The method 8300 may be performed by the organization device 102 or the processor device 106 of the system 100 (see FIG. 1), or may otherwise be performed.

A new outcome item request may be received at block 8302. The new outcome item request may be received through a user interface, or may otherwise be received. In one embodiment, the new outcome item request may be received through the user interface 800 when the operator selects the new button 852 (see FIG. 8).

A user interface to receive outcome data may be presented at block 8304. The user interface may be populated with default outcome data. An example of the user interface populated with data is shown in the user interface 900 (see FIG. 9).

Outcome data associated with a resource is received at block 8306. The outcome data includes an outcome time period, an outcome title, an outcome priority, an outcome status, an outcome access level, an outcome description, and/or a customized field. The resource may be the operator or a different resource in the organization. Examples of resources include users and computer systems. Other types of resources may be used. The outcome time period may include an outcome period start date and an outcome period end date, an outcome period start date and an outcome duration, or may otherwise be defined.

In some embodiments, the received outcome data may include portions of the populated data and portions entered in to the user interface. In other embodiments, the received outcome data may solely include data entered in to the user interface.

The outcome data may be received through a user interface, or may otherwise be received. In one embodiment, the outcome data is received from the operator's completion of one or more of the fields of the user interface 900 and selection of the ok button 926 (see FIG. 9).

The outcome data may be received from the resource, management associated with the resource, or a proxy to the resource. In general, management is a direct manager of the resource or a manager in direct line of sight to the top of an organization hierarchy of which the resource is associated. Generally the proxy is another resource with outcome item management approval. Having outcome item management approval is the ability to manage the outcome items on behalf of another resource.

The outcome data is stored in the database 108 as a portion of the item data 112 at block 8308.

An attachment may be associated with the outcome item at block 8310. In one embodiment, the attachment may be associated through the user interface 1500 (see FIG. 15). In some embodiments, the attachment is received from the resource, management, or proxy and the association of the attachment is based on receipt of the attachment. In other embodiments, a link to the attachment is received from the resource, management, or proxy and association of the attachment is based on receipt of the link. By using a link, the attachment may be maintained in its original location without creating an additional copy for attachment.

A note may be associated with the outcome item at block 8312. The note may include a note description, a note title, a note status, and/or an active note indication. In one embodiment, the note may be received through the user interface 1800 (see FIG. 18).

In some embodiments, the note is received from the resource. In another embodiment, the note is received from an additional resource, the additional resource being a different resource than the resource, a determination of whether the additional resource is a managed connection of the resource may be made. If the additional resource is a managed connection, the association may be made. If the additional resource is not a managed connection the association may not be made.

Outcome item related information may be accessed from the outcome data at block 8314. For example, the outcome status of the outcome item, the outcome priority of the outcome item, and the outcome access level of the outcome item may be accessed.

A determination of an outcome acceptance status of the outcome item may be made at block 8316. In one embodiment, the determination includes analyzing the history data 114 associated with the outcome item.

A display of an outcome item associated with the resource may be generated at block 8318 based on at least a portion of the outcome data. The outcome item represents the outcome for the resource (e.g., the operator). Examples of displays of the outcome item include the user interfaces 1100, 1400, 1600, 1900 (see FIGS. 11, 14, 16, and 19). The display of the outcome item may also be presented along with other items in the user interfaces.

The display of the outcome item may include, by way of example the outcome status, an outcome status visual indicator, the outcome priority, the outcome title, an acceptance status indicator, an access level indicator, the outcome time period, indicia that the attachment is associated with the outcome item, and/or indicia that the note is associated with the outcome item. Other indicia relating to display elements (e.g., outcome status, outcome priority, access level, acceptance status, etc.) may be displayed in addition to or instead of the display elements. The indicia may be in the form of a button, an indicator, highlighting of the item, modifying the color of the item or may otherwise be indicated on the display.

In some embodiments, a determination of a number of times that the outcome item has been accepted by management associated with the resource may be performed. The display may then indicate the number of times that the outcome item has been accepted by the management along with the indicia of the acceptance status of the outcome item.

In some embodiments, a determination of a presence of a location pointer associated with an interface device (e.g., of the organization device 102) in proximity to the indicia that the attachment is associated with the outcome item may be made. The display of the outcome item generated at block 8318 may then include a name of the attachment in proximity to the indicia that the attachment is associated with the outcome item.

In some embodiments, a determination of a presence of a location pointer associated with an interface device in proximity to the indicia that the note is associated with the outcome item may be made. A determination made then be made as to whether the note is an active note. The display of the outcome item generated at block 8318 may then include the note title in proximity to the indicia that the note is associated with the outcome item when the note is an active note.

In some embodiments, a determination of the note status of the note may be made. The color may then be selected for note title display based on the note status. For example, the color red may be used to indicate critical status and the color blue may indicate non-critical status. Other color schemes involving two colors or more than two colors may be used.

In some embodiments, a determination of whether an additional item is included by filter settings may be made based on a determination that the additional item is linked to the outcome item. The display of the additional item may then include indicia of the determination that the additional item is linked, the additional item connection number, and indicia of a result of a determination of whether the additional item is included by filter settings.

In some embodiments, a determination that a manager of the resource has accepted the outcome item may be made. The display of the outcome item may then include indicia that the manager of the resource has accepted the outcome item.

In some embodiments, a display of an additional outcome item may be generated. The generation of the display of the outcome item and the additional outcome item may be for a same user interface. A determination of whether the additional outcome item is linked to the outcome item may be made. The display of the additional outcome item may include indicia of a determination of whether the additional outcome item is linked to the outcome item.

In some embodiments, an additional item display may be generated. The additional item display may include display of an additional item. The display of the outcome item may be presented in a first pane of a user interface. The additional display may be presented in a second pane of the same user interface. A determination that the additional item is linked to the outcome item may be made. The display of the outcome item may include indicia of a determination that the additional item is linked and the display of the additional item includes the indicia of the determination that the additional item is linked.

In some embodiments, an additional item connection number between additional items associated with an item type of the second pane and a second pane resource may be determined. The display of the outcome item may then include the indicia of the determination that the additional item is linked and the additional item connection number.

In some embodiments, a determination of a resource connection number associated with the resource may be made. A resource connection may be associated with the resource connection number being a link from an item associated with additional resource to the outcome item or a link from the outcome item to the item associated with the additional resource. The display may then include resource connection indicia and the resource connection number.

In some embodiments, a determination of a presence of a location pointer associated with an interface device in proximity to the resource connection indicia may be made. The display of the outcome item may then include the resource connection indicia, the resource connection number, identification of the resource connection, and identification of whether the link is from the item to the outcome item or the link from the outcome item to the item based on a determination of the presence of the location pointer.

In some embodiments, the method 8300 may include receiving task data associated with the outcome data. The task data defines multiple tasks to achieve the outcome. Some or all of these tasks may then be assigned to the resource.

Figure 84:
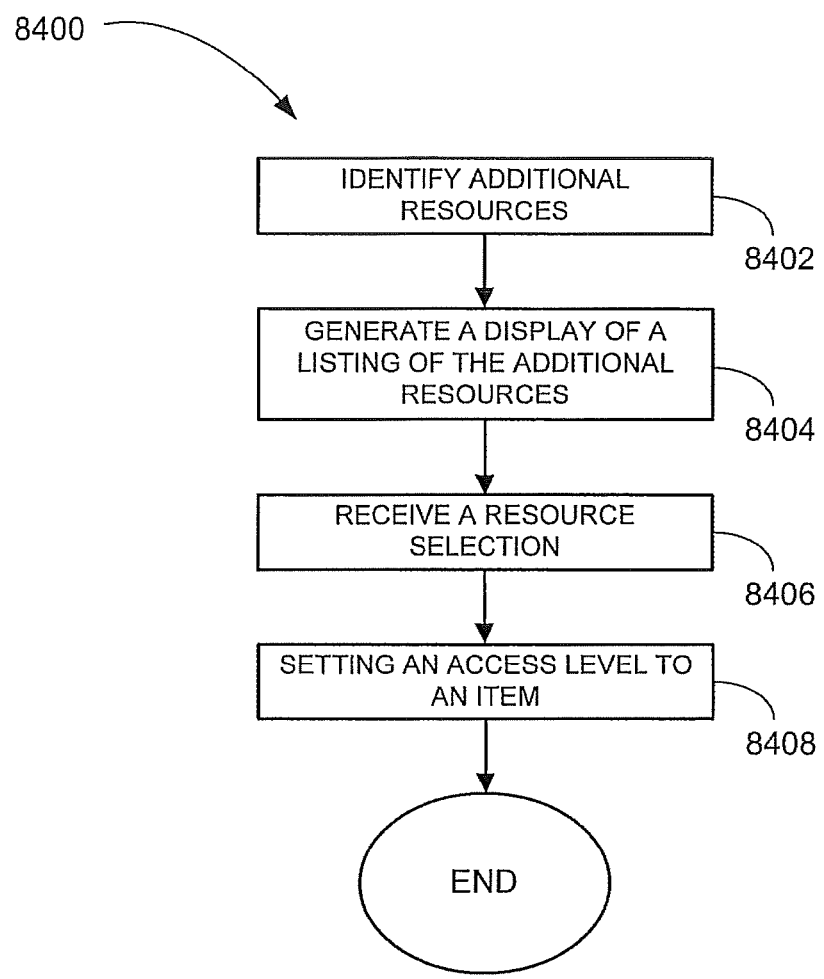
FIG. 84 is a block diagram of a flowchart illustrating a method for access setting, according to an example embodiment.

FIG. 84 illustrates a method 8400 for access setting according to an example embodiment. The method 8400 may be performed by the organization device 102 or the processor device 106 of the system 100 (see FIG. 1), or may otherwise be performed.

A portion of additional resources that report to the resource is identified at block 8402.

A display of a listing of the additional resources is generated at block 8404. In some embodiments, the display includes indicia that the portion of the resources report to the resource.

A resource selection is received at block 8406. The resource selection identifies the resources that the operator, management, or proxy designates access to an item (e.g., the outcome item.

An access level for the item is set at block 8408 based on receipt of the resource selection. The access level defines that a single additional resource or multiple additional resources have access to the item associated with the resource.

Figure 85:
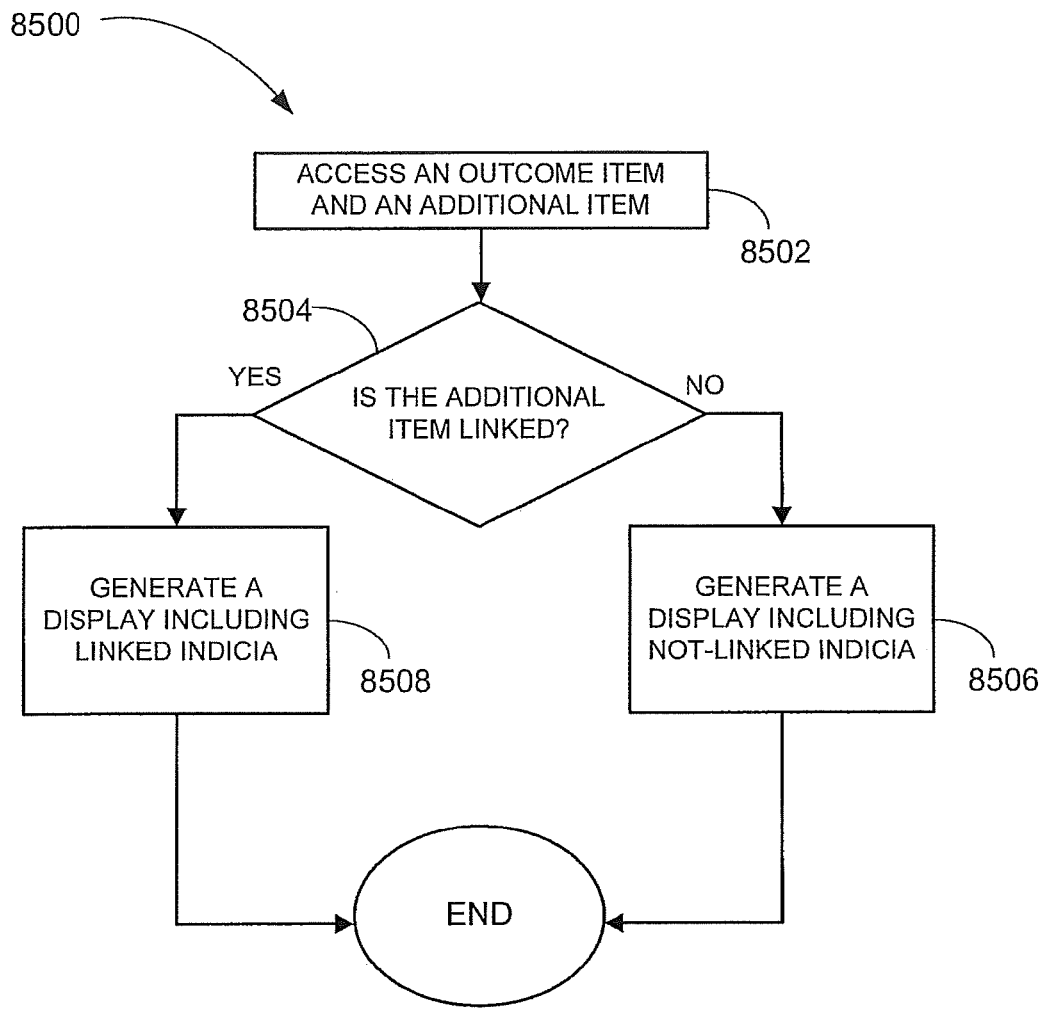
FIG. 85 is a block diagram of a flowchart illustrating a method for generating a display, according to an example embodiment.

FIG. 85 illustrates a method 8500 for generating a display according to an example embodiment. The method 8500 may be performed by the organization device 102 or the processor device 106 of the system 100 (see FIG. 1), or may otherwise be performed.

An outcome item and an additional item are accessed at block 8502.

At decision block 8504, a determination of whether the additional item is linked to the outcome item is made. If a determination is made that the additional item is not linked, a display of the outcome item and the additional item is generated at block 8506 and includes not-linked indicia (e.g., indicia of a determination of that the additional outcome item is not linked to the outcome item). If a determination is made at decision block 8504 that the additional item is linked, the display of the outcome item and the additional item is generated at block 8508 and includes link indicia (e.g., indicia of a determination of that the additional outcome item is linked to the outcome item).

Figure 86:
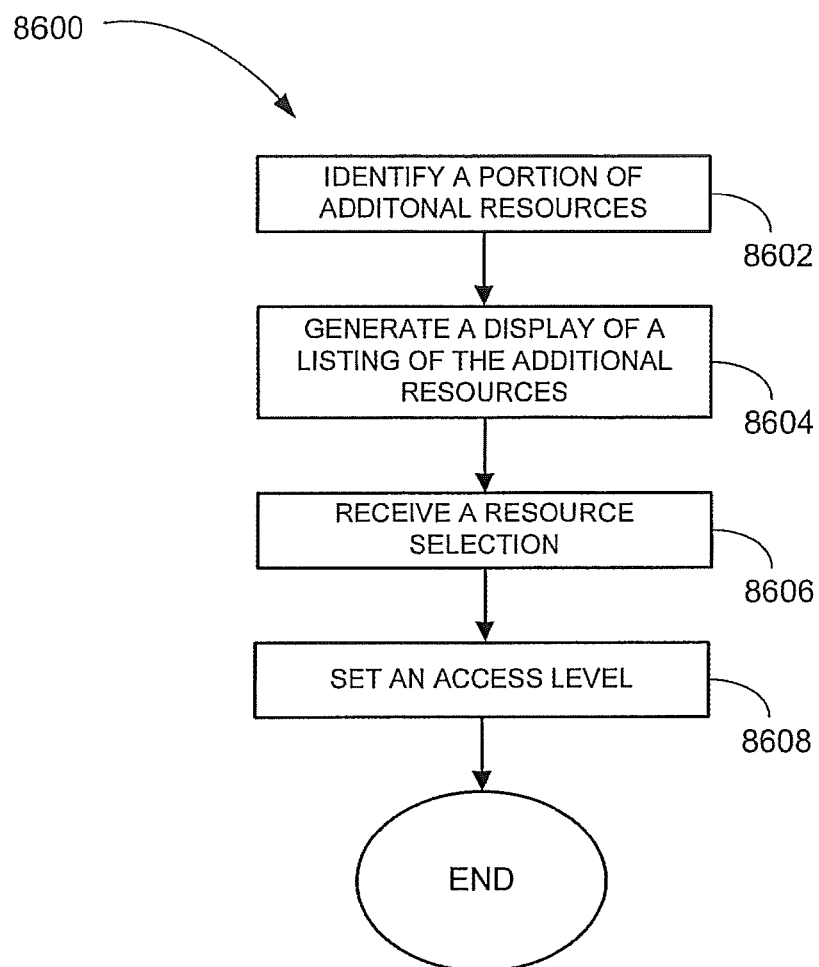
FIG. 86 is a block diagram of a flowchart illustrating a method for setting a custom access level, according to an example embodiment.

FIG. 86 illustrates a method 8600 for setting a custom access level according to an example embodiment. The method 8600 may be performed by the organization device 102 or the processor device 106 of the system 100 (see FIG. 1), or may otherwise be performed.

A portion of additional resources in an organization that report to the resource are identified at block 8602.

A display of a listing of the additional resources of the organization is generated at block 8604. For example, the user interface 1000 (see FIG. 10) includes an example display. In some embodiments, the display includes indicia for a portion of the additional resources that report to the resource.

A resource selection is received at block 8606. The resource selection may include a single additional resource or multiple additional resources in the listing. Additional resources may be added to or removed from the list of resources permitted to access the outcome item.

The access level to the outcome item may be set at block 8608 based on receipt of the additional resources selection.

Figure 87:
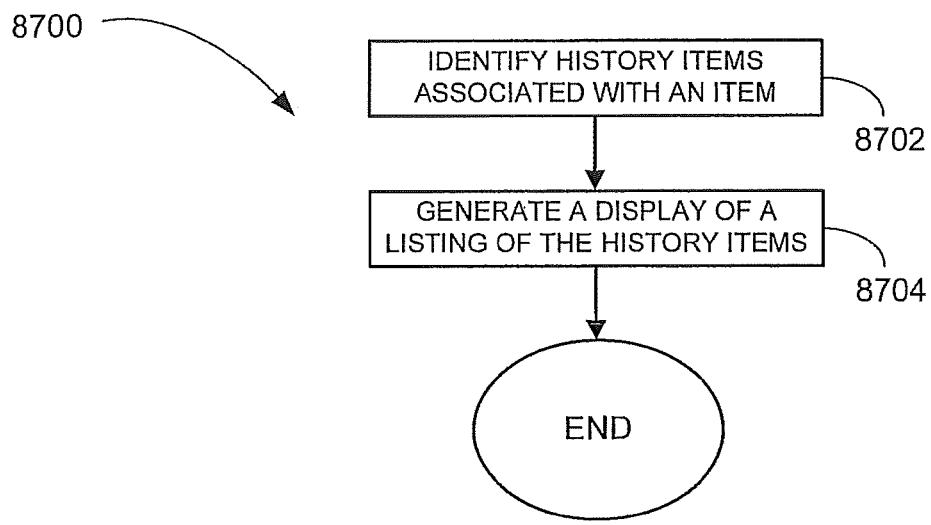
FIG. 87 is a block diagram of a flowchart illustrating a method for viewing item history, according to an example embodiment.

FIG. 87 illustrates a method 8700 for viewing item history according to an example embodiment. The method 8700 may be performed by the organization device 102 or the processor device 106 of the system 100 (see FIG. 1), or may otherwise be performed.

At block 8702, history items associated with an item are identified. Each history may include a field of the item, a value included in the field, identification of a value providing resource associated with causing the value to be included in the field, and a date when the value was included in the field. In one embodiment, the value providing resource is the resource. In another embodiment, the value providing resource is a different resource.

A display including a listing of the history items may be generated at block 8704. An example of a display including a list of the history items associated with an outcome item is shown in the user interface 2200 (see FIG. 22). An example of a display including a list of the history items associated with a goal item is shown in the user interface 3000 (see FIG. 30). The history of other items may also be displayed by the use of the method 8700.

Figure 88:
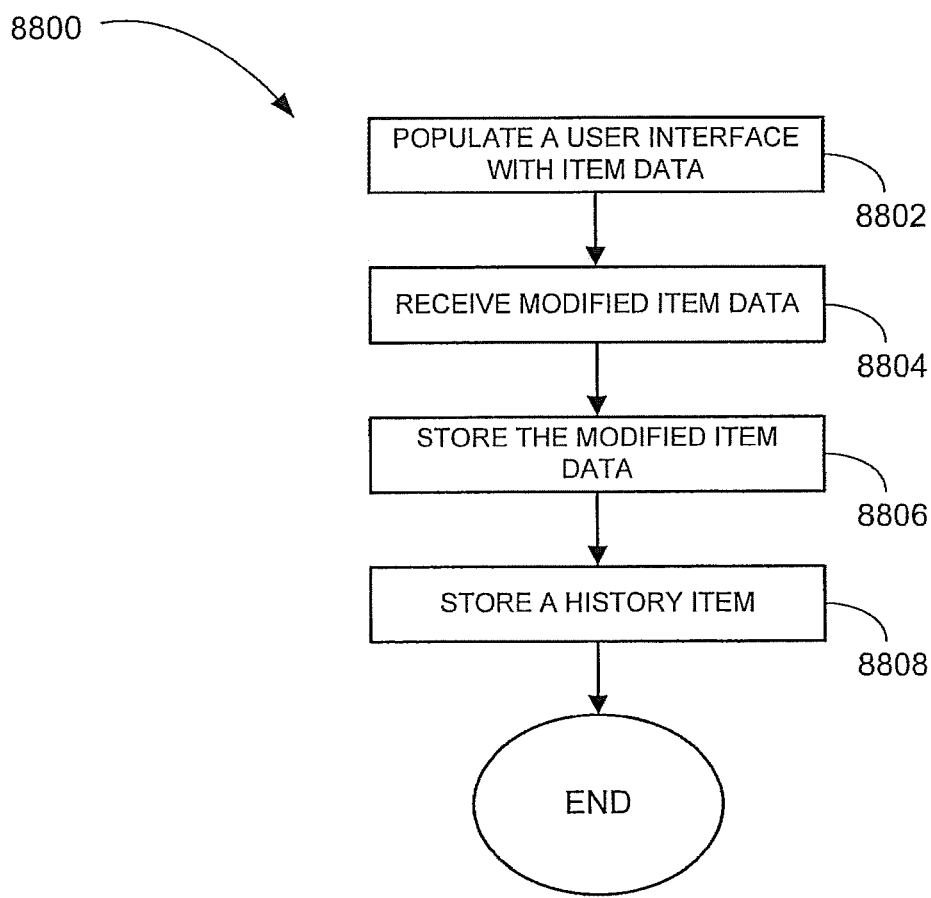
FIG. 88 is a block diagram of a flowchart illustrating a method for item modification, according to an example embodiment.

FIG. 88 illustrates a method 8800 for item modification according to an example embodiment. The method 8800 may be performed by the organization device 102 or the processor device 106 of the system 100 (see FIG. 1), or may otherwise be performed.

A user interface is populated with the item data (e.g., an outcome item) at block 8802. Modified item data associated with the resource is received at block 8804. The modified item data may be received through the user interface, or may otherwise be received. At block 8806, the modified item data may be stored as a portion of the item data 112 in the database 108.

A history item may be stored as a portion of the history data 114 in the database 108 at block 8808. The history item may include identification of a field with changed data between the item data and the modified item data, a value in the field, identification of a value providing resource associated with causing the value to be included in the field, and a date when the value was included in the field.

Figure 89:
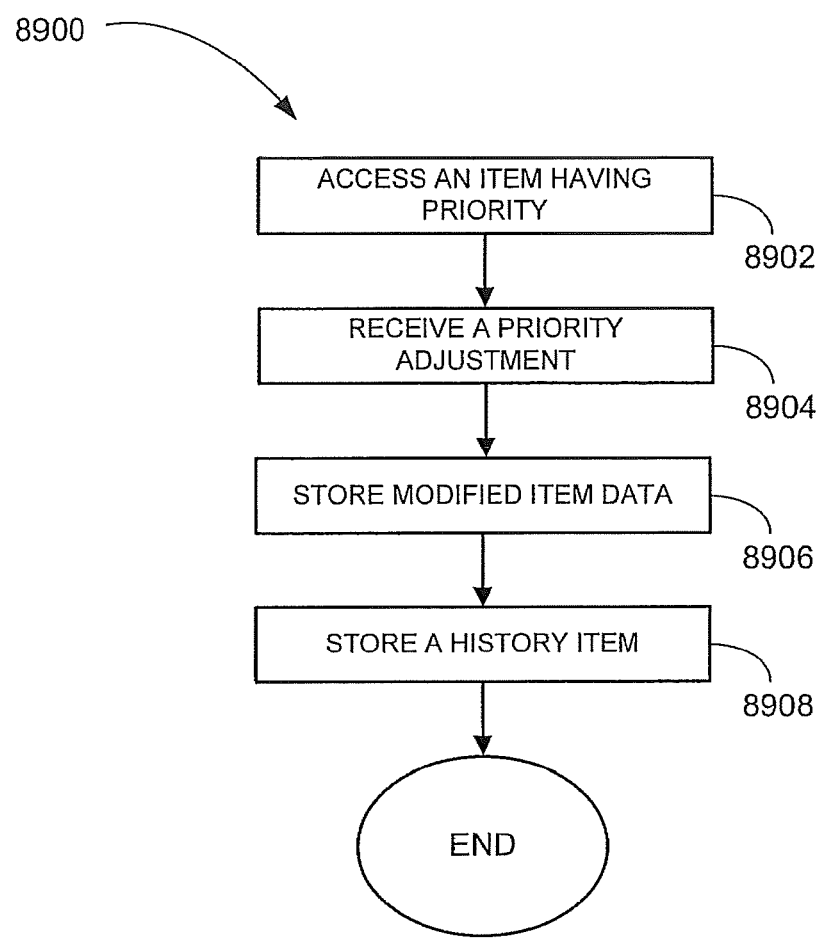
FIG. 89 is a block diagram of a flowchart illustrating a method for priority adjustment, according to an example embodiment.

FIG. 89 illustrates a method 8900 for priority adjustment according to an example embodiment. The method 8900 may be performed by the organization device 102 or the processor device 106 of the system 100 (see FIG. 1), or may otherwise be performed.

An item (e.g., an outcome item) having a priority is accessed at block 8902. A priority adjustment is received to the priority of the item at block 8904. The priority adjustment may be received through a user interface, or may otherwise be received. Modified item data of the item that reflects the change in priority is stored in the database 108 at block 8906. A history item that reflects the change in priority may be stored in the database 108 at block 8908. The history item including identification of the priority field as having changed priority data, the change priority value in the field, identification of the value providing resource associated with causing the value to be included in the field, and a date when the value was included in the field.

Figure 90:
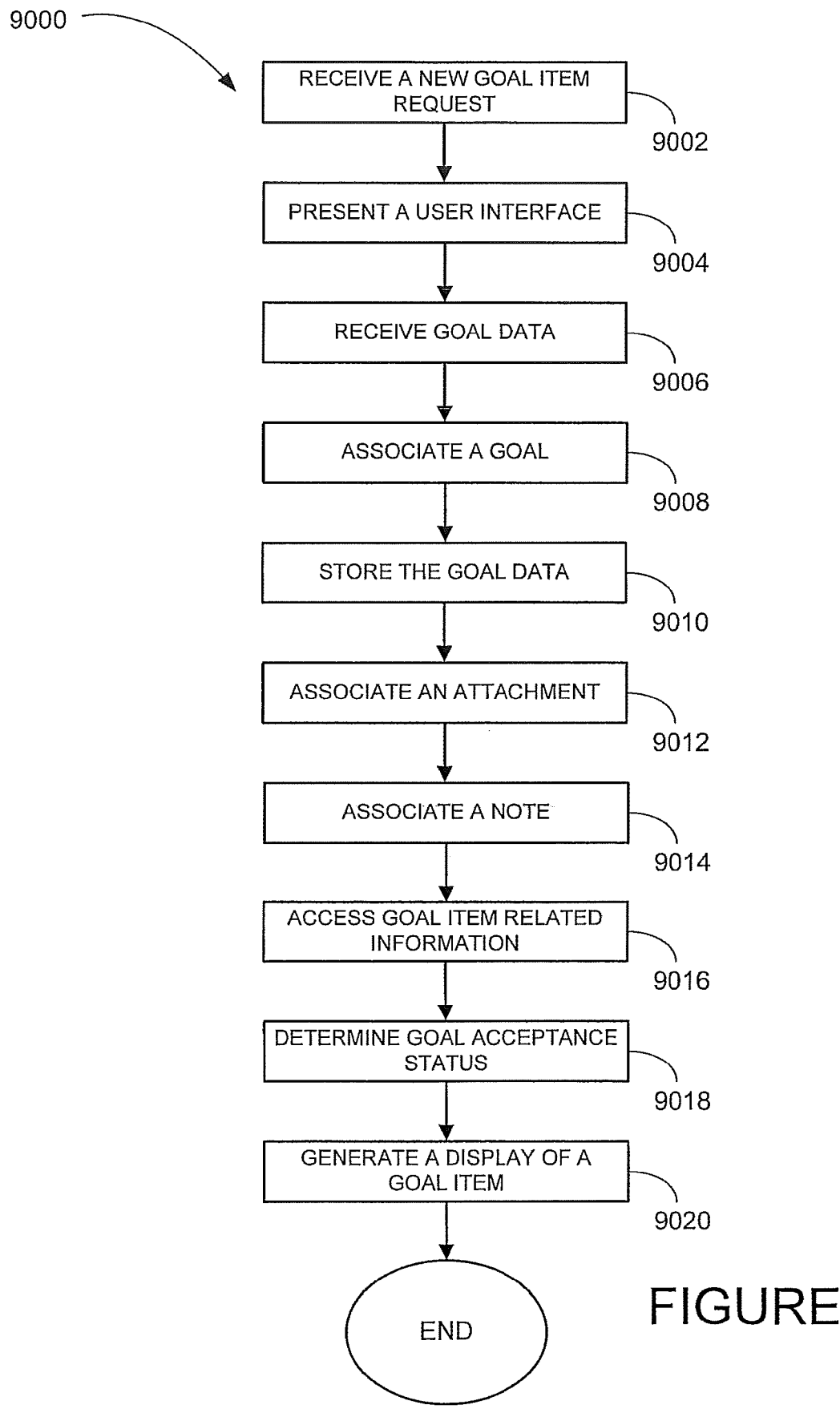
FIG. 90 is a block diagram of a flowchart illustrating a method for goal data processing, according to an example embodiment.

FIG. 90 illustrates a method 9000 for goal data processing according to an example embodiment. The method 9000 may be performed by the organization device 102 or the processor device 106 of the system 100 (see FIG. 1), or may otherwise be performed.

A new goal item request may be received at block 9002. The new goal item request may be received through a user interface, or may otherwise be received. In one embodiment, the new goal item request may be received through the user interface 800 when the operator selects the new button 3118 (see FIG. 31).

A user interface to receive goal data may be presented at block 9004. The user interface may be populated with default goal data. An example of the user interface populated with data is shown in the user interface 2300 (see FIG. 23).

Goal data associated with a resource and a goal template is received at block 9006. The goal data includes a goal title, a goal time period, a goal status, a goal access level, a goal description, and/or a contribution amount that the goal item has with a different item. In some embodiments, the goal data is associated with the resource and the goal template from management of the resource. In some embodiments, a template creation request is received from a goal owner and the business goal template is created based on receipt of the template creation request. The goal data associated with the resource may then be received from the goal owner. The goal template may then be the business goal template. In some embodiments, the goal template is a personal goal template. The goal time period may include a goal period start date and a goal period end date, a goal period start date and a goal duration, or may otherwise be set.

In some embodiments, the goal data associated with the resource is received from the resource, management associated with the resource, or a proxy to the resource. The proxy may be another resource with goal item management approval.

In some embodiments, a template creation request is received from a goal owner. The business goal template may be created based on receipt of the template creation request. The goal data associated with the resource may then be received from the goal owner.

In some embodiments, the goal is associated with a goal template at block 9008.

The goal data is stored in the database 108 as a portion of the item data 112 at block 9010.

An attachment may be associated with the goal item at block 9012. In one embodiment, the attachment may be initiated by operator selection of the attachment button 2710 (see FIG. 27).

In some embodiments, the attachment is received from the resource, management, or proxy and the association of the attachment is based on receipt of the attachment. In other embodiments, a link (e.g., a URL) to the attachment is received from the resource, management, or proxy and association of the attachment is based on receipt of the link. By using a link, the attachment may be maintained in its original location without creating an additional copy for attachment.

A note may be associated with the goal item at block 9014. The note may include a note description, a note title, a note status, and/or an active note indication.

Goal item related information may be accessed from the goal data at block 9016. For example, the goal status of the goal item and the goal access level of the goal item may be accessed.

A determination of goal acceptance status of the goal item may be made at block 9018.

A display of a goal item associated with the resource may be generated at block 9020 based on at least a portion of the goal data. The goal item represents the goal for the resource. The goal item is related to the goal template. Examples of the displays of the goal item include the user interfaces 2400, 2700, 2800 (see FIGS. 24, 27, and 28). The display of the goal item may also be presented along with other items in the user interfaces.

In some embodiments, a determination of a presence of a location pointer associated with an interface device (e.g., of the organization device 102) in proximity to the indicia that the attachment is associated with the outcome item may be made. The display of the outcome item generated at block 9020 may then include a file name of the attachment in proximity to the indicia that the attachment is associated with the outcome item.

The display of the goal item may include, by way of example the goal status, a goal status visual indicator, the goal title, an acceptance status indicator, an access level indicator, the goal time period, indicia of association of the goal with the goal template, indicia that the note is associated with the goal item, and/or contribution amount.

In some embodiments, a determination of a number of times that the goal item has been accepted by management associated with the resource may be performed. The display may then indicate the number of times that the goal item has been accepted by the management along with the indicia of the acceptance status of the goal item.

In some embodiments, a determination of presence of a location pointer associated with an interface device in proximity to the indicia of linking between the goal item and the different item may be made. A determination of whether the different item is included by filter settings may then be made. The display of the goal item may then includes a title of the different item, the contribution amount, and indicia of a result of a determination of whether the different item is included by filter settings in proximity to the indicia of linking between the goal item and the different item.

In some embodiments, a contribution amount that the goal item has with a different item may be received. The contribution amount for the goal item may be stored. The display of the goal item may then include the contribution amount. In one embodiment, the different item is an outcome item.

In some embodiments, a determination of a presence of a location pointer associated with an interface device in proximity to the indicia that the note is associated with the goal item may be made. The display of the outcome item generated at block 9020 may then include the note title in proximity to the indicia that the note is associated with the goal item.

In some embodiments, a determination of the note status of the note may be made. The color may then be selected for note title display based on the note status.

In some embodiments, a determination of whether the outcome item is included by filter settings may be made based on a determination that the goal item is linked to the outcome item. The display of the goal item may then include indicia that the goal item is linked to the outcome item and indicia of a result of a determination of whether the outcome item is included by filter settings in proximity to the indicia that the goal item is linked to the outcome.

In some embodiments, an additional item display may be generated. The additional item display may include display of an additional item. The display of the goal item may be presented in a first pane of a user interface. The additional display may be presented in a second pane of the same user interface. A determination that the additional item is linked to the goal item may be made. The display of the goal item may include indicia of a determination that the additional item is linked and the display of the additional item includes the indicia of the determination that the additional item is linked.

In some embodiments, an additional item connection number between additional items associated with an item type of the second pane and a second pane resource may be determined. The display of the goal item may then include the indicia of the determination that the additional item is linked and the additional item connection number.

In some embodiments, a determination of a resource connection number associated with the resource may be made. A resource connection may be associated with the resource connection number being a link from an item associated with additional resource to the goal item or a link from the goal item to the item associated with the additional resource. The display may then include resource connection indicia and the resource connection number.

In some embodiments, a determination of a presence of a location pointer associated with an interface device in proximity to the resource connection indicia may be made. The display of the goal item may then include the resource connection indicia, the resource connection number, identification of the resource connection, and identification of whether the link is from the item to the goal item or the link from the goal item to the item based on a determination of the presence of the location pointer.

Figure 91:
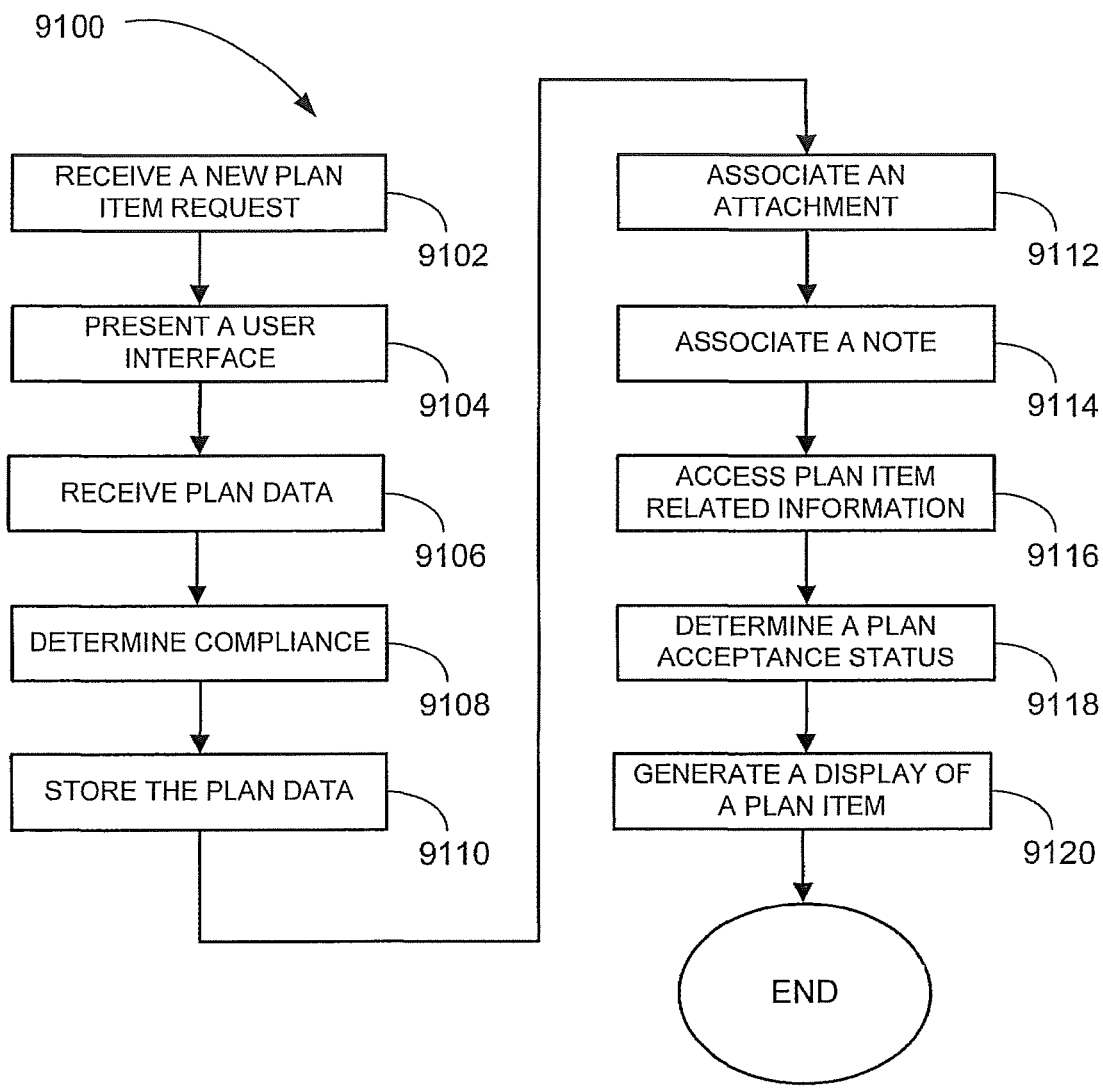
FIG. 91 is a block diagram of a flowchart illustrating a method for plan data processing, according to an example embodiment.

FIG. 91 illustrates a method 9100 for plan data processing according to an example embodiment. The method 9100 may be performed by the organization device 102 or the processor device 106 of the system 100 (see FIG. 1), or may otherwise be performed.

A new plan item request may be received at block 9102. The new plan item request may be received through a user interface, or may otherwise be received. In one embodiment, the new plan item request may be received through the user interface 800 when the operator selects the new button 3416 (see FIG. 34).

A user interface to receive plan data may be presented at block 9104. The user interface may be populated with default plan data. An example of the user interface populated with data is shown in the user interface 910 (see FIG. 9).

Plan data associated with a resource and identification of a plan section family is received at block 9106. The plan data includes a plan time period, a plan title, a plan priority, a plan status, a plan access level, and/or a plan description. The plan data may be associated with a resource. The resource may be associated with a plan template. The plan data may be received from the manager of the resource, or may otherwise be received.

The plan data may be received through a user interface, or may otherwise be received. In one embodiment, the plan data is received from the operator's completion of one or more of the fields of the user interface 3200 and selection of the ok button 3220 (see FIG. 32).

In some embodiments, the plan data associated with the resource is received from the resource, management associated with the resource, or a proxy to the resource. The proxy may be another resource with plan item management approval.

A determination whether the plan data is in compliance with the plan section family based on the plan template associated with the resource is made at block 9108.

The plan data is stored in the database 108 as a portion of the item data 112 at block 9110 based on a determination that the plan data is in compliance.

An attachment may be associated with the plan item at block 9112. In one embodiment, initiation of the attachment may be made based on selection by the operator of the attachment button 3322 (see FIG. 33). In some embodiments, the attachment is received from the resource, management, or proxy and the association of the attachment is based on receipt of the attachment. In other embodiments, a link to the attachment is received from the resource, management, or proxy and association of the attachment is based on receipt of the link. By using a link, the attachment may be maintained in its original location without creating an additional copy for attachment.

A note may be associated with the plan item at block 9114. The note may include a note description, a note title, a note status, and/or an active note indication. In one embodiment, initiation of receipt of the note may be made by operator selection of the note button 3324 (see FIG. 33).

In some embodiments, the note may be received from the resource. In some embodiments, the note may be received from an additional resource. The additional resource may be a different resource than the resource. A determination that the additional resource is a managed connection of the resource may be made. The association of the note with the plan item may be based on a determination that the additional resource is the managed connection.

Plan item related information may be accessed from the plan data at block 9116. For example, the plan status of the plan item, the plan priority of the plan item, and the plan access level of the plan item may be accessed from the plan data.

A determination of a plan acceptance status of the plan item may be made at block 9118.

A display of a plan item associated with the resource may be generated at block 9120 based on at least a portion of the plan data. The plan item represents the plan for the resource.

The display of the plan item may include, by way of example, plan status, a plan status visual indicator, the plan priority, the plan title, an acceptance status indicator, an access level indicator, and/or the plan time period.

In some embodiments, a determination of a number of times that the goal item has been accepted by management of the resource may be performed. The display may then indicate the number of times that the goal item has been accepted by the management along with the indicia of the acceptance status of the goal item.

In some embodiments, a determination of a presence of a location pointer associated with an interface device (e.g., of the organization device 102) in proximity to the indicia that the attachment is associated with the plan item may be made. The display of the plan item generated at block 9120 may then include a name of the attachment in proximity to the indicia that the attachment is associated with the plan item.

In some embodiments, a determination of a presence of a location pointer associated with an interface device in proximity to the indicia that the note is associated with the plan item may be made. A determination may be made that the notes is an active note. The display of the plan item generated at block 9118 may then include the note title in proximity to the indicia that the note is associated with the plan item.

In some embodiments, a determination of note status of the note is may be made. The color may then be selected for note title display based the note status.

In some embodiments, a determination of whether the outcome item is included by filter settings may be made based on a determination that the plan item is linked to the outcome item. The display of the plan item may then include indicia that the plan item is linked to the outcome item and indicia of a result of a determination of whether the outcome item is included by filter settings in proximity to the indicia that the plan item is linked to the outcome item.

In some embodiments, an additional item display may be generated. The additional item display may include display of an additional item. The display of the plan item may be presented in a first pane of a user interface. The additional display may be presented in a second pane of the same user interface. A determination that the additional item is linked to the plan item may be made. The display of the plan item may include indicia of a determination that the additional item is linked and the display of the additional item includes the indicia of the determination that the additional item is linked.

In some embodiments, an additional item connection number between additional items associated with an item type of the second pane and a second pane resource may be determined. The display of the plan item may then include the indicia of the determination that the additional item is linked and the additional item connection number.

In some embodiments, a determination of whether the additional item is included by filter settings of the second pane may be made. The display of the plan item may include the indicia of the determination that the additional item is linked, the additional item connection number, and indicia of a result of a determination of whether the additional item is included by filter settings.

In some embodiments, a determination of a resource connection number associated with the resource may be made. A resource connection may be associated with the resource connection number being a link from an item associated with additional resource to the plan item or a link from the plan item to the item associated with the additional resource. The display may then include resource connection indicia and the resource connection number.

In some embodiments, a determination of a presence of a location pointer associated with an interface device in proximity to the resource connection indicia may be made. The display of the plan item may then include the resource connection indicia, the resource connection number, identification of the resource connection, and identification of whether the link is from the item to the plan item or the link from the plan item to the item based on a determination of the presence of the location pointer.

Figure 92:
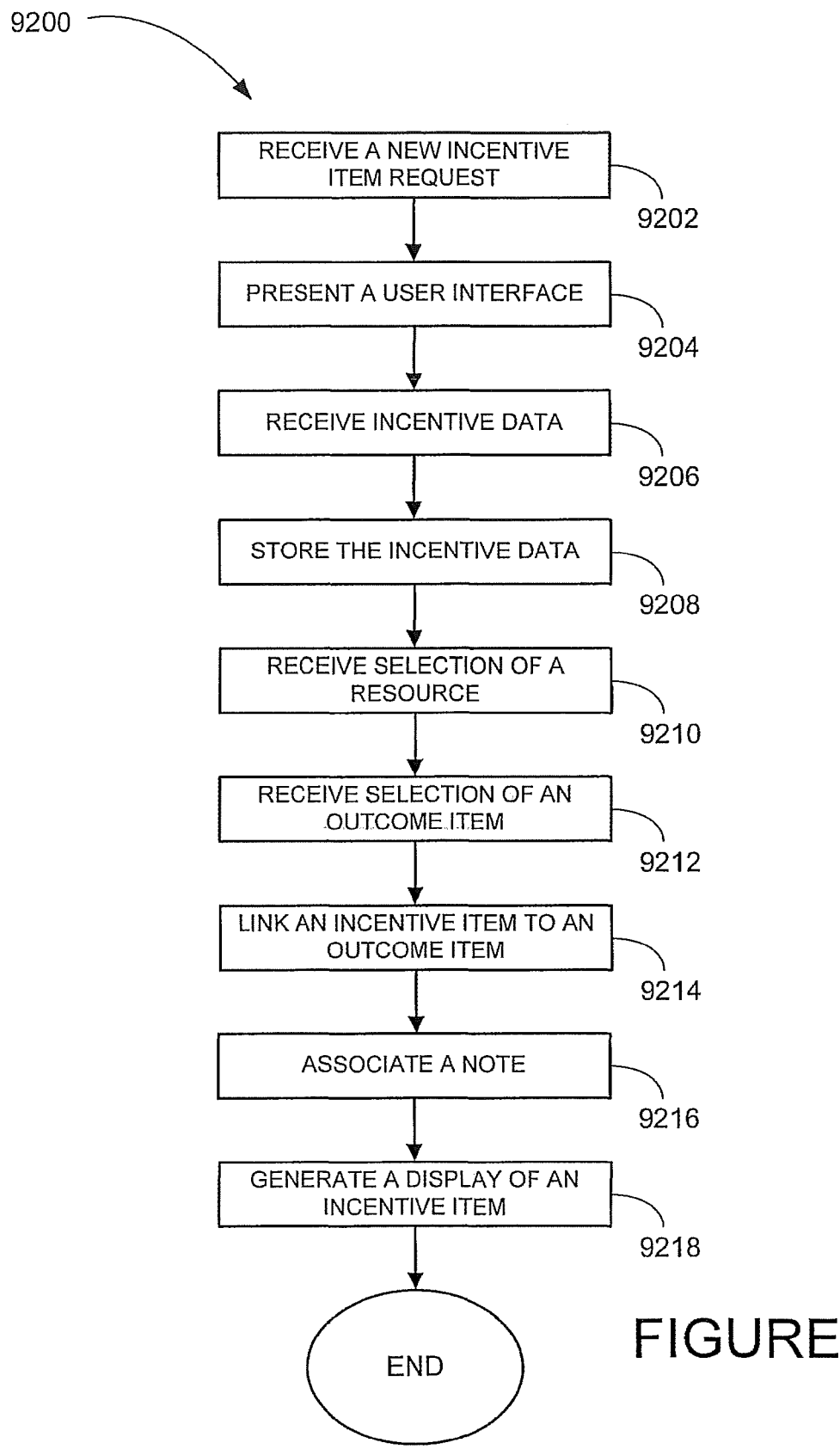
FIG. 92 is a block diagram of a flowchart illustrating a method for incentive data processing, according to an example embodiment.

FIG. 92 illustrates a method 9200 for incentive data processing according to an example embodiment. The method 9200 may be performed by the organization device 102 or the processor device 106 of the system 100 (see FIG. 1), or may otherwise be performed.

In general, certain resources (e.g., an organization operator or other personnel directing incentives for the organization) may cause the method 9200 to be initiated to create an incentive item for another resource.

Once created, the incentive item may then be linked by the originating resource to one or more outcome items of the receiving resource. The receiving resource then has an incentive to timely and fully complete the outcome associated with the outcome item to receive the incentive from the organization.

A new incentive item request may be received at block 9202. The new incentive item request may be received through a user interface, or may otherwise be received.

A user interface to receive incentive data may be presented at block 9204. The user interface may be populated with default incentive data.

Incentive data associated with a template is received from a template owner at block 9206. The template owner is the resource that created the template. The incentive data includes an incentive time period, an incentive title, an incentive priority, an incentive status, an incentive access level, an incentive description, and/or customized field. The resource may be the operator or a different resource in the organization. Examples of resources include users and computer systems. Other types of resources may be used. The incentive time period may include an outcome period start date and an outcome period end date, an outcome period start date and an outcome duration, or a different way of representing the incentive time period.

The incentive data may be received through a user interface, or may otherwise be received. In one embodiment, the incentive data is received from the operator's completion of one or more of the fields of the user interface 900 and selection of the ok button 926 (see FIG. 9).

The incentive data is stored in the database 108 as a portion of the item data 112 at block 9208.

Selection of a resource for an incentive is received from the template owner at block 9210. The incentive is associated with the incentive data.

Selection of an outcome item associated with the resource is received from a manager of the resource at block 9212.

The incentive item may be linked to the outcome item based on receipt of the selection of the outcome item at block 9214.

In some embodiments, selection of an additional outcome item associated with the resource may be received from the management of the resource at block 9212 and the incentive item may be linked to the outcome item based on receipt of the selection. A first portion of the incentive may then be based on the outcome item and a second portion of the incentive may be based on the additional outcome item.

A note may be associated with the outcome item at block 9216. The note may include a note description, a note title, a note status, and/or an active note indication. In some embodiments, the note is received from the resource. In some embodiments, the note is received from an additional resource. A determination may be that the additional resource is a managed connection of the resource. The association of the note with the incentive item may then based on a determination that the additional resource is the managed connection.

A display of an incentive item associated with the resource based may be generated at block 9218 on at least a portion of the incentive data. The incentive item represents the incentive for the resource. The display of the incentive item generally includes the incentive title and the incentive time period. However, more or less portions of incentive data may be displayed with the incentive item.

In some embodiments, a determination of a presence of a location pointer associated with an interface device in proximity to the indicia that the note is associated with the outcome item may be made. A determination that the note is an active note may be made. The display of the outcome item generated at block 9218 may then include the note title in proximity to the indicia that the note is associated with the outcome item.

In some embodiments, a display of an outcome item is generated. A determination that the incentive item is linked to the outcome item may be made. A determination of whether the outcome item is included by filter settings. The display of the incentive item may then include the note title, indicia that the incentive item is linked to the outcome item, and indicia of a result of a determination of whether the outcome item is included by filter settings in proximity to the indicia that the note is associated with the incentive item.

In some embodiments, an additional item display may be generated. The additional item display may include display of an additional item. The display of the incentive item may be presented in a first pane of a user interface. The additional display may be presented in a second pane of the same user interface. A determination that the additional item is linked to the incentive item may be made. The display of the incentive item may include indicia of a determination that the additional item is linked and the display of the additional item includes the indicia of the determination that the additional item is linked.

In some embodiments, a display of an outcome item may be generated. The display of the incentive item and the outcome item may be for a same user interface. A determination of whether the incentive item is linked to the outcome item. The display of the plan item may include indicia of a determination of whether the incentive item is linked to the outcome item.

In some embodiments, an additional item connection number between additional items associated with an item type of the second pane and a second pane resource may be determined. The display of the incentive item may then include the indicia of the determination that the additional item is linked and the additional item connection number.

In some embodiments, a determination determining that management of the resource has accepted the incentive item may be made. The display of the incentive item may then include indicia that the management of the resource has accepted the incentive item.

In some embodiments, a note status of the note may be determined. A color for note title display may be selected based on a determination of the note status. The display of the incentive item may then include the note title in the color in proximity to the indicia that the note is associated with the incentive item.

Figure 93:
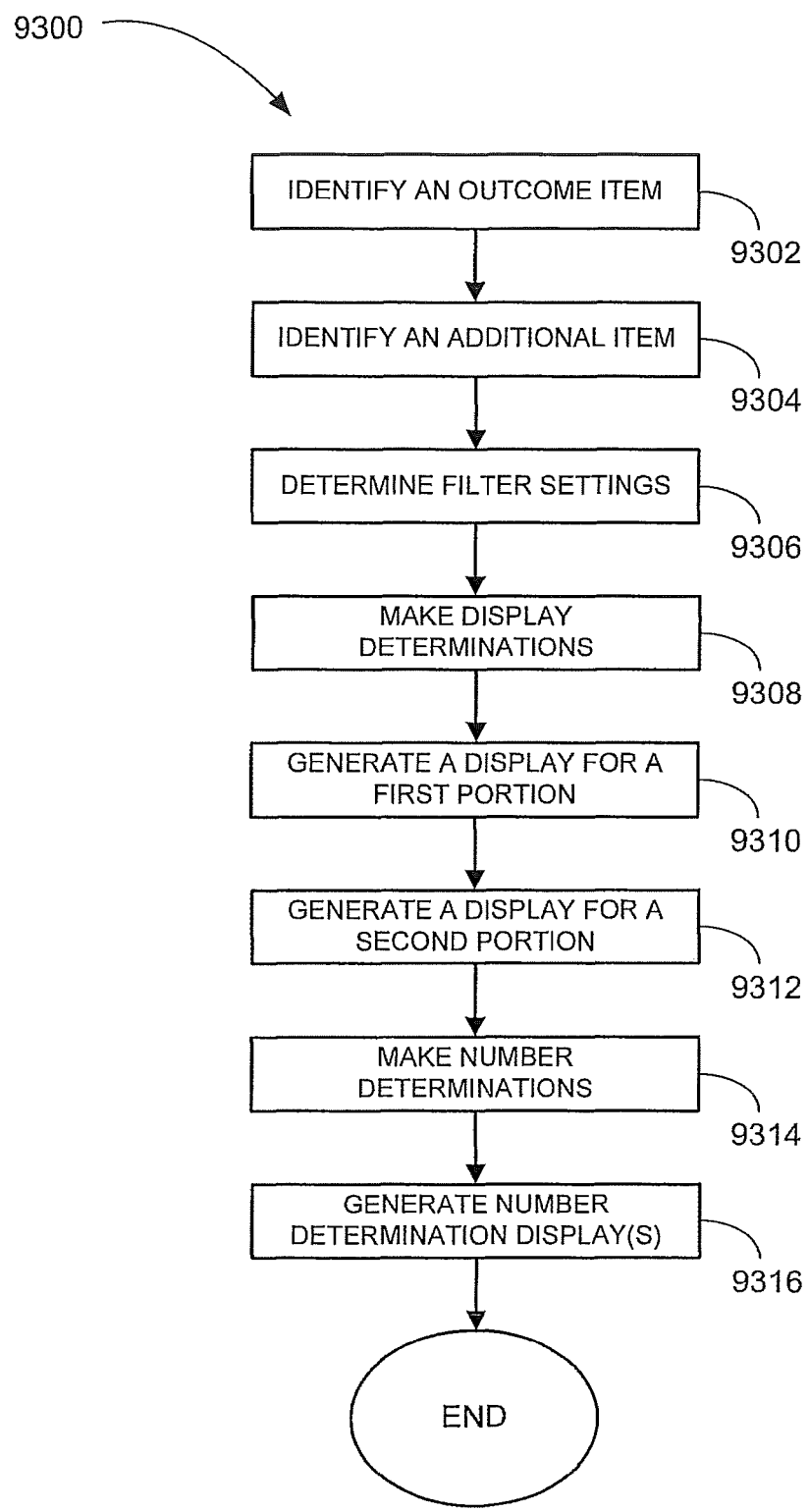
FIG. 93 is a block diagram of a flowchart illustrating a method for display generation, according to an example embodiment.

FIG. 93 illustrates a method 9300 for display generation according to an example embodiment. The method 9300 may be performed by the organization device 102 or the processor device 106 of the system 100 (see FIG. 1), or may otherwise be performed.

An outcome item associated with a first resource is identified at block 9302. The outcome item represents a first resource outcome for the first resource.

An additional item associated with a second resource is identified at block 9304. The outcome item represents a second resource outcome for the second resource. The additional item is a different item than the outcome item. In one embodiment, the first resource is a different resource than the second resource. In another embodiment, the first resource is the same resource as the first resource.

In some embodiments, a determination of whether either or both of the items have been accepted by a manager of the respective resources.

Filter settings may be determined for one or both items at block 9306. The filter settings may include, by way of example, a time period, a status, and/or an include deleted setting.

Display determinations may be made at block 9308. A single display determination or multiple display determinations may be made.

In some embodiments, the display determinations include determining whether an attachment has been associated with the item, determining whether the item is linked to the other item, determining whether a note has been associated with the item, determining whether another resource is linked to the item, determining an acceptance status of the item, determining an access level of the item, determining a number of total items to which the item is linked, determining whether a manager is associated with a resource, determining a number of total notes that are associated the item, and/or determining a number of total resources linked to the item.

In some embodiments, the display determinations include determining a number of a goal items to which the item is linked, determining a number of plan items to which the item is linked, and/or determining a number of incentive items to which the additional item is linked.

A display is generated at block 9310 for a first portion of a user interface based on identification of the outcome item.

A display is generated at block 9312 for a second portion of the user interface based on identification of the additional item. In some embodiments, the display of the outcome item, the additional item, or both include indicia of a determination of whether the item is accepted by the manager.

In some embodiments, the display for the first portion includes the outcome item and the display for the second portion includes the additional item.

In some embodiments, a determination of whether the additional item is linked to the outcome item may be made. The display of the outcome item, the additional item, or both may then include indicia of a determination of whether the additional item is linked to the outcome item.

The generation of the display may be based on display determinations. In some embodiments, the display for a portion may includes a title of the item, a period date of the item, a status visual indicator, an attachment indicator when a determination is made that the attachment has been associated with the additional link, a link indicator when a determination is made that one item is linked to another item, a note indicator when a determination has been made that the not has been associated with the item, a connections indicator when a determination has been made that another resource has linked to the item, an acceptance status indicator based on the acceptance status of the item, an access level indicator based on the access level of the item, identification of the resource, and/or identification of the manager of the resource. In one embodiment, the link indicator includes the number of total items. In one embodiment, the note indicator includes the number of total notes. In one embodiment, the link indicator includes the number of total resources.

In some embodiments, the display for a portion may include a linked goals indicator that includes the number of the goal items to which the item is linked, a linked plan indicator that includes the number of the plan items to which the item is linked, and/or a linked incentives indicator that includes the number of the incentive items to which the item is linked.

In some embodiments, generation of the display is based on the filter settings of on or both items.

Number determinations may be made at block 9314. A single number determination or multiple number determinations may be made. In one embodiment, a determination of a number of resources that are not outcome associated may be made. In one embodiment, a determination of a number of the outcome items that have not been accepted may be made. In one embodiment, a determination of a number of outcome items that are not goal associated may be made.

Number determination display generations may be made at block 9316 based on the number determination made at block 9314. In one embodiment, a display may be generated for a portion of the user interface that includes indicia of the number of the resources that are not outcome associated. In one embodiment, a display may be generated for a portion of the user interface that includes indicia of the number of the plurality of outcome items that have not been accepted. In one embodiment, a display may be generated for a portion of the user interface that includes indicia of the number of the plurality of outcome items that are not goal associated.

Figure 94:
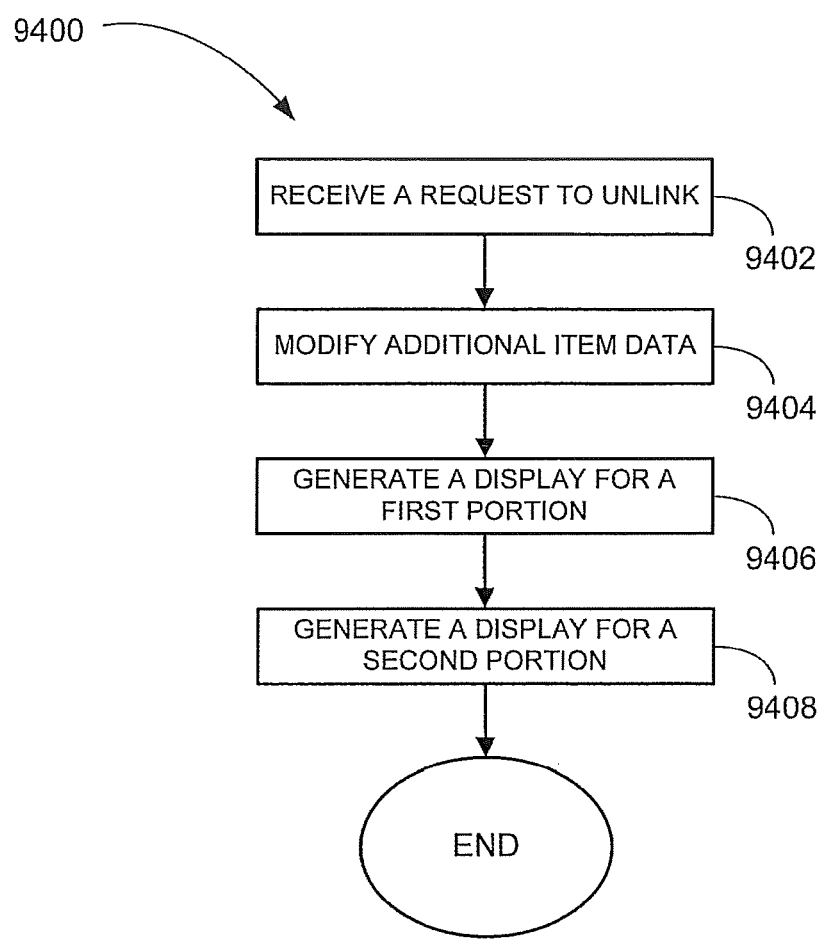
FIG. 94 is a block diagram of a flowchart illustrating a method for unlinking items, according to an example embodiment.

FIG. 94 illustrates a method 9400 for unlinking items according to an example embodiment. The method 9400 may be performed by the organization device 102 or the processor device 106 of the system 100 (see FIG. 1), or may otherwise be performed.

A request to unlink an additional item to the outcome item is received at block 9402. Additional item data associated with the additional item is modified based on receipt of the request to unlink at block 9404.

A display for a first portion of an additional user interface may be generated at block 9406 based on identification of the outcome item and modification to the additional item data. A display for a second portion of the additional user interface may be generated at block 9408 based on identification of the additional item and modification to the additional item data.

Figure 95:
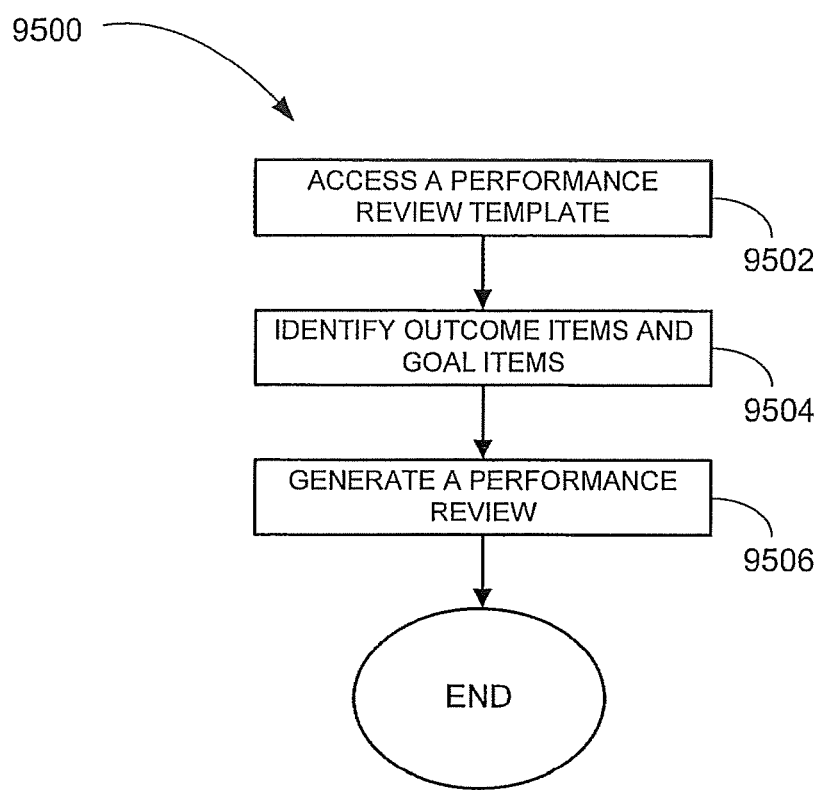
FIG. 95 is a block diagram of a flowchart illustrating a method for performance review generation, according to an example embodiment.

FIG. 95 illustrates a method 9500 for performance review generation according to an example embodiment. The method 9500 may be performed by the organization device 102 or the processor device 106 of the system 100 (see FIG. 1), or may otherwise be performed. The performance review is an example of a report that may be generated by the reporting subsystem 206 (see FIGS. 2, 3, and 6). However, other and different reports may be generated by the reporting subsystem 206.

A performance review template associated with a resource is accessed at block 9502. Outcome items and goal items associated with the resource are identified at block 9504. A performance review is generated based on the performance review template and identification of the outcome items and the goal items at block 9506. In some embodiments, the performance review is generated based on the performance review template, identification of the outcome items and the goal items, a determination of outcome status of the outcome items, and a determination of goal status of the goal items.

Figure 96:
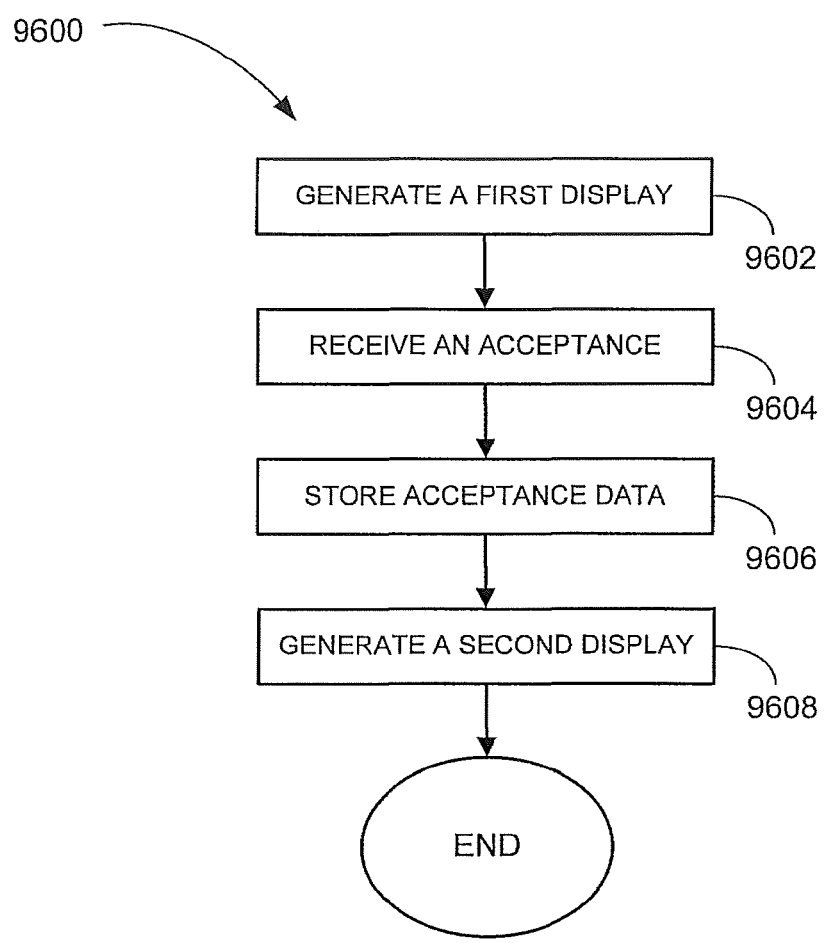
FIG. 96 is a block diagram of a flowchart illustrating a method for performing manager accept, according to an example embodiment.

FIG. 96 illustrates a method 9600 for performing manager accept according to an example embodiment. The method 9600 may be performed by the organization device 102 or the processor device 106 of the system 100 (see FIG. 1), or may otherwise be performed.

A first display of an outcome item associated with a first resource is generated at block 9602. An acceptance for the outcome item is received from a second resource at block 9604. The second resource has acceptance authority over the first resource.

At block 9606, acceptance data for the outcome item may be stored in the item data 112 of the database 108 based on receipt of the acceptance. A second display of the outcome item associated with the first resource is generated at block 9608 based on the acceptance data.

In some embodiments, the outcome data of the outcome item is analyzed to determine a number of acceptances received from the second resource for the outcome item. Generation of the second display of the outcome item associated with the first resource may then be based on the acceptance data and analysis of the outcome data. In one embodiment, the second display includes indicia of the number of acceptances received from the second resource for the outcome item.

Figure 97:
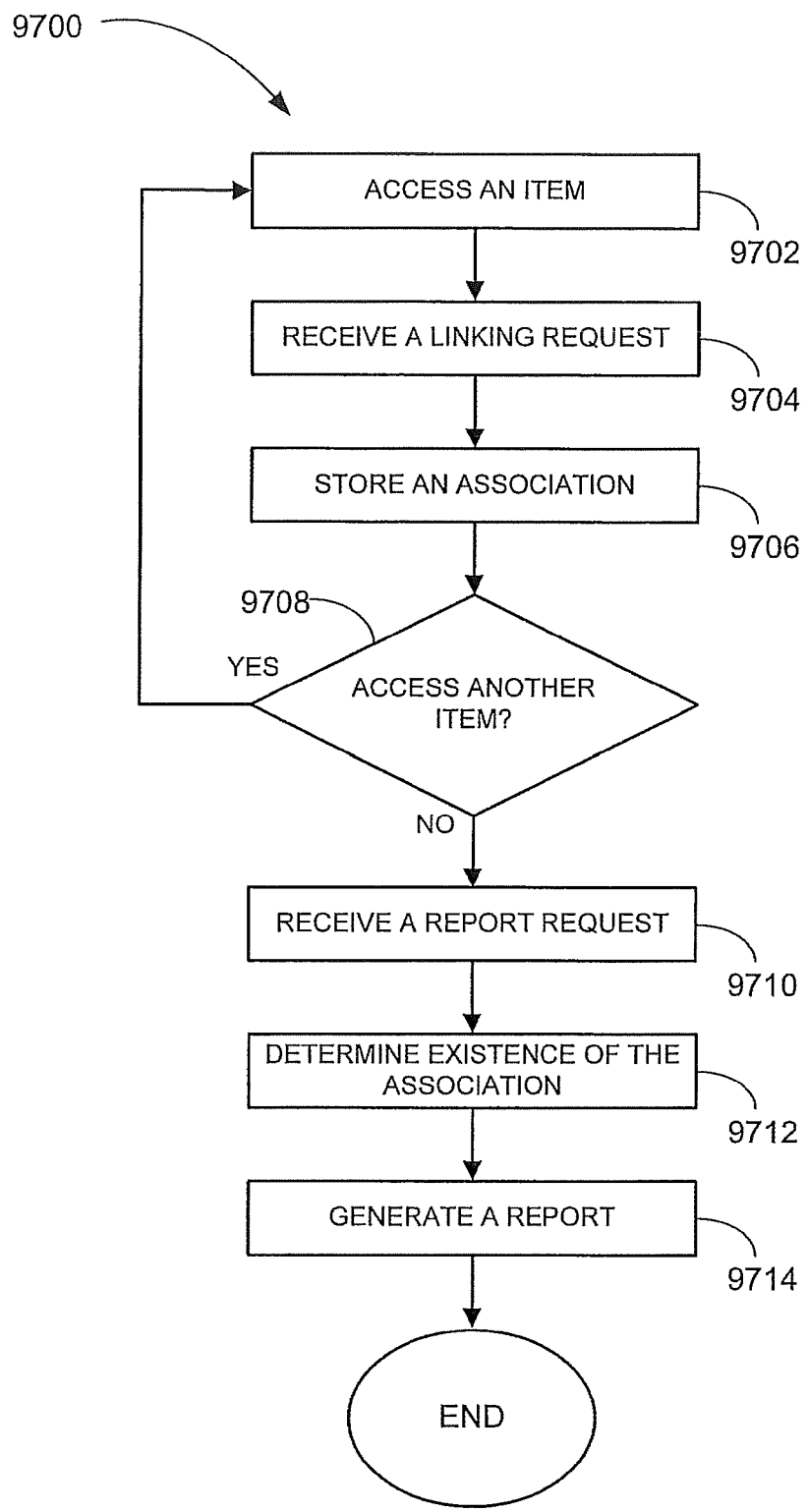
FIG. 97 is a block diagram of a flowchart illustrating a method for item association, according to an example embodiment.

FIG. 97 illustrates a method 9700 for item association according to an example embodiment. The method 9700 may be performed by the organization device 102 or the processor device 106 of the system 100 (see FIG. 1), or may otherwise be performed.

An item may be accessed at block 9702. A linking request associated with the item may be received at block 9704. An association between the item and another item may be stored at block 9706.

At decision block 9708, a determination may be made whether to access another item may be made. If a determination is made to access another item, the method 9700 may return to block 9702. If a determination is made at decision block 9708 not to access another item, the method 9700 may proceed to block 9710.

A report request may be received at block 9710. A determination of existence of an association between one or more items of one or more resources may be made at block 9712. A report may be generated at block 9714 based on a result of a determination.

In some embodiments, the method 9700 may include accessing an outcome item associated with a first resource, receiving a first linking request associated with a first additional item, the first additional item being a different item than the outcome item, storing an association between the outcome item and the first additional item based on receipt of the first linking request, receiving a second linking request associated with a second additional item, the second additional item being a different item than the outcome item and the first additional item, and storing an association between the outcome item and the first additional item based on receipt of the first linking request.

In some embodiments, the method 9700 may include receiving a report request, determining an existence of the association between the outcome item and the first additional item based on receipt of the first linking request in response to receipt of the report request, determining an existence of the association between the outcome item and the second additional item based on receipt of the second linking request, and generating a report based on the report request, a determination of the existence of the association between the outcome item and the first additional item, and a determination of the existence of the association between the outcome item and the second additional item.

In some embodiments, the first additional item is a first additional outcome item and the first additional outcome item is associated with the first resource.

In some embodiments, the first additional item is a first additional outcome item and the first additional outcome item is associated with a second resource, the second resource being a different resource than the first resource.

In some embodiments, the second additional item is a second additional outcome item, and the second additional outcome item is associated with a third resource, the third resource being a different resource than the first resource and the second resource.

In some embodiments, the first additional item, the second additional item, or both the first and the second additional item are goal items. In one embodiment, first goal item is associated with a first goal template and the second goal item is associated with a second goal template, the second goal template being different than the first goal template.

In some embodiments, the first additional item, the second additional item, or both the first and the second additional item are plan items. In one embodiment, the first additional item is a milestone plan item and the second additional item is an obstacle plan item.

In some embodiments, the first additional item, the second additional item, or both the first and the second additional item are incentive items. In one embodiment, the first incentive item is associated with a first incentive template, and the second incentive item is associated with a second incentive template, the second incentive template being different than the first incentive template.

In some embodiments, the method 9700 includes accessing a plan item associated with a first resource, receiving a first linking request associated with a first additional item, the first additional item being a different item than the plan item, storing an association between the plan item and the first additional item based on receipt of the first linking request, receiving a second linking request associated with a second additional item, the second additional item being a different item than the plan item and the first additional item, and storing an association between the plan item and the first additional item based on receipt of the first linking request.

In some embodiments, the method 9700 includes receiving a report request, determining an existence of the association between the plan item and the first additional item based on receipt of the first linking request in response to receipt of the report request, determining an existence of the association between the plan item and the second additional item based on receipt of the second linking request, and generating a report based on the report request, a determination of the existence of the association between the plan item and the first additional item, and a determination of the existence of the association between the plan item and the second additional item.

In some embodiments, the first additional item is a first additional plan item and the first additional plan item is associated with the first resource.

In some embodiments, the first additional item is a first additional plan item and the first additional plan item is associated with a second resource, the second resource being a different resource than the first resource. In some embodiments, the second additional item is a second additional plan item, and the second additional plan item is associated with a third resource, the third resource being a different resource than the first resource and the second resource.

The foregoing methods and systems describe the use of a number of items in the form of outcome items, goal items, plan items, and incentive items. However, other forms of items may also be used with the methods and systems described in this document.

Figure 98:
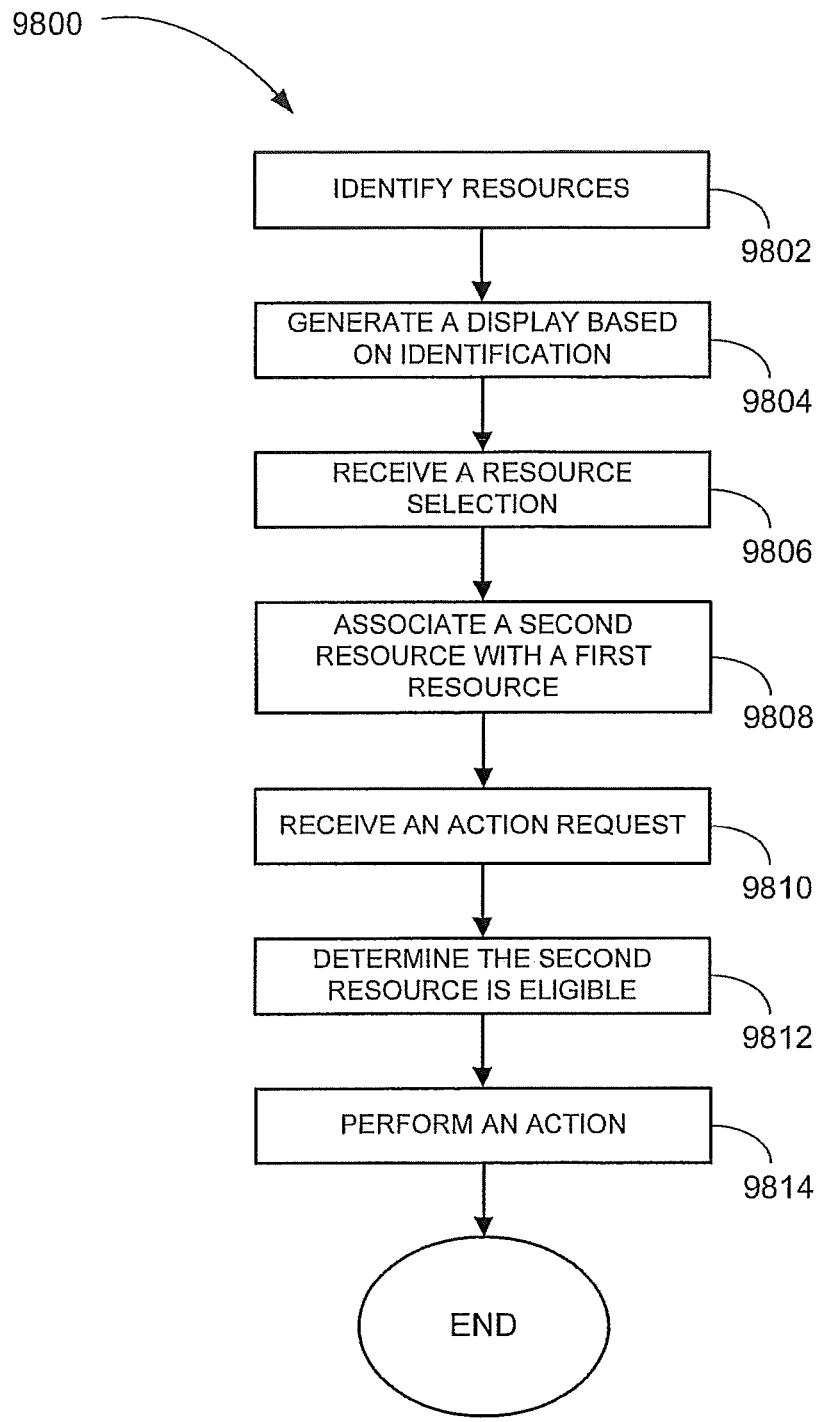
FIG. 98 is a block diagram of a flowchart illustrating a method for establishing an achievement network, according to an example embodiment.

FIG. 98 illustrates a method 9800 for establishing an achievement network according to an example embodiment. The method 9800 may be performed by the organization device 102 or the processor device 106 of the system 100 (see FIG. 1), or may otherwise be performed.

Resources understanding of the association to other resources they are or may be dependent on may improve resource and organization achievement. Resource managers may automatically associates a resource to the manager of the resource and anyone that reports directly to the resource. In addition, the resource may automatically add to their achievement network, anyone who reports to them. The resource has the ability to invite anyone from another department or externally (if applicable) to join their achievement network. If the other resource accepts, the resource then has the ability to view and interact with any items the connected resource wishes to share based on their access level settings.

Resources associated with an organization are identified at block 9802. The resources may include a first resource and a second resource.

A display is generated at block 9804 based on identification of the resources.

At block 9806, a resource selection of the second resource is received from the first resource based on generation of the display Associating of the second resource with the first resource is performed at block 9808 based on receipt of the resource selection.

An action request may be received at block 9810. A determination for whether the second resource is eligible to perform the action associated with the action request may be determined at block 9812. Based on a determination that the second resource is eligible, the action may be performed at block 9814.

In one embodiment, a view request is received from the second resource. The view request is to bring to view an item associated with the first resource. A determination that the second resource is view eligible is made based on association of the second resource with the first resource. A display including the item for the second resource is generated based on a determination that the second resource is view eligible.

In one embodiment, a link request is received from the second resource for an item associated with the first resource. A determination that the second resource is link eligible based on association of the second resource with the first resource. The link is established based on a determination that the second resource is link eligible.

In one embodiment, a note association request is received from the second resource for an item associated with the first resource. A determination that the second resource is note association eligible is made based on association of the second resource with the first resource. Association of a note with the item is made based on a determination that the second resource is note association eligible.

Figure 99:
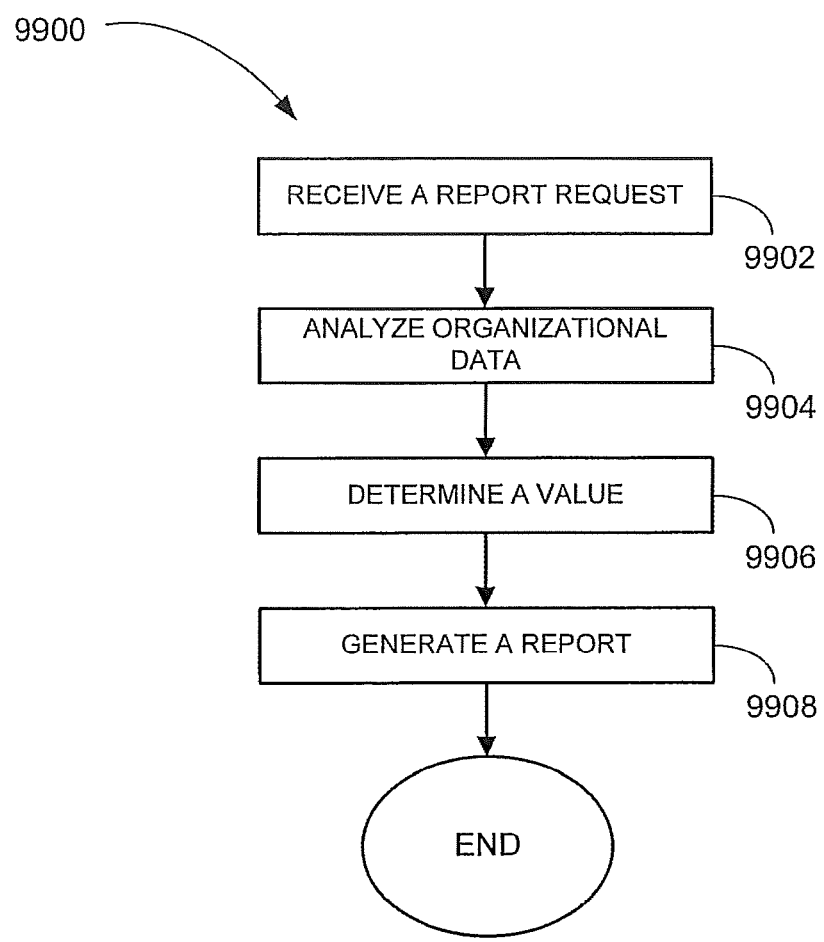
FIG. 99 is a block diagram of a flowchart illustrating a method for report generation, according to an example embodiment.

FIG. 99 illustrates a method 9900 for report generation according to an example embodiment. The method 9900 may be performed by the organization device 102 or the processor device 106 of the system 100 (see FIG. 1), or may otherwise be performed.

A report request may be received from a resource associated with an organization at block 9902. The organization is associated with the organizational data.

In some embodiments, a single potential attribute or multiple attributes (e.g., status, outcome, etc.) associated with an item attribute are accessed. The attributes may be received with the report request, or may otherwise be received.

Organizational data is analyzed at block 9904 to identify outcome linkage associated with outcome items. In some embodiments, the analysis is performed in response to receipt of the report request. In other embodiments, the analysis is performed automatically (e.g., based on a scheduled running of the schedule).

In one embodiment, the outcome items are associated with a single resource. In one embodiment, the outcome items are associated with different resources of an organization. In one embodiment, the outcome items are associated with different resources of a department of an organization. In one embodiment, the outcome items are associated with different resources of a team in an organization.

At block 9906, a determination of a value is determined based on organizational data. The value may be associated with the linkage.

A report is generated at block 9908 based on analysis of the organization data. In one embodiment, the generation of the report is based on the analysis of the organization data and the potential attributes.

In some embodiments, history outcome linkage data may be accessed. A determination of a chance or likelihood of achievement may be made based on a determination of the value. The generation of the report may be based on analysis of the organization data and the determination of the chance of achievement.

Figure 100:
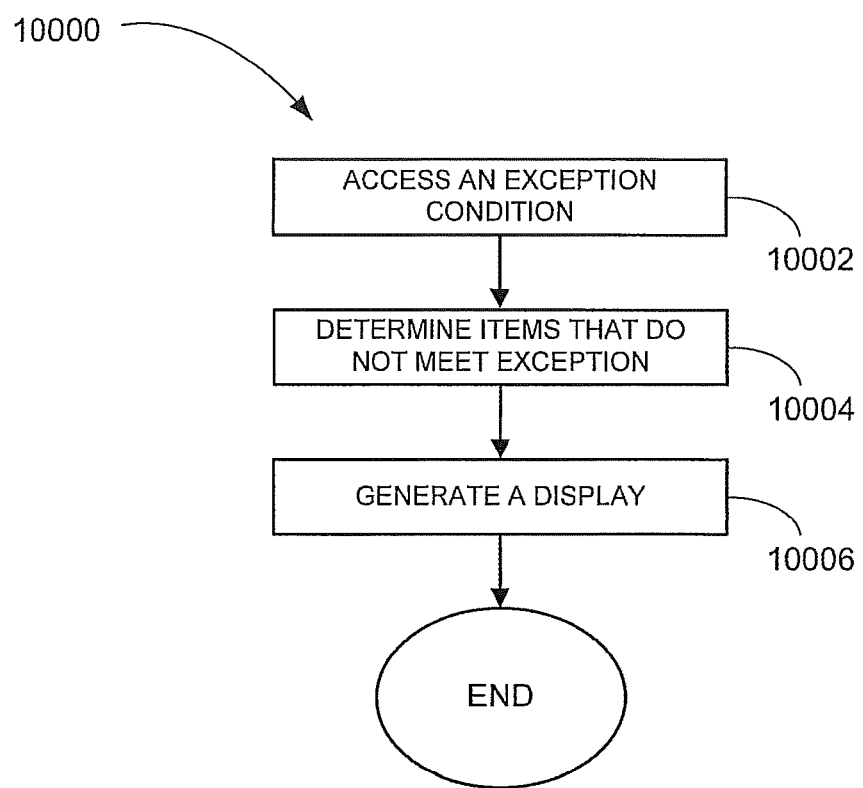
FIG. 100 is a block diagram of a flowchart illustrating a method for exception condition processing, according to an example embodiment.

FIG. 100 illustrates a method 10000 for exception condition processing according to an example embodiment. The method 10000 may be performed by the organization device 102 or the processor device 106 of the system 100 (see FIG. 1), or may otherwise be performed.

An exception condition associated with an item relationship is accessed at block 10002. A determination of items that do not meet the exception condition is made at block 10004. A display is generated based on a determination that the items that do not meet the exception condition.

Figure 101:
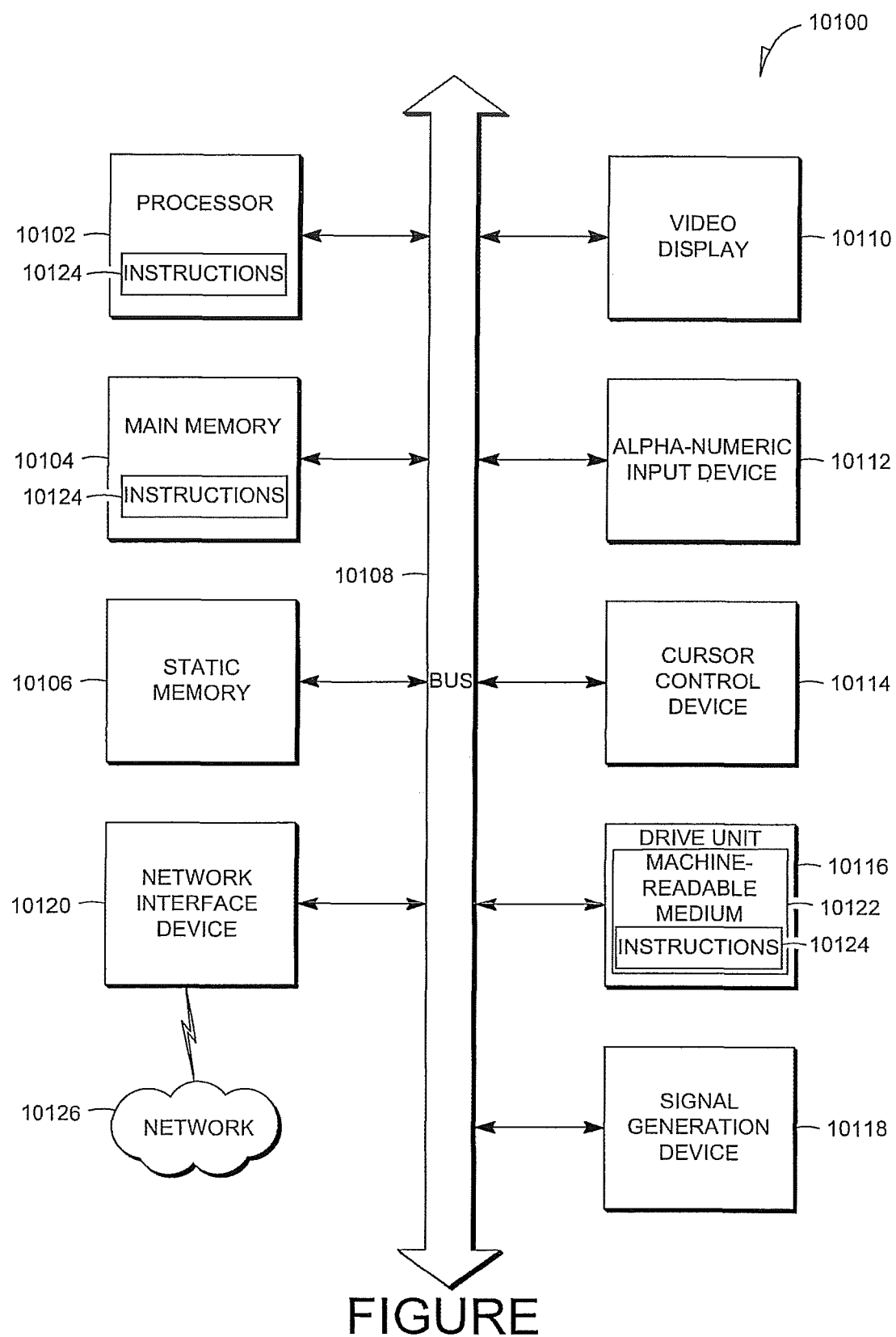
FIG. 101 is a block diagram of a machine in the example form of a computer system within which a set of instructions for causing the machine to perform any one or more of the methodologies discussed herein may be executed.

FIG. 101 shows a block diagram of a machine in the example form of a computer system 10100 within which a set of instructions may be executed causing the machine to perform any one or more of the methods, processes, operations, or methodologies discussed herein. The organization device 102, the provider device 106, or both may include the functionality of the one or more computer systems 10100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 10100 includes a processor 10112 (e.g., a central processing unit (CPU) a graphics processing unit (GPU) or both), a main memory 10104 and a static memory 10106, which communicate with each other via a bus 10108. The computer system 10100 may further include a video display unit 10110 (e.g., a liquid crystal display (LCD) or a cathode ray tube (CRT)). The computer system 10100 also includes an alphanumeric input device 10112 (e.g., a keyboard), a cursor control device 10114 (e.g., a mouse), a drive unit 10116, a signal generation device 10118 (e.g., a speaker) and a network interface device 10120.

The drive unit 10116 includes a machine-readable medium 10122 on which is stored one or more sets of instructions (e.g., software 10124) embodying any one or more of the methodologies or functions described herein. The software 10124 may also reside, completely or at least partially, within the main memory 10104 and/or within the processor 10112 during execution thereof by the computer system 10100, the main memory 10104 and the processor 10112 also constituting machine-readable media.

The software 10124 may further be transmitted or received over a network 10126 via the network interface device 10120.

While the machine-readable medium 10122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a machine-readable medium. The modules may be regarded as being communicatively coupled.

The methods and systems described herein may provide tools for resources and others who contribute to an organization's performance to gain insight into their performance and improve their likelihood of success, based on collected data. The methods and systems are not limited to top-down monitoring of resource performance, but may instead provide tools to enable resources to specify their own desired goals, to track and report progress toward those goals, and to improve their likelihood of success toward those goals.

The methods and systems may enable setting and evaluation of resource outcomes, for business planning, for creating connections between resources and between items, and other features for performance evaluation. The methods and systems may provide for configurability including the ways in which the data may be displayed and manipulated. The methods and systems may provide a data set that includes information on the human aspects of business performance. The methods and systems may provide for a number of possibilities for reporting and analysis based on such a data set.

The methods and systems may use several possible interfaces for including a web-based (SaaS) model interface and a mobile interface. Other interfaces may also be used.

In an example embodiment, outcome data associated with a resource may be received. The outcome data may include an outcome time period, an outcome title, an outcome priority, an outcome status, and an outcome access level. The outcome status may identify progress by a resource toward an outcome. The outcome access level may define other resource access to an outcome item beyond the resource. The outcome data may be stored in a database. A display of the outcome item associated with the resource may be generated based on at least a portion of the outcome data. The outcome item may represent the outcome for the resource.

In an example embodiment, goal data associated with a resource and a goal template may be received. The goal data may include a goal title, a goal time period, a goal status, and a goal access level. The goal status may identify progress by a resource toward a goal. The goal access level may define other resource access to a goal item beyond the resource. The goal data may be stored in a database. A display of the goal item associated with the resource may be generated based on at least a portion of the goal data. The goal item may represent the goal for the resource. The goal item may be related to the goal template.

In an example embodiment, plan data associated with a resource and identification of a plan section family may be received. The resource may be associated with a plan template. The plan data may include a plan time period, a plan title, a plan priority, a plan status, and a plan access level. The plan status may identify progress by the resource toward a plan. The plan access level may define other resource access to a plan item beyond the resource. A determination of whether the plan data is in compliance with the plan section family based on the plan template associated with the resource. The plan data may be stored in a database based on a determination that the plan data is in compliance. A display of the plan item associated with the resource may be generated based on at least a portion of the plan data, the plan item representing the plan for the resource.

In an example embodiment, incentive data associated with a template may be received from a template owner. The incentive data may include an incentive time period and an incentive title. The template owner may have managed creation of the template. The incentive data may be stored in a database. Selection of a resource for an incentive may be received from the template owner. The incentive may be associated with the incentive data. Selection of an outcome item associated with the resource may be received from a manager of the resource. The incentive item may be linked to the outcome item based on receipt of the selection of the outcome item. A display of an incentive item associated with the resource may be generated based on at least a portion of the incentive data, the incentive item representing an incentive for the resource.

In an example embodiment, an outcome item associated with a first resource may be identified. The outcome item may represent a first resource outcome for the first resource. An additional item associated with a second resource may be identified. The outcome item may represent a second resource outcome for the second resource. The additional item may be a different item than the outcome item. A display for a first portion of a user interface may be generated based on identification of the outcome item. A display for a second portion of the user interface may be generated based on identification of the additional item.

In an example embodiment, a performance review template associated with a resource may be accessed. A plurality of outcome items and a plurality of goal items associated with the resource may be identified. A performance review based on the performance review template and identification of the outcome items and the goal items may be generated.

In an example embodiment, a first display of an outcome item associated with a first resource may be generated. An acceptance for the outcome item may be received from a second resource. The second resource may have acceptance authority over the first resource. Acceptance data for the outcome item may be stored in outcome item data based on receipt of the acceptance. A second display of the outcome item associated with the first resource may be generated based on the acceptance data.

In an example embodiment, a plurality of resources associated with an organization may be identified. The plurality of resources may include a first resource and a second resource. A display may be generated based on identification of the plurality of resources. A resource selection of the second resource may be received from the first resource based on generation of the display. The second resource may be associated with the first resource based on receipt of the resource selection.

In an example embodiment, an initial item associated with a first resource may be accessed. A first linking request associated with a first additional item may be received. The first additional item may be a different item than the initial item. An association between the initial item and the first additional item may be stored based on receipt of the first linking request. A second linking request associated with a second additional item may be received. The second additional item may be a different item than the initial item and the first additional item. An association between the initial item and the second additional item may be stored based on receipt of the first linking request.

In an example embodiment, organizational data may be analyzed to identify outcome linkage associated with a plurality of outcome items. A value may be determined based on organizational data. The value may be associated with the linkage. A report may be generated based on analysis of the organization data.

In an example embodiment, an exception condition associated with an item relationship may be accessed. A determination of a plurality of items that do not meet the exception condition may be made. A display may be generated based on a determination of the plurality of items that do not meet the exception condition.

Thus, methods and systems for resource and organization achievement have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method for enterprise outcome management comprising:
    storing outcome data in a database in memory, the outcome data to provide enterprise outcome management and an outcome item associated with an organization outcome strategy, the outcome data including an outcome title, an assigned outcome access level, and an outcome status, the outcome status identifying progress of the outcome item, the assigned outcome access level defining other resource access to the outcome item beyond an outcome owner of the outcome item, and the outcome item identifying one or more accomplishments to achieve another outcome item or an ultimate outcome item of the organization outcome strategy;
    receiving, by a processor from a remote device over a network, a linking request initiated by a particular one of the plurality of resource devices defining a new link between the outcome item with another outcome item or with a non-outcome item, the non-outcome item being different than the outcome item;
    linking, by the processor, an association between the outcome item and the another outcome item or the outcome item and the non-outcome item based on receipt of the linking request;
    storing the link of the outcome item and the non-outcome item in a database in the memory;
    generating, by the processor, a display at a user interface including a representation of the at least one outcome item and a representation of a link between the outcome item and the non-outcome item, the representation of the outcome item including representations of at least one of the outcome title and the outcome status in association with the outcome item to restrict the outcome item to the display for one or more resources such that the display is changed according to the resource access having the assigned outcome access level;

sending the representation of the at least one outcome item and the representation of a link over a network;

storing the outcome item via a first electronic box of the user interface associated with the database in the memory to secure the outcome item and the links associated with the outcome item;

storing the non-outcome item via a second electronic box of the user interface associated with the database in the memory to secure the non-outcome item and the links associated with the non-outcome item; and securing the outcome item from change except when a change is by a manager device, an owner device that owns the outcome item, or a device with the assigned outcome access level with the change supporting at least part of the organization outcome strategy;

wherein generating the display of the outcome item further comprises generating an additional item display, the additional item display including display of an additional item, generation of the display of the outcome item being in a first pane of a user interface, generation of the additional display being in a second pane, the method further comprising:

determining that the additional item is linked to the outcome item, wherein the display of the outcome item includes indicia of a determination that the additional item is linked and the display of the additional item includes indicia of the determination that the additional item is linked;

receiving a new outcome item request for a new outcome item and storing the new outcome item request via a new first box of the user interface associated with the database in the memory;

populating a user interface with default outcome data based on receipt of the new outcome item request, the default outcome data including a default outcome status, and a default outcome access level, wherein receipt of the outcome data is through the user interface and at least some of the outcome data is not populated; and securing the new outcome item via the first box of the user interface from changes by devices other than changes from a manager device, an owner device that owns the outcome item, a device with the assigned outcome access level, or combinations thereof.

2. The method of claim 1, wherein the outcome data includes an outcome period start date and an outcome period end date; and wherein linking includes linking the outcome item to at least one incentive item.

3. The method of claim 1, wherein storing the outcome data comprises:

storing the outcome data, via the outcome item first box, associated with the resource from the resource, management associated with the resource, or a proxy to the resource, the management being a direct manager of the resource or a manager in direct line of sight to the top of an organization hierarchy of which the resource is associated, the proxy being another resource with outcome item management approval, and aligning the outcome data to organizational goals using a bottom-up approach.

4. The method of claim 1, further comprising:

accessing the outcome status of the outcome item from the outcome data via the outcome first item box, wherein the display of the outcome item includes indicia of the outcome status of the outcome item.

5. The method of claim 1, further comprising:

accessing an outcome priority of the outcome item from the outcome data, wherein the display of the outcome item includes indicia of the priority of the outcome item and an incentive item associated with the outcome item.

6. A method comprising:

receiving an incentive request associated with a resource item and an incentive template, the incentive request including incentive data associated with the resource item, the incentive data including an incentive title, an incentive status, and an incentive access level, the incentive status identifying progress by a resource item toward a defined incentive, the incentive access level defining other resource access to an incentive item beyond the resource item, the incentive request to provide enterprise outcome management within an organization outcome strategy, the incentive access level defining other resource access to the incentive item beyond an incentive owner of the incentive item, and the incentive item identifying one or more accomplishments to achieve another incentive item or an ultimate outcome of the organization outcome strategy;

storing the incentive data in a first electronic box of the user interface associated with a database in a memory;

storing the resource item in a second electronic box of the user interface associated with the database in the memory;

securing the incentive request from change except when a change is by a manager device, an owner device that owns the incentive item, or a device with the incentive access level with the change supporting at least part of the organization outcome strategy; and generating a display of the incentive item associated with the resource item based on at least a portion of the incentive data, the incentive item representing the incentive request for the resource item, the incentive item being related to the incentive template;

wherein generating the display of the incentive item further comprises:

generating an additional item display, the additional item display including display of an additional item, generation of the display of the incentive item being in a first pane of a user interface, generation of the additional display being in a second pane, determining that the additional item is linked to the incentive item, wherein the display of the incentive item includes an indicia of a determination that the additional item is linked and the display of the additional item includes the indicia of the determination that the additional item is linked;

receiving a new incentive item request for a new incentive item and storing the new incentive item request via a new first box of the user interface associated with the database in the memory;

populating a user interface with default incentive data based on receipt of the new incentive item request, the default incentive data including a default incentive status and a default incentive access level, wherein receipt of the incentive data is through the user interface and at least some of the incentive data is not populated; and securing the new incentive item from changes by devices other than changes from the manager device, an owner device that owns the incentive item, or a device with the incentive access level.

7. The method of claim 6, wherein the incentive template is a business incentive template, further comprising:

receiving a template creation request from an incentive owner;

creating the business incentive template based on receipt of the template creation request;

receiving the incentive data associated with the resource item from the incentive owner.

8. The method of claim 6, further comprising:

receiving a contribution amount that the incentive item has with a different item; and storing the contribution amount for the incentive item, wherein the display of the incentive item includes the contribution amount.

9. The method of claim 8, wherein the different item is an outcome item; and further comprising:

determining presence of a location pointer associated with an interface device in proximity to indicia of linking between the incentive item and the different item, determining whether the different item is included by filter settings; and wherein the display of the incentive item includes a title of the different item, the contribution amount, and indicia of a result of a determination of whether the different item is included by filter settings in proximity to the indicia of linking between the incentive item and the different item.

10. The method of claim 6, wherein receiving the incentive data comprises:

receiving the incentive data associated with the resource item from a resource management associated with the resource item or a proxy to the resource item, the resource management being a direct manager device of the resource item or a manager device in direct line of sight to the top of an organization hierarchy of which the resource item is associated, the proxy being another resource item with incentive item management approval, and wherein the incentive template is a personal incentive template associated with the resource item.

11. The method of claim 6, further comprising accessing the incentive status of the incentive item from the incentive data, wherein the display of the incentive item includes indicia of the incentive status of the incentive item.

12. The method of claim 6, further comprising determining an incentive acceptance status of the incentive item, wherein the display of the incentive item includes indicia of the acceptance status.

13. The method of claim 12, further comprising determining a number of times that the incentive item has been accepted by management associated with the resource item, wherein the display of the incentive item includes indicia of the acceptance status of the incentive item and indicia of the number of times that the incentive item has been accepted by the management.

14. The method of claim 6, further comprising:

accessing the incentive status of the incentive item and the incentive access level of the incentive item from the incentive data; and determining an incentive acceptance status of the incentive item, wherein the display of the incentive item includes the incentive status, a incentive status visual indicator, the incentive title, an acceptance status indicator, and an access level indicator, the incentive status visual indicator being based on the incentive status, the acceptance status indicator being based on the incentive acceptance status, the access level indicator being based on the incentive access level.

15. The method of claim 6, further comprising:

identifying a plurality of history items associated with the incentive item, a particular history item of the plurality of history items including a field of the incentive item, a value included in the field, and identification of a value providing resource associated with causing the value to be included in the field, the particular history item being associated with a modification to the incentive item; and generating a display including a listing of the plurality of history items.

16. The method of claim 6, further comprising:

determining filter settings of the incentive item, the filter settings including an outcome time period, an outcome status, and an outcome deleted setting; and determining filter settings of the additional item, the filter settings including an additional item time period, an additional item status, and an additional item deleted setting; wherein generation of the display for the first portion is based on the filter settings of the outcome item, and generation of the display for the second portion is based on the filter settings for the additional item.

17. A method comprising:

identifying a plurality of resources associated with an organization from remote devices over a network, the plurality of resources including at least a first resource and a second resource, the first and second resources contribute to an enterprise outcome management and an incentive item associated with an organization outcome strategy including one or more outcome items to achieve an outcome in the organization outcome strategy;

storing the plurality of resources in an electronic box of a user interface associated with a database in a memory;

generating a first display at the user interface based on identification of the plurality of resources, the first display including a representation of the identification of the plurality of resources;

receiving a resource selection selected by a user associated with the second resource from the first display at the user interface based on generation of the first display;

storing the resource selection in a resource location in the memory;

associating the second resource with the first resource based on receipt of the resource selection in the memory such that a processor forms an association between the first resource and the second resource;

receiving a view request from the user associated with the second resource at the user interface;

generating a view of an incentive item associated with the first resource in the first display of the user interface based on the view request made by the user associated with the second resource;

determining by the processor that the user associated with the second resource is view eligible for the view of the incentive item based on the association;

generating a second display at the user interface including the incentive item for the second resource based on a determination by the processor that the user associated with the second resource is view eligible;

receiving, by the processor from a remote device over the network, a link request from the user associated with the second resource for an incentive item associated with the first resource;

determining, by the processor, in response to the link request, that the second resource is link eligible based on the association of the second resource with the first resource;

establishing a link between the second resource and the incentive item associated with the first resource by the processor via a linking module, based on a determination that the second resource is link eligible; and generating at the second display of the user interface a representation of the link based on the link being established by the processor.

18. The method of claim 17, further comprising:

receiving a note association request from the user associated with the second resource at the user interface for a first incentive item associated with the first resource;

determining by the processor that the second resource is note association eligible based on association of the second resource with the first resource; and associating a note with the first incentive item based on a determination that the second resource is note association eligible in the memory.

19. The method of claim 17, further comprising:

receiving in the memory an access level for both accessing the first resource and the second resource, wherein the first display of the accessing the first resource and the second display of the accessing the second resource each includes indicia of the access level of the access level the first resource and the second resource, respectively.

20. The method of claim 19, further comprising:

identifying a portion of a plurality of additional resources, different from the plurality of resources, that report to the second resource; and generating a third display of a listing of the plurality of additional resources, the third display including indicia that the portion of the plurality of additional resources report to the second resource, wherein the access level of the second resource defines that an additional resource has access to the outcome item associated with the second resource.

21. A method comprising:

receiving, on a processor, incentive data associated with a strategy, the incentive data including an incentive title, an incentive deliverable, and an incentive access level defining other resource access to an incentive item beyond an owner of the incentive item;

receiving, in the processor, incentive linking data associated with at least one other incentive item or a non-incentive item, at least one other item being different than the incentive item, the incentive linking data being a type of relationship between items, and the non-incentive item being data from other sources;

storing the incentive data and incentive linking data in an incentive item location including a memory in the processor, memory, or a database; and generating a display of the incentive item associated with a strategy based on at least a portion of the incentive item data, the incentive item being restricted in the display for a resource such that the display is changed according to the incentive access level defined for each incentive item and where the incentive item is not an accepted incentive item until the resource and the owner of the incentive item both accept the incentive and the acceptance is stored in the incentive item location, wherein generating the display of the incentive item further comprises generating an additional item display, the additional item display including display of an additional item, generation of the display of the incentive item being in a first pane of a user interface, generation of the additional item display being in a second pane, the method further comprising:

determining that the additional item is linked to the incentive item, wherein the display of the incentive item includes a determination that the additional item is linked and the additional item display includes the determination that the additional item is linked;

receiving a new incentive item request and storing the new incentive item request via a new first box of the user interface associated with the database in the memory;

populating a user interface with default incentive data based on receipt of the new incentive item request, the default incentive data including a default incentive status, and a default incentive access level, and wherein receipt of the incentive data is through the user interface and at least some of the incentive data is not populated.

* * * * *